US011914094B2

(12) United States Patent
Widmer et al.

(10) Patent No.: US 11,914,094 B2
(45) Date of Patent: Feb. 27, 2024

(54) CIRCUIT FOR OBJECT DETECTION AND VEHICLE POSITION DETERMINATION

(71) Applicant: WiTricity Corporation, Watertown, MA (US)

(72) Inventors: Hans Peter Widmer, Wohlenschwil (CH); José Pedro Castro Fonseca, Regensdorf (CH); Andreas Daetwyler, Muhen (CH); Lukas Frank Sieber, Olten (CH)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 17/931,429

(22) Filed: Sep. 12, 2022

(65) Prior Publication Data

US 2023/0003914 A1 Jan. 5, 2023

Related U.S. Application Data

(63) Continuation of application No. 17/077,124, filed on Oct. 22, 2020.

(Continued)

(51) Int. Cl.
*G01V 3/08* (2006.01)
*B60L 53/122* (2019.01)

(Continued)

(52) U.S. Cl.
CPC ............ *G01V 3/088* (2013.01); *B60L 53/122* (2019.02); *B60L 53/124* (2019.02); *B60L 53/38* (2019.02);

(Continued)

(58) Field of Classification Search
CPC .......... G01V 3/088; G01V 3/101; G01V 3/10; B60L 53/122; B60L 53/124; B60L 53/38;

(Continued)

(56) References Cited

U.S. PATENT DOCUMENTS

| | | |
|---|---|---|
| 9,726,518 B2 | 8/2017 | Widmer et al. |
| 9,921,045 B2 | 3/2018 | Sieber et al. |

(Continued)

FOREIGN PATENT DOCUMENTS

| | | |
|---|---|---|
| EP | 3124314 | 2/2017 |
| WO | 2021081382 | 4/2021 |
| WO | 2022164558 | 8/2022 |

OTHER PUBLICATIONS

Resonant Filters, available at https://www.allaboutcircuits.com/textbook/alternating-current/chpt-8/resonant-filters/ on Jun. 9, 2019 (Year: 2019).*

(Continued)

*Primary Examiner* — Daniel R Miller
(74) *Attorney, Agent, or Firm* — Colby Nipper PLLC

(57) ABSTRACT

A multi-purpose detection circuit for object detection and vehicle position determination is described. For example, the circuit is configurable for detecting foreign metallic objects, living objects, and a vehicle or type of vehicle above an inductive wireless power transmitter. The circuit is also configurable for determining the vehicle's position relative to the inductive wireless power transmitter. An example apparatus includes a measurement circuit including a multiplexer, electrically connected to a plurality of inductive and capacitive sense circuits, for measuring one or more electrical characteristics in each of the inductive and capacitive sense circuits according to a predetermined time multiplexing scheme. The apparatus further includes a control and evaluation circuit for evaluating the measured electrical characteristics and determining at least one of a presence of a metallic object, a living object, a vehicle, or a type of vehicle, and a vehicle position based on changes in the measured electrical characteristics.

20 Claims, 35 Drawing Sheets

Related U.S. Application Data

(60) Provisional application No. 63/244,165, filed on Sep. 14, 2021, provisional application No. 62/926,307, filed on Oct. 25, 2019.

(51) Int. Cl.

| | |
|---|---|
| ***B60L 53/124*** | (2019.01) |
| ***B60L 53/38*** | (2019.01) |
| ***B60L 53/65*** | (2019.01) |
| ***G01V 3/10*** | (2006.01) |
| ***G06F 18/21*** | (2023.01) |
| ***H02J 50/10*** | (2016.01) |
| ***H02J 50/60*** | (2016.01) |
| ***H02J 50/90*** | (2016.01) |
| ***H05B 1/02*** | (2006.01) |

(52) U.S. Cl.
CPC .............. *B60L 53/65* (2019.02); *G01V 3/101* (2013.01); *G06F 18/217* (2023.01); *H02J 50/10* (2016.02); *H02J 50/60* (2016.02); *H02J 50/90* (2016.02); *H05B 1/0288* (2013.01); *G06V 2201/08* (2022.01)

(58) Field of Classification Search
CPC .... B60L 53/65; B60L 2240/80; G06F 18/217; H02J 50/10; H02J 50/60; H02J 50/90; H05B 1/0288; G06V 2201/08; Y02T 10/70; Y02T 90/14; Y02T 90/167; Y02T 10/7072; Y02T 90/12; Y04S 30/14; B60Y 2200/91
See application file for complete search history.

(56) References Cited

U.S. PATENT DOCUMENTS

| | | | | |
|---|---|---|---|---|
| 9,952,266 | B2 | 4/2018 | Katz et al. | |
| 10,122,192 | B2 | 11/2018 | Chopra et al. | |
| 10,124,687 | B2 | 11/2018 | Percebon et al. | |
| 10,293,696 | B2 | 5/2019 | Ludwig et al. | |
| 10,295,693 | B2 | 5/2019 | Widmer | |
| 10,298,049 | B2 | 5/2019 | Widmer et al. | |
| 10,302,795 | B2 | 5/2019 | Widmer et al. | |
| 10,340,752 | B2 | 7/2019 | Widmer et al. | |
| 10,411,524 | B2 | 9/2019 | Widmer et al. | |
| 10,495,773 | B2 | 12/2019 | Widmer et al. | |
| 10,566,839 | B2 | 2/2020 | Widmer et al. | |
| 10,627,257 | B2 | 4/2020 | Widmer | |
| 2003/0025679 | A1 | 2/2003 | Taylor | |
| 2013/0257168 | A1 | 10/2013 | Singh | |
| 2014/0015522 | A1 | 1/2014 | Widmer et al. | |
| 2014/0111019 | A1 | 4/2014 | Roy et al. | |
| 2015/0022014 | A1 | 1/2015 | Tanabe | |
| 2015/0211896 | A1* | 7/2015 | Wang | G01D 5/24 324/682 |
| 2015/0328996 | A1 | 11/2015 | Czainski | |
| 2016/0341573 | A1 | 11/2016 | Widmer et al. | |
| 2017/0054333 | A1* | 2/2017 | Roehrl | B60L 53/124 |
| 2017/0162931 | A1 | 6/2017 | Young et al. | |
| 2017/0203657 | A1 | 7/2017 | Ludwig et al. | |
| 2018/0198323 | A1* | 7/2018 | Widmer | G01V 3/101 |
| 2019/0006826 | A1 | 1/2019 | Islinger et al. | |
| 2019/0089206 | A1 | 3/2019 | Sieber et al. | |
| 2019/0225099 | A1 | 7/2019 | Sieber et al. | |
| 2019/0356178 | A1 | 11/2019 | Widmer et al. | |
| 2019/0363588 | A1 | 11/2019 | Daetwyler et al. | |
| 2019/0393732 | A1* | 12/2019 | Oshima | H02J 50/60 |
| 2020/0039368 | A1 | 2/2020 | Sieber et al. | |
| 2020/0200937 | A1 | 6/2020 | Widmer et al. | |
| 2020/0350787 | A1* | 11/2020 | Enderlin | H01F 38/14 |
| 2021/0124078 | A1 | 4/2021 | Widmer et al. | |
| 2022/0239160 | A1 | 7/2022 | Sieber et al. | |

OTHER PUBLICATIONS

"Impedance Matching—Wikipedia", Retrieved at: https://web.archive.org/web/20190901154045/en.wikipedia.org/wiki/Impedance_matching, Sep. 1, 2019, 11 pages.
"International Preliminary Report on Patentability", Application No. PCT/US2020/057139, dated Apr. 26, 2022, 10 pages.
"International Search Report and Written Opinion", Application No. PCT/US2020/057139, dated Apr. 6, 2021, 17 pages.
"International Search Report and Written Opinion", Application No. PCT/US2021/064858, dated Apr. 7, 2022, 12 pages.
"Invitation to Pay Additional Fees and Partial Search Report", Application No. PCT/US2020/057139, dated Feb. 12, 2021, 10 pages.
"International Search Report and Written Opinion", Application No. PCT/US2022/076345, dated Feb. 6, 2023, 11 pages.
"Non-Final Office Action", U.S. Appl. No. 17/077,124, filed Jun. 7, 2023, 21 pages.
"Restriction Requirement", U.S. Appl. No. 17/077,124, filed Mar. 24, 2023, 6 pages.
George, et al., "A Combined Inductive-capacitive Proximity Sensor and its Application to Sear Occupancy Sensing", May 2009, 5 pages.
Jeong, et al., "Living Object Detection System Based on Comb Pattern Capacitive Sensor for Wireless Ev Chargers", Dec. 2016, 6 pages.
"Notice of Allowance", U.S. Appl. No. 17/077,124, dated Sep. 18, 2023, 8 pages.

* cited by examiner

| Circuit | 500 of FIG. 5F | | 540 of FIG. 5G | |
|---|---|---|---|---|
| Configuration | Series resonant | Parallel resonant | Series resonant | Parallel resonant |
| Resonant angular frequency | $\omega_s \approx \frac{1}{\sqrt{L\,C_s}}$ | $\omega_p \approx \frac{1}{\sqrt{C_s\,L_p\,(1+n_L)}};\ n_L = \frac{L}{L_p}$ | $\omega_s \approx \frac{1}{\sqrt{L\,C_s\,(1+n_c)}};\ n_C = \frac{C_p}{C_s}$ | $\omega_p \approx \frac{1}{\sqrt{L\,C_p}}$ |
| Q-factor of sense coil 502 and inductor 506 | $Q = \frac{\omega_s\,L}{R}$ | $Q = \frac{\omega_p\,L}{R}\ ,\ Q_{Lp} = \frac{\omega_p\,L_p}{R_{Lp}}$ | $Q = \frac{1}{\omega_s\,L\,G}$ | $Q = \frac{1}{\omega_p\,L\,G}$ |
| Resonant resistance/conductance | $R_s \approx \frac{\omega_s\,L}{Q};\ \text{ for } \omega_s\,L_p \gg R_s$ | $G_p \approx \left(\frac{Q}{Q_{Lp}} + n_L\right)\frac{n_L}{Q\,\omega_p\,L}$ | $R_s \approx \frac{(1+n_C)^2}{Q}\ \omega_s\,L$ | $G_p \approx \frac{1}{Q\,\omega_p\,L};\ \text{ for } \omega_p\,C_s \gg G_p$ |
| Q-factor of sense circuit 501/541 | $Q_s \approx Q$ | $Q_p \approx Q\frac{(1+n_L)}{\left(\frac{Q}{Q_{Lp}} + n_L\right)}$ | $Q_s \approx Q$ | $Q_p \approx Q$ |
| Impedance/admittance in presence of object (e.g., object 110) | $Z_{11} \approx R_s + \Delta Z \approx R_s + \Delta Z_r$ | $Y_{11} \approx G_p + \Delta Y \approx G_p + \frac{n_L^{\,2}}{\omega_p^{\,2}\,L^2}\Delta Z_r$ | $Z_{11} \approx R_s + \Delta Z$ <br> $\approx R_s + (1+n_C)^2\,\omega_s^{\,2}L^2\,\Delta Y_r$ | $Y_{11} \approx G_p + \Delta Y \approx G + \Delta Y_r$ |
| Fractional change | $\Delta Z' \approx \frac{\Delta Z}{R_s} \approx Q_s\,\Delta Z_r'$ | $\Delta Y' \approx \frac{\Delta Y}{G_p} \approx \frac{n_L}{(1+n_L)} Q_p\,\Delta Z_r'$ | $\Delta Z' \approx \frac{\Delta Z}{R_s} \approx \frac{\Delta Y_r}{G} \approx Q_s\,\Delta Y_r'$ | $\Delta Y' \approx \frac{\Delta Y}{G_p} \approx Q_p\,\Delta Y_r'$ |
| Differential narrowband extrinsic SNR (WPT switching noise) | $\Delta SNR_{ex,s} \approx \frac{\lvert I_L\rvert\,\omega_s L}{V_{sn}}\lvert\Delta Z_r'\rvert$ | $\Delta SNR_{ex,p} \approx \frac{\lvert I_L\rvert\,\omega_p L}{V_{sn}}\lvert\Delta Z_r'\rvert$ | $\Delta SNR_{ex,s} \approx \frac{\lvert I_L\rvert}{I_{sn}}\lvert\Delta Y_r'\rvert$ | $\Delta SNR_{ex,p} \approx \frac{\lvert I_L\rvert}{I_{sn}}\lvert\Delta Y_r'\rvert$ |
| Differential narrowband intrinsic SNR (Sense signal noise) | $\Delta SNR_{int,s} \approx \frac{\lvert I_0\rvert}{I_{0,n}} Q_s\,\lvert\Delta Z_r'\rvert$ | $\Delta SNR_{int,p} \approx \frac{\lvert I_0\rvert}{I_{0,n}}\frac{n_L}{(1+n_L)} Q_p\,\lvert\Delta Z_r'\rvert$ | $\Delta SNR_{int,s} \approx \frac{\lvert V_0\rvert}{V_{0,n}} Q_s\,\lvert\Delta Y_r'\rvert$ | $\Delta SNR_{int,p} \approx \frac{\lvert V_0\rvert}{V_{0,n}} Q_p\,\lvert\Delta Y_r'\rvert$ |
| Differential narrowband intrinsic SNR (Thermal noise) | $\Delta SNR_{int,s} \approx \frac{\lvert I_L\rvert\ \omega_s L}{\sqrt{4kTB_m R}}\ \lvert\Delta Z_r'\rvert$ | $\Delta SNR_{int,p} \approx \frac{\lvert I_L\rvert\ \omega_p L}{\sqrt{4kTB_m(R+R_{Lp})}}\lvert\Delta Z_r'\rvert$ | $\Delta SNR_{int,s} \approx \frac{\lvert I_L\rvert\,\lvert\Delta Y_r'\rvert}{\sqrt{4kTB_m G}}$ | $\Delta SNR_{int,p} \approx \frac{\lvert I_L\rvert\,\lvert\Delta Y_r'\rvert}{\sqrt{4kTB_m G}}$ |
| Broadband extrinsic SNR (WPT fundamental disturbance) | $SNR_{W,s} \approx \frac{\lvert I_L\rvert}{V_{sw}}\frac{n_L}{Q_s}\frac{\omega_s^{\,2}}{\omega_W^{\,2}}\,\omega_s L$ | $SNR_{W,p} \approx \frac{\lvert I_L\rvert}{V_{sw}}\frac{(1+n_L)}{n_L}\frac{\omega_p^{\,2}}{\omega_W^{\,2}}\,\omega_p L$ | $SNR_{W,s} \approx \frac{\lvert I_L\rvert}{I_{sw}}\frac{\omega_s^{\,2}}{\omega_W^{\,2}}$ | $SNR_{W,p} \approx \frac{\lvert I_L\rvert}{I_{sw}}\frac{n_C}{Q_p}\frac{\omega_p^{\,2}}{\omega_W^{\,2}}$ |

FIG. 5K

| Circuit | 700 of FIG. 7J | | 740 of FIG. 7K | |
|---|---|---|---|---|
| Configuration | Series resonant | Parallel resonant | Series resonant | Parallel resonant |
| Resonant angular frequency | $\omega_s \approx \frac{1}{\sqrt{C\,L_s}}$ | $\omega_p \approx \frac{1}{\sqrt{C\,L_p\,(1+n_L)}}$ ; $n_L = \frac{L_s}{L_p}$ | $\omega_s \approx \frac{1}{\sqrt{L_p\,C_s\,(1+n_C)}}$ ; $n_C = \frac{C}{C_s}$ | $\omega_p \approx \frac{1}{\sqrt{C\,L_p}}$ |
| Q-factor of inductors 704, 706, and 744 | $Q_{Ls} = \frac{\omega_s\,L_s}{R_{Ls}}$ | $Q_{Ls} = \frac{\omega_p\,L_s}{R_{Ls}}$ , $Q_{Lp} = \frac{\omega_p\,L_p}{R_{Lp}}$ | $Q_{Lp} = \frac{1}{\omega_s\,L_p\,G_{Lp}}$ | $Q_{Lp} = \frac{1}{\omega_p\,L_p\,G_{Lp}}$ |
| Resonant resistance/conductance | $R_s \approx \frac{1}{Q_{Ls}\,\omega_s C}$ ; for $\omega_s\,L_p \gg R_s$ | $G_p \approx (1+n_L)\left(\frac{Q_{Ls}}{Q_{Lp}} + n_L\right)\frac{\omega_p C}{Q_{Ls}}$ | $R_s \approx \frac{n_C(1+n_C)}{Q_{Ls}\,\omega_s C}$ | $G_p \approx \frac{\omega_p C}{Q_{Lp}}$ ; for $\omega_p\,C_s \gg G_p$ |
| Q-factor of sense circuit 701/741 | $Q_s \approx Q_{Ls}$ | $Q_p \approx Q_{Ls}\frac{(1+n_L)}{\left(\frac{Q_{Ls}}{Q_{Lp}} + n_L\right)}$ | $Q_s \approx Q_{Lp}$ | $Q_p \approx Q_{Lp}$ |
| Impedance/admittance in presence of object (e.g., object 114) | $Z_{11} \approx R_s + \Delta Z \approx R_s + \Delta Z_r$ | $Y_{11} \approx G_p + \Delta Y$ $\approx G_p + (1+n_L)^2\,\omega_p^2\,C^2\,\Delta Z_r$ | $Z_{11} \approx R_s + \Delta Z \approx R_s + n_C^2\frac{\Delta Y_r}{\omega_s^2\,C^2}$ | $Y_{11} \approx G_p + \Delta Y \approx G_p + \Delta Y_r$ |
| Fractional change | $\Delta Z' \approx \frac{\Delta Z}{R_s} \approx Q_s\,\Delta Z_r'$ | $\Delta Y' \approx \frac{\Delta Y}{G_p} \approx \frac{\Delta Z_r}{R_{Ls}+R_{Lp}} \approx Q_p\,\Delta Z_r'$ | $\Delta Z' \approx \frac{\Delta Z}{R_s} \approx \frac{n_C}{1+n_C}\,Q_s\,\Delta Y_r'$ | $\Delta Y' \approx \frac{\Delta Y}{G_p} \approx Q_p\,\Delta Y_r'$ |
| Differential narrowband extrinsic SNR (WPT switching noise) | $\Delta SNR_{ex,s} \approx \frac{\lvert I_C\rvert}{V_{sn}}\frac{\lvert\Delta Z_r'\rvert}{\omega_s C}$ | $\Delta SNR_{ex,p} \approx \frac{\lvert I_C\rvert}{V_{sn}}\frac{\lvert\Delta Z_r'\rvert}{\omega_p C}$ | $\Delta SNR_{ex,s} \approx \frac{\lvert I_C\rvert}{I_{sn}}\lvert\Delta Y_r'\rvert$ | $\Delta SNR_{ex,p} \approx \frac{\lvert I_C\rvert}{I_{sn}}\lvert\Delta Y_r'\rvert$ |
| Differential narrowband intrinsic SNR (Sense signal noise) | $\Delta SNR_{int,s} \approx \frac{\lvert I_0\rvert}{I_{0,n}}\,Q_s\,\lvert\Delta Z_r'\rvert$ | $\Delta SNR_{int,p} \approx \frac{\lvert I_0\rvert}{I_{0,n}}\,Q_p\,\lvert\Delta Z_r'\rvert$ | $\Delta SNR_{int,s} \approx \frac{\lvert V_0\rvert}{V_{0,n}}\frac{n_C}{1+n_C}\,Q_s\,\lvert\Delta Y_r'\rvert$ | $\Delta SNR_{int,p} \approx \frac{\lvert V_0\rvert}{V_{0,n}}\,Q_p\,\lvert\Delta Y_r'\rvert$ |
| Differential narrowband intrinsic SNR (Thermal noise) | $\Delta SNR_{int,s} \approx \frac{\lvert I_C\rvert}{\sqrt{4kTB_m R_{Ls}}}\frac{\lvert\Delta Z_r'\rvert}{\omega_s C}$ | $\Delta SNR_{int,p} \approx \frac{\lvert I_C\rvert}{\sqrt{4kTB_m(R_{Ls}+R_{Lp})}}\frac{\lvert\Delta Z_r'\rvert}{\omega_p C}$ | $\Delta SNR_{int,s} \approx \frac{\lvert I_C\rvert\,\lvert\Delta Y_r'\rvert}{\sqrt{4kTB_m G_{Lp}}}\sqrt{\frac{(1+n_C)}{n_C}}$ | $\Delta SNR_{int,p} \approx \frac{\lvert I_C\rvert\,\lvert\Delta Y_r'\rvert}{\sqrt{4kTB_m G_{Lp}}}$ |
| Broadband extrinsic SNR (WPT fundamental disturbance) | $SNR_{W,s} \approx \frac{\lvert I_C\rvert}{V_{sW}}\frac{n_L}{Q_s}\frac{\omega_s^2}{\omega_W^2}\frac{1}{\omega_s C}$ | $SNR_{W,p} \approx \frac{\lvert I_C\rvert}{V_{sW}}\frac{\omega_p^2}{\omega_W^2}\frac{1}{\omega_p C}$ | $SNR_{W,s} \approx \frac{\lvert I_C\rvert}{I_{sW}}\frac{(1+n_C)}{n_C}\frac{\omega_s^2}{\omega_W^2}$ | $SNR_{W,p} \approx \frac{\lvert I_C\rvert}{I_{sW}}\frac{n_C}{Q_p}\frac{\omega_p^2}{\omega_W^2}$ |

*FIG. 7N*

| NaCl mass [%] | NaCl mass [mol/dm³] | σ (25°C) [mS/m] |
|---|---|---|
| ~0 | ~0 | ~0 |
| 0.01 | 0.0017 | 0.2 |
| 0.02 | 0.0034 | 0.4 |
| 0.04 | 0.0068 | 0.7 |
| 0.08 | 0.013 | 1.5 |
| 0.16 | 0.027 | 2.9 |
| 0.32 | 0.055 | 5.8 |
| 0.64 | 0.11 | 11.3 |
| 1.3 | 0.22 | 21.4 |
| 2.6 | 0.44 | 40.1 |
| 5.1 | 0.88 | ~70 |
| 10.2 | 1.75 | ~125 |
| 20.5 | 3.50 | ~190 |

CIRCUIT FOR OBJECT DETECTION AND VEHICLE POSITION DETERMINATION

RELATED APPLICATIONS

This application claims priority under 35 U.S.C. § 119(e) to U.S. Provisional Application 63/131,291, filed on Dec. 20, 2020 which is incorporated herein by reference in its entirety. This application is additionally a Continuation-in-Part of U.S. Utility application Ser. No. 17/077,124 filed on Oct. 22, 2020, which in turn claims priority under 35 U.S.C. § 119(e) to U.S. Provisional Application 62/926,307, filed on Oct. 25, 2019 which is additionally incorporated herein by reference in its entirety.

FIELD

The present disclosure relates generally to object detection and vehicle position determination, for example, in an application for inductive wireless charging of electric vehicles. In particular, the present disclosure is directed to a multi-purpose detection circuit configurable for detecting foreign metallic objects, living objects located near an inductive wireless power transmitter as well as for detecting a vehicle above the wireless power transmitter and for determining a position of the vehicle relative to the inductive wireless power transmitter.

BACKGROUND

Inductive wireless power transfer (WPT) systems provide one example of wireless transfer of energy. In an inductive WPT system, a primary power device (or wireless power transmitter) transmits power wirelessly to a secondary power device (or wireless power receiver). Each of the wireless power transmitter and wireless power receiver includes an inductive power transfer structure, typically a single or multi-coil arrangement of windings comprising electric current conveying materials (e.g., copper Litz wire). An alternating current passing through the coil e.g., of a primary wireless power transfer structure produces an alternating magnetic field. When a secondary wireless power transfer structure is placed in proximity to the primary wireless power transfer structure, the alternating magnetic field induces an electromotive force (EMF) into the secondary wireless power transfer structure according to Faraday's law, thereby wirelessly transferring power to the wireless power receiver if a resistive load is connected to the wireless power receiver. To improve a power transfer efficiency, some implementations use a wireless power transfer structure that is part of a resonant structure (resonator). The resonant structure may comprise a capacitively loaded inductor forming a resonance substantially at a fundamental operating frequency of the inductive WPT system (e.g., in the range from 80 kHz to 90 kHz).

Inductive wireless power transfer to electrically chargeable vehicles at power levels of several kilowatts in both domestic and public parking zones may require special protective measures for safety of persons and equipment. Such measures may include detection of foreign objects in an inductive power region of the inductive WPT system where electromagnetic field exposure levels exceed certain limits. This may be particularly true for systems where the inductive power region is open and accessible. Such measures may include detection of electrically conducting (metallic) objects and living objects, (e.g., humans, extremities of humans, or animals) that may be present within or near the inductive power region.

In certain applications for inductive wireless charging of electric vehicles, it may be useful to be able to detect foreign objects that may be present in the inductive power region and that could be susceptible to induction heating due to the high magnetic field strength in that region. In an inductive wireless power transfer system for electric vehicle charging operating at a fundamental frequency in the range from 80 kHz to 90 kHz, magnetic flux densities in the inductive power region (e.g., above a primary wireless power transfer structure) can reach relatively high levels (e.g., above 2 mT) to allow for sufficient power transfer (e.g., 3.3 kW, 7 kW, 11 kW, and the like). Therefore, metallic objects or other objects present in the magnetic field can experience undesirable induction heating. For this reason, foreign object detection (FOD) may be implemented to detect metallic objects or other objects that are affected by the magnetic field generated by the primary and/or the secondary wireless power transfer structure of the inductive WPT system.

In certain applications for inductive wireless charging of electric vehicles, it may also be useful to be able to detect living objects that may be present within or near an inductive power region where the level of electromagnetic field exposure exceeds certain limits (e.g., as defined by the International Commission on Non-Ionizing Radiation Protection (ICNIRP) recommendation). For this reason, living object detection (LOD) may be implemented to detect living objects (e.g., human extremities, animals), or other objects that may be exposed to the magnetic field generated by the primary and/or the secondary wireless power transfer structure of the inductive WPT system.

In further applications for inductive wireless charging of electric vehicles, it may also be useful to be able to detect a vehicle or the type of vehicle that may be present above the wireless power transmitter (e.g., above the primary wireless power transfer structure). For this reason, vehicle detection (VD) may be implemented. In yet another application for inductive wireless charging of electric vehicles, it may also be useful to be able to transmit data (e.g., a vehicle identifier or the like) from the vehicle-based secondary device to the ground-based primary device. For this reason, vehicle detection (VD) may be extended for receiving low rate signaling from the vehicle.

Efficiency of an inductive WPT system for electric vehicle charging depends at least in part on achieving sufficient alignment between the ground-based primary wireless power transfer structure and the secondary wireless power transfer structure. Therefore, in certain applications for inductive wireless charging of electric vehicles, it may be useful to be able to determine a position of the vehicle relative to the wireless power transmitter for purposes of guidance and alignment. More specifically, it may be useful to be able to determine a position of the vehicle-based wireless power transfer structure (e.g., the secondary wireless power transfer structure) relative to the ground-based wireless power transfer structure (e.g., the primary wireless power transfer structure). For this reason, position determination (PD) may be implemented.

In an aspect of hardware complexity reduction and cost saving, it may be useful and desirable to provide FOD, LOD, VD, and PD by a common multi-purpose detection circuit.

SUMMARY

In one aspect of the disclosure, an apparatus for determining at least one of a presence of a metallic object, living object, vehicle, type of vehicle, and a vehicle position is provided. The apparatus includes a plurality of inductive sense circuits and a plurality of capacitive sense circuits. Each of the plurality of inductive sense circuits includes at least one inductive sense element (e.g., a sense coil) and an associated capacitive element to compensate for the gross reactance as presented at the terminals of the at least one inductive sense element at an operating frequency herein referred to as the sense frequency. Each of the plurality of capacitive sense circuits includes at least one capacitive sense element (e.g., a sense electrode) and an associated inductive element to compensate for the gross reactance as presented at the terminals of the at least one capacitive sense element at the sense frequency. At least one of the plurality of inductive and capacitive sense circuits also includes an impedance matching element (e.g., a transformer) for transforming the impedance of the sense circuit to match with an operating impedance range of the apparatus. The apparatus further includes a measurement circuit for selectively and sequentially measuring an electrical characteristic (e.g., an impedance) in each of the plurality of inductive and capacitive sense circuits according to a predetermined time multiplexing scheme. More specifically, the measurement circuit includes a driver circuit including multiplexing (input multiplexing) electrically connected to the plurality of inductive and capacitive sense circuits for selectively and sequentially driving each of the plurality of sense circuits with a drive signal (e.g., a current signal) at the sense frequency based on a driver input signal. The measurement circuit further includes a measurement amplifier circuit including multiplexing (output multiplexing) electrically connected to the plurality of inductive and capacitive sense circuits for selectively and sequentially amplifying a measurement signal (e.g., a voltage signal) in each of the plurality of sense circuits and for providing a measurement amplifier output signal indicative of the measurement signal in each of the plurality of sense circuits. The measurement circuit also includes a signal generator circuit electrically connected to the input of the driver circuit for generating the driver input signal. The measurement circuit further includes a signal processing circuit electrically connected to the output of the measurement amplifier circuit for receiving and processing the measurement amplifier output signal and for determining the electrical characteristic in each of the plurality of inductive and capacitive sense circuits based on the driver input signal and the measurement amplifier output signal. The apparatus further includes a control and evaluation circuit electrically connected to the measurement circuit for controlling the signal generator circuit, for controlling the input and output multiplexing according to the predetermined time multiplexing scheme, for evaluating the electrical characteristic as measured in each of the inductive and capacitive sense circuits, and for determining at least one of a presence of a metallic object, living object, vehicle, type of vehicle, and a vehicle position based on changes in the measured electrical characteristics.

In another aspect of the disclosure, a method for determining at least one of a presence of a metallic object, living object, vehicle, type of vehicle, and a vehicle position is provided. The method includes selectively and sequentially measuring, in a measurement circuit, an electrical characteristic (e.g., an impedance) in each of the plurality of inductive and capacitive sense circuits according to a predetermined time multiplexing scheme. More specifically, the method includes selectively and sequentially applying, from a driver circuit as part of the measurement circuit and including input multiplexing, a drive signal (e.g., a current signal) at a sense frequency to each of the plurality of inductive and capacitive sense circuits according to the predetermined time multiplexing scheme. The method further includes selectively and sequentially amplifying, in a measurement amplifier circuit as part of the measurement circuit, and including output multiplexing, a measurement signal (e.g., a voltage signal) in each of the plurality of inductive and capacitive sense circuits according to the predetermined time multiplexing scheme, and providing a measurement amplifier output signal indicative for the measurement signal. The method further includes applying, from a signal generator circuit as part of the measurement circuit, a driver input signal to the driver circuit. The method further includes receiving and processing, in a signal processing circuit as part of the measurement circuit, the measurement amplifier output signal, and determining the electrical characteristic in each of the plurality of inductive and capacitive sense circuits based on the driver input signal and the measurement amplifier output signal. The method further includes controlling, in a control and evaluation circuit, the signal generator circuit and the input and output multiplexing according to the time multiplexing scheme. The method further includes evaluating the electrical characteristic as measured in each of the inductive and capacitive sense circuits and determining at least one of a presence of a metallic object, living object, vehicle, type of vehicle, and a vehicle position based on changes in the measured electrical characteristics.

BRIEF DESCRIPTION OF THE DRAWINGS

In the figures, the third and fourth digit of a reference number identify the figure in which the reference number first appears. The use of the same reference numbers in different instances in the description or the figures indicates like elements.

FIG. 5K shows a table of equations that may be relevant for the equivalent circuit models of FIG. 5F and FIG. 5G.

FIG. 7N shows a table of equations that may be relevant for the equivalent circuit models of FIG. 7J and FIG. 7K.

DETAILED DESCRIPTION

Figure 1:
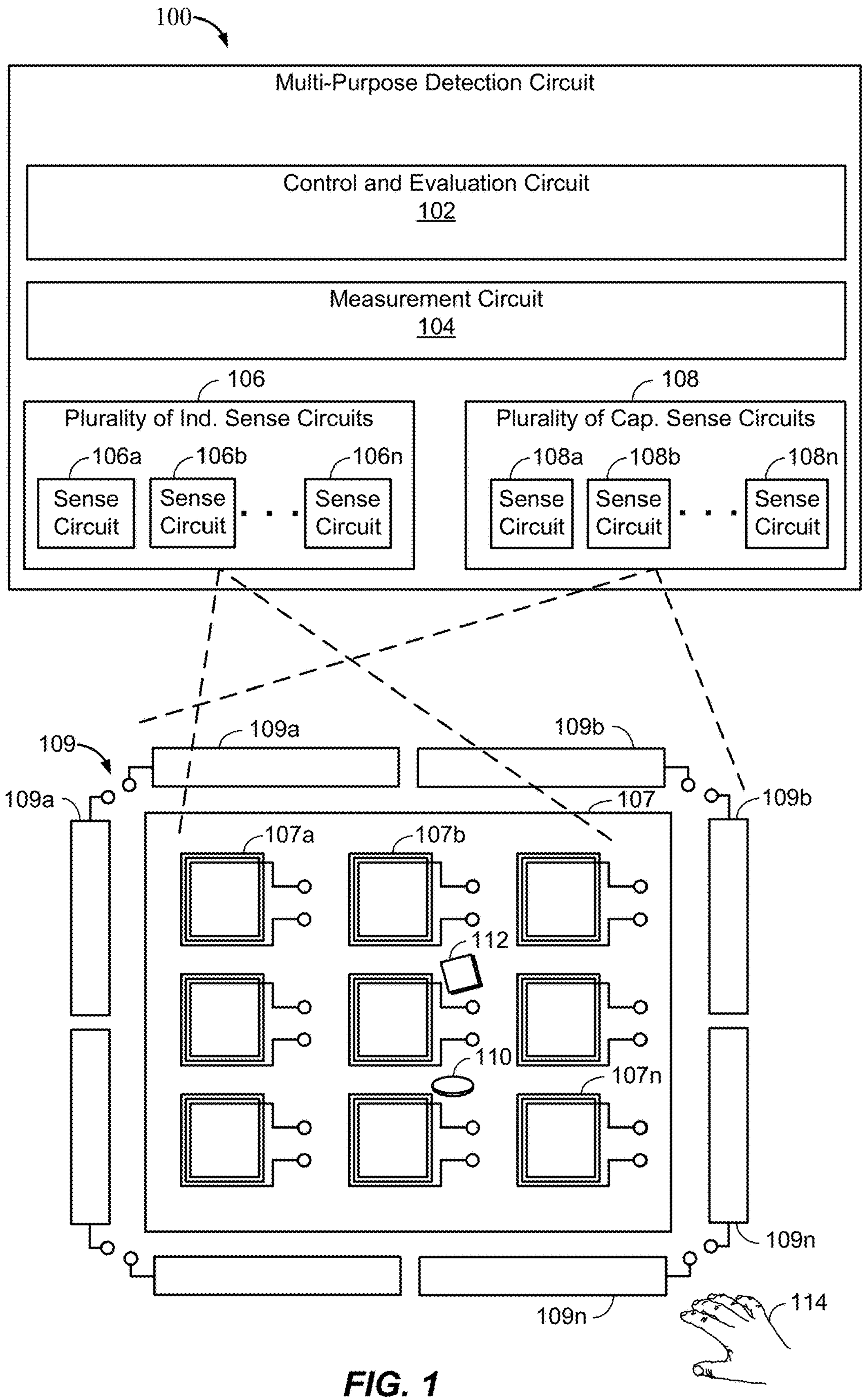
FIG. 1 is a schematic view illustrating an example implementation of a multi-purpose detection circuit including a plurality of inductive and capacitive sense circuits, a non-living (e.g., metallic) object, and a living object.

The detailed description set forth below in connection with the appended drawings is intended as a description of example implementations and is not intended to represent the only implementations in which the techniques described herein may be practiced. The term "example" used throughout this description means "serving as an example, instance, or illustration," and should not necessarily be construed as preferred or advantageous over other example implementations. The detailed description includes specific details for the purpose of providing a thorough understanding of the example implementations. In some instances, some devices are shown in block diagram form. Drawing elements that are common among the following figures may be identified using the same reference numerals.

As mentioned above foreign object detection (FOD) (and particularly metal object detection) may be valuable for a variety of applications. For detection in a predetermined region, a FOD system may include a plurality of inductive sense circuits each including an inductive sense element (e.g., a sense coil) distributed across a predetermined area (e.g., a planar array of sense coils integrated into the ground-based wireless power transfer structure). The predetermined region may be defined by the space where metal objects may be found and where the magnetic flux density exceeds certain limits (e.g., a threshold determined based on what levels of temperature a metal object might be heated up). This is generally a three-dimensional space above the plurality of indictive sense elements. The number of the inductive sense elements may be proportional or related to the minimum size of objects that are desirable to be detected. For a system that is configured to detect small objects (e.g., a paper clip), the number of sense elements may be relatively high (e.g., in the order of 100). An example FOD system is described in U.S. Pat. No. 10,627,257, titled Systems, Methods, and Apparatus for Detection of Metal Objects in a Predetermined Space, the entire contents of which are hereby incorporated by reference.

As mentioned above living object detection (LOD) (e.g., human extremities, animals) may be valuable for a variety of applications. For detection in a predetermined region, a LOD system may include a plurality of capacitive sense circuits each including a capacitive sense element (e.g., a sense electrode) e.g., disposed along the periphery of a ground-based wireless power transfer structure of a WPT system. The predetermined region may be defined by the space accessible for living objects and where living objects may be located and where the exposure magnetic field strength exceeds certain limits (e.g., as recommended by ICNIRP). This is generally a three-dimensional space. The number of the capacitive sense elements may be proportional or related to the minimum size of living objects that are desirable to be detected. For a system that is configured to detect human extremities (e., a hand) and animals (e.g., a cat), the number of sense elements may be relatively low (e.g., in the order of 4). A measurement drive circuitry for applying drive signals to each of the plurality of capacitive sense circuits each including a capacitive sense element and additional elements for conditioning, as well as corresponding measurement circuitry as needed for measuring an electrical characteristic in each of the plurality of capacitive sense circuits and for looking for changes in the electrical characteristics that may correspond to the presence of a living object. An example LOD system is described in U.S. Pat. No. 9,952,266, titled Object Detection for Wireless Energy Transfer Systems, the entire contents of which are hereby incorporated by reference.

As mentioned above vehicle detection (VD) or detection of the type of vehicle above the ground-based wireless power transfer structure of a WPT system may be valuable for a variety of applications. For detection of a vehicle or the type of vehicle, a VD system may include a plurality of inductive sense circuits each including an inductive sense element (e.g., a sense coil) distributed across an area defined by the ground-based wireless power transfer structure (e.g., a planar array of sense coils) and a plurality of capacitive sense circuits each including a capacitive sense element (e.g., a sense electrode) disposed in an area defined by the ground-based wireless power transfer structure. Drive circuitry for applying drive signals to each of the inductive and capacitive sense circuits, each including an inductive and capacitive sense element, respectively and additional elements for conditioning, as well as corresponding measurement circuitry as needed for measuring an electrical characteristic in each of the plurality of capacitive sense circuits and for looking for changes in the electrical characteristics that may correspond to the presence of a vehicle.

As mentioned above determination of a position (PD) of a vehicle (e.g., the position of the vehicle-based wireless power transfer structure relative to the ground-based wireless power transfer structure of a WPT system) may be valuable for a variety of applications. For determination of a vehicle position, a PD system may include a plurality of inductive sense circuits each including an inductive sense element (e.g., a sense coil) distributed across an area defined by the ground-based wireless power transfer structure (e.g., a planar array of sense coils) and a plurality of capacitive sense circuits each including a capacitive sense element (e.g., a sense electrode) disposed in an area defined by the ground-based wireless power transfer structure.

In some implementations, the PD system is configured to support a passive beacon PD technique. Passive beacon PD uses at least one passive beacon transponder that may be integrated into the vehicle-based wireless power transfer structure or that may be mounted elsewhere at the vehicle underbody. When positioned above the inductive and capacitive sense element array of the multi-purpose detection circuit, the passive beacon transponder produces a distinct time-varying change (a modulated response) in the electrical characteristic of at least one of the plurality of inductive sense circuits and capacitive sense circuits. This modulated response may be used for determining a position of the at least one passive beacon transponder relative to the array of sense elements, which is related to the position of the vehicle-based wireless power transfer structure relative to the ground-based wireless power transfer structure. The at least one passive beacon transponder may also be used for determining presence of a vehicle (VD) or the type of vehicle e.g., by means of a modulation that is characteristic for the type of vehicle. Further, the at least one passive beacon transponder may be used to transmit data (e.g., at a low data rate) to the primary device by means of the passive modulation technique.

In some implementations, the at least one passive beacon transponder includes an inductive passive beacon transponder configured to mainly interact with the inductive sense circuits. In other implementations, the at least one passive beacon transponder includes a capacitive passive beacon transponder configured to mainly interact with the capacitive sense circuits. In further implementations, the at least one passive beacon transponder is configured to interact with both the inductive and capacitive sense circuits. An example inductive passive beacon PD system is described in U.S. patent application Ser. No. 16/052,445, titled Hybrid Foreign Object Detection and Positioning System, the entire contents of which are hereby incorporated by reference.

Circuitry for applying drive signals to each of the plurality of inductive and/or capacitive sense circuits each including a sense element and additional elements for conditioning, as well as corresponding measurement, control and evaluation circuitry as needed for measuring an electrical characteristic in each of the plurality of inductive sense circuits and detecting changes in the electrical characteristics that may be indicative of one of the presence of a metal object, a living object, a vehicle, the type of vehicle, and a vehicle position may be complex and costly as the number of sense elements increases. Therefore, in an aspect of hardware complexity reduction and cost saving, it may be useful and desirable to combine the various functions such as FOD, LOD, VD, data signaling, and PD in a single system referred to herein as the multi-purpose detection circuit.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like.

A foreign object is used herein to describe an object that does not naturally belong to the WPT system. A foreign object may include a metallic object, a non-living dielectric (substantially nonconductive) object, a living object (e.g., an animal, a human extremity), a vehicle, or a combination thereof. It may describe an object that needs to be detected for purposes of safety of equipment or persons, but it may also refer to an object of no harm that is potential to produce a false positive detection in a multi-purpose detection system.

FIG. 1 illustrates an example implementation of a multi-purpose detection circuit 100 that includes a plurality of inductive sense circuits 106 and a plurality of capacitive sense circuits 108 illustrated in FIG. 1 by inductive sense circuits 106*a*, 106*b*, some dots, and 106*n* and by capacitive sense circuits 108*a*, 108*b*, some dots, and 108*n*. The dots shall indicate that the number of inductive sense circuits 106 and/or the number of capacitive sense circuits 108 may be greater than three. The plurality of inductive sense circuits 106 is also sometimes referred herein as the plurality of inductive sense circuits 106*a*, 106*b*, . . . , 106*n*. Likewise, the plurality of capacitive sense circuits 108 is also sometimes referred herein as the plurality of capacitive sense circuits 108*a*, 108*b*, . . . , 108*n*. As illustrated in FIG. 1, each of the inductive sense circuit of the plurality of sense circuits 106*a*, 106*b*, . . . , 106*n* includes a corresponding inductive sense element (e.g., a sense coil) of a plurality of inductive sense elements 107*a*, 107*b*, . . . , 107*n*, respectively. Likewise, each of the capacitive sense circuits of the plurality of sense circuits 108*a*, 108*b*, . . . , 108*n* includes a corresponding capacitive sense element (e.g., a pair of sense electrodes) of a plurality of capacitive sense elements 109*a*, 109*b*, . . . , 109*n*, respectively.

FIG. 1 also illustrates foreign objects 110 and 112 as referred to herein as non-living objects and a living object 114. The object 110 may represent a metallic (substantially electrically conductive object) that is potentially heated when exposed to the WPT magnetic field as previously discussed, while the object 112 may be representative for a dielectric or ferromagnetic object that is substantially electrically non-conductive and that does not heat to hazardous temperatures when exposed to the WPT magnetic field. The living object 114 may stand for a human extremity (e.g., a hand as depicted in FIG. 1) or an animal that is dielectric and substantially electrically non-conductive.

The inductive sense elements 107*a*, 107*b*, . . . , 107*n* and capacitive sense elements 109*a*, 109*b*, . . . , 109*n* are configured to sense at least one of a presence of a foreign object (e.g., object 110) in proximity to at least one of the plurality of inductive sense elements 107*a*, 107*b*, . . . , 107*n*, a living object (e.g., object 114) in proximity to at least one of the plurality of capacitive sense elements 109*a*, 109*b*, . . . , 10*n*, a vehicle or type of vehicle (not shown in FIG. 1) positioned above the plurality of inductive and capacitive sense elements 107*a*-107*n* and 109*a*-109*n*, respectively, and for determining a vehicle position based on measuring one or more electrical characteristics (e.g., an impedance) in each of the plurality of inductive sense circuits 106*a*, 106*b*, . . . , 106*n* and capacitive sense circuits 108*a*, 108*b*, . . . , 108*n* and based on detecting changes in the measured one or more electrical characteristics. Each of the plurality of inductive sense circuits 106*a*, 106*b*, . . . , 106*n* and capacitive sense circuits 108*a*, 108*b*, . . . , 108*n* may also include additional conditioning circuitry (not shown in FIG. 1) e.g., configured to improve measurement of the one or more electrical characteristics and thus sensitivity and reliability of the multi-purpose detection circuit 100. Each of the plurality of sense circuits also defines at least one measurement port (not shown in FIG. 1) where the one or more electrical characteristics is measured and refers to.

Each of the plurality of inductive sense elements 107*a*, 107*b*, . . . , 107*n* is shown in FIG. 1 as a "circular" coil for purposes of illustration. However, in other implementations, the inductive sense elements 107*a*, 107*b*, . . . , 107*n* may include a sense coil having another coil topology, e.g., a "figure-eight-like" topology. In yet other implementations, the plurality of inductive sense elements 107*a*, 107*b*, . . . , 107*n*, may include sense coils of a mixed coil topology, e.g., "circular" and "figure-eight-like". In further implementations, the plurality of inductive sense elements 107*a*, 107*b*, . . . , 107*n*, may include sense coils (e.g., solenoid coils) with a ferrite core (not shown herein) that are physically smaller compared to "air" coils. In yet further implementations, the plurality of sense elements 107*a*, 107*b*, . . . , 107*n* may include other inductive devices that can be used for generating a magnetic field for detecting a foreign object (e.g., object 110), a vehicle, or for determining a vehicle position. In some implementations (not shown herein), each of the plurality of inductive sense elements 107*a*, 107*b*, . . . , 107*n*, may include a double or even a triple sense coil arrangement that may be used in conjunction with a transimpedance or mutual impedance measurement technique. In some implementations, the plurality of inductive sense elements 107*a*, 107*b*, . . . , 107*n* is arranged in an array 107, such as a two-dimensional array 107 as shown in FIG. 1. However, in other implementations, the sense elements of the plurality of inductive sense elements 107*a*, 107*b*, . . . , 107*n* are arranged in other configurations that do not conform to rows or columns (radial or interleaved), are at least partially overlapping or have irregular spacing, have different size, have different shapes (circular, hexagonal, etc.), or cover irregular detection areas, or any combination thereof. As such the term "array" as used herein denotes a plurality of sense elements that are arranged over a predetermined area. Furthermore, the number of sense elements of an array 107 and thus the number of sense circuits can vary widely based on the application including the total region in which a foreign object (e.g., object 110) is to be detected and the smallest size of an object the multi-purpose detection circuit 100 is configured to detect. Example implementations of the inductive sense element (e.g., 107*a*) and arrangements of inductive sense elements are described in U.S. Pat. No. 9,726,518, titled Systems, Methods, and Apparatus for Detection of Metal Objects in a Predetermined Space, in U.S. patent application Ser. No. 16/358,534, titled Foreign Object Detection Circuit Using Mutual Impedance Sensing, in U.S. Pat. No. 10,122,192, titled Sense Coil Geometries with Improved Sensitivity for Metallic Object Detection in a Predetermined Space, in U.S. Pat. No. 10,124,687, titled Hybrid Foreign Object Detection (FOD) Loop Array Board, the entire contents of which are hereby incorporated by reference.

Each of the plurality of capacitive sense elements 109*a*, 109*b*, . . . , 109*n* is shown in FIG. 1 as a pair of sense electrodes for purposes of illustration. However, in other implementations, the capacitive sense elements 109*a*, 109*b*, . . . , 10*n* may include a single electrode providing a single terminal. In further implementations, the capacitive sense elements 109*a*, 109*b*, . . . , 109*n*, may be driven and configured for measuring a transimpedance (a mutual capacitance). In yet further implementations, the capacitive sense elements 109*a*, 109*b*, . . . , 109*n*, may include other capacitive devices that can be used for generating and detecting an electric field for detecting a foreign object (e.g., object 112), a living object (e.g., object 114), a vehicle (e.g., vehicle 330), or for determining a type of vehicle or a vehicle position. In FIG. 1, the capacitive sense elements 109*a*, 109*b*, . . . , 109*n*, are shown arranged in an area around the array of inductive sense elements 107*a*, 107*b*, . . . , 107*n*. However, in other implementations, the capacitive sense elements of the plurality of capacitive sense elements 109*a*, 109*b*, . . . , 109*n* are arranged in other configurations, e.g., distributed over the area of the array 107 of the inductive sense elements. Example implementations of the capacitive sense element (e.g., 109*a*) and arrangements of capacitive sense elements are described in U.S. Pat. No. 9,952,266, titled Object Detection for Wireless Energy Transfer Systems, the entire contents of which are hereby incorporated by reference.

Each of the plurality of inductive sense circuits 106 and the plurality of capacitive sense circuits 108 including a corresponding sense element of the plurality of inductive sense elements 107*a*-107*n* and the plurality of capacitive sense elements 109*a*-109*n* are operably connected to a measurement circuit 104. The measurement circuit 104, including multiplexing (not shown in FIG. 1), is configured to selectively and sequentially measure one or more electrical characteristics in each of the plurality of inductive and capacitive sense circuits (106 and 108, respectively) and to provide outputs to the control and evaluation circuit 102.

The measurement circuit 104 is configured to cause each of the plurality of inductive sense elements (e.g., sense coils) 107*a*, 107*b*, . . . , 107*n* to selectively and sequentially generate an alternating magnetic field at the sense frequency, e.g., by selectively and sequentially applying a sense signal (e.g., a current) to each of the plurality of inductive sense circuits 106*a*, 106*b*, . . . , 106*n*. If a metallic object (e.g., object 110) is present in the alternating magnetic field, eddy currents will be generated in the object. According to Lentz' law, the eddy currents in the object will generate another (secondary) magnetic field that interacts with the primary magnetic field as generated by the respective sense element, and a mutual coupling is developed. This may cause a change in an electrical characteristic (e.g., an impedance) as measured by the measurement circuit 104 in the respective inductive sense circuit (e.g., inductive sense circuit 106*a*). A change in a measured electrical characteristic may also be caused by a substantially non-conductive but ferromagnetic object (not shown in FIG. 1) with a relative permeability $\mu_r>1$ that interacts with the alternating magnetic field as generated by the respective sense element. Applying a sense signal to an inductive sense circuit (e.g., sense circuit 106*a*) may also cause the respective inductive sense element to generate an alternating electric field that may interact with a substantially non-conductive, dielectric object (e.g., non-living object 112 or living object 114) causing a change in the electrical characteristic as measured in the respective inductive sense circuit (capacitive sensing effect). This alternating electric field may also interact with a metallic (substantially electrically conductive) object (e.g., object 110). However, this effect may be orders of magnitude weaker than the magnetic field effect.

The measurement circuit 104 is further configured to cause each of the plurality of capacitive sense elements (e.g., sense electrodes) 109*a*, 109*b*, . . . , 109*n* to selectively and sequentially generate an alternating electric field at the sense frequency, e.g., by selectively and sequentially applying a sense signal (e.g., a current) to each of the plurality of capacitive sense circuits 108*a*, 108*b*, . . . , 108*n*. If a substantially non-conductive, dielectric object (e.g., living object 114 or non-living object 112) with a relative permittivity $\varepsilon_r>1$ is present in the alternating electric field, it will interact with the electric field. This may cause a change in an electrical characteristic (e.g., an impedance) as measured by the measurement circuit 104 in the respective capacitive sense circuit (e.g., capacitive sense circuit 108*a*). A change in a measured electrical characteristic may also be caused by a metallic object (e.g., object 110) as it will also interact with the alternating electric field as generated by the respective capacitive sense element. Applying a sense signal (e.g., current) to a capacitive sense circuit (e.g., sense circuit 106*a*) may also cause the respective capacitive sense element to generate an alternating magnetic field that may interact with a metallic object (e.g., object 110) causing a change in the electrical characteristic as measured in the respective capacitive sense circuit (inductive sensing effect). However, this effect may be orders of magnitude weaker than the electric field effect.

Figure 3:
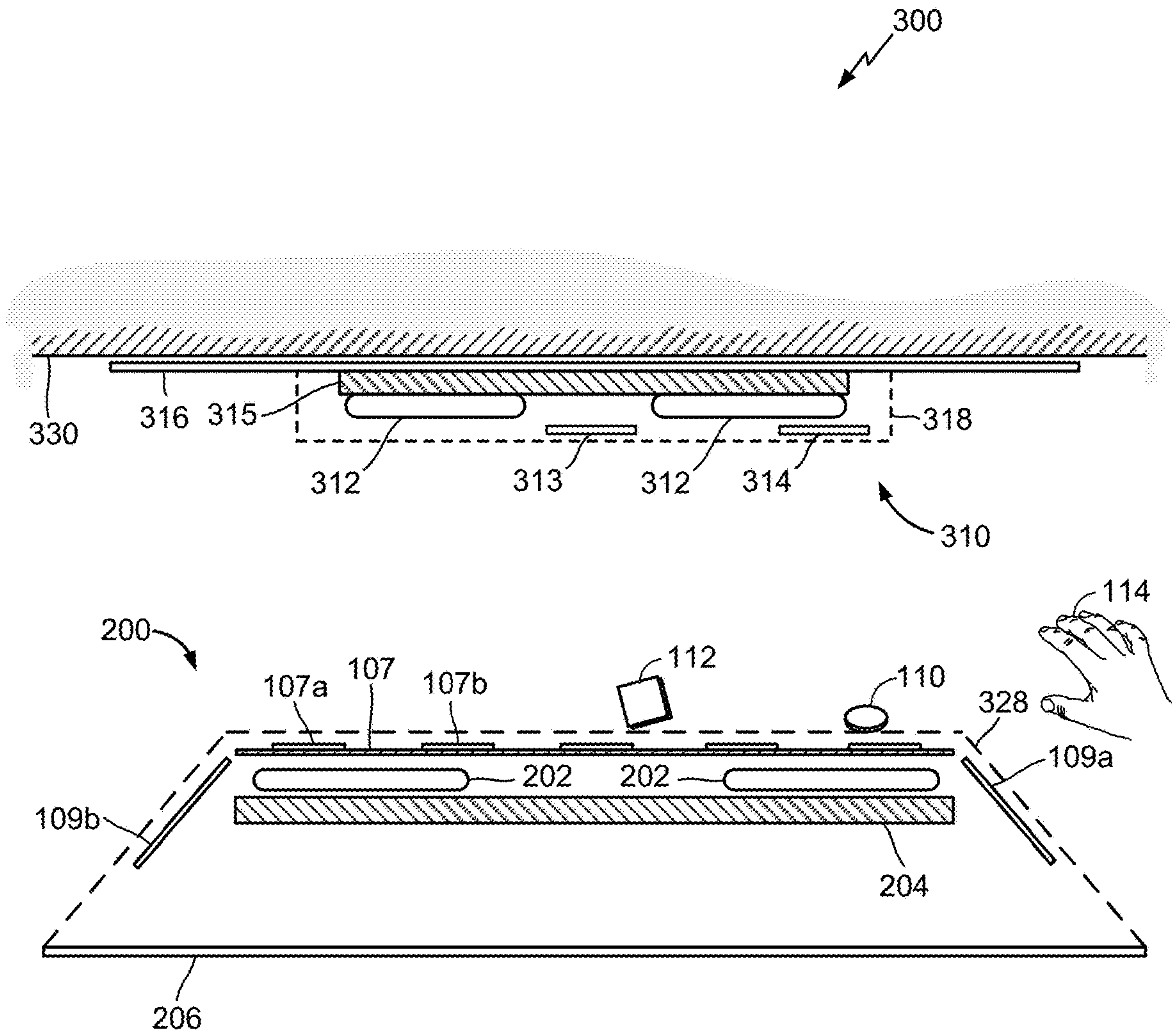
FIG. 3 is a vertical cut view illustrating a portion of a WPT system including the vehicle-based wireless power transfer structure and the ground-based wireless power transfer structure integrating a portion of the multi-purpose detection circuit of FIG. 1, and the non-living and the living object of FIG. 1.

The control and evaluation circuit 102 is configured to control the measurement circuit 104 (e.g., the multiplexing) and to evaluate the outputs of the measurement circuit 104, to determine at least one of a presence of a foreign object (e.g., object 110), living object (e.g., object 114), a presence of a vehicle with reference to FIG. 3, a type of vehicle, and a vehicle position based on changes in the measured one or more electrical characteristics. In some implementations, the control and evaluation circuit 102 may include the decision functions as needed for FOD, LOD, and VD as well as the position calculation functions needed for PD. In other implementations, the vehicle position is determined in a unit external to the multi-purpose detection circuit 100 (not shown herein) based on outputs (e.g., raw data) from the control and evaluation circuit 102 and on outputs provided by other ground- or vehicle-based sensors (not shown herein).

In an example implementation or operation of the control and evaluation circuit 102, the evaluation is based on a time-differential detection scheme that is sensitive e.g., to a fast (e.g., abrupt) change in a sequence (time-series) of consecutive outputs of the measurement circuit 104 (e.g., the measured electrical characteristics), each associated to the same at least one sense circuit (e.g., sense circuit 106*a*) of the plurality of sense circuits 106 and 108. The measured electrical characteristics (e.g., an impedance) may refer to outputs as obtained after processing (e.g., filtering, combining, averaging, etc.) in the control and evaluation circuit 102. In some implementations or operations based on a time-differential detection scheme, presence of an object (e.g., object 110) is assumed, if at least one difference between a first measurement output associated to a sense circuit (e.g., sense circuit 106*a*) and at least one first time and a second measurement output associated to the same sense circuit and at least one second time exceeds a threshold. Using time-differential detection, an object can be detected when it enters or leaves the proximity of the at least one sense element (e.g., sense element 107*a*) or generally when it moves in the proximity of the at least one sense element.

In a further example implementation or operation of the control and evaluation circuit 102, the evaluation is based on a sense circuit-differential detection scheme that is sensitive to differences between measurement outputs associated to different sense circuits of the plurality of sense circuits (e.g., 106). This detection scheme may be also referred to as space-differential detection. In some implementations or operations based on a space-differential detection scheme, presence of an object (e.g., object 110) is assumed if at least one difference between a first measurement output associated to at least one first sense circuit (e.g., sense circuit 106*a*) and a second measurement output associated to at least one second sense circuit (e.g., sense circuit 106*b*) exceeds a threshold. In some implementations or operations of a true space-differential detection scheme, the plurality of measurement outputs used to determine a difference refer to substantially the same time. It may be appreciated that in certain cases, space-differential detection may be less sensitive and reliable than time-differential detection because sense circuits of the plurality of sense circuits 104*a*, 104*b*, . . . , 104*n* may be at least partially differently (individually) affected by temperature, mechanical impacts, and aging.

In some aspects, time-differential detection may be sensitive to movements of metallic structures in the environment of the sense element array (e.g., array 107). Such environmental effects may include movements of the metallic vehicle underbody structure when a vehicle is parked over the wireless power transfer structure. These movements may cause false detections in certain implementations of the multi-purpose detection circuit 100 that is solely based on a time-differential approach. Therefore, in some aspects, it may be desirable to mitigate such disturbance effects.

Combining the time-differential scheme with a space-differential scheme on top may be an approach to effectively discriminate such disturbance effects. In certain implementations or operations of a space-differential detection scheme, presence of an object is determined by evaluating at least one difference between a measurement output associated to at least one sense circuit (e.g., sense circuit 106*a*) and a reference value that is determined based on a plurality of measurement outputs each associated to a different sense circuit of the plurality of sense circuits (e.g., 106). This reference value may be e.g., a mean value, a median value (50th percentile), or any other percentile value that is derived from a histogram built upon the plurality of measurement outputs. It may be appreciated that this special detection scheme has the potential to discriminate environmental effects e.g., from a moving vehicle underbody that may produce changes in an electrical characteristic (e.g., an impedance) in a majority (cluster) of sense circuits. This special scheme may be considered as a mechanism that automatically adapts the detection threshold used by the control and evaluation circuit 102 for determining presence of an object (e.g., object 110). More specifically, in some implementations or operations, the control and evaluation circuit 102 automatically adjusts the reference value as described above. When the vehicle underbody is moving, the reference value may increase as well as the detection threshold. Increasing the detection threshold reduces the false detection rate but also the detection sensitivity (detection probability) to some extent. Therefore, a somewhat lower sensitivity may be accepted for an object entering the predetermined space while the vehicle is moving. As soon as the vehicle underbody comes to rest, the detection threshold is readjusted automatically, and the object detection circuit 100 may return to its ordinary sensitivity (detection probability) maintaining a specified false detection rate.

Figure 2:
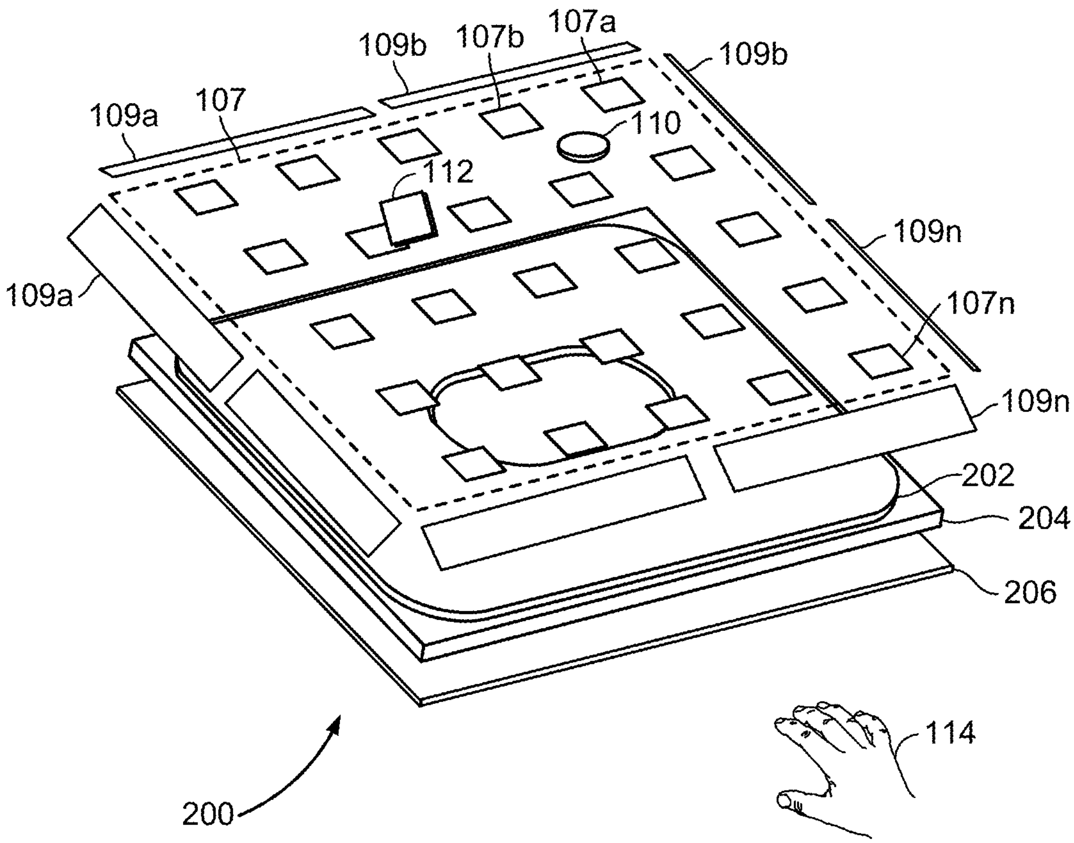
FIG. 2 is a schematic view illustrating an example implementation of a wireless power transfer structure of a wireless power transmitter integrating a portion of the multi-purpose detection circuit shown in FIG. 2, the non-living and the living object of FIG. 1.

FIG. 2 illustrates an example implementation of a wireless power transfer structure 200 that is a portion of a WPT system including a portion of the multi-purpose detection circuit 100 of FIG. 1. The wireless power transfer structure 200 may depict either a wireless power transmitter that generates a magnetic field (e.g., at an operating frequency in the range from 80-90 kHz) for transferring power or a wireless power receiver that can couple and receive power via a magnetic field. It may be more likely that when integrated with a multi-purpose detection circuit 100, the wireless power transfer structure 200 may be a wireless power transmitter as power may be generally transferred from the ground or other upward facing surface where foreign objects (e.g., object 110 or 112) will generally come to a rest. However other implementations are possible, e.g., the multi-purpose detection circuit 100 or a portion thereof may be also integrated into a wireless power receiver (e.g., a vehicle-based wireless power transfer structure). The wireless power transfer structure 200 (also sometimes referred to as a "ground assembly" or "base bad") may be configured to wirelessly transmit or receive power.

The wireless power transfer structure 200 includes a coil 202 (e.g., a Litz wire coil) also referred to as the WPT coil that is configured to generate an alternating magnetic field when driven with a current by a power conversion circuit (not shown herein). The wireless power transfer structure 200 may further include a ferrite 204 structure configured to channel and/or provide a path for magnetic flux (e.g., may be arranged in one or more ferrite tiles). The wireless power transfer structure 200 may also include a metal shield 206 (also sometimes referred to as a back plate). The metal shield 206 is configured to prevent the magnetic field or associated electromagnetic emissions from extending far beyond a boundary determined by the shield 206 or at least to attenuate the magnetic field extending beyond that boundary. As an example, the shield 206 may be formed from aluminum.

FIG. 2 illustrates one example how the plurality of inductive sense elements (array 107) and the plurality of capacitive sense elements 109 of FIG. 1 may be integrated into the wireless power transfer structure 200.

FIG. 3 illustrates a vertical cut view of a portion 300 of a WPT system applicable to wireless electric vehicle charging. This portion 300 includes the ground-based (e.g., transmit) wireless power transfer structure 200 with reference to FIG. 2 and the vehicle-based (e.g., receive) wireless power transfer structure 310. The ground-based wireless power transfer structure 200 includes the shield (back plate) 206, a layer of ferrite 204, and a WPT coil 202 with reference to FIG. 2. It also includes a housing 328 configured to house the WPT coil 202, the ferrite 204, and the shield 206. In addition, the housing 328 is configured to house the plurality of inductive sense elements (array 107) and the plurality of capacitive sense elements (109) as part of the multi-purpose detection circuit 100 as illustrated in FIG. 2. In some implementations, the shield 206 may form a portion of the housing 328 as illustrated in FIG. 3. Further, the housing 328 may be inclined along its perimeter from its edge toward its interior to form a ramp over which a vehicle may drive. The power conversion circuit (not shown herein) may be electrically connected to the WPT coil 202 or a portion or all may also be housed in the housing 328. In some aspects, the capacitive sense elements (e.g., the capacitive sense elements 109*a*, 109*b*, . . . , 109*n*) may be oriented to be nonparallel with a plane defined by the array 107 of inductive sense elements. For example, the capacitive sense elements may be oriented to be substantially parallel to the inclined top surface of the housing 328 along the housing's perimeter.

The vehicle-based wireless power transfer structure 310 includes a WPT coil 312, a layer of ferrite 315, and a shield 316 made of an electrically conductive material. In some implementations, the shield 316 may be formed from a portion of the apparatus that the ferrite 315 and the WPT coil 312 are affixed to the metallic underbody of a vehicle 330. In this case, a housing 318 configured to house the WPT coil 312 and ferrite 315 is provided but that may not house the shield 316. However other implementations are possible where a conductive back plate is included in the housing 318. A power conversion circuit (not shown herein) may be electrically connected to the WPT coil 312 or a portion or all may also be housed in the housing 318.

As mentioned above and as illustrated in FIG. 3, the vehicle-based wireless power transfer structure 310 may also integrate at least one of an inductive passive beacon transponder 313 and a capacitive beacon transponder 314 e.g., for purposes of PD and VD as previously discussed. The inductive passive beacon transponder 313 may be configured to primarily interact with the inductive sense elements e.g., the inductive sense elements 107*a*, 107*b*, . . . , 107*n*. In some implementations, the inductive passive beacon transponder 313 includes a transponder coil, a capacitive element to compensate for the gross reactance of the coil at the operating (sense) frequency of the multi-purpose detection circuit 100, and a passive impedance modulation circuit (these elements not shown in herein). The capacitive passive beacon transponder 314 may be configured to primarily interact with the capacitive sense elements e.g., the capacitive sense elements 109*a*, 109*b*, . . . , 109*n*. In some implementations, the capacitive passive beacon transponder 314 includes a transponder electrode, an inductive element to compensate for the gross reactance of the electrode at the operating (sense) frequency of the multi-purpose detection circuit 100, and a passive impedance modulation circuit (these elements not shown in herein). In further implementations (not shown herein), the passive beacon transponder (e.g., passive beacon transponder 313) is configured to interact with both the inductive and capacitive sense elements of the multi-purpose detection circuit 100.

The ground-based (e.g., transmit) wireless power transfer structure 200 may be configured to generate a magnetic field 232. The vehicle-based wireless power transfer structure 310 may be configured to inductively receive power via the magnetic field. Furthermore, as the ground-based wireless power transfer structure 200 may be positioned on a ground or other top facing surface, an object (e.g., object 110 or 112) may come to rest at the top surface of the housing 328 as illustrated in FIG. 3. The object may thereby be potentially exposed to high levels of magnetic flux density if power is being transferred.

Figure 4:
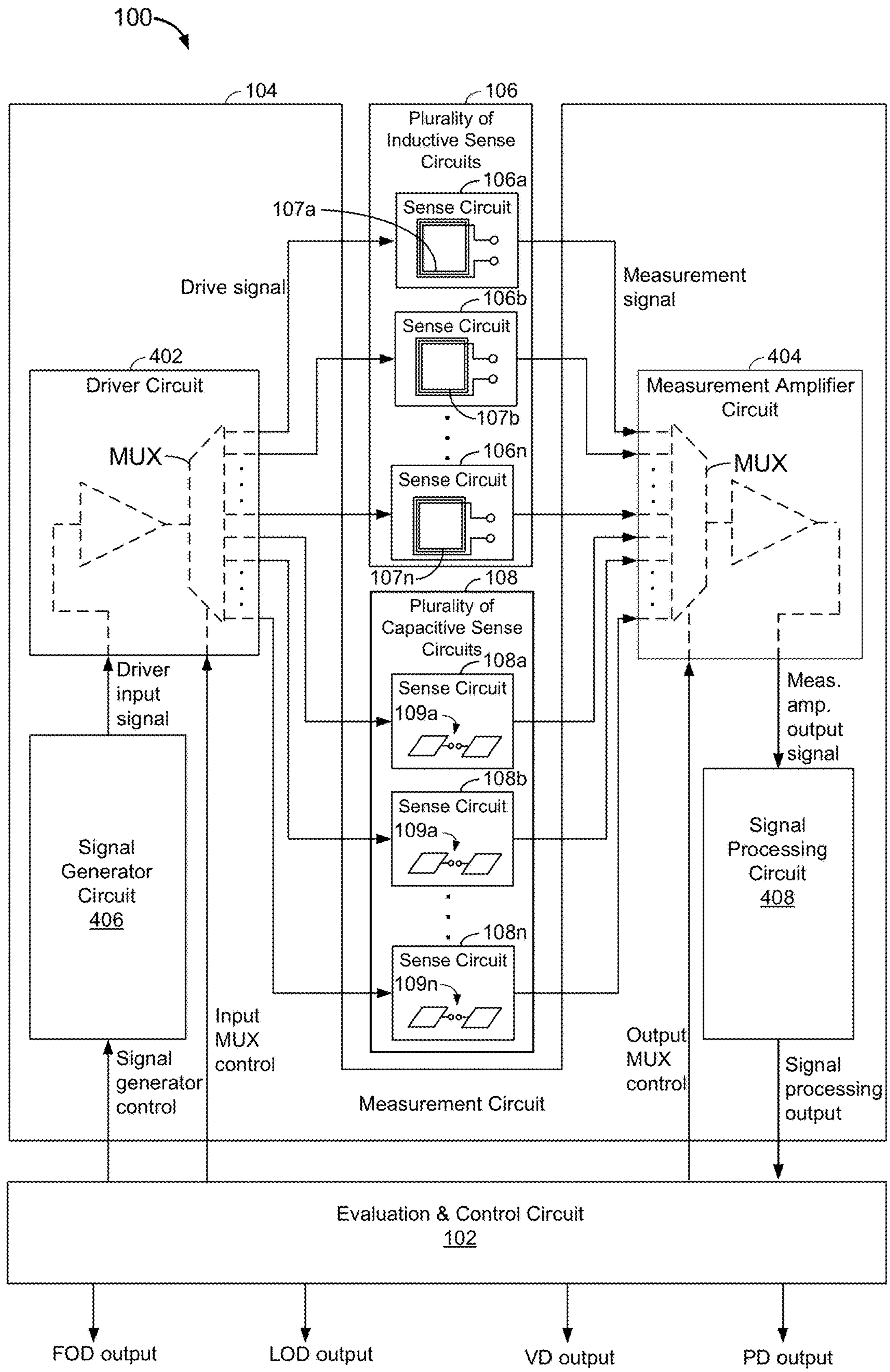
FIG. 4 is a generic block diagram of an example implementation of the multi-purpose detection circuit o FIG. 1.

FIG. 4 is a generic block diagram illustrating an example implementation or operation of a multi-purpose detection circuit 100. The circuit 100 includes the plurality of inductive sense circuits 106*a*, 106*b*, . . . , 106*n*, including the inductive sense elements 107*a*, 107*b*, . . . , 107*n*, respectively, the plurality of capacitive sense circuits 108*a*, 108*b*, . . . , 108*n*, including the capacitive sense elements 109*a*, 109*b*, . . . , 109*n*, respectively, the measurement circuit 104, and the control and evaluation circuit 102 with reference to FIG. 1.

Each of the plurality of inductive sense circuits 106 may also include an associated capacitive element (not shown herein) to compensate for the gross reactance as presented at the terminals of the at least one inductive sense element at the sense frequency. Each of the plurality of capacitive sense circuits 108 may also include an associated inductive element (not shown herein) to compensate for the gross reactance as presented at the terminals of the at least one capacitive sense element at the sense frequency. At least one of the plurality of inductive and capacitive sense circuits also includes an impedance matching element (e.g., a transformer) for transforming the impedance of the sense circuit (e.g., sense circuit 108*a*) to match with an operating impedance range of the multi-purpose detection circuit 100. In an example implementation, each of the plurality of inductive sense circuits 106 is naturally matched with an operating impedance range without using an additional impedance matching element. However, the plurality of capacitive sense circuits 108 is not naturally matched, and therefore an additional impedance matching element (e.g., a transformer) is used. In another example implementation, it is vice-versa. In a further example implementation, both the plurality of inductive and capacitive sense circuits 106 and 108, respectively, include an additional impedance matching element.

The measurement circuit 104 is electrically connected to the plurality of inductive and capacitive sense circuits and configured for selectively and sequentially measuring one or more electrical characteristics (e.g., an impedance) in each of the plurality of inductive and capacitive sense circuits according to a predetermined time multiplexing scheme.

The control and evaluation circuit 102 is electrically connected to the measurement circuit 104 and configured to control time multiplexing (input multiplexer (MUX) control and output MUX control in FIG. 4) according to the predetermined time multiplexing scheme, to evaluate the one or more electrical characteristics as measured in each of the inductive and capacitive sense circuits, and to determine at least one of a presence of a foreign object (e.g., object 110 or 112), a living object (e.g., object 114), a vehicle (e.g., vehicle 330), a type of vehicle, and a vehicle position based on changes in the measured one or more electrical characteristics.

The measurement circuit 104 further includes a driver circuit 402, a measurement amplifier circuit 404, a signal generator circuit 406, and a signal processing circuit 408.

The driver circuit 402 including multiplexing (input multiplexing) is electrically connected to the plurality of inductive sense circuits 106 and the plurality of capacitive sense circuits 108 and configured to selectively and sequentially apply a drive signal (e.g., a current signal) at the sense frequency to each of the plurality of inductive sense circuits 106 and the plurality of capacitive sense circuits 108 based on a driver input signal generated by the signal generator circuit 406.

The measurement amplifier circuit 404 including multiplexing (output multiplexing) is electrically connected to the plurality of inductive sense circuits 106 and the plurality of capacitive sense circuits 108 and configured to selectively and sequentially amplify a measurement signal (e.g., a voltage signal) in each the plurality of inductive sense circuits 106 and the plurality of capacitive sense circuits 108 and to provide a measurement amplifier output signal indicative of the measurement signal in each of the plurality of sense circuits.

The signal generator circuit 406 electrically connected to the input of the driver circuit 402 is configured to generate the driver input signal.

The signal processing circuit 408 electrically connected to the output of the measurement amplifier circuit 404 is configured to receive and process the measurement amplifier output signal and to determine the one or more electrical characteristics in each of the plurality of inductive and capacitive sense circuits based on the driver input signal and the measurement amplifier output signal.

The dashed lines used in FIG. 4 emphasize that the components and their configuration in the driver circuit 402 and the measurement amplifier circuit 404 are illustrative, and other implementations may have these or other components configured to selectively and sequentially drive the plurality of sense circuits 106 and 108 with a drive signal and to selectively and sequentially amplify a measurement signal in each of the plurality of sense circuits 106 and 108. Furthermore, while certain circuit elements are described as connected between other elements, it should be appreciated that there may be other circuit elements in various implementations that may also be in between the two elements described as electrically connected (e.g., other elements interposed). To mention an example of an alternative implementation (not shown herein), multiplexing is common to both the driver circuit 402 and the measurement amplifier circuit 404.

Example implementations of the measurement circuit 104 and the control and evaluation circuit 102 are described in U.S. Pat. No. 9,726,518, titled Systems, Methods, and Apparatus for Detection of Metal Objects in a Predetermined Space, U.S. Pat. No. 9,921,045, titled Systems, Methods, and Apparatus for Increased Foreign Object Detection Loop Array Sensitivity, in U.S. Pat. No. 10,295,693, titled Systems, Methods, and Apparatus for Foreign Object Detection Loop Based on Inductive Thermal Sensing, in U.S. Pat. No. 10,302,795, titled Systems, Methods, and Apparatus for Detecting Ferromagnetic Objects in a Predetermined Space, in U.S. Pat. No. 10,298,049, titled Systems, Methods, and Apparatus for Detecting Metallic Objects in a Predetermined Space via inductive kinematic Sensing, in U.S. patent application Ser. No. 16/226,156, titled Foreign Object Detection Circuit Using Current Measurement, in U.S. patent application Ser. No. 16/392,464, titled Extended Foreign Object Detection Signal Processing, and in U.S. patent application Ser. No. 16/358,534, titled Foreign Object Detection Circuit Using Mutual Impedance Sensing, the entire contents of which are hereby incorporated by reference.

In an example operation of the multi-purpose detection circuit 100, the sense signal is selectively and sequentially applied to each of the plurality of inductive sense circuits 106 and to each of the plurality of the capacitive sense circuits 108 according to a time division multiplexing scheme and in a round robin fashion. The sense signal for driving an inductive sense circuit (e.g., inductive sense circuit 106*a*) is applied in a time interval (time slot) allocated to that sense circuit and has a maximum duration equal or shorter than the duration of the time slot. The time frame corresponding to the sum of time slots allocated to the plurality of inductive sense circuits 106 and capacitive sense circuits 108 is also referred herein as to the scan cycle or to the repetition period.

In an aspect to reduce the duration of the scan cycle, a first sense signal is selectively and sequentially applied to each of a portion of the plurality of inductive sense circuits 106 and capacitive sense circuits 108 and a second sense signal is concurrently, selectively and sequentially applied to each of the remaining portions of inductive and capacitive sense circuits. Concurrently applying two or more sense signals reduces the scan cycle and may result in a reduced detection latency with respect to FOD and LOD and in an increased position update rate with respect to PD (e.g., using the passive beaconing approach as previously described).

In an example implementation and operation of the multi-purpose detection circuit 100, the first and the at least one concurrently applied second sense signal are sinusoidal signals of the same frequency.

In another example implementation and operation of the multi-purpose detection circuit 100, the first and the at least one concurrently applied second sense signal are sinusoidal signals but differ in frequency.

In a further example implementation and operation of the multi-purpose detection circuit 100, each of the first and the at least one concurrent second sinusoidal sense signals as applied in time slots allocated to the same sense circuit (e.g., sense circuit 106*a*) start with the same phase (e.g., zero-phase). In some implementations using more than two current sense signals, starting sense signals in time slots allocated to the same sense circuit with the same phase may help to mitigate interference caused by intermodulation effects as described in U.S. patent application Ser. No. 16/392,464 titled Extended Foreign Object Detection Signal Processing, the entire contents of which are hereby incorporated by reference.

In some implementations and operations of the multi-purpose detection circuit 100, time slots of a scan cycle are reallocated based on some conditions (e.g., whether WPT is active or inactive). In an aspect, it may be desirable to reduce the detection latency with respect to LOD when WPT is active. Therefore, in an example operation, two or more time slots of a scan cycle are allocated to each of the capacitive sense circuits 108 when WPT is active. Conversely, the LOD function may not be required when WPT is inactive. Therefore, in an example operation, time slots of a scan cycle are only allocated to inductive sense circuits (e.g., to the plurality of inductive sense circuits 106) when WPT is inactive. In another example operation, two or more time slots of a scan cycle are allocated to each of the plurality of inductive sense circuits (e.g., inductive sense circuits 106) and one time slot is allocated to each of the plurality of capacitive sense circuits when WPT is inactive. This mode of operation may allow maintaining a limited LOD function when WPT is inactive (e.g., for purposes of monitoring proper functioning of the multi-purpose detection circuit 100 with respect to LOD). Moreover, the time spacing between time slots allocated to the same sense circuit in any of the scanning modes described above is maximized.

FIGS. 5A to 5E illustrate example implementations of a portion of the multi-purpose detection circuit 100 of FIG. 1 based on inductive sensing by measuring at least one electrical characteristic (e.g., a complex impedance). These examples are to illustrate the principle of the sensing and measurement technique and do not show all the details of a multi-purpose detection circuit 100. Particularly, for illustrative purposes, they only show a single inductive sense circuit rather than the plurality of inductive sense circuits (e.g., the plurality of inductive sense circuits 106*a*, 106*b*, . . . , 106*n* with reference to FIG. 1). Further, they do not show the details of the signal generation, signal processing, and evaluation as it may be required e.g., for determining at least one of a presence of a foreign object, a living object, a vehicle, a type of vehicle, and a position of the vehicle and as illustrated by the block diagram of FIG. 4.

Figure 5A:
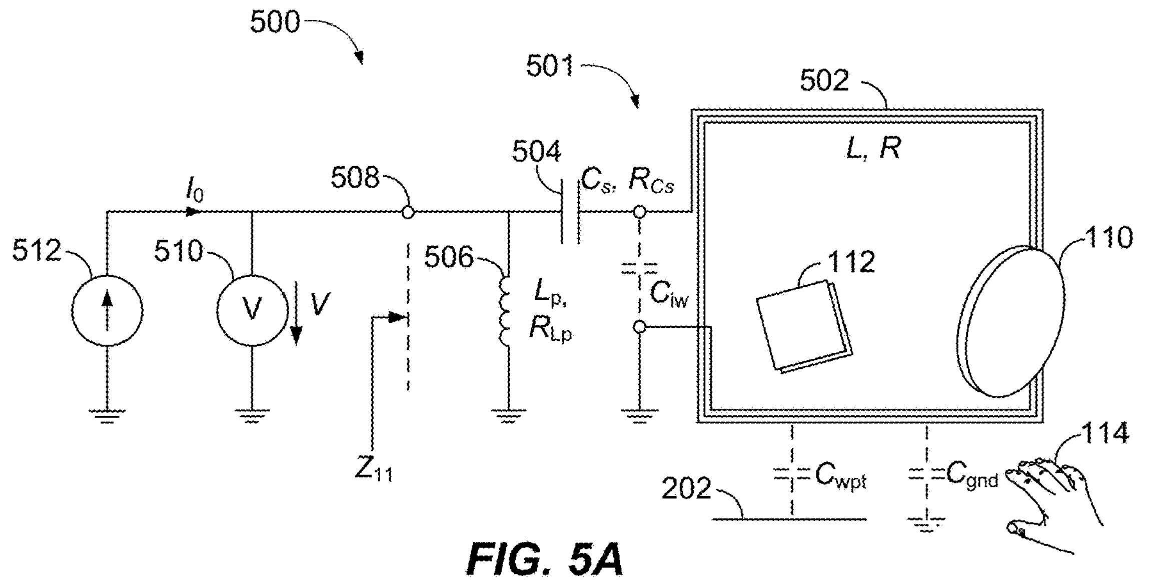
FIG. 5A is a schematic diagram of a circuit illustrating an example implementation of a portion of the multi-purpose detection circuit of FIG. 1 based on inductive sensing and an impedance measurement approach, and the non-living and the living object of FIG. 1.
Figure 5B:
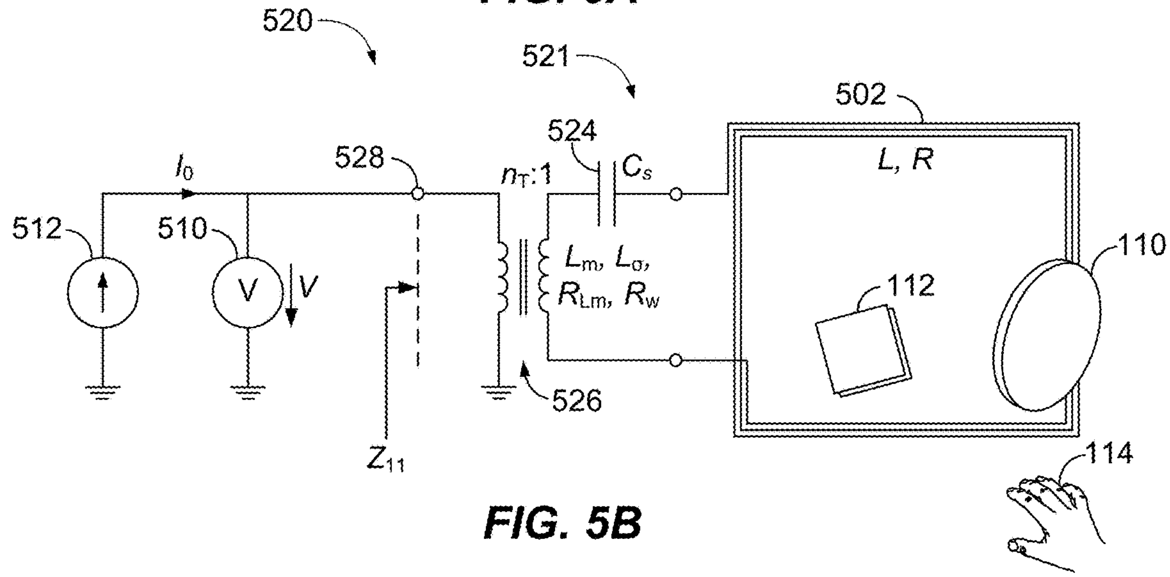
FIG. 5B is a schematic diagram of a circuit illustrating another example implementation of a portion of the multi-purpose detection circuit of FIG. 1 based on inductive sensing and the impedance measurement approach of FIG. 5A, and the non-living and the living object of FIG. 1.
Figure 5C:
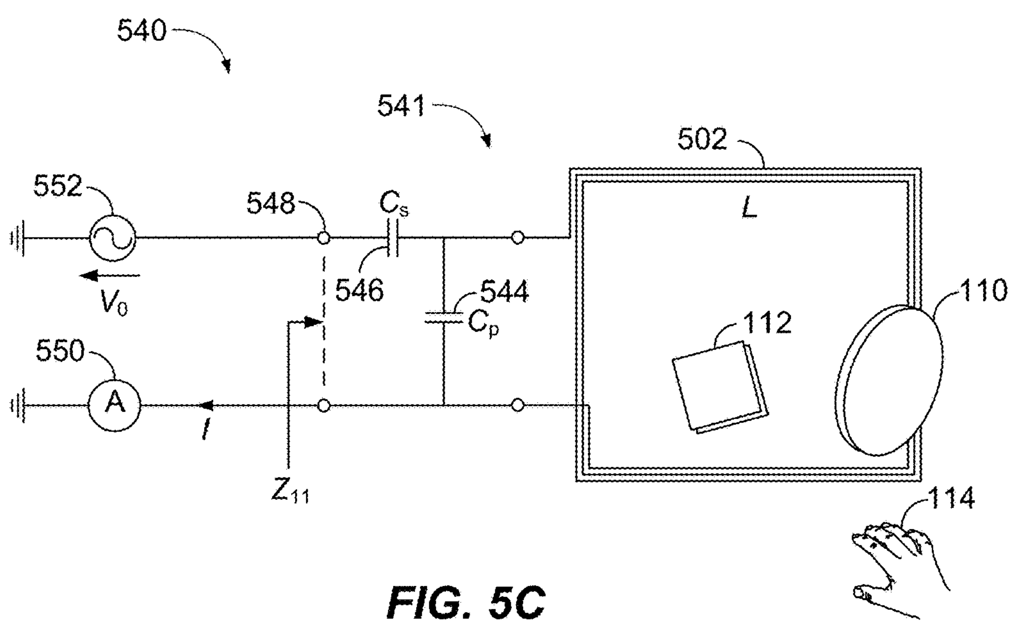
FIG. 5C is a schematic diagram of a circuit illustrating an example implementation of a portion of the multi-purpose detection circuit of FIG. 1 based on inductive sensing and another impedance measurement approach, and the non-living and the living object of FIG. 1.
Figure 5D:
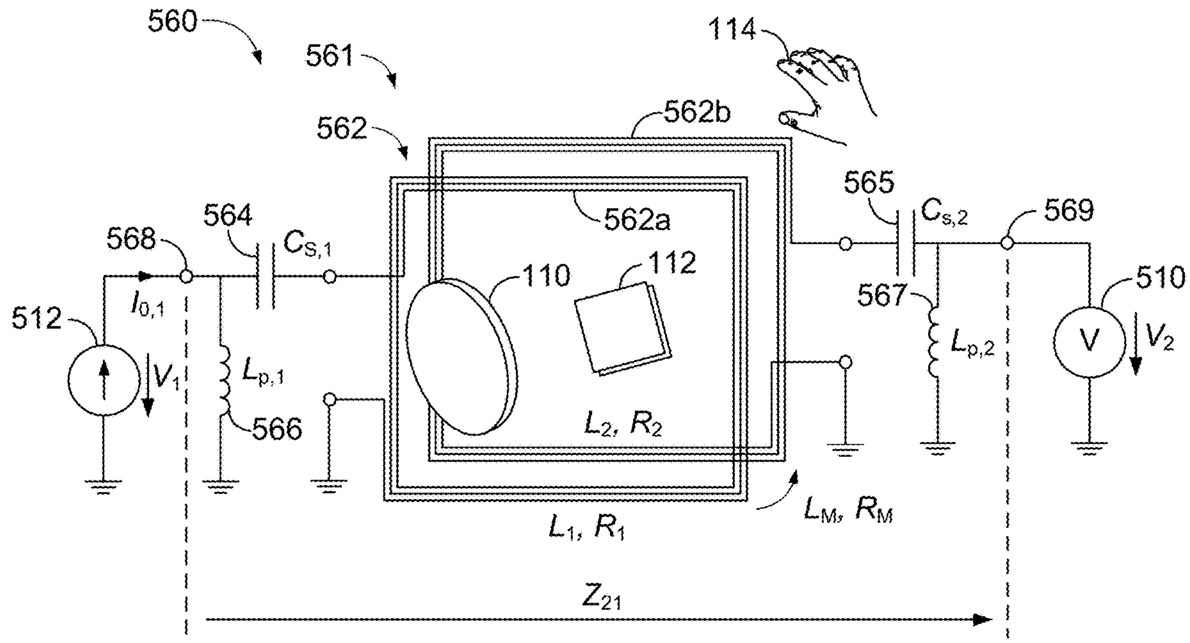
FIG. 5D is a schematic diagram of a circuit illustrating an example implementation of a portion of the multi-purpose detection circuit of FIG. 1 based on inductive sensing and a transimpedance measurement approach, and the non-living and the living object of FIG. 1.
Figure 5E:
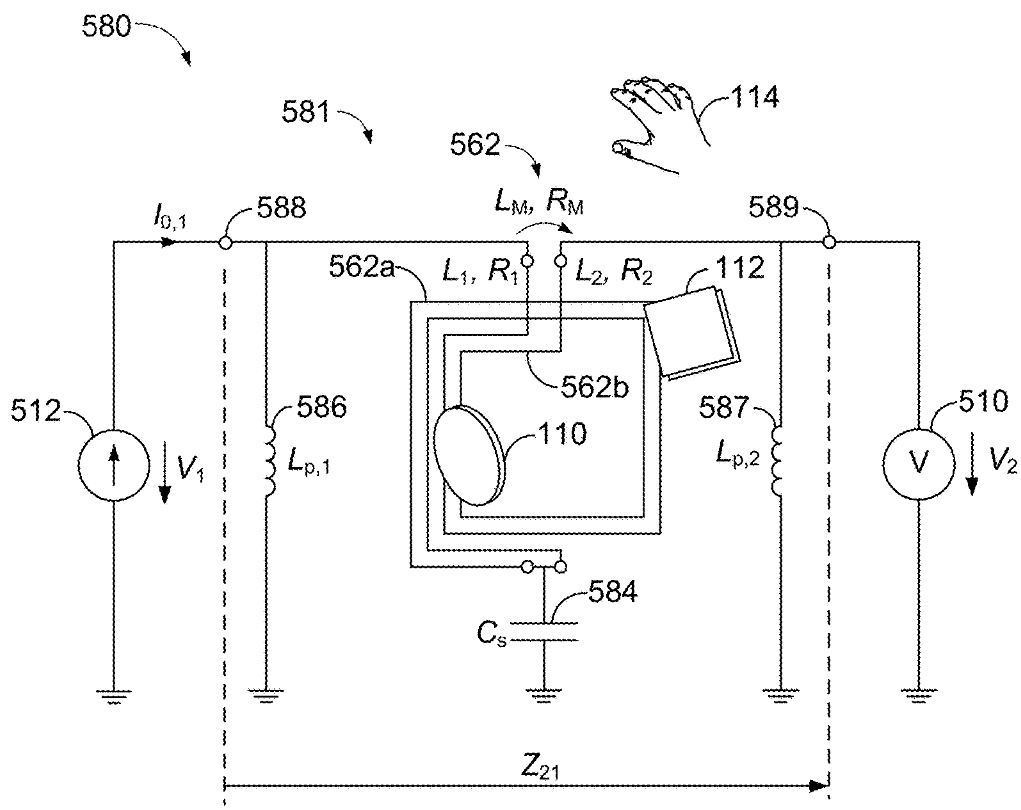
FIG. 5E is a schematic diagram of a circuit illustrating another example implementation of a portion of the multi-purpose detection circuit of FIG. 1 based on inductive sensing and the transimpedance measurement approach of FIG. 5D, and the non-living and the living object of FIG. 1.

The descriptions of the circuits 500, 520, and 540 of FIGS. 5A, 5B, and 5C, respectively, are based on measuring a one-port impedance $Z_{11}$, while the circuits 560 and 580 of FIGS. 5D and 5E, respectively, employ a two-port transimpedance $Z_{21}$ measurement at the sense frequency e.g., using a sinusoidal sense signal. However, this should not exclude implementations configured to measure other electrical characteristics using other sense signal waveforms (e.g., multi frequency signals, pulse signals, pseudo random signals, etc.).

In some implementations, the sense signal is a high frequency signal with a spectrum substantially in the megahertz (MHz) range (e.g., in a frequency range from 2.5 MHz to 3.5 MHz). In other implementations, the sense signal is constraint to the frequency range from 3.155 MHz to 3.400 MHz for frequency regulatory reasons. In some geographic regions or countries, this frequency range may permit higher emission levels e.g., a magnetic field strength $H<13.5$ dBμA/m at 10 m from the radiating parts of the multi-purpose detection circuit 100 (e.g., from the inductive sense element array 107).

The ground symbol shown in the schematic diagrams of FIGS. 5A to 5E indicate a network node on ground potential referred to as the "circuit ground". However, this should not exclude non-ground-based implementations or implementations that use different grounds on different potentials.

The circuit 500 of FIG. 5A illustrates an example implementation based on measuring a complex impedance $Z_{11}$ of a one-port inductive sense circuit 501 (shown in FIG. 5A as the circuit on the right side of the dashed line). More specifically, the impedance $Z_{11}$ is measured at the measurement port 508 (indicated in FIG. 5A by a terminal and a dashed line) by applying, from a current source 512 (sense circuit current source 512), a sinusoidal current $I_0$ at the sense frequency with a defined amplitude and phase and by measuring, using a voltage measurement circuit 510, the complex open-circuit voltage V (amplitude and phase) as indicated in FIG. 5A. The impedance $Z_{11}$ is then determined by dividing the measured voltage V by the defined (known) current $I_0$. This impedance measurement technique is also referred herein as to the current source voltage measurement technique.

The sense circuit 501 comprises a single-coil sense element (e.g., sense coil 502) having an inductance L and an equivalent series resistance R, a series capacitor 504 having a capacitance $C_s$ and an equivalent series resistance $R_{Cs}$ electrically connected in series to the sense coil 502, and a parallel inductor 506 having an inductance $L_p$ and an equivalent series resistance $R_{Lp}$ electrically connected to the capacitor 504 in parallel to the measurement port 508. The circuit 500 further illustrates the sense signal current source 512 and the voltage measurement circuit 510 both electrically connected to the sense circuit 501 at the measurement port 508.

The equivalent series resistance R includes all electrical losses intrinsic to the sense coil 502 and extraneous losses as they may occur in its surrounding materials (e.g., the Litz wire of the WPT coil 202 and the ferrite of the wireless power transfer structure 200 where the sense coil 502 may be integrated). These materials may interact with the magnetic field as generated by the sense coil 502 causing losses.

The circuit 500 of FIG. 5A also indicates parasitic capacitances (by dashed lines) such as the sense coil's 502 self-capacitance (or intra winding capacitance) $C_{iw}$, the sense coil's 502 ground capacitance $C_{gnd}$, and the capacitance $C_{wpt}$ between the sense coil 502 and the WPT coil 202 with reference to FIG. 2 (abstracted in FIG. 5A by a line). These capacitances and the associated electric stray fields may cause a certain sensitivity of the circuit 500 on substantially non-conductive, dielectric objects (e.g., object 112 or 114). For the following considerations, it is assumed that the impact of these capacitances on the sense coil's 502 impedance is negligible.

The sense circuit 501 may be configured to provide a local minimum in the impedance magnitude function $|Z_{11,0}(\omega)|$ substantially at a nominal sense frequency, where $Z_{11,0}$ refers to the impedance as presented by the sense circuit 501 at the measurement port 508 in absence of a foreign object, and w to the angular frequency. The minimum of the impedance magnitude is also referred to herein as the series resonance by definition and applies to the inductive sense circuits with reference to FIGS. 5A to 5E. Alternatively, the sense circuit 501 may be configured to provide a local minimum in the admittance magnitude function $|Y_{11,0}(\omega)|$ substantially at the nominal sense frequency, where $Y_{11,0}$ ($=1/Z_{11,0}$) refers to the admittance as presented by the sense circuit 501 at the measurement port 508 in absence of a foreign object. The minimum of the admittance magnitude is also referred to herein as the parallel resonance by definition and applies to the inductive sense circuits with reference to FIGS. 5A to 5E.

In an example series resonant configuration of the sense circuit 501, the reactance of the series capacitor 504 substantially compensates for the reactance of the sense coil 502 at the nominal sense frequency providing an impedance $Z_{11,0}$ that is substantially real (resistive). In this configuration, the inductance $L_p$ of the parallel inductor 506 may be similar or larger than the inductance L of the sense coil 502. In other terms, the impedance magnitude of the parallel inductor 506 may be substantially (e.g., 10 times) higher than the impedance magnitude $|Z_{11,0}|$ as presented at the nominal sense frequency. In this configuration, the parallel inductor 506 may exert a negligible impact on the impedance $|Z_{11,0}|$ at the nominal sense frequency.

In an example parallel resonant configuration of the sense circuit 501, the reactance of the series capacitor 504 over-compensates for the reactance of the sense coil 502 at the nominal sense frequency. The residual capacitive susceptance of the series connection of the capacitor 504 and the sense coil 502 is substantially compensated for by the susceptance of the parallel inductor 506 providing an admittance $Y_{11,0}$ that is substantially real (resistive). In this configuration, the inductance $L_p$ of the parallel inductor 506 may be smaller, similar, or larger than the inductance L of the sense coil 502. Stated in other terms, the admittance magnitude of the parallel inductor 506 may be substantially (e.g., 20 times) higher than the admittance magnitude $|Y_{11,0}|$ as presented at the nominal sense frequency. In this configuration, the parallel inductor 506 exerts a significant impact on the admittance $Y_{11,0}$ at the nominal sense frequency.

In some implementations, the parallel inductor 506 together with the series capacitor 504 are used for purposes of resonance tuning and impedance transformation e.g., to transform the impedance $Z_{11}$ to match the sense circuit 501 with an operating impedance range as previously mentioned with reference to FIG. 1. The inductance ratio $L/L_p$ may be a parameter to control the impedance magnitude $|Z_{11,0}|$.

Impedance transformation may be particularly effective, if the sense circuit 501 is configured for parallel resonance. More specifically, increasing the inductance ratio $L/L_p$, while maintaining series resonance at the nominal sense frequency, may substantially increase the admittance magnitude $|Y_{11,0}|$ at the nominal sense frequency. Therefore, in an aspect, the sense circuit 501 in the parallel resonant configuration may be considered as an alternative to the sense circuit 521 illustrated in FIG. 5B using a transformer.

Increasing the inductance ratio $L/L_p$, while maintaining resonance at the nominal sense frequency, may also somewhat decrease the impedance magnitude $|Z_{11,0}|$ as presented at the nominal sense frequency in the series resonant configuration of the sense circuit 501. However, impedance transformation may be limited and far less effective than that of the series resonant configuration.

In another aspect of resonance tuning, the series capacitor 504 may include a variable capacitor whose capacitance $C_s$ can be electronically controlled (e.g., a direct current (DC) controlled capacitor) forming a variable capacitor 504. In some implementations of the circuit 500, a variable capacitor 504 is used to compensate for a temperature drift, an aging, or a detuning of the sense circuit 701 caused by an external impact and to maintain its resonance substantially at the nominal sense frequency. Similarly, the parallel inductor 506 may include a variable inductor whose inductance $L_p$ can be electronically controlled (e.g., a DC controlled inductor) forming a variable inductor 506. In a further aspect, the variable capacitor 504 and variable inductor 506 in combination are used to vary the impedance $|Z_{11,0}|$ of the sense circuit 501.

In yet another aspect, the series capacitor 504 in combination with the parallel inductor 506 form a $2^{nd}$ order high pass filter to attenuate a low frequency disturbance component in the voltage V emanating from the voltage inductively coupled into the sense coil 502 by the magnetic and electric field as generated during wireless power transfer. This high pass filter may reduce dynamic range requirements of the voltage measurement circuit 510 and may also protect the voltage measurement circuit 510 and the current source 512 from being overloaded. Stated in other words, it may reduce non-linear distortion effects (e.g., signal clipping) in a voltage measurement circuit 510 with a limited dynamic range.

With reference to FIG. 1, the sense circuit 501, the sense coil 502, the series capacitor 504, and the parallel inductor 506 may correspond e.g., to the inductive sense circuit 106*a*, the inductive sense element 107*a*, and the associated capacitive element, respectively. The current source 512 may include the signal generator circuit 406 and the driver circuit 402, while the voltage measurement circuit 510 may include the measurement amplifier circuit 404 and the signal processing circuit 408 with reference to FIG. 4.

In an aspect and for sinusoidal signals, a current source (e.g., current source 512) may be characterized by a quasi-ideal current source providing a source admittance magnitude $|Y_{cs}|$ substantially (e.g., at least 10 times) lower than the admittance magnitude $|Y_{11}|$ of the sense circuit 501 as presented at the measurement port 508 at the sense frequency. Analogously, the voltage measurement circuit 510 may be characterized by a quasi-ideal voltage measurement circuit with an admittance magnitude $|Y_{vm}|$ substantially (e.g., at least 10 times) lower than $|Y_{11}|$ at the sense frequency.

In a further aspect and for sinusoidal signals, a measurement circuit (e.g., measurement circuit 104 of FIG. 4) including a current source (e.g., current source 512) and a voltage measurement circuit (e.g., voltage measurement circuit 510) configured to measure the admittance $Y_{11}$ of a one-port sense circuit (e.g., sense circuit 501) may be characterized by a quasi-ideal measurement circuit providing a measurement circuit admittance magnitude $|Y_{mc}|$ substantially (e.g., at least 10 times) lower than $|Y_{11}|$ at the sense frequency, where the measurement circuit admittance may be defined, using above admittance definitions, as:

$$Y_{mc} \approx Y_{cs} + Y_{vm} \tag{1}$$

Conversely, the quality of a measurement circuit (e.g., measurement circuit 104 of FIG. 4) based on the current source voltage measurement approach may be characterized as the ratio:

$$Q_{mc} \approx |Y_{11}|/|Y_{mc}| \tag{2}$$

Equation (2) may be used to assess the quality of a measurement circuit (e.g., measurement circuit 104 of FIG. 4) based on the current source voltage measurement approach.

A more general definition of the quality of a measurement circuit (e.g., measurement circuit 104 of FIG. 4) based on the current source voltage measurement approach, also applicable to a two-port sense circuit (e.g., sense circuit 561 with reference to FIG. 5D) may be given by:

$$Q_{mc} \approx |\Delta V/V_0|/|\Delta I/I_0| \tag{3}$$

Above characterizations of the current source 512, the voltage measurement circuit 510, and the measurement circuit 104 may be generalized to non-sinusoidal sense signals, where the notions of complex impedance and complex amplitude may not directly apply. This may be accomplished by approximating the signal by a complex Fourier series and applying above characterizations to the individual frequency components of the complex Fourier series.

Other impedance measurement techniques may also be contemplated e.g., by applying a sinusoidal voltage, from a voltage source (e.g., voltage source 552 with reference to FIG. 5C) with a defined voltage $V_0$ (amplitude and phase) to the sense circuit 501 and by measuring the complex current I (amplitude and phase) at the measurement port 508 using a current measurement circuit (e.g., current measurement circuit 550 with reference to FIG. 5C).

Analogously to the current source voltage measurement technique, the voltage source 552 (sense signal voltage source 552) may be characterized by a quasi-ideal voltage source with a source impedance magnitude $|Z_{vs}|$ substantially (e.g., at least 10 times) lower than the impedance magnitude $|Z_{11}|$ of the sense circuit 501 as presented at the sense frequency. Analogously, the current measurement circuit 550 may be characterized by a quasi-ideal current measurement circuit with an impedance magnitude $|Z_{cm}|$ substantially (e.g., at least 10 times) lower than $|Z_{11}|$ at the sense frequency.

In a further aspect, a measurement circuit (e.g., measurement circuit 104 of FIG. 4) including a voltage source (e.g., voltage source 552) and a current measurement circuit (e.g., current measurement circuit 550) may be characterized by a quasi-ideal measurement circuit providing a measurement circuit impedance magnitude $|Z_{mc}|$ substantially (e.g., at least 10 times) lower than $|Z_{11}|$ at the sense frequency, where the measurement circuit impedance may be defined, using above impedance definitions, as:

$$Z_{mc} \approx Z_{vs} + Z_{cm} \quad (4)$$

Conversely, the quality of a measurement circuit (e.g., measurement circuit 104 of FIG. 4) based on the voltage source current measurement approach may be characterized as the ratio:

$$Q_{mc} \approx |Z_{11}|/|Z_{mc}| \quad (5)$$

Equation (5) may be used to assess the quality of a measurement circuit (e.g., measurement circuit 104 of FIG. 4) based on the voltage source current measurement approach.

Other impedance measurement techniques may also include approaches where the sense circuit 501 is driven by a non-ideal source and the voltage V and the current I are measured e.g., using a quasi-ideal voltage measurement circuit and a quasi-ideal current measurement circuit, respectively.

Further, in some implementations, measurement of the voltage V and thus of the impedance $Z_{11}$ may be affected by noise and other disturbance signals reducing a detection sensitivity of the multi-purpose detection circuit 100. The noise may include circuit intrinsic noise as generated in active and passive components of the circuit 500 of FIG. 5A. It may also include quantization noise e.g., generated in a digital implementation of the signal generator circuit 406 and the signal processing circuit 408 with reference to FIG. 4. Other disturbance signals may emanate from sources external to the circuit 500 (e.g., from the WPT system during wireless power transfer, from a switched-mode power supply, from a digital processing unit, etc.). These circuit extrinsic disturbance signals may be inductively and capacitively coupled (e.g., via capacitance $C_{wpt}$) to the sense coil 502 and may include the fundamental and harmonics of the WPT operating frequency and other switching noise components as generated by the WPT system. Therefore, in some implementations, the voltage measurement circuit 510 includes a filter to selectively filter the sense signal and to suppress noise and other disturbance signal components as discussed above and consequently to improve the detection sensitivity. The filter may be matched to the sense signal and configured to maximize a signal-to-noise ratio (SNR) in presence of noise and other disturbance signals. In implementations using a sinusoidal sense signal, the voltage measurement circuit 510 may be frequency selective (narrowband) and tuned to the sense signal frequency. It may be configured to suppress noise and other disturbance signal components at frequencies substantially different from the sense frequency.

Moreover, in implementations employing a selective voltage measurement circuit 510 as discussed above, the sense signal waveform as generated by the current source 512 and the corresponding filter of the voltage measurement circuit 510 are adapted e.g., to improve the SNR and consequently to improve the detection sensitivity. Therefore, in some implementations, the voltage measurement circuit 510 also includes a noise analyzer (e.g., included in the signal processing circuit 408 with reference to FIG. 4) that is continuously analyzing the noise. Further, it includes a controller (e.g., the control and evaluation circuit 102 of FIG. 4) for controlling the waveform of the sense signal as generated by the current source 512 based on the noise analysis and within some operational constraints. More specifically, in an example implementation using a sinusoidal sense signal, the voltage measurement circuit 510 includes a spectrum analyzer and a controller that is continuously looking for frequencies with a minimum disturbance (noise) level and adjusts the frequency of the sense signal (sense frequency) to a frequency with the minimum disturbance level, avoiding switching harmonics of the WPT system and remaining substantially at resonance of the sense circuit 501.

With reference to FIG. 1, FIG. 5A also illustrates objects 110, 112, and 114 proximate to the sense coil 502. Presence of any one of these objects including vehicle 330 may cause a change in one or more electrical characteristics of the sense coil 502 and consequently of the sense circuit 501. As non-limiting examples, it may cause a change in at least one of the inductance L and the equivalent series resistance R and hence in the sense coil's 502 impedance Z. This change of impedance, herein referred to as the reflected impedance $\Delta Z_r$ of the object (e.g., object 110), results in an impedance change $\Delta Z$ with respect to the impedance $Z_{11,0}$ as presented at the measurement port 508 in absence of a foreign object. As discussed below in more detail with reference to FIG. 6 and FIG. 5F, the reflected impedance $\Delta Z_r$ and the related impedance change $\Delta Z$ may be indicative of electrical properties of the object (e.g., object 110).

Presence of an object (e.g., object 110) may be determined if $\Delta Z$ satisfies certain criteria (e.g., magnitude $|\Delta Z|$ exceeding a detection threshold, angle $\arg\{\Delta Z\}$ being within a certain range). Though not shown in FIG. 5A, a change $\Delta Z_r$ in Z and thus $\Delta Z$ in the impedance $Z_{11}$ may also be caused by the underbody of a vehicle (e.g., vehicle 330), by the vehicle-based wireless power transfer structure (e.g., wireless power transfer structure 310 of FIG. 3), by a passive beacon transponder (e.g., passive beacon transponder 314 of FIG. 3), or by another structure at the vehicle. Therefore, a change $\Delta Z$ may be also indicative of the presence of a vehicle or a type of vehicle above the sense coil 502. Further, an impedance change $\Delta Z$ may be caused by a substantially non-conductive, dielectric object (e.g., object 112 or 114) proximate to the sense coil 502 due to the capacitive sensing effect inherent to the sense coil 502 as previously mentioned. More specifically, the object 112 or 114 in proximity of the sense coil 502 may change one or more of its parasitic capacitances $C_{iw}$, $C_{gnd}$, and $C_{wpt}$ as illustrated in FIG. 5A.

In an implementation of the circuit 500 based on measuring the admittance $Y_{11}$, presence of an object (e.g., object 110, 112, 114, or vehicle 330) may cause a change $\Delta Y$ with respect to the admittance $Y_{11,0}$ as measured in absence of a foreign object. Analogously, presence of an object (e.g., object 110) may be determined if $\Delta Y$ satisfies certain criteria (e.g., magnitude $|\Delta Y|$ exceeding a detection threshold, angle $\arg\{\Delta Y\}$) being within a certain range).

Using a quasi-ideal current source (e.g., the current source 512), a change $\Delta Z$ in the impedance $Z_{11}$ (e.g., due to the presence of the object 110) manifests in a change $\Delta V$ in the voltage V while the current $I_0$ remains substantially unaffected. Therefore, measuring the complex voltage V may be equivalent to measuring the complex impedance $Z_{11}$. In other words, the complex voltage V may be indicative of the complex impedance $Z_{11}$ and there may be no requirement for additionally measuring the current $I_0$ thus reducing complexity of the measurement circuit (e.g., measurement circuit 104 of FIG. 1). Likewise, measuring the complex voltage V and determining the reciprocal value 1/V may be equivalent to measuring the complex admittance $Y_{11}$.

In an aspect, it may be useful to define the normalized reflected impedance of an object (e.g., object 110) in the sense coil's 502 having a reactance $\omega L$ as:

$$\Delta Z'_r=(Z-j\omega L)/(\omega L)=\Delta Z_r/(\omega L) \tag{6}$$

where Z defines the sense coil's 502 impedance in presence of an object (e.g., object 110). Analogously, the normalized reflected admittance $\Delta Y'_r$ may be defined as:

$$\Delta Y_r'=(Y-(1/(j\omega L))\omega L=\Delta Y_r\omega L \tag{7}$$

where Y and $\Delta Y_r$ denote the sense coil's 502 admittance in presence of an object (e.g., object 110) and the reflected admittance of the object, respectively. The normalized reflected impedance $\Delta Z'_r$ or the normalized reflected admittance $\Delta Y'_r$ determine the impact of an object (e.g., object 110) on the sense coil's 502 impedance or admittance, respectively. Its magnitude $|\Delta Z'_r|$ or $|\Delta Y'_r|$ may be related to the size, the position, and orientation of the object relative to the sense coil 502.

In a further aspect, it may be useful to define the normalized impedance change of a one-port sense circuit (e.g., sense circuit 501 of FIG. 5A) as:

$$\Delta Z'=(Z_{11}-Z_{11,0})/|Z_{11,0}|=\Delta Z/|Z_{11,0}| \tag{8}$$

and analogously, the normalized admittance change as:

$$\Delta Y'=(Y_{11}-Y_{11,0})/|Y_{11,0}|=\Delta Y/|Y_{11,0}| \tag{9}$$

also referred herein as to the fractional change $\Delta Z'$ (or $\Delta Y'$). The fractional change $\Delta Z'$ (or $\Delta Y'$) caused by a defined test object (e.g., object 110) placed at a defined position relative to the sense coil 502 may relate to the detection sensitivity of an object detection circuit (e.g., the multi-purpose detection circuit 100 of FIG. 1) based on the one-port sense circuit 501. More specifically, increasing the fractional change $\Delta Z'$ (or $\Delta Y'$) may increase a signal-to-noise ratio (SNR) e.g., defined as:

$$\Delta SNR=|\Delta V|/V_n \tag{10}$$

with $V_n$ (not indicated in FIG. 5A) referring to the noise component in the voltage V. In another aspect, increasing the fractional change may reduce dynamic range requirements of the voltage measurement circuit 510.

As non-limiting examples, the normalized reflected impedance $\Delta Z'_r$ of an object (e.g., object 110) and thus the related fractional change $\Delta Z'$ may be increased by optimizing the design of the sense coil 502 with respect to its geometry and its integration into the wireless power transfer structure (e.g., wireless power transfer structure 200 with reference to FIGS. 2 and 3). The fractional change $\Delta Z'$ may be further increased by resonance tuning e.g., using the series capacitor 504, and by improving the Q-factor of the sense circuit 501. Improving the Q-factor may also increase the SNR, if the noise voltage $V_n$ is predominantly circuit intrinsic noise as discussed below with reference to FIG. 5F. The same may apply to the normalized reflected admittance $\Delta Y'_r$ and the fractional change $\Delta Y'$.

As further analyzed and discussed below with reference to FIG. 5F, use of the parallel inductor 506 for purposes of parallel resonance tuning and impedance transformation may result in a lower fractional change as compared to the sense circuit 501 using the parallel inductor 506 only for purposes of high pass filtering as previously discussed. This may be explained by the additional losses inherent to the parallel inductor 506.

In a further aspect of the multi-purpose detection circuit 100, variations in temperature e.g., of the sense coil 502 may result in thermal drift of the impedance $Z_{11}$ as measured at the measurement port 508. In some implementations, the sense coil's inductance L and equivalent series resistance R, the series capacitor's 504 capacitance, and the parallel inductor's 506 inductance $L_p$ and equivalent series resistance $R_{Lp}$ may be subjected to thermal drift. Thermal drift effects may deteriorate the detection sensitivity of the multi-purpose detection circuit 100. Considering the physical nature of temperature drifts in a tuned sense circuit (e.g., sense circuit 501), it may be meaningful to define a temperature sensitivity $S_\vartheta$ for the real and imaginary part, separately, as the ratios:

$$Re\{S_\vartheta\}=Re\{\Delta Z_\vartheta'\}/Re\{\Delta Z'\} \tag{11}$$

$$Im\{S_\vartheta\}=Im\{\Delta Z_\vartheta'\}/Im\{\Delta Z'\} \tag{12}$$

where $\Delta Z_\vartheta'$ denotes the fractional impedance change due to a defined temperature change $\Delta\vartheta$ and $\Delta Z'$ the fractional impedance change due to presence of a test object (e.g., object 110) at a defined position relative to the sense coil 502. The fractional change $\Delta Z_\vartheta'$ may be considered the complex temperature coefficient of a sense circuit (e.g., sense circuit 501). The temperature sensitivity $S_\vartheta$ may also be expressed in terms of the fractional admittance changes $\Delta Y_\vartheta'$ and $\Delta Y'$.

In yet another aspect of the multi-purpose detection circuit 100, it may be desirable to discriminate between certain categories of objects e.g., between foreign metallic objects (e.g., object 110), non-living non-conductive objects (e.g., object 112), and living objects (e.g., object 114). In another aspect, it may also be desirable to discriminate e.g., between foreign metallic objects (e.g., object 110) and the vehicle 330 with reference to FIG. 3. As further discussed below with reference to FIG. 6, this may be accomplished based on characteristics of the reflected impedance $\Delta Z_r$ as defined above. As already mentioned above and discussed in more details with reference to FIG. 6, the reflected impedance $\Delta Z_r$ and particularly the angle $\arg\{\Delta Z_r\}$ may reflect electrical properties of the object 110, 112, 114, or vehicle 330. The same may be true for the reflected admittance $\Delta Y_r$.

In some implementations and configurations of the circuit 500 of FIG. 5A, the change $\Delta Z$ in the impedance $Z_{11}$ caused by an object (e.g., object 110) is indicative of the reflected impedance $\Delta Z_r$. Therefore, in an aspect of object discrimination, the circuit 500 may be configured to determine the angle $\arg\{\Delta Z\}$ with the required accuracy. However, in some implementations, measuring the angle $\arg\{\Delta Z\}$ may be subject to errors for various reasons. One prominent error source of some implementations of the circuit 500 is an unknown (e.g., frequency dependent) phase offset of the output of the voltage measurement circuit 510 relative to the drive current $I_0$ as generated by the current source 512. In a mixed digital and analog implementation of the circuit 500, this phase offset may be attributed to the analog frontend portion of the circuit 500.

In an aspect of reducing an error in the measurement of the angle $\arg\{\Delta Z\}$, some implementations of a multipurpose detection circuit 100 employ a phase calibration of the analog circuitry (e.g., the analog front end portion of the measurement circuit 104 with reference to FIG. 4). This phase calibration may be a factory calibration or it may be performed at the time of installation and commissioning of the wireless power transfer structure 200 (integrating the multipurpose detection circuit 100). In some operations of the multipurpose detection circuit 100, this phase calibration is repeated periodically in fixed intervals (e.g., to mitigate aging effects). In other operations, it is executed after the multipurpose detection circuit 100 is reactivated (powered on). In further operations, this calibration is initiated e.g., if the temperature as measured in the wireless power transfer structure 200 exceeds or falls below a threshold.

Reactance compensation (resonance tuning) in the sense circuit 501 produces a local extremum (minimum or maximum) in the impedance magnitude function $|Z_{11,0}(\omega)|$ and hence in the voltage magnitude $|V|$ across the measurement port 508. Therefore, reactance compensation provides a mean to calibrate the voltage measurement circuit 510 and hence the impedance measurement with respect to the angle $\arg\{\Delta Z\}$.

In a first step of an example calibration procedure applicable to the series resonant configuration of the circuit 500 of FIG. 5A, the sense frequency is adjusted to the local minimum of the voltage magnitude $|V|$ as measured by the voltage measurement circuit 510 supposing absence of a foreign object. At this frequency, the complex impedance $Z_{11,0}$ and hence the complex voltage V across the measurement port 508 may be substantially real. Otherwise stated, the angles $\arg\{Z_{11,0}\}$ and $\arg\{V\}$ are substantially zero. In a second step of the example calibration procedure, the voltage measurement circuit 510 is corrected by applying a phase shift such that the imaginary part of the complex voltage value as determined and output by the voltage measurement circuit 510 at this frequency vanishes. Applying the phase shift is equivalent to rotating the impedance plane by an angle $\arg\{V_{uncal}\}$ where $V_{uncal}$ refers to the complex voltage value as determined by the uncalibrated voltage measurement circuit 510 (before any correction is applied). This angle correction may be expressed by the following complex multiplication:

$$V_{cal}=V_{uncal}\exp(-j\arg\{V_{uncal}\}) \tag{13}$$

where $V_{cal}$ refers to the complex voltage value as determined by the calibrated voltage measurement circuit 510.

Applying the angle correction of Equation (13), an object (e.g., object 110) reflecting an impedance $\Delta Z_r$ that is imaginary (reactive) may cause a measured voltage change $\Delta V_{cal}$ that is substantially imaginary. Nevertheless, a small residual error may remain in the angle $\arg\{\Delta V_{cal}\}$ due to the impact of the parallel inductor 506 and the electrical losses in the sense circuit 501. The residual angle error of an example series resonant configuration of the circuit 500 and for an example object 110 is provided in TABLE 2.

In some implementations, the residual error described above is reduced by configuring the parallel inductor 506 with an inductance $L_p$ whose impedance $Z_{Lp}$ is substantially larger (e.g., 10 times larger) than the series resonant resistance of the sense circuit 501. In other implementations, the residual error is reduced by measuring the impedance $Z_{11,0}$ at two or more substantially different frequencies and by determining the elements of an equivalent circuit model of the sense circuit 501 (e.g., the equivalent circuit model illustrated in FIG. 5F) based on the measured impedances $Z_{11,0}$ employing a best fit method. In some implementations, these two or more frequencies include at least the frequency of the minimum and the maximum of $|Z_{11,0}(\omega)|$.

In an implementation of the multipurpose detection circuit 100 using a plurality of inductive sense circuits (e.g., inductive sense circuits 106*a*, 106*b*, . . . , 106*n*), each including a respective inductive sense element (e.g., inductive sense element 107*a*, 107*b*, . . . , 107*n*) of an array (e.g., array 107), a further residual error may be caused by a parasitic resonance effect of sense circuits associated to adjacent inductive sense elements. More precisely, a residual error in a first sense circuit (e.g., inductive sense circuit 106*a*) including a first inductive sense element (e.g., inductive sense element 107*a*) may be caused by a parasitic resonance effect of at least one second inductive sense circuit (e.g., inductive sense circuit 106*b*) including a second inductive sense element (e.g., inductive sense element 107*b*) that is located adjacent to the first inductive sense element.

Therefore, in some implementations of the multipurpose detection circuit 100, the measurement accuracy of the angle $\arg\{\Delta Z\}$ and thus of the angle $\arg\{\Delta Z_r\}$ is increased by an optimized design of the sense coil 502 and by introducing some spacing between adjacent sense coils 502 of an array (e.g., array 107).

In an implementation configured for parallel resonance as defined above, the circuit 500 may be configured to measure the admittance $Y_{11}$ and corresponding changes $\Delta Y$ of $Y_{11}$ as caused by the object 110, 112, 114, or vehicle 330. In this case, the admittance change $\Delta Y$ may be indicative of the reflected impedance $\Delta Z_r$ as previously introduced. As discussed above with reference to the series resonant configuration, the angle $\arg\{\Delta Y\}$ may be subjected to an error and therefore may require calibration to reduce an error in the measurement of the angle $\arg\{\Delta Y\}$ and thus of the angle $\arg\{\Delta Z_r\}$.

In an implementation configured for parallel resonance, the circuit 500 may be calibrated analogously to the series resonant configuration using the local minimum of the admittance function $|Y_{11,0}(\omega)|$ where susceptance compensation occurs.

In a first step of an example calibration procedure applicable to the parallel resonant configuration of the circuit 500 of FIG. 5A, the sense frequency is adjusted to the local maximum of the voltage magnitude $|V|$ as measured by the uncalibrated voltage measurement circuit 510 supposing absence of a foreign object. At this frequency, the admittance $Y_{11,0}$ and hence the voltage V across the measurement port 508 may be substantially real. Otherwise stated, the angles $\arg\{Y_{11,0}\}$ and $\arg\{V\}$ are substantially zero. In a second step of the example calibration procedure, the voltage measurement circuit 510 is corrected by applying a phase shift (impedance plane rotation) as defined above by Equation (13).

Applying the angle correction of Equation (13), an object (e.g., object 110) reflecting an impedance $\Delta Z_r$ that is imaginary (reactive) may result in a measured voltage change $\Delta V_{cal}$ that is substantially imaginary. A residual error may remain in the angle $\arg\{\Delta V_{cal}\}$ due to the transformation of $\Delta Z_r$ to $\Delta Y$ in the lossy sense circuit 501. The residual angle error of an example parallel resonant configuration of the circuit 500 and for example reflected impedance $\Delta Z_r$ is provided in TABLE 2.

In an example implementation, the residual error due to the transformation of $\Delta Z_r$ to $\Delta Y$ is reduced by measuring the admittance $Y_{11,0}$ at two or more substantially different frequencies, supposing absence of a foreign object, and by determining the elements of an equivalent circuit model (e.g., the equivalent circuit model of FIG. 5F) based on the measured admittances $Y_{11,0}$ employing a best fit method. In some implementations, these two or more frequencies include at least the frequency of the minimum and the maximum of $|Y_{11,0}(\omega)|$.

The series and the parallel resonant configuration of the circuit 500 of FIG. 5A are further analyzed below with reference to FIG. 5F with respect to various characteristics such as the Q-factor, fractional change, and various definitions of SNR based on an equivalent circuit model.

The circuit 520 of FIG. 5B illustrates another example implementation based on measuring a complex impedance $Z_{11}$ of a one-port inductive sense circuit 521 (shown in FIG. 5B as the circuit on the right side of the dashed line). More specifically, the impedance $Z_{11}$ is measured at the measurement port 528 (indicated in FIG. 5B by a terminal and a dashed line) by applying, from the current source 512, a sinusoidal current $I_0$ and by measuring, using the voltage measurement circuit 510, the complex open-circuit voltage V as previously described with reference to FIG. 5A.

The sense circuit 521 comprises the single-coil inductive sense element (e.g., sense coil 502) having the inductance L with reference to FIG. 5A and a capacitor 524 having a capacitance $C_s$ electrically connected in series to the sense coil 502. However, the sense circuit 521 shows the parallel inductor 506 of FIG. 5A replaced by a transformer 526. The transformer 526 may include a primary winding and a galvanically insulated secondary winding wound on a common core as suggested by the transformer symbol in FIG. 5B. However, other transformer implementations may apply e.g., an autotransformer having only one winding with at least three terminals. FIG. 5B also indicates a transformation ratio $n_T$:1, a main inductance $L_m$, a leakage inductance $L_\sigma$, and equivalent series resistances $R_{Lm}$ and $R_w$ that may represent core and conductor losses, respectively. These parameters may refer to the secondary referred approximate equivalent circuit model of a non-ideal transformer illustrated in FIG. 5H. FIG. 5B shows its primary winding electrically connected in parallel to the measurement port 528, while its secondary winding is electrically connected to the series capacitor 524. The circuit 520 further illustrates the sense signal current source 512 and the voltage measurement circuit 510 both electrically connected to the sense circuit 521 at the measurement port 528.

Though not indicated in FIG. 5B for purposes of illustration, the series capacitor 524 and the sense coil 502 may also include the equivalent series resistance $R_{Cs}$ and the parasitic capacitances $C_{iw}$, $C_{gnd}$, and $C_{wpt}$, respectively, as shown in FIG. 5A.

The sense circuit 521 may be configured to provide a local minimum in the impedance magnitude function $|Z_{11,0}(\omega)|$ (series resonance) substantially at the nominal sense frequency. Alternatively, it may be configured to provide a local minimum in the admittance magnitude function $|Y_{11,0}(\omega)|$ (parallel resonance) substantially at the nominal sense frequency using the transformer's 526 secondary referred main inductance $L_m$ in a manner similar to using the inductance $L_p$ as described above with reference to FIG. 5A.

In an example series resonant configuration of the sense circuit 521, the reactance of the series capacitor 504 substantially compensates for the reactance of the sense coil 502 at the nominal sense frequency providing an impedance $Z_{11,0}$ at the measurement port 528 that is substantially real (resistive). The reactance of the series capacitor 524 also compensates for the reactance of the transformer's 526 secondary referred leakage inductance $L_\sigma$ with reference to FIG. 5H. In this configuration, the transformer's 526 secondary referred main inductance $L_m$ may be similar or larger than the inductance L of the sense coil 502. Stated in other terms, the primary referred open-circuit impedance of the transformer 526 may be substantially (e.g., 10 times) higher than the impedance magnitude $|Z_{11,0}|$ as presented at the nominal sense frequency. Apart from the impedance transformation by the factor $n_T^2$, the transformer 526 may exert a negligible impact on the impedance $|Z_{11,0}|$ at the nominal sense frequency.

In an example parallel resonant configuration of the sense circuit 521, the reactance of the series capacitor 524 overcompensates for the sum reactance of the sense coil 502 and the transformer's 526 leakage inductance $L_\sigma$ at the nominal sense frequency. The residual capacitive susceptance of the series connection of the capacitor 524, the sense coil 502 and the transformer's leakage inductance $L_\sigma$ is substantially compensated for by the susceptance of the transformer's 526 secondary referred inductance $L_m$ providing an admittance $Y_{11,0}$ that is substantially real (resistive). In this configuration, the inductance $L_m$ may be smaller, similar, or larger than the inductance L of the sense coil 502. Stated in other terms, the primary referred open-circuit admittance of the transformer 526 may be substantially (e.g., 20 times) higher than the admittance magnitude $|Y_{11,0}|$ as presented at the nominal sense frequency. In this configuration and apart from the admittance transformation, the transformer 526 exerts a significant impact on the admittance $Y_{11,0}$ at the nominal sense frequency.

The transformer 526 may serve for various purposes. In some implementations, the transformer 526 is a $n_T$:1 transformer with $n_T \neq 1$ used at least for impedance transformation e.g., to match the impedance magnitude $|Z_{11}|$ of the sense circuit 521 with an operating impedance range as previously mentioned with reference to FIG. 5A. In an example implementation configured for series resonance, the transformer 526 increases the impedance $|Z_{11}|$ by a factor $n_T^2$ with $n_T>1$. In another example implementation configured for parallel resonance, it increases the admittance $|Y_{11}|$ by a factor $1/n_T^2$ with $n_T<1$. In yet other implementations, it is a balancing (balun) transformer used to reduce a common mode disturbance voltage capacitively coupled to the sense coil 502 (e.g., via parasitic capacitance $C_{wpt}$). In a further implementation, it is a balancing transformer used to reduce a ground leakage current e.g., via parasitic capacitance $C_{gnd}$ and thus to reduce at least one of a sensitivity to living objects (e.g., living object 112) and an electromagnetic emission. In yet another implementation, the transformer 526 is also part of the resonance tuning as described above.

Apart from the transformation ratio $n_T$:1, the inductance ratio $L/L_m$ may be an additional parameter to match the admittance magnitude $|Y_{11,0}|$ of the parallel resonant configuration with an operating admittance range of the multipurpose detection circuit 100 in a manner similar to the parameter $L/L_p$ in the circuit 500 of FIG. 5A.

In a further aspect, the series capacitor 524 in combination with the transformer's 526 main inductance $L_m$ form a $2^{nd}$ order high pass filter to attenuate a low frequency disturbance component in the voltage V for purposes as previously discussed in connection with FIG. 5A.

FIG. 5B also illustrates the objects 110, 112, and 114 (with reference to FIG. 1) proximate to the sense coil 502. As previously discussed with reference to FIG. 1, presence of an object (e.g., object 110, 112, 114, or vehicle 330) may cause a change in one or more electrical characteristics of the sense coil 502 and consequently of the sense circuit 521. Not limited to that, the object may change the sense coil's impedance Z referred to as the reflected impedance $\Delta Z_r$ with reference to FIG. 5A.

The losses of the transformer 526 and its leakage inductance $L_o$ may somewhat reduce the fractional change ΔZ (or ΔY) of the sense circuit 521 if compared to the transformerless sense circuit 501 of FIG. 5A. This is further analyzed and discussed below with reference to FIG. 5F.

The circuit 540 of FIG. 5C illustrates another example implementation based on measuring a complex impedance $Z_{11}$ of a one-port inductive sense circuit 541 (shown in FIG. 5C as the circuit on the right side of the dashed line). More specifically, the impedance $Z_{11}$ is measured at the measurement port 548 (indicated in FIG. 5C by a terminal and a dashed line) by applying, from a voltage source 552, a sinusoidal voltage $V_0$ and by measuring, using a current measurement circuit 550, the complex short-circuit current I as previously mentioned with reference to FIG. 5A (voltage source current measurement technique).

The circuit 540 may be considered an electrically dual circuit of the circuit 500 of FIG. 5A according to the principle of duality in electrical engineering. The circuit 540 includes the sense circuit 541 comprising the sense coil 502 having an inductance L with reference to FIG. A, a parallel capacitor 544 having a capacitance $C_p$ electrically connected in parallel to the sense coil 502, and a series capacitor 546 having a capacitance $C_s$ electrically connected in series to the parallel connection of the sense coil 502 and parallel capacitor 544. The circuit 540 further illustrates the sense signal voltage source 552 and the current measurement circuit 550 both electrically connected to the sense circuit 541 at the measurement port 548.

In another aspect, the sense circuit 541 may also include a transformer (not shown herein) e.g., electrically connected between the measurement port 548 and the capacitor 546 e.g., for purposes of balancing.

Though not indicated in FIG. 5C for purposes of illustration, the capacitive and inductive elements of the sense circuit 541 may also cause electrical losses that may be represented by a respective equivalent series resistance as previously discussed with reference to FIG. 5A. Further, the sense coil 502 may also include the parasitic capacitances $C_{iw}$, $C_{gnd}$, and $C_{wpt}$ as indicated in FIG. 5A by dashed lines.

As with the circuit 500 of FIG. 5A, the circuit 540 of FIG. 5C may be configured to provide a local minimum in the admittance magnitude function $|Y_{11,0}(\omega)|$) substantially at the nominal sense frequency. Alternatively, it may be configured to provide a series resonance (a local minimum in the impedance magnitude function $|Z_{11,0}(\omega)|=1/|Y_{11,0}(\omega)|$) substantially at the nominal sense frequency.

In an example parallel resonant configuration of the sense circuit 541, the susceptance of the parallel capacitor 544 substantially compensates for the susceptance of the sense coil 502 at the nominal sense frequency providing an admittance $Y_{11,0}$ that is substantially real (resistive). In this configuration, the capacitance $C_s$ of the series capacitor 546 may be similar or larger than the capacitance $C_p$ of the parallel capacitor 544. Stated in other terms, the admittance magnitude of the series capacitor 546 may be substantially (e.g., 10 times) higher than the admittance magnitude $|Y_{11,0}|$ as presented at the nominal sense frequency. In this configuration, the series capacitor 546 may exert a negligible impact on the admittance $|Y_{11,0}|$ at the nominal sense frequency.

In an example series resonant configuration of the sense circuit 541, the susceptance of the parallel capacitor 544 undercompensates for the susceptance of the sense coil 502 at the nominal sense frequency. The residual inductive reactance of the parallel connection of the capacitor 544 and the sense coil 502 is substantially compensated for by the reactance of the series capacitor 546 providing an impedance $Z_{11,0}$ that is substantially real (resistive). In this configuration, the capacitance $C_s$ of the series capacitor 546 may be smaller, similar, or larger than the capacitance $C_p$ of the parallel capacitor 544. Stated in other terms, the impedance magnitude of the series capacitor 546 may be substantially (e.g., 20 times) higher than the impedance magnitude $|Z_{11,0}|$ as presented at the nominal sense frequency. In this configuration, the series capacitor 546 exerts a significant impact on the impedance $Z_{11,0}$ at the nominal sense frequency.

In some implementations, the series capacitor 546 together with the parallel capacitor 544 are used for purposes of resonance tuning and impedance transformation e.g., to transform the impedance $Z_{11}$ to match the sense circuit 541 with an operating impedance range as previously mentioned with reference to FIG. 1. The capacitance ratio $C_p/C_s$ may be a parameter to control the impedance magnitude $|Z_{11,0}|$.

Impedance transformation may be particularly effective, if the sense circuit 541 is configured for series resonance. More specifically, increasing the capacitance ratio $C_p/C_s$, while maintaining series resonance at the nominal sense frequency, may substantially increase the impedance magnitude $|Z_{11,0}|$ at the nominal sense frequency. Therefore, in an aspect, the sense circuit 541 in the series resonant configuration may be considered as an alternative to the sense circuit 521 of FIG. 5B using the transformer 726.

Increasing the capacitance ratio $C_p/C_s$, while maintaining resonance at the nominal sense frequency, may also somewhat decrease the admittance magnitude $|Y_{11,0}|$ as presented at the nominal sense frequency in the parallel resonant configuration of the sense circuit 541. However, impedance transformation may be limited and far less effective than that of the series resonant configuration.

In a further aspect, the sense circuit 541 due to the series capacitor 546 in conjunction with the voltage source current measurement technique provides a high pass filter characteristic to attenuate a low frequency disturbance component in the current/emanating from the voltage inductively coupled into the sense coil 502 by the magnetic and electric field as generated during wireless power transfer. This high pass filter may reduce dynamic range requirements of the current measurement circuit 550 and may also protect the current measurement circuit 550 and the voltage source 552 from being overloaded. Stated in other terms, it may reduce non-linear distortion effects (e.g., signal clipping) in a current measurement circuit 550 with a limited dynamic range.

With reference to FIG. 1, the sense circuit 541, the sense coil 502, the parallel capacitor 544, and the series capacitor 546 may correspond e.g., to the inductive sense circuit 106_a_, the inductive sense element 107_a_, and the associated capacitive element, respectively. The voltage source 552 may include the signal generator circuit 406 and the driver circuit 402, while the current measurement circuit 550 may include the measurement amplifier circuit 404 and the signal processing circuit 408 with reference to FIG. 4.

In some implementations, the voltage source 552 may be characterized by a quasi-ideal voltage source providing a source impedance whose magnitude is substantially (e.g., 10 times) lower than the magnitude of the impedance $|Z_{11}|$ of the sense circuit 541 as presented at the sense frequency. Analogously, the current measurement circuit 550 may be characterized by a quasi-ideal current measurement circuit with an impedance magnitude substantially (e.g., 10 times) lower than the impedance magnitude $|Z_{11}|$ at the sense frequency.

Above characterizations of the voltage source 552 and the current measurement circuit 550 may be generalized to non-sinusoidal sense signals as previously discussed with reference to FIG. 5A.

Other impedance measurement techniques may also be contemplated e.g., by applying a sinusoidal current, from the current source 512, with a defined current $I_0$ (amplitude and phase) to the sense circuit 541 and by measuring the complex voltage V (amplitude and phase) at the measurement port 548 using the voltage measurement circuit 510 as previously discussed with reference to FIG. 5A.

Further, in some implementations, measurement of the current I and thus of the impedance $Z_{11}$ may be affected by noise and other disturbance signals reducing a detection sensitivity of the multi-purpose detection circuit 100 as previously discussed with reference to FIG. 5A. Therefore, in some implementations, the current measurement circuit 550 includes a filter to selectively filter the sense signal and to suppress noise and other disturbance signal components and consequently to improve the detection sensitivity as previously discussed.

With reference to FIG. 1, FIG. 5C also illustrates the objects 110, 112, and 114 proximate to the sense coil 502. Presence of the object 110, 112, 114, or vehicle 330 (not shown in FIG. 5C) may cause a change in one or more electrical characteristics of the sense coil 502 and consequently of the sense circuit 541. As non-limiting examples, it may cause a change of the sense coil's 502 admittance Y referred to as the reflected admittance $\Delta Y_r$ with reference to FIG. 5A, a change $\Delta Y$ with respect to the admittance $Y_{11,0}$ as measured in absence of a foreign object.

Presence of an object (e.g., object 110) may be determined if $\Delta Y$ satisfies certain criteria (e.g., magnitude $|\Delta Y|$ exceeding a detection threshold, angle $\arg\{\Delta Y\}$ being within a certain range). In an implementation of the circuit 540 where the impedance $Z_{11}$ is measured as previously mentioned in connection with the series resonance, presence of an object (e.g., object 110) may cause a change $\Delta Z$ with respect to the impedance $Z_{11,0}$.

Using a quasi-ideal voltage source 552, a change $\Delta Y$ in the admittance $Y_{11}$ (e.g., due to presence of the object 110) manifests in a change $\Delta I$ in the current I while the voltage $V_0$ remains substantially unaffected. Therefore, measuring the complex current I may be equivalent to measuring the complex admittance $Y_{11}$. In other words, the complex current I may be indicative of the complex admittance $Y_{11}$ and there may be no requirement for additionally measuring the voltage $V_0$ thus reducing complexity of the measurement circuit (e.g., measurement circuit 104 of FIG. 1)

The fractional change $\Delta Y'$ (or $\Delta Z'$) as defined by Equations (8) and (9) and with respect to a defined test object (e.g., object 110) placed at a defined position relative to the sense coil 502 may relate to the detection sensitivity of an object detection circuit (e.g., the multi-purpose detection circuit 100 of FIG. 1) based on the sense circuit 541. More specifically, increasing the fractional change $\Delta Y'$ (or $\Delta Z'$) may increase a signal-to-noise ratio (SNR) e.g., defined as:

$$\Delta SNR = |\Delta I|/I_n \tag{14}$$

with $I_n$ referring to the noise component in the current I. In another aspect, increasing the fractional change may reduce dynamic range requirements of the current measurement circuit 550.

As non-limiting examples, the fractional change may be increased by optimizing the design of the sense coil 502 with respect to its geometry and its integration into the wireless power transfer structure (e.g., wireless power transfer structure 200 with reference to FIGS. 2 and 3), by resonance tuning e.g., using the parallel capacitor 544, and by improving the Q-factor of the sense circuit 541. Improving the Q-factor may increase the SNR, if the noise current $I_n$ is predominantly circuit intrinsic noise as discussed below with reference to FIG. 5G.

As previously discussed with reference to the circuit 500 of FIG. 5A, it may be desirable to discriminate between certain categories of objects (e.g., object 110 and 112) e.g., based on the reflected admittance $\Delta Y_r$ that may be indicative of electrical properties of the object 110, 112, 114, or vehicle 330.

In some implementations and configurations of the circuit 540 of FIG. 5C, the change $\Delta Y$ in the admittance $Y_{11}$ caused by an object (e.g., object 110) is indicative of the reflected admittance $\Delta Y_r$. Therefore, in an aspect of object discrimination, the circuit 540 may be configured to determine the angle $\arg\{\Delta Y\}$ and thus the angle $\arg\{\Delta Y_r\}$ with the required accuracy. However, in some implementations, measuring the admittance $Y_{11}$ including the change $\Delta Y$ may be subject to errors for various reasons as previously discussed with reference to the circuit 500 of FIG. 5A.

Susceptance compensation in the sense circuit 541 exhibiting a local extremum (minimum or maximum) in the admittance magnitude function $|Y_{11,0}(\omega)|$ and hence in the resulting current magnitude $|I|$ at the measurement port 548 provides a mean to calibrate the current measurement circuit 550 and hence the admittance measurement with respect to the angle $\arg\{\Delta Y\}$.

In a first step of an example calibration procedure applicable to the parallel resonant configuration of the circuit 540 of FIG. 5C, the sense frequency is adjusted to the local minimum of the current magnitude $|I|$ as measured by the uncalibrated current measurement circuit 550 supposing absence of a foreign object. At this frequency, the admittance $Y_{11,0}$ and hence the current I at the measurement port 548 may be substantially real. Otherwise stated, the angles $\arg\{Y_{11,0}\}$ and $\arg\{I\}$ are substantially zero. In a second step of the example calibration procedure, the current measurement circuit 550 is corrected by applying a phase shift such that the imaginary part of the complex current value as determined and output by the current measurement circuit 550 at this frequency vanishes. Applying the phase shift is equivalent to rotating the admittance plane by an angle $\arg\{I_{uncal}\}$ where $I_{uncal}$ refers to the complex current value as determined by the uncalibrated current measurement circuit 550 (before any correction is applied). This angle correction may be expressed by the following complex multiplication:

$$I_{cal} = I_{uncal} \exp(-j\arg\{I_{uncal}\}) \tag{15}$$

where $I_{cal}$ refers to the complex current value as determined by the calibrated current measurement circuit 550.

Applying the angle correction of Equation (15), an object (e.g., object 110) reflecting an admittance $\Delta Y_r$ that is imaginary (reactive) may result in a measured current change $\Delta I_{cal}$ that is substantially imaginary. Nevertheless, a residual error may remain in the angle $\arg\{\Delta I_{cal}\}$ due to the impact of the series capacitor 546 and the electrical losses in the sense circuit 541. The residual angle error of an example parallel resonant configuration of the circuit 540 and for an example object 110 is provided in TABLE 2.

In some implementations, the residual error is reduced by configuring the series capacitor 546 with a capacitance $C_s$ whose admittance $Y_{Cs}$ is substantially larger (e.g., 10 times larger) than the parallel resonant conductance of the sense circuit 541. In other implementations, the residual error is reduced by computing the error in the measured angle arg{ΔY} by estimating parameters of the sense circuit 541 (e.g., the Q-factor) at the actual sense frequency. In further implementations, the residual error is reduced by measuring the admittance $Y_{11,0}$ at two or more substantially different frequencies and by determining the elements of an equivalent circuit model of the sense circuit 541 (e.g., the equivalent circuit model illustrated in FIG. 5G) based on the measured admittances $Y_{11,0}$ employing a best fit method. In some implementations, these two or more frequencies include at least the frequency of the minimum and the maximum of $|Y_{11,0}(\omega)|$.

In an implementation configured for series resonance as defined above, the circuit 540 may be configured to measure the impedance $Z_{11}$ and corresponding changes ΔZ of $Z_{11}$ as caused by the object 110, 112, 114, or vehicle 330. In this case, the impedance change ΔZ may be indicative of the reflected admittance $\Delta Y_r$ as previously introduced. As discussed above with reference to the parallel resonant configuration, the angle arg{ΔZ} may be subjected to an error and therefore may require calibration to reduce an error in the measurement of the angle arg{ΔZ} and thus of the angle arg{$\Delta Y_r$}.

In an implementation configured for series resonance, the circuit 540 may be calibrated analogously to the parallel resonant configuration however using the local minimum of the impedance function $|Z_{11,0}(\omega)|$ where reactance compensation occurs.

In a first step of an example calibration procedure applicable to the series resonant configuration of the circuit 540 of FIG. 5C, the sense frequency is adjusted to the local maximum of the current magnitude |I| as measured by the uncalibrated current measurement circuit 550 supposing absence of a foreign object. At this frequency, the impedance $Z_{11,0}$ and hence the current I at the measurement port 548 may be substantially real. Otherwise stated, the angles arg{$Z_{11,0}$} and arg{I} are substantially zero. In a second step of the example calibration procedure, the current measurement circuit 550 is corrected by applying a phase shift (impedance plane rotation) as given above by Equation (15).

Applying the angle correction of Equation (15), an object (e.g., object 110) reflecting an admittance $\Delta Y_r$ that is imaginary (reactive) may result in a measured current change $\Delta I_{cal}$ that is substantially imaginary. Nevertheless, a residual error may remain in the angle arg{$\Delta I_{cal}$} due to the transformation of $\Delta Y_r$ to ΔZ in the lossy sense circuit 541. The residual angle error of an example series resonant configuration of the circuit 540 and for an example object 110 is provided in TABLE 2.

In an example implementation, the residual error due to the transformation of $\Delta Y_r$ to ΔZ is reduced by measuring the impedance $Z_{11,0}$ at two or more substantially different frequencies, supposing absence of a foreign object, and by determining the elements of an equivalent circuit model (e.g., the equivalent circuit model of FIG. 5G) based on the measured impedances $Z_{11,0}$ employing a best fit method. In some implementations, these two or more frequencies include at least the frequency of the minimum and the maximum of $|Z_{11,0}(\omega)|$.

The series and the parallel resonant configuration of the circuit 540 of FIG. 5C are analyzed below with reference to FIG. 5G with respect to various characteristics such as the Q-factor, the fractional change, and various definitions of SNR based on an equivalent circuit model.

The circuit 560 of FIG. 5D illustrates a further example implementation based on measuring a complex transimpedance $Z_{21}$ of a two-port inductive sense circuit (e.g., sense circuit 561, shown in FIG. 5D as the circuit between the left and right dashed lines). The transimpedance $Z_{21}$ is measured by applying, from a current source 512, a sinusoidal current $I_{0,1}$ at the sense frequency with a defined amplitude and phase to the measurement port 568 (indicated in FIG. 5D by a terminal and a dashed line) and by measuring, using a voltage measurement circuit 510, the complex open-circuit voltage $V_2$ (amplitude and phase) at the measurement port 569 (indicated in FIG. 5D by a terminal and a dashed line). The transimpedance $Z_{21}$ is then determined by dividing the measured voltage $V_2$ by the defined (known) current $I_{0,1}$.

The sense circuit 561 of FIG. 5D comprises a double-coil inductive sense element 562 composed of a first (primary) sense coil 562*a* having an inductance $L_1$ and an equivalent series resistance $R_1$ and a second (secondary) sense coil 562*b* having an inductance $L_2$ and an equivalent series resistance $R_2$. FIG. 5D also indicates a mutual inductance $L_M$ and an equivalent mutual resistance $R_M$ between the first sense coil 562*a* and the second sense coil 562$_b$. The equivalent resistances $R_1$, $R_2$, and $R_M$ include a variety of sense element intrinsic and extraneous electrical losses as previously discussed with reference to FIG. 5A. The sense circuit 561 further comprises a first series capacitor 564 having a capacitance $C_{s,1}$ electrically connected in series to the first sense coil 562*a*, a second series capacitor 565 having a capacitance $C_{s,2}$ electrically connected in series to the second sense coil 562$_b$. The sense circuit 561 further comprises a first parallel inductor 566 having an inductance $L_{p,1}$ electrically connected to the first capacitor 564 and in parallel to the measurement port 568 and a second parallel inductor 567 having an inductance $L_{p,2}$ electrically connected to the second capacitor 565 and in parallel to the measurement port 569.

Though not indicated in FIG. 5D for purposes of illustration, the series capacitors 564, 565 and the parallel inductors 566, 567 may cause electrical losses that may be represented by respective equivalent series resistances.

Figure 5F:
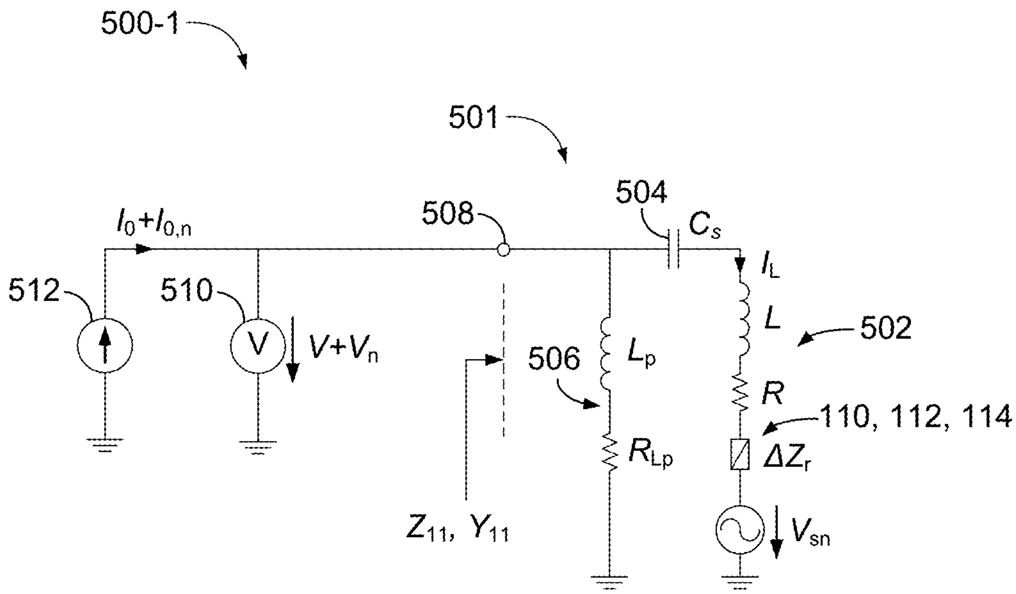
FIG. 5F illustrates an equivalent circuit model of the example implementation of FIG. 5A.
Figure 5G:
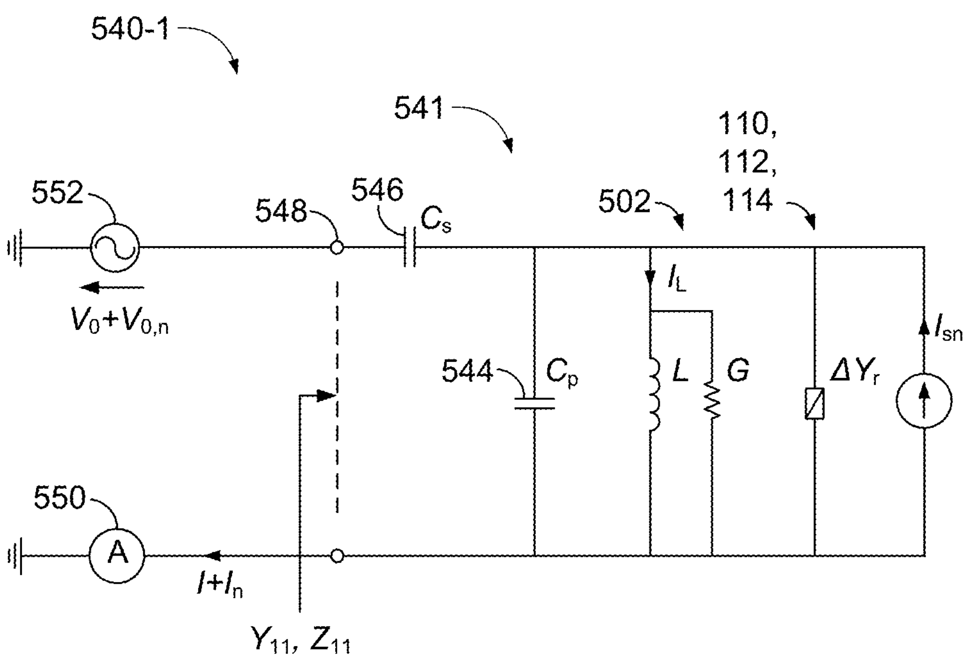
FIG. 5G illustrates an equivalent circuit model of the example implementation of FIG. 5C.
Figure 5H:
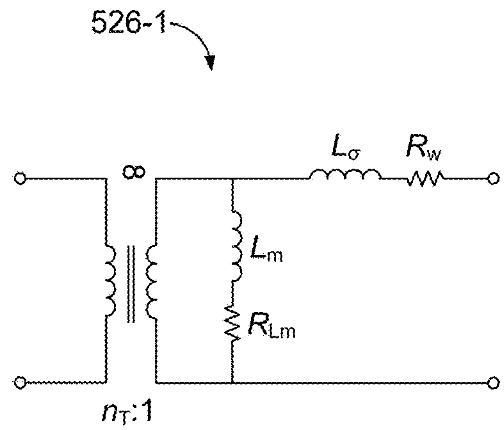
FIG. 5H illustrates an equivalent circuit model of a portion of the circuits of FIGS. 5C, 7C, 7F, and 7H.
Figure 5I:
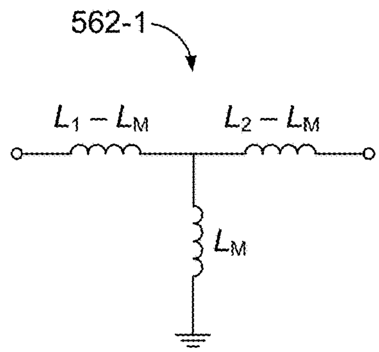
FIG. 5I illustrates an equivalent circuit model of another portion of the circuits of FIGS. 5D and 5E.
Figure 5J:
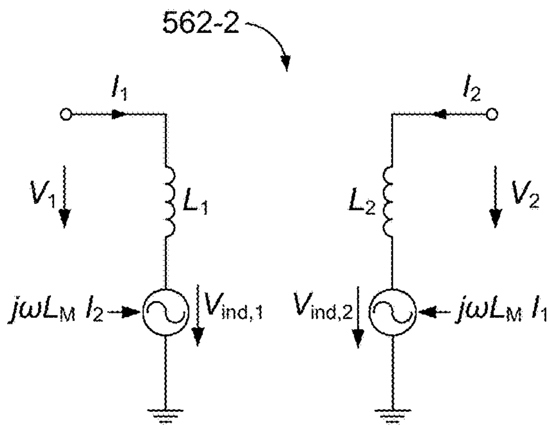
FIG. 5J illustrates another equivalent circuit model of the portion of the circuits of FIGS. 5D and 5E illustrated in FIG. 5I.

An inductive coupling factor:

$$k_L = L_M (L_1 L_2)^{-1/2} \tag{16}$$

may be defined for the two-port inductive sense element 562. Further, a two-port inductive sense element (e.g., inductive sense element 562 of FIG. 5D) may be modeled by a "T"-equivalent circuit based on inductances $L_1$, $L_2$, $L_M$ as illustrated in FIG. 5I. Alternatively, a two-port inductive sense element (e.g., inductive sense element 562) may be modeled by an equivalent circuit illustrated by FIG. 5J comprising the inductances $L_1$ and $L_2$ in series to respective current-controlled voltage sources:

$$V_{ind,1} = j\omega L_M I_2 \tag{17}$$

$$V_{ind,2} = j\omega L_M I_1 \tag{18}$$

representing the voltage induced into the first and second sense coil, respectively as indicated in FIG. 5J.

In some implementations, the reactance of $C_{s,1}$ substantially compensates for the reactance of $L_1$ providing a local impedance minimum $|Z_{11}|$ (series resonance) substantially at the nominal sense frequency, while the reactance of $C_{s,2}$ substantially compensates for the reactance of $L_2$ providing a local impedance minimum $|Z_{22}|$ (series resonance) substantially at the nominal sense frequency.

In another implementation, the sense circuit 561 is configured to provide a local minimum of the admittance magnitude functions $|Y_{11}(\omega)|$ and $|Y_{22}(\omega)|$ (parallel resonance) substantially at the nominal sense frequency.

In a further implementation, the sense circuit 561 is configured to provide a local minimum of the admittance magnitude function $|Y_{11}(\omega)|$ (parallel resonance) and a local minimum of the impedance magnitude function $|Z_{22}(\omega)|$ (series resonance) substantially at the nominal sense frequency.

In yet another implementation, the sense circuit 561 is configured to provide a local minimum of the impedance magnitude function $|Z_{11}(\omega)|$ (series resonance) and a local minimum of the admittance magnitude function $|Y_{22}(\omega)|$ (parallel resonance) substantially at the nominal sense frequency.

In implementations configured for primary-side and secondary-side series resonance, the reactance of the parallel inductors 566 and 567 is substantially higher than the impedance magnitudes $|Z_{11}|$ and $|Z_{22}|$, respectively, of the sense circuit 561 at the nominal sense frequency.

In a further example implementation, at least one of the series capacitors 564 and 565 is omitted and the sense circuit 561 is operated as a non-resonant or partially resonant circuit.

In a further aspect, the first series capacitor 564 in combination with the first parallel inductor 566 form a $2^{nd}$ order high pass filter to attenuate a low frequency disturbance component in the voltage $V_1$. Likewise, the second series capacitor 565 in combination with the second parallel inductor 567 form a $2^{nd}$ order high pass filter to attenuate a low frequency disturbance component in the voltage $V_2$ for purposes as previously discussed in connection with FIG. 5A.

With reference to FIG. 1, the sense circuit 561, the sense coils 562*a* and 562*b*, and the respective capacitors 564, 565 and the respective inductors 566, 567 may correspond e.g., to the inductive sense circuit 106*a*, the inductive sense element 107*a* (double sense coil), and the respective associated capacitive elements, respectively.

As with the circuit 500 of FIG. 5A, the circuit 560 of FIG. 5D may also include parasitic capacitances (not shown in FIG. 5D) such as the self-capacitances (intra winding capacitances $C_{iw}$ and intercoil capacitance), the ground capacitances $C_{gnd}$, and the capacitances $C_{wpt}$ between each of the sense coils 562*a* and 562*b* and the WPT coil (e.g., WPT coil 202 of FIG. 2). These capacitances and the associated electric stray fields may cause a certain sensitivity of the circuit 560 on substantially non-conductive, dielectric objects (e.g., object 112).

Though not shown herein, other transimpedance measurement techniques such as the voltage source current measurement technique or any other combination may apply (e.g., a current source current measurement technique). In some implementations (also not shown herein), at least one of the impedances $Z_{11}$ and $Z_{22}$ of the sense circuit 561 is additionally measured to the transimpedance $Z_{21}$ (e.g., using one or more of the techniques as previously discussed with reference to FIG. 5A). In these alternative implementations, presence of an object (e.g., object 110) is determined based on a change in at least one of an impedance $Z_{11}$, $Z_{22}$, and $Z_{21}$.

Moreover, at least one of an impedance transformation and balancing may apply to at least one of the primary-side and secondary-side of the sense circuit 561 (not shown herein). More specifically, with reference to the circuit 521 of FIG. 5B, a transformer (e.g., transformer 526) may be used instead of the parallel inductors 566 and 567. Alternatively, with reference to the sense circuit 541 of FIG. 5C, a series capacitor and a parallel capacitor (e.g., capacitors 546 and 544, respectively) may apply at least on the primary side.

With reference to FIG. 1, FIG. 5D also illustrates the objects 110, 112, and 114 proximate to the inductive sense element 562. As previously discussed with reference to FIG. 1, presence of the object 110, 112, 114, or vehicle 330 may cause a change in one or more electrical characteristics of the sense circuit 561. As non-limiting examples, it may change the self-inductances $L_1$ and $L_2$, the equivalent series resistances $R_1$ and $R_2$, the mutual inductance $L_M$, and the mutual equivalent series resistance $R_M$ generally resulting in a change $\Delta Z$ with respect to the transimpedance $Z_{21,0}$ as measured in absence of a foreign object. Presence of an object (e.g., object 110) may be determined if $\Delta Z$ satisfies certain criteria (e.g., the magnitude of $\Delta Z$ exceeds a detection threshold). A change $\Delta Z$ in the measured impedance $Z_{21}$ may also be caused by a vehicle (e.g., vehicle 330, not shown in FIG. 5D), which may indicate presence of a vehicle above the inductive sense element 562. Further, an impedance change $\Delta Z$ may also be caused by a substantially non-conductive, dielectric object (e.g., object 112 or 114) proximate to at least one of the sense coils 562*a* and 562*b* as previously discussed with reference to FIG. 1. In other terms, a dielectric object (e.g., object 112 or 114) proximate to at least one of the sense coils 562*a* and 562*b* may change one or more of the parasitic capacitances as mentioned above.

Using a quasi-ideal current source 512, a change $\Delta Z$ in the transimpedance $Z_{21}$ (e.g., due to presence of the object 110) manifests in a change $\Delta V$ in the voltage $V_2$ while the current $I_{0,1}$ remains substantially unaffected. Therefore, measuring the complex voltage $V_2$ may be equivalent to measuring the complex transimpedance $Z_{21}$. In other words, the complex voltage $V_2$ may be indicative of the complex transimpedance $Z_{21}$ and there may be no requirement for additionally measuring the current $I_{0,1}$ thus reducing complexity of the measurement circuit (e.g., measurement circuit 104 of FIG. 1)

In an aspect, it may be useful to define the normalized transimpedance change of a two-port sense circuit (e.g., sense circuit 561 of FIG. 5D) as:

$$\Delta Z' = (Z_{21} - Z_{21,0})/|Z_{21,0}| = \Delta Z/|Z_{21,0}| \tag{19}$$

and, correspondingly, the normalized transadmittance change as:

$$\Delta Y' = (Y_{21} - Y_{21,0})/|Y_{21,0}| = \Delta Y/|Y_{21,0}| \tag{20}$$

also referred herein as to the fractional change. As with the circuit 501 of FIG. 5A, the fractional change $\Delta Z'$ (or $\Delta Y'$) caused by a defined test object (e.g., object 110) placed at a defined position relative to the inductive sense element 562 may relate to the detection sensitivity of an object detection circuit (e.g., the multi-purpose detection circuit 100 of FIG. 1) based on a two-port inductive sense circuit (e.g., sense circuit 561). Increasing the fractional change $\Delta Z'$ (or $\Delta Y'$) may increase a detection sensitivity of the circuit 560. More specifically, it may increase a signal-to-noise ratio (SNR) e.g., defined as:

$$\Delta SNR_V = |\Delta V|/V_n \tag{21}$$

with $V_n$ referring to the noise component in the voltage $V_2$.

As non-limiting examples, the fractional change may be increased by optimizing the design and arrangement of the sense coils 562*a* and 562*b*, their integration into the wireless power transfer structure (e.g., wireless power transfer structure 200 with reference to FIGS. 2 and 3), by resonance tuning e.g., using the series capacitors 564 and 565 as previously described, and by improving a Q-factor of the sense circuit 561.

In an example implementation, the fractional change ΔZ' (or ΔY') is substantially increased by configuring and arranging the sense coils 562*a* and 562*b* such that the mutual inductance $L_M$ substantially vanishes in absence of a foreign object, resulting in a transimpedance $|Z_{21,0}|$ that is substantially zero. Example implementations of double sense coil arrangements providing a substantially zero mutual inductance $L_M$ are described in U.S. patent application Ser. No. 16/358,534, titled Foreign Object Detection Circuit Using Mutual Impedance Sensing, the entire contents of which are hereby incorporated by reference.

The circuit 580 of FIG. 5E illustrates yet a further example implementation based on measuring a complex transimpedance $Z_{21}$ of a two-port inductive sense circuit 581 (shown in FIG. 5E as the circuit between the left and the right dashed line). The transimpedance $Z_{21}$ is measured by applying, from a current source 512, a sinusoidal current $I_{0,1}$ at the sense frequency with a defined amplitude and phase to the measurement port 588 (indicated in FIG. 5E by a terminal and a dashed line) and by measuring, using a voltage measurement circuit 510, the complex open-circuit voltage $V_2$ (amplitude and phase) at the measurement port 589 (indicated in FIG. 5E by a terminal and a dashed line). The transimpedance $Z_{21}$ is then determined by dividing the measured voltage $V_2$ by the defined (known) current $I_{0,1}$.

The sense circuit 581 of FIG. 5E comprises a double-coil inductive sense element 562 with reference to FIG. 5D composed of the first sense coil 562*a* having an inductance $L_1$ and an equivalent series resistance $R_1$ and a second sense coil 562*b* having an inductance $L_2$ and an equivalent series resistance $R_2$. FIG. 5E also indicates the mutual inductance $L_M$ and the equivalent mutual resistance $R_M$. The equivalent resistances $R_1$, $R_2$, and $R_M$ include a variety of sense element intrinsic and extraneous electrical losses as previously discussed with reference to FIG. 5A. The sense circuit 561 further comprises a series capacitor 584 having a capacitance $C_s$ electrically connected to the second terminal of the sense coils 562*a* and 562*b*, a first parallel inductor 586 having an inductance $L_{p,1}$ electrically connected to the first terminal of the sense coil 562*a* and in parallel to the measurement port 588 and a second parallel inductor 587 having an inductance $L_{p,2}$ electrically connected to the first terminal of the sense coil 562*b* and in parallel to the measurement port 589. The circuit 580 further illustrates the sense signal current source 512 and the voltage measurement circuit 510 electrically connected to the measurement ports 588 and 589, respectively.

Though not indicated in FIG. 5E for purposes of illustration, the series capacitor 584 and the parallel inductors 586, 587 may cause electrical losses that may be represented by respective equivalent series resistances.

In an example implementation, the sense coils 562*a* and 562*b* are tightly coupled resulting in an inductive coupling factor $k_L$ as defined by Equation (16) that is near unity ($k_L \approx < 1$). Example implementations of double-coil inductive sense elements 562 providing an inductive coupling factor $k_L$ near unity are described in U.S. patent application Ser. No. 16/358,534, titled Foreign Object Detection Circuit Using Mutual Impedance Sensing, the entire contents of which are hereby incorporated by reference.

The sense circuit 581 may be configured to provide a local minimum in the transimpedance magnitude function $|Z_{21,0}(\omega)|$ (series resonance) substantially at a nominal sense frequency. Alternatively, the sense circuit 581 may be configured to provide a local minimum in the transadmittance magnitude function $|Y_{11,0}(\omega)|$ substantially at the nominal sense frequency.

In an example series resonant configuration of the sense circuit 581 using an inductive sense element 562 with $k_L \approx < 1$, the reactance of the series capacitor 584 substantially compensates for the reactance of the mutual inductance $L_M$ providing a local minimum in the transimpedance magnitude function $|Z_{21,0}(\omega)|$ (series resonance) substantially at the nominal sense frequency. The principle of mutual reactance compensation may become more evident by contemplating FIG. 5I illustrating a "T" equivalent circuit model 562-1 of the two-port inductive sense element 562 and by considering the capacitance $C_s$ of the capacitor 584 inserted in series to the mutual inductance $L_M$. With $k_L \approx < 1$, both the series inductances $L_1$-$L_M$ and $L_2$-$L_M$ become substantially zero.

In this series resonant configuration, the inductance $L_{p,1}$ and $L_{p,2}$ of the parallel inductor 586 and 587, respectively, may be similar or larger than the inductance $L_1$ and $L_2$ of the sense coils 562*a* and 562*b*, respectively. Stated in other terms, the impedance magnitude of the parallel inductor 586 and 587 may be substantially higher than the impedance magnitude $|Z_{11}|$ and $|Z_{22}|$, respectively, of the sense circuit 581 at the nominal sense frequency. In this configuration, the parallel inductors 586 and 587 may exert a negligible impact on the impedances and transimpedance $|Z_{11}|$, $|Z_{22}|$, and $|Z_{21}|$, respectively, at the nominal sense frequency.

In an example parallel resonant configuration of the sense circuit 581 using an inductive sense element 562 with $k_L \approx < 1$, the reactance of the series capacitor 584 overcompensates for the reactance of the mutual inductance $L_M$ at the nominal sense frequency. The residual capacitive susceptance of the series connection of the capacitor 584 and the mutual inductance $L_M$ is substantially compensated for by the susceptance of the parallel inductors 586 and 587 providing a transadmittance $Y_{21,0}$ that is substantially real (resistive). In this configuration, the inductances $L_{p,1}$ and $L_{p,2}$ of the parallel inductors 586 and 587, respectively, may be smaller, similar, or larger than the inductance $L_1$ and $L_2$ of the sense coils 562*a* and 562*b*, respectively. Stated in other terms, the admittance magnitude of each of the parallel inductors 586 and 587 may be substantially (e.g., 20 times) higher than the admittance magnitudes $|Y_{11}|$ and $|Y_{22}|$, respectively, as presented at the nominal sense frequency. In this configuration, the parallel inductors 586 and 587 exert a significant impact on the admittance and transadmittance magnitudes $|Y_{11}|$, $|Y_{22}|$, and $|Y_{21}|$, respectively, at the nominal sense frequency.

In some implementations, the parallel inductors 586 and 587 together with the series capacitor 584 are used for purposes of resonance tuning and transimpedance transformation, e.g., to transform the transimpedance $Z_{21}$ to match the sense circuit 581 with an operating transimpedance range as previously mentioned with reference to FIG. 1. The inductance ratios $L_1/L_{p,1}$ and $L_2/L_{p,2}$ may be parameters to control the impedance magnitudes $|Z_{11,0}|$, $Z_{22,0}|$, and $Z_{21,0}|$.

Impedance and transimpedance transformation may be particularly effective, if the sense circuit 581 is configured for parallel resonance. More specifically, increasing the inductance ratios $L_1/L_{p,1}$ and $L_2/L_{p,2}$, while maintaining parallel resonance at the nominal sense frequency, may substantially increase the admittance magnitudes $|Y_{11,0}|$, $Y_{22,0}|$, and $|Y_{21,0}|$ of the parallel resonant configuration at the nominal sense frequency.

increasing the inductance ratios $L_1/L_{p,1}$ and $L_2/L_{p,2}$, while maintaining resonance at the nominal sense frequency, may also somewhat decrease the impedance magnitudes $|Z_{11,0}|$, $|Z_{22,0}|$, and $|Z_{21,0}|$ as presented at the nominal sense frequency in the series resonant configuration of the sense circuit 581. However, impedance transformation may be limited and far less effective than that of the parallel resonant configuration.

In a further aspect, the series capacitor 584 in combination with the first parallel inductor 586 form a $2^{nd}$ order high pass filter to attenuate a low frequency disturbance component in the voltage $V_1$. Likewise, the second series capacitor 584 in combination with the second parallel inductor 587 form a $2^{nd}$ order high pass filter to attenuate a low frequency disturbance component in the voltage $V_2$ for purposes as previously discussed in connection with FIG. 5A.

With reference to FIG. 1, the sense circuit 581, the sense coils 562*a* and 562*b*, and the capacitor 584 may correspond e.g., to the inductive sense circuit 106*a*, the inductive sense element 107*a* (double sense coil), and the respective associated capacitive element, respectively.

With reference to FIG. 1, FIG. 5E also illustrates the objects 110, 112, and 114 proximate to the inductive sense element 562. As previously discussed with reference to FIG. 1, presence of the object 110, 112, 114, or vehicle 330 may cause a change in one or more electrical characteristics of the sense circuit 561 as previously discussed with reference to FIG. 5D. As non-limiting examples, it may change the self-inductances $L_1$ and $L_2$, the equivalent series resistances $R_1$ and $R_2$, the mutual inductance $L_M$, and the equivalent mutual resistance $R_M$ generally resulting in a change $\Delta Z$ with respect to the transimpedance $Z_{21,0}$ as measured in absence of a foreign object. In an implementation with $k_L \approx< 1$, the change $\Delta Z$ may be primarily related to a change in the mutual inductance $L_M$ and the equivalent mutual resistance $R_M$.

As with the sense circuit 561 of FIG. 5D, the fractional change $\Delta Z'$ (or $\Delta Y'$) caused by a defined test object (e.g., object 110) may relate to the detection sensitivity of the sense circuit 581. It may be appreciated that using an inductive sense element 562 with $k_L \approx< 1$ reduces the impact of the equivalent series resistances $R_1$ and $R_2$ on the fractional change, if compared e.g., to the circuit 500 of FIG. 5A. The fractional change of the sense circuit 581 with $k_L \approx< 1$ is governed by the Q-factor:

$$Q_M \approx \omega L_M / R_M \tag{22}$$

of the inductive sense element 562 with respect to $L_M$ and $R_M$.

Moreover, the impedance change $\Delta Z$ may reflect electrical properties of the object 110, 112, or 114 as discussed with reference to the circuit 500 of FIG. 5A.

The circuit 580 of FIG. 5E may further allow calibration to reduce an error in the measurement of the angle $\arg\{\Delta Z\}$ by applying a procedure as previously described with reference to FIG. 5A.

FIGS. 5F and 5G illustrate an equivalent circuit model 500-1 and 540-1, respectively, used below for purposes of a theoretical analysis and performance comparison. More specifically, the equivalent circuit model 500-1 is used to analyze the circuit 500 of FIG. 5A and the circuit 520 of FIG. 5B (using the transformer 526), while the equivalent circuit model 540-1 serves for the analysis of the circuit 540 of FIG. 5C. Each of the circuits 500, 520, and 540 are analyzed with respect to its series and parallel resonant configuration and with respect to various characteristics such as the impedance and the Q-factor of the sense circuit at resonance, the fractional change, and various SNRs as defined below.

For purposes of comparison, an identical sense coil 502 an equal sense coil current level $|I_L|$ is assumed for both configurations of the circuits 500, 520, and 540, though practical implementations configured for parallel resonance may prefer a sense coil 502 with a lower inductance L. Comparing SNRs at the same sense coil current level $|I_L|$ may be meaningful e.g., if the current level $|I_L|$ is emission or power constraint. Further, it is assumed that the circuits in both configurations are adjusted to a common resonant frequency substantially corresponding with the nominal sense frequency that is substantially higher than the WPT operating frequency.

The equivalent circuit model 500-1 as illustrated in FIG. 5F comprises the sense coil's 502 inductance L and its equivalent series resistance R, the series capacitor's 504 capacitance $C_s$ the parallel inductor's 506 inductance $L_p$ and its equivalent series resistance $R_{Lp}$, an ideal sense signal current source 512 and an ideal voltage measurement circuit 510. It may be appreciated that in practical implementations, losses in capacitors are generally substantially lower than losses in inductors. Therefore, the equivalent series resistance of series capacitor 504 is neglected (not shown) in the equivalent circuit model 500-1 of FIG. 5F. Further, the equivalent circuit model 500-1 includes an impedance $\Delta Z_r$ in series to the inductance L representing the reflected impedance of the object 110, 112, or 114 proximate to the sense coil 502. (The reflected impedance $\Delta Z_r$ may be regarded as the object 110, 112, or 114 as illustrated in FIG. 5A abstracted away). The equivalent circuit model 500-1 also includes a noise voltage source $V_{sn}$ in series to the inductance L representing the noise voltage inductively and capacitively coupled into sense coil 502 by the magnetic and electric field as generated when WPT is active. The noise voltage $V_{sn}$ may include any low frequency component (e.g., at the fundamental of the WPT operating frequency and harmonics thereof) as well as any high frequency component (e.g., switching noise at the sense frequency). The equivalent circuit model 500-1 further indicates the impedance $Z_{11}$ and the admittance $Y_{11}(=1/Z_{11})$, the drive current $I_0$ with an additive noise current component $I_{0,n}$, the sense signal voltage V with an additive noise voltage $V_n$, and the measurement port 508 (indicated by the terminal and the dashed line) where the current $I_0+I_{0,n}$ is applied, the voltage $V+V_n$ is measured, and where $Z_{11}$ or $Y_{11}$ refer to. Because the equivalent circuit model 500-1 applies to the circuit 500 of FIG. 5A or the circuit 520 of FIG. 5B, the reference numerals 500 and 520, respectively, are used instead in the following theoretical analysis.

To analyze the series and parallel resonant configuration of the circuit 500 of FIG. 5F, the following assumptions:

$$\omega L >> R \tag{23}$$

$$\omega L_p >> R_{Lp} \tag{24}$$

$$|\Delta Z_r| << R \tag{25}$$

are made for a frequency range about the resonant frequency.

In an implementation configured for series resonance and with a reactance:

$$\omega L_p >> |Z_{11}| \tag{26}$$

in a frequency range about the series resonant frequency, the impedance $Z_{11}$ at the measurement port 508 of the circuit 500 of FIG. 5F in presence of an object (e.g., object 110) may be expressed as:

$$Z_{11} \approx R + (j\omega C_s)^{-1} + j\omega L + \Delta Z_r \tag{27}$$

In absence of a foreign object, a local minimum of $|Z_{11,0}(\omega)|$ (series resonance) occurs substantially at an angular frequency $\omega$ satisfying:

$$(j\omega C_s)^{-1}+j\omega L\approx 0 \quad (28)$$

yielding the series resonant angular frequency:

$$\omega_s\approx(L\ C_s)^{-1/2} \quad (29)$$

At this frequency, the impedance $Z_{11,0}$ becomes substantially real:

$$Z_{11,0}\approx Re\{Z_{11,0}\}=R_s\approx R \quad (30)$$

with $R_s$ denoting the series resonant resistance, while the impedance $Z_{11}$ in presence of an object (e.g., object 110) is approximately:

$$Z_{11}\approx R_s+\Delta Z\approx R+\Delta Z_r \quad (31)$$

with $\Delta Z_r$ referring to the reflected impedance as previously defined with reference to FIG. 5A.

Applying Equations (30) and (31) to Equation (8), the fractional change $\Delta Z'$ for the series resonant configuration of the circuit 500 of FIG. 5F becomes approximately:

$$\Delta Z'\approx\Delta Z_r/R_s\approx\Delta Z_r/R \quad (32)$$

Using the definition of Equation (6) of the normalized reflected impedance $\Delta Z'_r$ at $\omega_s$ and defining a Q-factor of the series resonant configuration of the circuit 500 of FIG. 5F:

$$Q_s\approx\omega_s L/R_s \quad (33)$$

which approximately equals the Q-factor of the sense coil 502 at the series resonant frequency:

$$Q=\omega_s L/R\approx Q_s \quad (34)$$

the fractional change may also be written in terms of $\Delta Z'_r$ and $Q_s$ as:

$$\Delta Z'\approx Q_s\Delta Z'_r \quad (35)$$

Equation (35) shows that reactance compensation in the series resonant configuration of the circuit 500 of FIG. 5F multiplies the normalized reflected impedance $\Delta Z'_r$ by the Q-factor $Q_s$ that approximately equals the Q-factor Q of the sense coil 502.

To analyze the parallel resonant configuration of the circuit 500 of FIG. 5F, the additional assumption:

$$|\omega L-(\omega C_s)^{-1}|>>R \quad (36)$$

is made for a frequency range about the resonant frequency. The admittance $Y_{11}$ at the measurement port 508 in presence of an object (e.g., object 110) may be expressed as:

$$Y_{11}=(R_{Lp}+j\omega L_p)^{-1}+(R+j\omega L+(j\omega C_s)^{-1}+\Delta Z_r)^{-1} \quad (37)$$

Using Equations (23), (24), (25), (36) and the approximation:

$$1/(1+x)\approx 1-x \quad (38)$$

valid for $|x|<<1$, where x may be a complex number, and neglecting insignificant terms, the admittance $Y_{11}$ of Equation (37) may be approximated as:

$$Y_{11}\approx(j\omega L_p)^{-1}+R_{Lp}(\omega L_p)^{-2}+(j\omega L+(j\omega C_s)^{-1})^{-1}+(R+\Delta Z_r)(\omega L-(\omega C_s)^{-1})^{-2} \quad (39)$$

In absence of a foreign object, a local minimum of $|Y_{11,0}(\omega)|$ (parallel resonance) occurs substantially at an angular frequency $\omega$ satisfying:

$$(j\omega C_s)^{-1}+j\omega(L+L_p)\approx 0 \quad (40)$$

yielding for the parallel resonant angular frequency:

$$\omega_p\approx(C_s(L+L_p))^{-1/2} \quad (41)$$

At this frequency, the admittance $Y_{11,0}$ becomes substantially real:

$$Y_{11,0}\approx Re\{Y_{11,0}\}=G_p=(R+R_{Lp})/(\omega_p L_p)^2 \quad (42)$$

with $G_p$ denoting the parallel resonant conductance, while the admittance $Y_{11}$ in presence of an object (e.g., object 110) is approximately:

$$Y_{11}\approx G_p+\Delta Y\approx(R+R_{Lp}+\Delta Z_r)/(\omega_p L_p)^2 \quad (43)$$

where:

$$\Delta Y\approx\Delta Z_r/(\omega_p L_p)^2 \quad (44)$$

defines the admittance change due to the object.

Further, defining the Q-factor of the sense coil 502:

$$Q=\omega_p L/R \quad (45)$$

and the Q-factor of the parallel inductor 506:

$$Q_{Lp}=\omega_p L_p/R_{Lp} \quad (46)$$

the inductance ratio:

$$n_L=L/L_p \quad (47)$$

the admittance $Y_{11,0}$ of Equation (42) at $\omega_p$ may be expressed as:

$$Y_{11,0}\approx G_p\approx n_L((Q/Q_{Lp})+n_L)/(Q\omega_p L) \quad (48)$$

For the case $Q_{Lp}=Q$ and $n_L>>1$, the parallel resonant conductance $G_p$ becomes approximately:

$$G_p\approx n_L^2/(Q\omega_p L) \quad (49)$$

According to Equation (48), the admittance $Y_{11}$ at $\omega_p$ of the sense circuit 501 of FIG. 5F can be modified (e.g., decreased) by adjusting the inductance ratio $n_L=L/L_p$ accordingly, while maintaining parallel resonance substantially at the nominal sense frequency. Therefore, in some implementations, the parallel resonant configuration of the circuit 500 of FIG. 5A is employed as an alternative to using a transformer (e.g., transformer 526 of FIG. 5B) for transforming the admittance $Y_{11}$ to be within a suitable operating range as previously discussed with reference to FIG. 5B.

Applying Equations (42) and (44) to Equation (9), the fractional change $\Delta Y'$ for the parallel resonant configuration of the circuit 500 of FIG. 5F becomes approximately:

$$\Delta Y'=\Delta Y/G_p\approx\Delta Z_r/(R+R_{Lp}) \quad (50)$$

showing that the admittance change $\Delta Y$ is substantially proportional to the reflected impedance $\Delta Z_r$. Therefore, the angle $\arg\{\Delta Y\}$ of the measured admittance change $\Delta Y$ is indicative of the angle $\arg\{\Delta Z_r\}$. As previously described with reference the circuit 500 of FIG. 5A, the accuracy of the measured angle may be improved by applying calibration.

Defining the Q-factor of the parallel resonant configuration of the sense circuit 501 of FIG. 5F:

$$Q_p=\omega_p(L_p+L)/(R+R_{Lp})\approx n_L(1+n_L)/(G_p\omega_p L) \quad (51)$$

which may be also expressed in terms of the Q-factors Q and $Q_{Lp}$ as:

$$Q_p=Q(1+n_L)/((Q/Q_{Lp})+n_L) \quad (52)$$

using the definition of Equation (6) of the normalized reflected impedance at $\omega_p$, and applying Equations (51) and (47) to Equation (50), the fractional admittance change $\Delta Y'$ may also be written as:

$$\Delta Y'\approx Q_p\Delta Z'_r n_L/(1+n_L) \quad (53)$$

For the case $Q_{Lp}=Q$, the fractional change becomes:

$$\Delta Y'\approx Q\Delta Z'_r n_L/(1+n_L) \quad (54)$$

and for $Q_{Lp}>>Q$:

$$\Delta Y' \approx Q \Delta Z'_r \quad (55)$$

The fractional change $|\Delta Y'|$ of the parallel resonant configuration of the circuit 500 of FIG. 5F as given by Equation (53) is generally lower than $|\Delta Z'|$ of the series resonant configuration as given by Equation (35) but approaches $|\Delta Z'|$ as the inductance ratio $n_L$ or the Q-factor $Q_{Lp}$ increases. In an example implementation configured with $L_p=L(n_L=1)$ and $Q_{Lp}=Q$, the fractional change $|\Delta Y'|$ of the parallel resonant configuration is approximately ½ of the fractional change $|\Delta Z'|$ of the series resonant configuration, while in another example implementation with $L_p=L/4$ ($n_L=4$) and $Q_{Lp}=Q$, the fractional change $|\Delta Y'|$ amounts to about ⅘ of $|\Delta Z'|$.

In a further aspect, the drive current level $I_0$, the resulting voltage V at the measurement port 508, and the drive power level P are considered. In some implementations based on the circuit 500 of FIG. 5F, the current level $I_0$ of the current source 512 is adjusted to achieve a specified current level $|I_L|$ in the sense coil 502. For the series resonant configuration of the circuit 500 of FIG. 5F, the current level $I_0$ approximately equals $|I_L|$:

$$I_0 \approx |I_L| \quad (56)$$

resulting in a voltage across the measurement port 508:

$$V \approx |Z_{11,0}| I_0 \approx R |I_L| \quad (57)$$

and in a drive power level:

$$P \approx V\, I_0 \approx R |I_L|^2 \quad (58)$$

Using Equations (42), (47), and (51) for the parallel resonant configuration of the circuit 500 of FIG. 5F, it can be shown that the current $|I_L|$ through the sense coil 502 at parallel resonance is approximately $Q_p/(1+n_L)$ times higher than the drive current level $I_0$ providing:

$$I_0 \approx |I_L|(1+n_L)/Q_p \approx |I_L|((Q/Q_{Lp})+n_L)/Q \quad (59)$$

The voltage across the measurement port 508 becomes approximately:

$$V \approx I_0/|Y_{11,0}| \approx I_0/G_p \approx |I_L|/(Q\, G\, n_L) \quad (60)$$

and the drive power:

$$P \approx I_0 V \approx (|I_L|^2/G)((Q/Q_{Lp})+n_L)/(Q^2 n_L) \quad (61)$$

In a further aspect, the SNR in the voltage V at the measurement port 508 may be considered. As with the fractional change, the SNR may determine the sensitivity of the multi-purpose detection circuit 100. It may be distinguished between the intrinsic SNR (the sense signal-to-circuit intrinsic noise ratio) and the extrinsic SNR (the sense signal-to-circuit extrinsic noise ratio). With reference to FIG. 5F, circuit intrinsic noise may include contributions from the noise current $I_{0,n}$ caused by the current source 512 and from noise inherent to the voltage measurement circuit 510. Further, it may include a contribution from thermal noise of the loss resistances R and $R_{Lp}$ inherent to the sense circuit 501. Circuit extrinsic noise may include any disturbance signal component inductively and capacitively coupled into the sense coil 502 (e.g., via the magnetic and electric field as caused by the WPT system when active). In some implementations, circuit extrinsic noise may prevail when WPT is active, while circuit intrinsic noise may determine the SNR when WPT is inactive. As previously mentioned, in certain implementations and use cases, the multi-purpose detection circuit 100 is also used when WPT is inactive (e.g., for determining presence of a foreign object, a vehicle, a type of vehicle, or the position of a vehicle).

It may be further distinguished between a narrowband SNR resulting at the nominal sense frequency in the bandwidth of the voltage measurement circuit 510 and a broadband SNR defined in a larger bandwidth e.g., also covering the WPT operating frequency. The former mainly relates to the sensitivity of a multi-purpose detection circuit 100, while the latter may determine the dynamic range and filtering requirements of the voltage measurement circuit 510.

In another aspect, it may be meaningful to define the narrowband SNR at the measurement port 508 of the circuit 500 of FIG. 5F as given by Equation (10), where $|\Delta V|$ denotes the magnitude of the change in the measured voltage V due to the presence of an object (e.g., object 110) and $V_n$ the additive noise voltage component as indicated in the circuit 500 of FIG. 5F. More specifically, the voltage change $|\Delta V|$ may refer to the r.m.s. voltage and $V_n$ to the r.m.s. noise voltage as measured at the nominal sense frequency in the bandwidth $B_m$ of the voltage measurement circuit 510. This noise voltage $V_n$ may include circuit intrinsic and extrinsic noise components as discussed above. The SNR as given by Equation (10) is referred herein as to the differential narrowband SNR.

In yet a further aspect, it may be meaningful to define the broadband extrinsic SNR at the measurement port 508 of the circuit 500 of FIG. 5F as:

$$SNR_W = |V|/V_W \quad (62)$$

where $|V|$ denotes the magnitude of the sense signal voltage and $V_W$ the disturbance voltage at the fundamental WPT operating frequency, which may be a prominent component in $V_n$ when WPT is active. More specifically, the voltage $|V|$ may refer to the r.m.s. voltage of the sense signal and $V_W$ to the r.m.s. disturbance voltage as measured at the measurement port 508 at the fundamental WPT operating frequency.

Using Equation (19), the differential narrowband extrinsic SNR for the series resonant configuration of the circuit 500 of FIG. 5F may be expressed as:

$$\Delta SNR_{ex,s} \approx |\Delta Z_r||I_L|/V_{sn} \approx |\Delta Z'_r||V_L|/V_{sn} = |\Delta Z'_r|\omega_s L |I_L|/V_{sn} \quad (63)$$

with $|I_L|$ denoting the magnitude of the sense signal current in the sense coil 502, which approximately equals the source current level $I_0$, and $V_{sn}$ the noise voltage as indicated in FIG. 5F.

Since the sense circuit 501 transforms the voltage drop across $\Delta Z_r$ to $\Delta V$ in the same way as it transforms $V_{sn}$ to $V_n$, Equation (21) may also apply to the parallel resonant configuration of the circuit 500, meaning that:

$$\Delta SNR_{ex,p} = (|I_l|/V_{sn})\omega_s L |\Delta Z'_r| \quad (64)$$

Equation (63) and (64) show that the differential narrowband extrinsic SNR for the circuit 500 of FIG. 5F is no function of the Q-factor for both the series and the parallel resonant configuration.

In some implementations (e.g., where the sense signal is numerically generated and converted to an analog signal using a digital-to-analog converter (DAC) e.g., in the signal generator circuit 406 with reference to FIG. 4), the noise current $I_{0,n}$ as indicated in FIG. 5F may cause the predominant contribution in $V_n$ when WPT is inactive. In this case, the noise voltage $V_n$ for the series resonant configuration is approximately:

$$V_n \approx R\, I_{0,n} \quad (65)$$

while the voltage change |ΔV| in presence of an object (e.g., object 110) is:

$$|\Delta V| \approx |I_l||\Delta Z_r| \approx |I_0||\Delta Z_r| \quad (66)$$

Applying Equations (35), (65), and (66) to Equation (10), the differential narrowband intrinsic SNR with respect to the noise current $I_{0,n}$ for the series resonant configuration of the circuit 500 of FIG. 5F may be expressed as:

$$\Delta SNR_{int,s} \approx (|I_0|/I_{0,n})|\Delta Z_r|/R \quad (67)$$

Using Equation (33), Equation (67) may also be written in terms of the Q-factor $Q_s$ and the normalized reflected impedance $\Delta Z'_r$ as:

$$\Delta SNR_{int,s} \approx (|I_0|/I_{0,n})Q_s|\Delta Z'_r| \quad (68)$$

Using:

$$\Delta Y' << 1 \quad (69)$$

which follows from Equations (23) and (25) and Equation (38), the magnitude |ΔV| of the voltage change in the parallel resonant configuration of the circuit 500 of FIG. 5F may be approximated as:

$$|\Delta V| = |(I_0/Y_{11}) - (I_0/Y_{11,0})| = |I_0||(Y_{11,0}+\Delta Y)^{-1} - Y_{11,0})^{-1}| \approx |I_0||\Delta Y|/|Y_{11,0}|^2 \quad (70)$$

With the noise current $I_{0,n}$ as the predominant contribution, the noise voltage $V_n$ at the parallel resonant frequency becomes:

$$V_n = I_{0,n}/|Y_{11,0}| \quad (71)$$

Applying Equations (70), (71), and (50) to Equation (10), the differential narrowband intrinsic SNR with respect to the noise current $I_{0,n}$ for the parallel resonant configuration of the circuit 500 of FIG. 5F may be expressed as:

$$\Delta SNR_{int,p} \approx (|I_0|/I_{0,n})|\Delta Y'| \approx (|I_0|/I_{0,n})|\Delta Z_r|/(R_{Lp}+R) \quad (72)$$

Using Equation (53), Equation (72) may also be written in terms of the Q-factor $Q_p$ and the normalized reflected impedance $\Delta Z'_r$ as:

$$\Delta SNR_{int,p} \approx (|I_0|/I_{0,n})|\Delta Z'_r|Q_p n_L/(1+n_L) \quad (73)$$

Similar considerations may be made for the thermal noise though likely less significant in practical implementations as further shown below with reference to TABLE 2. As previously mentioned, a thermal noise voltage is generated by the series equivalent loss resistances $R_{Lp}$ and R. The noise voltage component $V_n$ at the series resonant frequency may be considered as the thermal noise voltage generated by the series resonant resistance $R_s$ as defined by Equation (30) and becomes approximately:

$$V_n = (4k\,T\,B_m R_s)^{1/2} \approx (4k\,T\,B_m R)^{1/2} \quad (74)$$

where k denotes the Boltzmann constant, T the absolute temperature of the sense coil 502, and $B_m$ the equivalent noise bandwidth of the voltage measurement circuit 510. Applying Equation (66) and (74) to Equation (10) provides for the differential narrowband intrinsic SNR with respect to thermal noise for the series resonant configuration of the circuit 500 of FIG. 5F:

$$\Delta SNR_{int,s} \approx |I_L||\Delta Z_r|/V_n \approx |I_L|\omega_s L|\Delta Z'_r|/(4k\,T\,B_m R)^{1/2} \quad (75)$$

Accordingly, the thermal noise voltage $V_n$ as resulting at parallel resonance may be considered as the thermal noise generated by the parallel resonant conductance $G_p$ as defined by Equation (42). Assuming equal temperature T for the sense coil 502 and the parallel inductor 506, the noise voltage $V_n$ becomes approximately:

$$V_n \approx (4k\,T\,B_m/G_p)^{1/2} \quad (76)$$

Using Equation (70), (50), (42), (51), and the relation:

$$|I_0| = |V|G_p \approx |I_L|\omega_p L_p G_p \quad (77)$$

the voltage change ΔV may be expressed as:

$$|\Delta V| \approx |I_0||\Delta Y|/G_p^2 \approx |I_L|\omega_p L_p|\Delta Y'| \approx |I_L|\omega_p L_p|\Delta Z_r|/(R+R_{Lp}) \quad (78)$$

Applying Equations (76) and (78) to Equation (10) also using Equation (42), provides for the differential narrowband intrinsic SNR with respect to the thermal noise for the parallel resonant configuration of the circuit 500 of FIG. 5F:

$$\Delta SNR_{int,p} \approx |I_L|\omega_p L|\Delta Z'_r|/(4k\,T\,B_m(R+R_{Lp}))^{1/2} \quad (79)$$

In a further aspect, the broadband extrinsic SNR as defined by Equation (62) with respect to the induced voltage component $V_{sW}$ at the fundamental WPT operating angular frequency $\omega_W$ is considered. Assuming the magnetic field coupling as the predominant contribution, the disturbance signal voltage $V_{sn}$ may relate to the WPT coil current $I_{WPT}$ as follows:

$$V_{sn} \approx V_{sW} \approx \omega_W L_{sW} I_{WPT} \quad (80)$$

where $L_{sW}$ denotes the mutual inductance between the sense coil 502 and the WPT coil (e.g., WPT coil 202 with reference to FIGS. 2 and 3). Further, assuming:

$$1/(\omega_W C_s) << \omega_W L \quad (81)$$

$$\omega_s >> \omega_W \quad (82)$$

and using Equation (29) and (47), the disturbance voltage component $V_W$ in the voltage V for the series resonant configuration of the circuit 500 of FIG. 5F becomes approximately:

$$V_n = V_W \approx V_W \omega_W C_s \omega_W L_p \approx V_{sW}(\omega_W/\omega_s)^2/n_L \quad (83)$$

The factor $(\omega_W/\omega_s)^2/n_L$ may be considered as the attenuation of the low frequency induced voltage $V_{sW}$ by the high pass filter effect of the sense circuit 501. Using:

$$|V| = |I_0|R_s \approx |I_L|R \quad (84)$$

and applying Equations (33), (83), (80), (84), and (47) to Equation (62), the broadband extrinsic SNR for the series resonant configuration of the circuit 500 of FIG. 5F may be expressed in terms of the Q-factor $Q_s$ and the inductance ratio $n_L$ as:

$$SNR_{W,s} \approx (|I_L|/V_{sW})\Psi_s L(\omega_s/\omega_W)^2 n_L/Q_s \quad (85)$$

Using Equation (41), (81), and (82), the disturbance voltage component $V_W$ in the voltage V for the parallel resonant configuration of the circuit 500 of FIG. 5F becomes approximately:

$$V_n = V_W \approx V_{sW}\omega_W C_s \omega_W L_p \approx V_{sW}(\omega_W/\omega_p)^2/(1+n_L) \quad (86)$$

The factor $(\omega_W/\omega_p)^2/(1+n_L)$ may be considered as the attenuation of the low frequency induced voltage $V_{sW}$ by the high pass filter effect of the sense circuit 501. Further, expressing the sense signal voltage |V| at the angular frequency $\omega_p$ in terms of the sense coil current $|I_L|$ using Equation (40):

$$|V| \approx |I_L|((\omega_p C_s)^{-1} - \omega_p L) \approx |I_L|\omega_p L_p \quad (87)$$

and applying Equations (86) and (87) to Equation (62), the broadband extrinsic SNR with respect to the WPT fundamental disturbance voltage component $V_{sW}$ for the parallel resonant configuration of the circuit 500 of FIG. 5F may be expressed as:

$$SNR_{W,p} \approx (|I_L|/V_{sW})\omega_p L(\omega_p/\omega_W)^2(1+n_L)/n_L \quad (88)$$

In yet another aspect, the temperature sensitivity as defined by Equations (11) and (12) for the real and imaginary part of $Z_{11}$, respectively, is considered. Using Equation (35), the real part temperature sensitivity of the circuit 500 of FIG. 5F may be expressed as:

$$S_{\vartheta,R}=Re\{\Delta Z'_\vartheta\}/Re\{\Delta Z'\}\approx Re\{\Delta Z'_\varepsilon\}/(Q_s Re\{\Delta Z'_r\}) \quad (89)$$

Equation (89) shows that the real part temperature sensitivity reduces as the Q-factor $Q_s$ of the sense circuit 501 increases. However, the imaginary part temperature sensitivity may not improve and may only reduce by lowering a temperature coefficient associated with the inductive and capacitive elements of the sense circuit 501.

In some implementations, components and materials with a low temperature coefficient (e.g., NP0-type capacitors) are used. In other implementations, temperature sensitivity is reduced e.g., using a combination of components or materials with a positive temperature coefficient and components or materials with a negative temperature coefficient in a manner such that the overall thermal drift is canceled out.

Equations (8) to (89) may also apply to the circuit 520 of FIG. 5B with some minor modifications e.g., by replacing the inductance L by $L+L_\sigma$, the series resistance R by $R+R_w$, the inductance $L_p$ by $L_m$, and the series resistance $R_{Lp}$ by $R_m$, where $L_\sigma$ denotes the transformer's 526 secondary referred leakage inductance, $R_w$ its secondary referred equivalent series resistance with respect to the conductor losses, $L_m$ its secondary referred main inductance, and $R_m$ its secondary referred equivalent series resistance with respect to the core losses with reference to FIG. 5H. Further, if $L_\sigma$ is a substantial portion of $L+L_\sigma$, the normalized reflected impedance $\Delta Z'_r$ can be replaced by $\Delta Z'_r\ L/(L+L_\sigma)$. Likewise, the correction factor $L/(L+L_\sigma)$ can be applied to the normalized reflected admittance $\Delta Y'_r$. As a consequence, the inductance ratio $n_L=L/L_p$ can be replaced by $(L+L_\sigma)/L_m$.

To analyze the circuit 520 with respect to the series resonant configuration of the circuit 520 of FIG. 5B, the following assumptions in addition to the assumption of Equations (23) and (25) are made:

$$L_\sigma<<L \quad (90)$$

$$\omega L_m>>R_{Lm} \quad (91)$$

$$n_T^2\omega L_m=\alpha|Z_{11,0}| \quad (92)$$

$$\alpha>>1 \quad (93)$$

The ratio $n_T$:1 refers to the transformation ratio of the ideal transformer as used in the transformer's 526 equivalent circuit model with reference to FIG. 5H. The factor $\alpha$ determines the impact of the transformer's main inductance $L_m$ on the measured impedance $Z_{11,0}$ and hence on the angle $\arg\{\Delta Z\}$ as relevant for purposes of object discrimination as previously discussed with reference to FIG. 5A. The factor $\alpha$ is referred herein as to the transformer impact factor. The larger $\alpha$, the less is the impact from the transformer 526. Further, defining a Q-factor $Q_w$ for the transformer 526 with respect to its equivalent series resistance $R_w$ (e.g., representing conductor losses):

$$Q_w\approx\omega L_m/R_w \quad (94)$$

and using Equations (30) and (34), the impedance magnitude $|Z_{11,0}|$ at the measurement port 528 for the series resonant configuration of the circuit 520 of FIG. 5B may be expressed as:

$$|Z_{11,0}|\approx R_s\approx n_T^2(R+R_w)\approx n_T^2((\omega_s L/Q)+(\omega_s L_m/Q_w))\approx n_T^2\omega_s L_m/\alpha \quad (95)$$

yielding for the inductance ratio $n_L$ for satisfying Equation (92):

$$n_L=L/L_m\approx(Q/\alpha)-(Q/Q_w)>0 \quad (96)$$

Equation (95) may also be written as:

$$|Z_{11,0}|\approx R_s\approx n_T^2(1+Q/(n_L Q_w))R\approx n_T^2(Q_w/(Q_w-\alpha))R \quad (97)$$

For $Q_w>>\alpha$ and $n_T>1$, the series resonant resistance $R_s$ may be $n_T^2R$.

Defining the Q-factor of the series resonant configuration of the sense circuit 521 as:

$$Q_s\approx n_T^2\omega_s L/R_s\approx\omega_s L/(R+R_w) \quad (98)$$

and substituting $R_s$ by Equation (97) yields for the Q-factor of the series resonant configuration of the sense circuit 521 of FIG. 5B:

$$Q_s\approx Q(1-\alpha/Q_w) \quad (99)$$

and for the fractional change using Equation (35):

$$\Delta Z'\approx Q_s\Delta Z'_r\approx Q(1-\alpha/Q_w)\Delta Z'_r \quad (100)$$

The factor $1-\alpha/Q_w$ and thus $Q_s$ degrades as $Q_w$ decreases or $\alpha$ increases. This factor may also apply to the SNRs that are related to $Q_s$ as given above e.g., by Equations (68) and (85). In an example implementation configured with $\alpha=10$ and $Q_w=30$, this factor may be 2/3. It may be appreciated that the Q-factor $Q_w$ relates to the component volume rather than to the transformation ratio $n_T$:1.

In some implementations, the transformer impact factor $\alpha$ represents a trade-off between an error in the measured impedance change $\Delta Z$ (e.g., with respect to the angle $\arg\{\Delta Z_r\}$ as previously discussed with reference to FIG. 5A) and a degradation of the fractional change $|\Delta Z'|$.

To analyze the circuit 520 with respect to the parallel resonant configuration of the circuit 520 of FIG. 5B, the following additional assumption is made:

$$\omega L_m>>R_{Lm} \quad (101)$$

Defining the inductance ratio:

$$n_L\approx L/L_m \quad (102)$$

and the Q-factor of the transformer 526 with respect to $R_{Lm}$ (e.g., core losses) as:

$$Q_{Lm}\approx\omega L_m/R_{Lm} \quad (103)$$

the admittance $|Y_{11,0}|$ at the measurement port 528 for the parallel resonant configuration of the circuit 520 of FIG. 5B may be expressed as:

$$|Y_{11,0}|\approx G_p\approx(n_L/n_T^2)((Q/Q_w)+(Q/Q_{Lm})+n_L)/(Q\omega_p L) \quad (104)$$

with $G_p$ denoting the parallel resonant conductance of the sense circuit 521. For $Q\approx Q_w\approx Q_{Lm}$ and $n_L>1$, the parallel resonant conductance becomes:

$$G_p\approx(n_L/n_T^2)(n_L+2)/(Q\omega_p L) \quad (105)$$

Applying Equation (104) to Equation (51), the Q-factor for the parallel resonant configuration of the sense circuit 521 may be expressed as:

$$Q_p\approx\omega_p(L+L_m)/(R+R_W+R_{Lm})\approx Q(1+n_L)/(n_L+(Q/Q_w)+(Q/Q_{Lm})) \quad (106)$$

and the fractional change using Equation (53):

$$\Delta Y'\approx Q_p\Delta Z'_r n_L/(1+n_L)\approx Q\Delta Z'_r n_L/(n_L+(Q/Q_w)+(Q/Q_{Lm})) \quad (107)$$

As $n_L$ increases, the factor $Q_p\ n_L/(1+n_L)$ approaches the Q-factor Q of the sense coil 502. In an example implementation configured with $L_m=L$ ($n_L=1$) and $Q_w=Q_{Lm}=Q$, this factor may be Q/3. For $n_L>>1$, the fractional change $\Delta Y'$ may equal $\Delta Z'$ of the series resonant configuration of the circuit 520 of FIG. 5B as given by Equation (100). For the example parallel resonant configuration as specified above and for an example series resonant configuration with $\alpha/Q_w=1/3$, equality may occur at $n_L=4$.

Based on Equation (107), an example implementation of the circuit 520 configured for parallel resonance with $L_m=L$ ($n_{Lm}=1$) and $Q_w=Q_{Lm}=Q$ and a transformer 526 with a transformation ratio $n_T^2\approx 1/3$ provides a fractional change $\Delta Y'\approx 0.33\ Q\ \Delta Z'_r$. Another example implementation of the circuit 520 using a transformer 526 with $n_T=1$ and $Q_w=Q_{Lm}=Q$ and an inductance ratio $n_L\approx 2.16$ to provide the same admittance $|Y_{11}|$, yields a fractional change $\Delta Y'\approx 0.52\ Q\ \Delta Z'_r$. A further example implementation of the circuit 500 (without transformer 526) with $Q_{Lp}=Q$ with an inductance ratio $n_L=1$ and yields a fractional change $\Delta Y'\approx 0.72\ Q\ \Delta Z'_r$.

From above examples, it may be concluded that using the transformerless circuit 500 may be preferable in a parallel resonant configuration. If a transformer (e.g., transformer 526) is indispensable e.g., for purposes of balancing as previously discussed with reference to FIG. 5B, decreasing the inductance ratio $n_L$ rather than $n_T$ may result in a larger fractional change.

The equivalent circuit model 540-1 as illustrated in FIG. 5G comprises the sense coil's 502 inductance L and its equivalent parallel conductance G, the parallel capacitor's 544 capacitance $C_p$, and the series capacitor's 546 capacitance $C_s$, an ideal sense signal voltage source 552, and an ideal current measurement circuit 550. It may be appreciated that in practical implementations, losses in the capacitors are generally substantially lower than losses in inductors. Therefore, the equivalent series resistance of the capacitors 544 and 546 are neglected (not shown) in the equivalent circuit model 540-1 of FIG. 5G. Further, the equivalent circuit model 540-1 includes an admittance $\Delta Y_r$ in parallel to the inductance L representing the reflected admittance of the object 110, 112, or 114 proximate to the sense coil 502. (The reflected admittance $\Delta Y_r$ may be regarded as the object 110, 112, or 114 as illustrated in FIG. 5C abstracted away). The equivalent circuit model 540-1 also includes a noise current source $I_{sn}$ in parallel to the inductance L representing the noise current inductively and capacitively coupled into the sense coil 502 by the magnetic and electric field, respectively, as generated when WPT is active. The noise current $I_{sn}$ may include any low frequency component (e.g., the fundamental of the WPT operating frequency and harmonics thereof) as well as any high frequency component (e.g., switching noise at the sense frequency). The equivalent circuit model 540-1 further indicates the admittance $Y_{11}$ and the impedance $Z_{11}$ ($=1/Y_{11}$), the sense signal source voltage $V_0$ with an additive noise voltage component $V_{0,n}$, the sense signal current I with an additive noise current component $I_n$, and the measurement port 548 (indicated by the terminal and the dashed line) where the voltage $V_0+V_{0,n}$ is applied, the current $I+I_n$ is measured, and where $Y_{11}$ or $Z_{11}$ refer to. Because the equivalent circuit model 540-1 applies to the circuit 540 of FIG. 5C, the reference numeral 540 is used instead in the following theoretical analysis.

With the assumption of an identical sense coil 502 in the circuits 500 and 540, the following relations may apply:

$$\Delta Y'_r=\Delta Z'_r \tag{108}$$

$$G\approx R/(\omega L)^2 \tag{109}$$

$$\Delta Y_r\approx\Delta Z_r/(\omega L)^2 \tag{110}$$

$$I_{sn}\approx V_{sn}/(\omega L) \tag{111}$$

with $\Delta Y'_r$, $\Delta Z'_r$, $\Delta Z_r$, R, and $V_{sn}$ referring to the normalized reflected admittance, the normalized reflected impedance, the reflected impedance of the object 110 in the sense coil 502, the equivalent series resistance of the sense coil 502, and the disturbance voltage $V_{sn}$ with reference to the circuit 500 of FIG. 5F, respectively.

To analyze the series and parallel resonant configuration of the circuit 540 of FIG. 5G, the common assumptions:

$$1/\omega L>>G \tag{112}$$

$$|\Delta Y_r|<<G \tag{113}$$

are made for a frequency range about the resonant frequency.

In an implementation configured for parallel resonance and with a susceptance:

$$\omega C_s>>|Y_{11}| \tag{114}$$

in a frequency range about the resonant frequency, the admittance $Y_{11}$ at the measurement port 548 of the circuit 540 of FIG. 5G in presence of an object (e.g., object 110) may be expressed as:

$$Y_{11}\approx G+(j\omega L)^{-1}+j\omega C_p+\Delta Y_r \tag{115}$$

In absence of a foreign object, a local minimum of $|Y_{11,0}(\omega)|$ (parallel resonance) occurs substantially at an angular frequency $\omega$ satisfying:

$$(j\omega L)^{-1}+j\omega C_p\approx 0 \tag{116}$$

yielding the parallel resonant angular frequency:

$$\omega_p\approx(L\ C_p)^{-1/2} \tag{117}$$

At this frequency, the admittance $Y_{11,0}$ becomes approximately real:

$$Y_{11,0}\approx Re\{Y_{11,0}\}=G_p\approx G \tag{118}$$

with $G_p$ denoting the parallel resonant conductance, while the admittance $Y_{11}$ in presence of an object (e.g., object 110) is approximately:

$$Y_{11}\approx G_p+\Delta Y\approx G+\Delta Y_r \tag{119}$$

with $\Delta Y_r$ referring to the reflected admittance as previously defined with reference to FIG. 5A.

Applying Equations (118) and (119) to Equation (9), the fractional change $\Delta Y'$ for the parallel resonant configuration of the circuit 540 of FIG. 5G becomes approximately:

$$\Delta Y'\approx\Delta Y/G_p\approx\Delta Y_r/G \tag{120}$$

Defining the normalized reflected admittance:

$$\Delta Y'_r=\Delta Y_r\omega_p L \tag{121}$$

the Q-factor of the sense coil 502:

$$Q=1/(\omega_p L\ G) \tag{122}$$

and the Q-factor of the parallel resonant configuration of the sense circuit 541 of FIG. 5G:

$$Q_p\approx 1/(\omega_p L\ G_p)\approx Q \tag{123}$$

the fractional change may also be written in terms of $\Delta Y'_r$ and $Q_p$:

$$\Delta Y'\approx Q_p\Delta Y'_r \tag{124}$$

To analyze the series resonant configuration of the circuit 540 of FIG. 5G, the additional assumption:

$$|\omega C_p-(\omega L)^{-1}|>>G \tag{125}$$

is made for a frequency range about the resonant frequency. The impedance $Z_{11}$ at the measurement port 548 in presence of an object (e.g., object 110) may be expressed as:

$$Z_{11}=(j\omega C_s)^{-1}+(G+j\omega C_p+(j\omega L)^{-1}+\Delta Y_r)^{-1} \tag{126}$$

Using Equations (112), (113), (125), and (38), Equation (126) may be approximated as:

$$Z_{11} \approx (j\omega C_s)^{-1} + (j\omega C_p + (j\omega L)^{-1})^{-1} + (G + \Delta Y_r)(\omega C_p + (\omega L)^{-1})^{-2} \quad (127)$$

In absence of a foreign object, a local minimum of $|Z_{11,0}(\omega)|$ (series resonance) occurs substantially at an angular frequency $\omega$ satisfying:

$$(j\omega L)^{-1} + j\omega(C_p + C_s) \approx 0 \quad (128)$$

yielding for the series resonant angular frequency:

$$\omega_s \approx (L(C_p + C_s))^{-1/2} \quad (129)$$

At this frequency, the impedance $Z_{11,0}$ becomes substantially real:

$$Z_{11,0} \approx Re\{Z_{11,0}\} \approx R_s \approx G/(\omega_s C_s)^2 \quad (130)$$

with $R_s$ denoting the series resonant resistance, while the impedance $Z_{11}$ in presence of an object (e.g., object 110) is approximately:

$$Z_{11} \approx R_s + \Delta Z \approx (G + \Delta Y_r)/(\omega_s C_s)^2 \quad (131)$$

with:

$$\Delta Z \approx \Delta Y_r/(\omega_s C_s)^2 \quad (132)$$

Further, defining the Q-factor of the sense coil 502:

$$Q = 1/(\omega_s L\ G) \quad (133)$$

and the capacitance ratio:

$$n_C = C_p/C_s \quad (134)$$

the impedance $Z_{11,0}$ of Equation (130) at $\omega_s$ may be expressed as:

$$Z_{11,0} = R_s \approx 1/(Q\omega_s L\omega_s^2 C_s^2) \approx (1+n_C)^2 \omega_s L/Q \quad (135)$$

For $n_C >> 1$, the series resonant resistance $R_s$ becomes approximately:

$$R_s \approx n_C^2 \omega_s L/Q \quad (136)$$

and approximately 9R for the case $n_C=2$. According to Equation (135), the impedance $Z_{11}$ at $\omega_s$ of the sense circuit 541 can be modified (e.g., increased) by adjusting the capacitance ratio $n_C=C_p/C_s$ accordingly, while maintaining series resonance substantially at the nominal sense frequency. Therefore, in some implementations, the series resonant configuration of the circuit 540 of FIG. 5G is employed as an alternative to using a transformer (e.g., transformer 526 of FIG. 5B) for transforming the impedance $Z_{11}$ to be within a suitable operating impedance range as previously discussed with reference to FIG. 5B.

Applying Equations (130) and (131) to Equation (8), the fractional change $\Delta Z'$ for the series resonant configuration of the circuit 540 of FIG. 5G becomes approximately:

$$\Delta Z' = \Delta Z/R_s \approx \Delta Y_r/G \quad (137)$$

showing that the impedance change $\Delta Z$ is substantially proportional to the reflected admittance $\Delta Y_r$. Therefore, the angle $\arg\{\Delta Z\}$ of the measured impedance change $\Delta Z$ may be indicative of the angle $\arg\{\Delta Y_r\}$. As previously described with reference to the circuit 540 of FIG. 5C, the accuracy of the measured angle may be improved by applying calibration.

Defining the Q-factor of the series resonant configuration of the sense circuit 541 of FIG. 5G:

$$Q_s \approx \omega_s(C_s + C_p)/G \approx Q \quad (138)$$

which approximately equals the Q-factor Q of the sense coil 502 as defined by Equation (133), using Equation (7), and applying Equation (133) to (137), the fractional impedance change $\Delta Z'$ may also be written as:

$$\Delta Z' \approx Q_s \Delta Y'_r \approx Q\Delta Y'_r \quad (139)$$

In a further aspect, the drive voltage level $V_0$, the resulting current I at the measurement port 548, and the drive power level P are considered. In some implementations based on the circuit 540 of FIG. 5G, the voltage level $V_0$ of the voltage source 542 is adjusted to achieve a specified current level $|I_L|$ in the sense coil 502. For the parallel resonant configuration of the circuit 540 of FIG. 5G, the voltage level $V_0$ approximately equals the voltage across the sense coil 502 providing the relation:

$$V_0 \approx \omega_p L|I_L| \quad (140)$$

Using Equations (118) and (122), the current I at the measurement port 548 may be expressed approximately as:

$$I \approx |Y_{11,0}|V_0 \approx |I_L|\omega_p L\ G = |I_L|/Q \quad (141)$$

and the drive power level:

$$P \approx V_0 I = |I_L|^2 \omega_p L/Q \quad (142)$$

For the series resonant configuration of the circuit 540 of FIG. 5G, the voltage $|V_L|$ across the sense coil 502 is approximately:

$$|V_L| \approx \omega_s L|I_L| \quad (143)$$

and the current I using Equations (129), (134), and (143):

$$I \approx |V_L|\omega_s C_s = \omega_s^2 L\ C_s|I_L| = |I_L|C_s/(C_s + C_p) = |I_L|/(1+n_C) \quad (144)$$

respectively. The voltage $V_0$ and the drive power P required to drive the sense coil 502 with a current level $|I_L|$ can be found to be:

$$V_0 \approx I\ R_s \approx I(1+n_C)R = |I_L|\omega_s L/Q_s \quad (145)$$

$$P \approx I^2 R_s \approx |I_L|^2 \omega_s L/(Q_s(1+n_C)) \quad (146)$$

In a further aspect, it may be meaningful to define the narrowband SNR at the measurement port 548 of the circuit 540 of FIG. 5G as given by Equation (14), where $|\Delta I|$ denotes the magnitude of the current change in the measured current I due to the presence of an object (e.g., object 110) and $I_n$ the additive noise voltage component as indicated in the circuit 540 of FIG. 5G. More specifically, the current change $|\Delta I|$ may refer to the r.m.s. current and $I_n$ to the r.m.s. noise current as measured at the nominal sense frequency in the bandwidth $B_m$ of the current measurement circuit 550. This noise current $I_n$ may include circuit intrinsic and extrinsic noise components as discussed above. The SNR as given by Equation (14) is referred herein as to the differential narrowband SNR.

In another aspect, it may be meaningful to define the broadband extrinsic SNR at the measurement port 548 of the circuit 540 of FIG. 5G as:

$$SNR_W = |I|/I_W \quad (147)$$

where $|I|$ denotes the magnitude of the sense signal current and $I_W$ the disturbance current at the fundamental WPT operating frequency, which may be a prominent component in $I_n$ when WPT is active. More specifically, the current $|I|$ may refer to the r.m.s. current and $I_W$ to the r.m.s. disturbance current as measured at the measurement port 548 at the fundamental WPT operating frequency.

Using Equation (14) and (7), the differential narrowband extrinsic SNR of the parallel resonant configuration of the circuit 540 of FIG. 5G may be expressed as:

$$\Delta SNR_{ex,p} \approx |\Delta Y_r|\omega_p L|I_L|/I_{sn} = |\Delta Y'_r||I_L|/I_{sn} \quad (148)$$

with $I_{sn}$ the noise current as illustrated in FIG. 5G.

Since the sense circuit 541 transforms the shunt current through $\Delta Y_r$ to $\Delta I$ in the same way as it transforms $I_{sn}$ to $I_n$, Equation (148) also applies to the series resonant configuration, meaning that:

$$\Delta SNR_{ex,s} \approx \Delta SNR_{ex,p} \quad (149)$$

In operations of the circuit 540 where the noise voltage $V_{0,n}$ is predominant as previously discussed, the noise current $I_n$ in the parallel resonant configuration of the circuit 540 is approximately:

$$I_n \approx G_p V_{0,n} \quad (150)$$

and the current change in presence of an object (e.g., object 110) is:

$$|\Delta I| \approx |V_0||\Delta Y_r| \quad (151)$$

Applying Equations (123), (124), (150), and (151) to Equation (14), the differential narrowband intrinsic SNR with respect to the noise voltage $V_{0,n}$ for the parallel resonant configuration of the circuit 540 of FIG. 5G may be expressed as:

$$SNR_{int,p} \approx (|V_0|/V_{0,n})|\Delta Y_r|/G_p \approx (|V_0|/V_{0,n})|\Delta Y'| \quad (152)$$

Using Equation (124), Equation (152) may also be written in terms of the Q-factor $Q_p$ and the normalized reflected admittance $\Delta Y'_r$ as:

$$\Delta SNR_{int,p} \approx (|V_0|/V_{0,n})Q_p|\Delta Y'_r{}' \quad (153)$$

Using:

$$\Delta Z' << 1 \quad (154)$$

which follows from assumptions of Equations (112) and (113) and Equation (38), the magnitude $|\Delta I|$ of the current change in the series resonant configuration of the circuit 540 of FIG. 5G may be approximated as:

$$|\Delta I| = |(V_0/Z_{11}) - (V_0/Z_{11,0})| = |V_0||(Z_{11,0}+\Delta Z)^{-1} - Z_{11,0})^{-1}| \approx |V_0||\Delta Z|/|Z_{11,0}|^2 \quad (155)$$

With the noise voltage $V_{0,n}$ as the predominant noise contribution, the noise current $I_n$ at the series resonant frequency becomes:

$$I_n = V_{0,n}/|Z_{11,0}| \quad (156)$$

Applying Equations (155), (156), and (137) to Equation (14), the differential narrowband intrinsic SNR with respect to the noise voltage $V_{0,n}$ for the series resonant configuration of the circuit 540 of FIG. 5G may be expressed as:

$$\Delta SNR_{int,s} \approx (|V_0|/V_{0,n})|\Delta Z'| \approx (|V_0|/V_{0,n})|\Delta Y_r|/G \quad (157)$$

Using Equation (139), Equation (157) may also be written in terms of the Q-factor $Q_s$ and the normalized reflected admittance $\Delta Y'_r$ as:

$$\Delta SNR_{int,s} \approx (|V_0|/V_{0,n})Q_s|\Delta Y'_r| \quad (158)$$

Similar considerations may be made for thermal noise, though likely less significant in practical implementations as shown below with reference to TABLE 2. As previously mentioned, a thermal noise current is generated by the equivalent parallel conductance G of the sense coil 502. The noise current $I_n$ may be considered as the thermally generated by the parallel resonant conductance $G_p$ as defined by Equation (118) and becomes approximately:

$$I_n = (4k\,T\,B_m G_p)^{1/2} \approx (4k\,T\,B_m G)^{1/2} \quad (159)$$

Applying Equation (151), (159), and (7) to Equation (14), the differential narrowband intrinsic SNR with respect to thermal noise of the parallel resonant configuration of the circuit 540 may be expressed as:

$$\Delta SNR_{int,p} \approx |I_L|\omega_p L|\Delta Y_r|/I_n \approx |I_L||\Delta Y'_r|/(4k\,T\,B_m G)^{1/2} \quad (160)$$

where k denotes the Boltzmann constant, T the absolute temperature, and $B_m$ the equivalent noise bandwidth of the current measurement circuit 550.

In the series resonant configuration of the circuit 540, the noise current component $I_n$ as thermally generated by the series resonant resistance $R_s$ as defined by Equation (118) becomes:

$$I_n = (4k\,T\,B_m/R_s)^{1/2} \quad (161)$$

Using Equations (137), (129), and the relation:

$$|V_0| = |I|R_s \approx |I_L|\omega_s^2 L\,C_s R_s \quad (162)$$

the current change $|\Delta I|$ may be expressed as:

$$|\Delta I| \approx |V_0||\Delta Z|/R_s^2 \approx |I_L|\omega_s^2 L\,C_s|\Delta Z'| \approx |I_L||\Delta Y_r|/((1+n_C)G) \quad (163)$$

Applying Equation (161) and (163) to Equation (14), the differential narrowband intrinsic SNR with respect to thermal noise of the series resonant configuration of the circuit 540 may be expressed in terms of the sense coil 502 current $|I_L|$ and the normalized reflected admittance $|\Delta Y'_r|$ as:

$$\Delta SNR_{int,s} \approx |I_L||\Delta Y'_r|/(4k\,T\,B_m G)^{1/2} \quad (164)$$

In yet a further aspect, the broadband extrinsic SNR as defined by Equation (147) with respect to the induced current component $I_{sW}$ at the fundamental WPT operating angular frequency $\omega_W$ is considered. Assuming:

$$I_{sn} = I_{sW} \quad (165)$$

$$1/(\omega_W C_p) >> \omega_W L \quad (166)$$

and using Equation (117), the disturbance current component $I_W$ in the current I for the parallel resonant configuration of the circuit 540 of FIG. 5G becomes approximately:

$$I_n = I_W \approx I_{sW}\omega_W L\omega_W C_s \approx I_{sW}(\omega_W/\omega_p)^2/n_C \quad (167)$$

The factor $(\omega_W/\omega_p)^2/n_C$ may be considered as the attenuation of the low frequency induced current $I_{sW}$ by the high pass filter effect of the sense circuit 541. Using:

$$|I| \approx |V_L|G \quad (168)$$

and applying Equations (167), (168), and (134) to Equation (147), the broadband extrinsic SNR of the parallel resonant configuration of the circuit 540 of FIG. 5G may be expressed as:

$$SNR_{W,p} \approx (|V_L|G/I_{sW})(\omega_p/\omega_W)^2 n_C \quad (169)$$

with $V_L$ denoting the voltage across the sense electrode 702.

Using the relation:

$$|V_L| \approx |I_L|\omega_p L \quad (170)$$

and Equation (123), Equation (169) may also be written as:

$$SNR_{W,p} \approx (|I_L|/I_{sW})(\omega_p/\omega_W)^2 n_C/Q_p \quad (171)$$

Using Equations (82), (129), (134), and (166), the disturbance current $I_W$ in the current I for the series resonant configuration of the circuit 540 of FIG. 5G becomes approximately:

$$I_W \approx I_{sW}\omega_W L\omega_W C_s \approx I_{sW}(\omega_W/\omega_s)^2(1+n_C) \quad (172)$$

The factor $(\omega_W/\omega_p)^2\ (1+n_C)$ may be considered as the attenuation of the low frequency induced current $I_{sW}$ by the high pass filter effect of the sense circuit 541. Further, expressing the sense signal current $|I|$ at the angular frequency $\omega_s$ in terms of the sense coil 502 voltage $|V_L|$ using Equations (138) and (168):

$$|I| \approx |V_L|(\omega_s C_s - (\omega_s L)^{-1}) \approx |V_L|\omega_s C_s \quad (173)$$

and applying Equations (172) (173), and (134) to Equation (14), the broadband extrinsic SNR with respect to the WPT fundamental disturbance current component $I_{sW}$ for the series resonant configuration of the circuit 540 of FIG. 5G may be expressed as:

$$SNR_{W,s} \approx (|V_L|\omega_s C_s / I_{sW})(\omega_s/\omega_W)^2(1+n_C) \quad (174)$$

Using the relation:

$$|V_L| \approx |I_L|\omega_s L \quad (175)$$

Equations (129), and (165), Equation (174) may also be written as:

$$SNR_{W,s} \approx (|I_L|/I_{sW})(\omega_s/\omega_W)^2 \quad (176)$$

Based on Equations (171) and (176) and $\omega_s=\omega_p$, the following relation between the broadband extrinsic SNRs of the parallel and series resonant configurations of the circuit 540 of FIG. 5G can be found:

$$SNR_{W,s} \approx SNR_{W,p} Q_p / n_C \quad (177)$$

TABLE 1 provides example parameter values as used for a numerical analysis of the series and parallel resonant configuration of the circuit 500 of FIG. 5F and the circuit 540 of FIG. 5G. Values for the induced disturbance voltage $V_{sW}$, the noise voltage $V_{sn}$, and their equivalent respective currents $I_{sW}$ and $I_{sn}$ of the circuit 540 may be considered typical for the multi-purpose detection circuit 100 integrated into a wireless power transfer structure (e.g., wireless power transfer structure 200 with reference to FIG. 2). The normalized reflected impedance of the object 110 as given in TABLE 1 may be typical for a paperclip placed on the surface of the wireless power transfer structure 200 at a worst case position 3 mm above the sense coil 502 (e.g., inductive sense element 107*a*) with a form factor of 60×80 mm. The example sense current level $|I_L|$ may be within a constraint given by an electromagnetic emission limit of an established electromagnetic compatibility (EMC) standard (e.g., EN 300330). The example drive signal SNR $|I_0|/I_{0,n}$ and $|V_0|/V_{0,n}$ for the circuit 500 and 540, respectively, may be typical for a digital implementation of a sense signal source (e.g., sense signal current source 512 and sense signal voltage source 552), respectively, as previously described with reference to FIG. 4.

TABLE 1

| | 500 of FIG. 5F | | 540 of FIG. 5G | |
|---|---|---|---|---|
| Circuit Configuration | Series resonant | Parallel resonant | Series resonant | Parallel resonant |
| Nominal sense frequency | 3 MHz | 3 MHz | 3 MHz | MHz |
| WPT operating frequency | 85 kHz | 85 kHz | 85 kHz | 85 kHz |
| Inductance L of sense coil 502 | 5 μH | 5 μH | 5 μH | 5 μH |
| Inductance/capacitance ratio | $n_L = 1$ | $n_L = 2.5$ | $n_C = 2$ | $n_C = 1$ |
| Q-factor Q of sense coil 502 | 30 | 30 | 30 | 30 |
| Q-factor of capacitors504/544 | $Q_{Cs} >> Q$ | $Q_{Cs} >> Q$ | $Q_{Cp} >> Q$ | $Q_{Cp} >> Q$ |
| Q-factor of inductor 506/capacitor 546 | $Q_{Lp} = Q$ | $Q_{Lp} = Q$ | $Q_{Cs} >> Q$ | $Q_{Cs} >> Q$ |
| Normalized reflected impedance/admittance | $\|\Delta Z_r'\| =$ 100 ppm | $\|\Delta Z_r'\| =$ 100 ppm | $\|\Delta Y_r'\| =$ 100 ppm | $\|\Delta Y_r'\| =$ 100 ppm |
| Angle of reflected impedance/admittance | $\arg\{\Delta Z_r\} =$ 45° | $\arg\{\Delta Z_r\} =$ 45° | $\arg\{\Delta Y_r\} =$ 45° | $\arg\{\Delta Y_r\} =$ 45° |

TABLE 1-continued

| | 500 of FIG. 5F | | 540 of FIG. 5G | |
|---|---|---|---|---|
| Circuit Configuration | Series resonant | Parallel resonant | Series resonant | Parallel resonant |
| Sense coil current level $\|I_L\|$ | 20 $mA_{rms}$ | 20 $mA_{rms}$ | 20 $mA_{rms}$ | 20 $mA_{rms}$ |
| Extrinsic noise voltage$V_{sn}$/ current $I_{sn}$ (WPT switching noise) | 10 $\mu V_{rms}$ | 10 $\mu V_{rms}$ | 0.11 $\mu A_{rms}$ | 0.11 $\mu A_{rms}$ |
| SNR of sense signal source 512/552 | $\|I_0\|/I_{0,n} =$ 80 dB | $\|I_0\|/I_{0,n} =$ 80 dB | $\|V_0\|/V_{0,n} =$ 80 dB | $\|V_0\|/V_{0,n} =$ 80 dB |
| Ambient temperature T | 350 K | 350 K | 350 K | 350 K |
| Equiv. noise bandwidth $B_m$ of measurement circuit 510/540 | 200 Hz | 200 Hz | 200 Hz | 200 Hz |
| WPT fundamental disturbance voltage $V_{sW}$/current $I_{sW}$ | 30 $V_{rms}$ | 30 $V_{rms}$ | 11.2 $A_{rms}$ | 11.2 $A_{rms}$ |

Numerical results as obtained from a circuit analysis using the numerical assumptions of TABLE 1 are listed in TABLE 2. While the SNR values are obtained using the corresponding approximate equations as defined above with reference to FIGS. 5F and 5G, the values related to inductances, capacitances, impedances, fractional change, currents, voltages, and power result from using a more accurate analytical tool. TABLE 2 also includes numerical results for the angle error in the measured impedance change ΔZ e.g., in presence of the object 110. In a multipurpose detection circuit 100 employing an angle calibration procedure as previously described with reference to FIG. 5A. For the series resonant configuration of the circuit 500 of FIG. 5F, the angle error is defined as:

$$\varepsilon \approx \arg\{\Delta Z \exp(-j \arg\{Z_{11,0}\})\} - \arg\{\Delta Z'_r\} \quad (178)$$

where $\Delta Z \exp(-j \arg\{Z_{11,0}\})$ denotes the impedance change with the angle correction applied. For the parallel resonant configuration of the circuit 500 of FIG. 5F, it is defined as:

$$\varepsilon \approx \arg\{\Delta Y \exp(-j \arg\{Y_{11,0}\})\} - \arg\{\Delta Z'_r\} \quad (179)$$

For the parallel resonant configuration of the circuit 540 of FIG. 5G, the angle error is defined as:

$$\varepsilon \approx \arg\{\Delta Y \exp(-j \arg\{Y_{11,0}\})\} - \arg\{\Delta Y'_r\} \quad (180)$$

and for the series resonant configuration of the circuit 540 of FIG. 5G, it is defined as:

$$\varepsilon \approx \arg\{\Delta Z \exp(-j \arg\{Z_{11,0}\})\} - \arg\{\Delta Y'_r\} \quad (181)$$

Further, TABLE 2 includes the drive current level $I_0$, the drive power level P required to drive the sense coil 502 of the sense circuit 501 with the sense current $|I_L|$ as specified in TABLE 1. Accordingly, it includes the drive voltage level $V_0$, the drive power level P required to drive the sense coil 502 of the sense circuit 541 with the sense current $|I_L|$ as specified in TABLE 1.

TABLE 2

| | 500 of FIG. 5F | | 540 of FIG. 5G | |
|---|---|---|---|---|
| Circuit Configuration | Series resonant | Parallel resonant | Series resonant | Parallel resonant |
| Capacitance of capacitor 504/544 | $C_s$ = 563 pF | $C_s$ = 402 pF | $C_p$ = 375 pF | $C_p$ = 563 pF |
| Inductance/capacitance of inductor/capacitor 506/546 | $L_p$ = 5 μH | $L_P$ = 2 μH | $C_s$ = 188 pF | $C_s$ = 563 pF |
| Q-factor of sense circuit 501/541 | $Q_s \approx 30$ | $Q_p \approx 30$ | $Q_s \approx 30$ | $Q_p \approx 30$ |
| Precise frequency of minimum $\lvert Z_{11,0}\rvert/\lvert Y_{11,0}\rvert$ | 3.0017 MHz | 2.9959 MHz | 2.9967 MHz | 3.0017 MHz |
| Impedance $\lvert Z_{11,0}\rvert$ of sense circuit 501/541 | 3.13 Ω | 326 Ω | 28.1 Ω | 2.8 kΩ |
| Fractional change $\lvert\Delta Z'\rvert$ | 0.30% | 0.21% | 0.30% | 0.30% |
| Impedance angle error ε | −0.04° | −2.0° | −1.9° | −0.04° |
| Drive current $I_0$/ voltage $V_0$ | ≈20 $mA_{rms}$ | ≈2.3 $mA_{rms}$ | ≈0.19 $V_{rms}$ | ≈1.9 $V_{rms}$ |
| Voltage across $\lvert Z_{11,0}\rvert$/ current through $\lvert Y_{11,0}\rvert$ | ≈63 $mV_{rms}$ | ≈0.76 $V_{rms}$ | ≈6.7 $mA_{rms}$ | ≈0.67 $mA_{rms}$ |
| Drive power P | ≈1.3 mW | ≈1.8 mW | ≈1.3 mW | ≈1.3 mW |
| Differential narrow-band extrinsic SNR (WPT switching noise) | $\Delta SNR_{ex,s} \approx$ 25.5 dB | $\Delta SNR_{ex,p} \approx$ 25.5 dB | $\Delta SNR_{ex,s} \approx$ 25.5 dB | $\Delta SNR_{ex,p} \approx$ 25.5 dB |
| Differential narrow-band intrinsic SNR (Sense signal noise) | $\Delta SNR_{int,s} \approx$ 29.5 dB | $\Delta SNR_{int,p} \approx$ 26.6 dB | $\Delta SNR_{int,s} \approx$ 29.5 dB | $\Delta SNR_{int,p} \approx$ 29.5 dB |
| Differential narrow-band intrinsic SNR (Thermal noise) | $\Delta SNR_{int,s} \approx$ 94.7 dB | $\Delta SNR_{int,p} \approx$ 93.2 dB | $\Delta SNR_{int,s} \approx$ 94.7 dB | $\Delta SNR_{int,p} \approx$ 94.7 dB |
| Broadband extrinsic SNR (WPT fundamental disturbance) | $SNR_{W,s} \approx$ 8.3 dB | $SNR_{W,p} \approx$ 40.8 dB | $SNR_{W,s} \approx$ 6.9 dB | $SNR_{W,p} \approx$ −22.6 dB |

Based on the numerical results of TABLE 2, the following conclusions may be drawn. The high impedance magnitude $\lvert Z_{11,0}\rvert$ as generally presented by the parallel resonant configuration of the circuit 500 of FIG. 5A can be substantially decreased with a moderate loss in fractional change by configuring the sense circuit 501 with an inductance ratio $n_L>1$ (e.g., $n_L=2.5$). Conversely, the low impedance magnitude $\lvert Z_{11,0}\rvert$ as generally presented by the series resonant configuration of the circuit 540 of FIG. 5C can be increased without loss in fractional change by configuring the sense circuit 541 with a capacitance ratio $n_C>1$ (e.g., $n_C=2$). Further, the results in TABLE 2 show circuits and configurations equivalent in terms of the differential narrowband extrinsic SNR (WPT switching noise). Moreover, the numbers for the differential narrowband intrinsic SNR (sense signal noise) show the parallel resonant configuration of the circuit 500 slightly inferior to the other circuits and configurations. The high numbers obtained for the differential narrowband intrinsic SNR (thermal noise) show that thermal noise is negligible, even when WPT is inactive. The numbers resulting for the broadband extrinsic SNR (WPT fundamental disturbance) show a substantial difference (>60 dB) between the parallel resonant configuration of the circuit 500 and 540. The series resonant configuration of the circuit 500 and 540 are almost equivalent and the SNRs are slightly above 6 dB, which may be a minimum requirement in a practical implementation. TABLE 2 further shows a negligible angle error $\lvert\varepsilon\rvert$ for the series resonant configuration of the circuit 500 and the parallel resonant configuration of the circuit 540 and an angle error of about 2° for each of the other configurations. Finally, the current or voltage levels as required at the respective measurement port 508 and 548 for driving the sense coil 502 with the specified sense current level $\lvert I_L\rvert$ may be within suitable ranges of low power electronics for the circuits and configurations as theoretically analyzed herein.

Figure 7A:
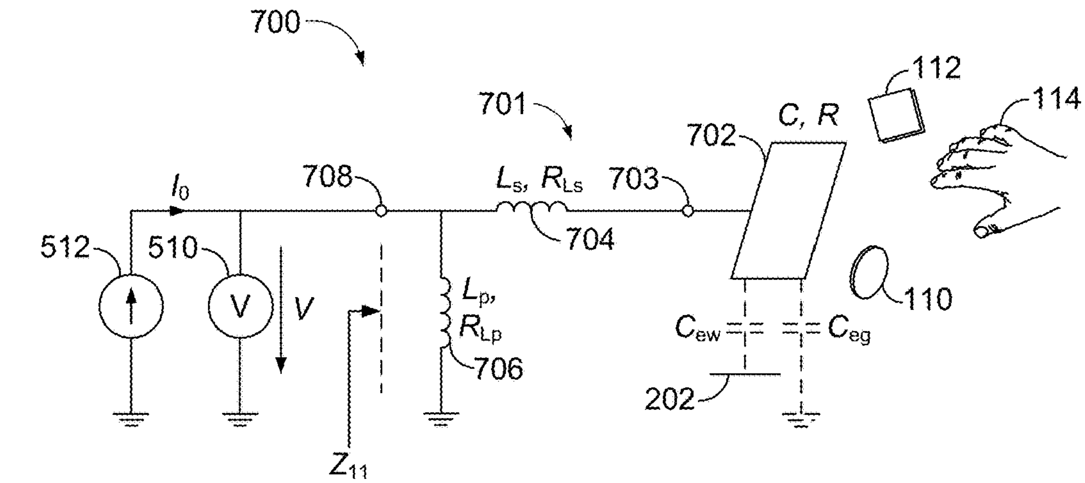
FIG. 7A is a schematic diagram of a circuit illustrating an example implementation of a portion of the multi-purpose detection circuit of FIG. 1 based on capacitive sensing and the impedance measurement approach of FIG. 5A, and the living and the non-living object of FIG. 1.
Figure 7B:
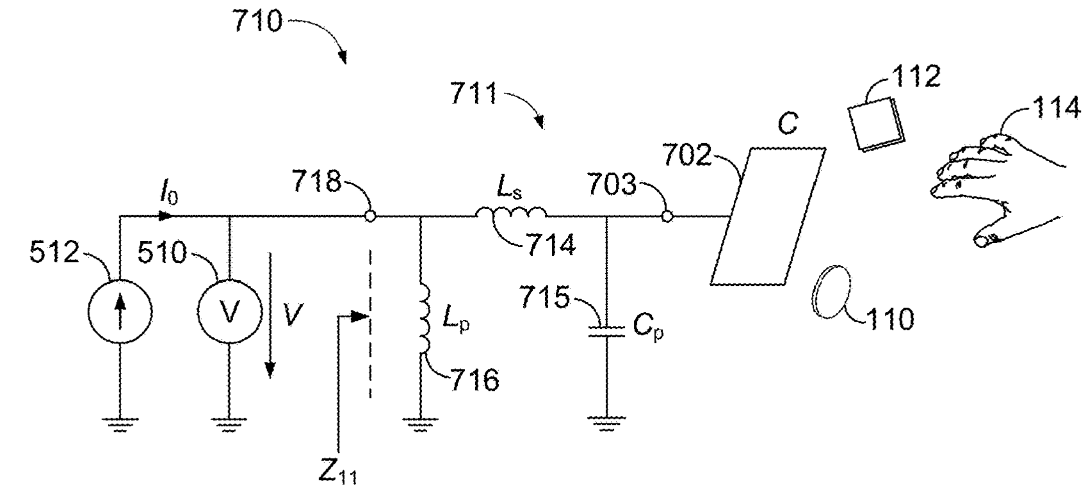
FIG. 7B is a schematic diagram of a circuit illustrating another example implementation of a portion of the multi-purpose detection circuit of FIG. 1 based on capacitive sensing and the impedance measurement approach of FIG. 5A, and the living and the non-living object of FIG. 1.
Figure 7C:
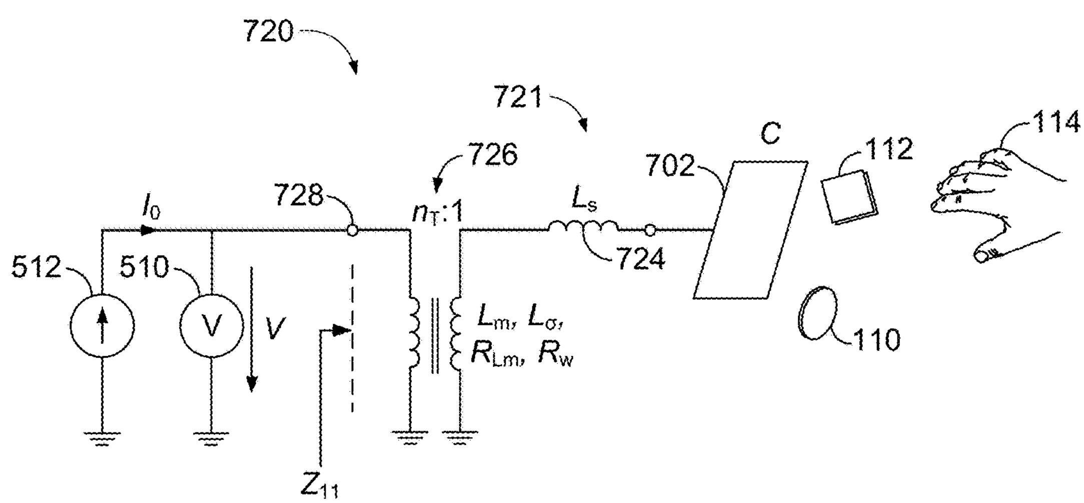
FIG. 7C is a schematic diagram of a circuit illustrating a further example implementation of a portion of the multi-purpose detection circuit of FIG. 1 based on capacitive sensing and the impedance measurement approach of FIG. 5A, and the living and the non-living object of FIG. 1.

FIG. 5H illustrates an "L" equivalent circuit model 526-1 applicable to the non-ideal transformer 526 and 726 with reference to the circuit 520 of FIG. 5B and the circuit 720 of FIG. 7C, respectively. The "L" equivalent circuit comprises an ideal transformer (indicated by the infinity symbol) with transformation ratio $n_T$:1, a secondary referred main inductance $L_m$, and a secondary referred series (leakage) inductance $L_\sigma$.

FIG. 5I illustrates a "T"-equivalent circuit model 562-1 applicable to the double-coil inductive sense elements 562 used in the circuit 560 of FIG. 5D and the circuit 580 of FIG. 5E. The circuit model 562-1 comprises three inductances connected in a "T"-topology and related to the inductance $L_1$, $L_2$, and the mutual inductance $L_M$ as indicated in FIGS. 5D and 5E.

FIG. 5J illustrates another equivalent circuit model 562-2 applicable to the double-coil inductive sense element used in the circuit 560 of FIG. 5D and the circuit 580 of FIG. 5E. The circuit model 562-2 comprises the inductances $L_1$ and $L_2$ in series to the respective current-controlled voltage sources $V_{ind,1}$ and $V_{ind,2}$ representing the voltage induced into the first and second sense coil, respectively.

FIG. 5K shows a table of a summary of selected equations with respect to the resonant frequency, the Q-factor of the sense circuit, the impedance/admittance of the sense circuit, the fractional change, and the various SNRs for the series and parallel resonant configurations of the circuit 500 of FIG. 5F and the circuit 540 of FIG. 5G. As previously noted, these equations are valid for the assumptions made with reference to FIGS. 5F and 5G.

Figure 6:
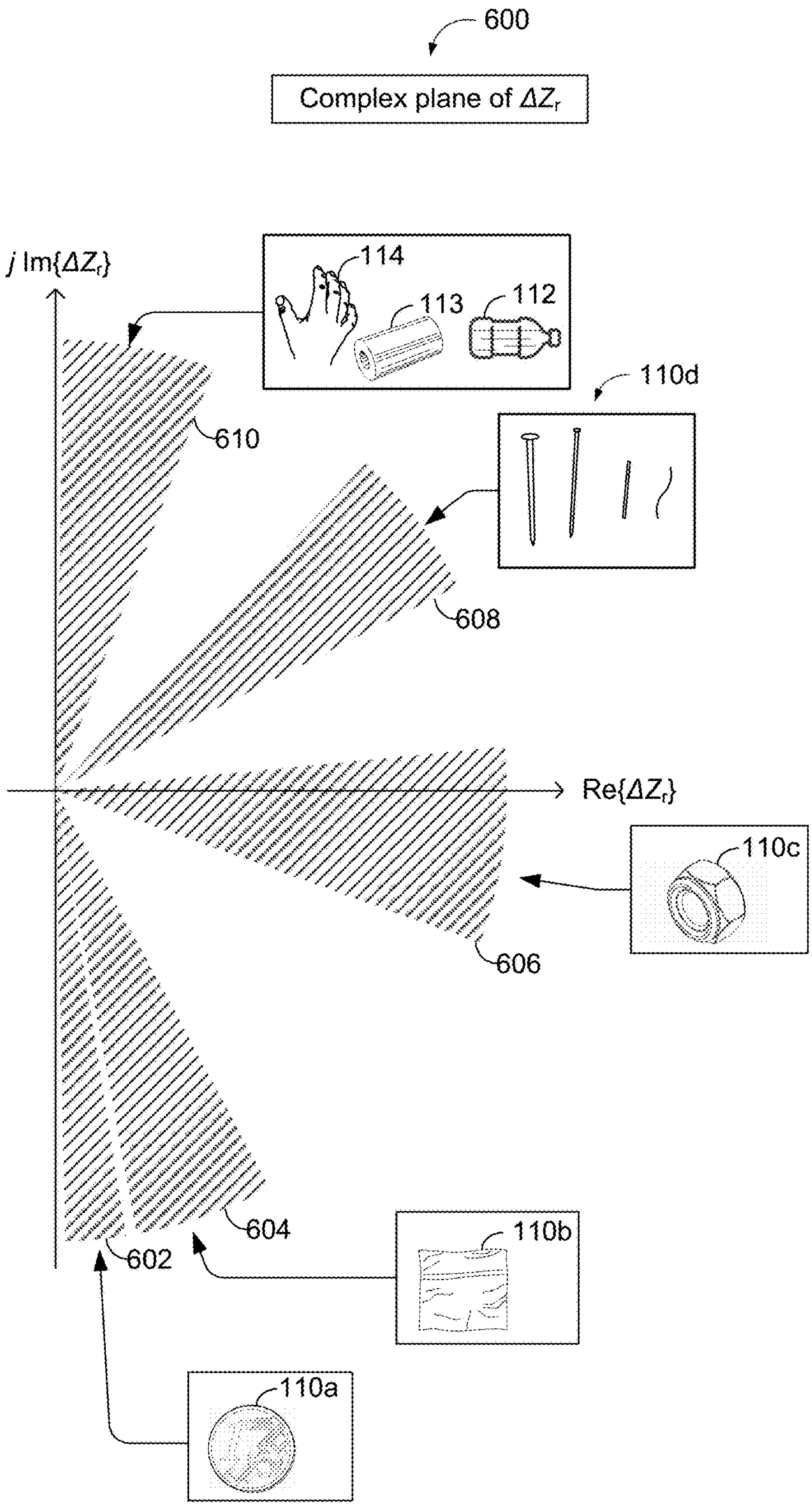
FIG. 6 illustrates a complex impedance plane, different types of objects of FIG. 1, and corresponding areas where changes of impedance may occur in presence of the object.

FIG. 6 illustrates a complex plane 600 or more precisely a complex half plane comprising quadrant 1 and 4 where the reflected impedances $\Delta Z_r$ of different types (categories) of objects (e.g., object 110*a*-110*d*, 112, 113, 114, or vehicle 330) may occur if proximate to a sense coil (e.g., sense coil 502 with reference to FIG. 5A). More specifically, FIG. 6 shows shaded areas (e.g., angle ranges 602 to 610) where the reflected impedances $\Delta Z_r$ of different types (categories) of objects (e.g., object 110*a*-110*d*, 112, 114) may be measured at a sense frequency (e.g., in the MHz range). To emphasize the characteristics of the different categories of objects, the angle ranges 602 to 610 indicated in FIG. 6 may be not drawn to scale and should be considered qualitative rather than quantitative. The actual angle ranges may also depend on the particular sense frequency, certain characteristics of the inductive sense element (e.g., sense coil 502), the capacitive sensing effect of the inductive sense element as previously discussed with reference to FIG. 1, the position and orientation of an object relative to the inductive sense element.

The complex plane 600 and the shaded areas (e.g., angle ranges 602 to 610) may also apply to the reflected admittance $\Delta Y_r$ by simply relabeling the real and imaginary axis by $\mathrm{Re}\{\Delta Y_r\}$ and $j\,\mathrm{Im}\{\Delta Y_r\}$, respectively (not shown in FIG. 6).

Further, FIG. 6 illustrates different types of metallic objects 110 such as a 1 € cent coin (object 110*a*), a metal foil (object 110*b*), a steel nut (object 110*c*), a steel nail, a fixing pin, and steel wire pieces (objects 110*d*). Moreover, it illustrates different types of non-living, substantially non-conductive or weakly conductive objects such as a ferrite core (object 113), a plastic bottle filled with water (object 112), and a living object 114 representing a hand (symbolizing a human extremity).

The angle range 602 (e.g., close to −90°) in quadrant 4 may be characteristic for an object (e.g., object 110*a*) exhibiting a relatively high electric conductivity (e.g., $\sigma>50$ MS/m) and that is substantially non ferromagnetic (relative permeability $\mu_r\approx1$) at the sense frequency. For a sense frequency in the MHz range, the impedance $\Delta Z_r$ reflected by a copper coated coin may be found in the angle range 602.

The angle range 604 (e.g., around −80°) in quadrant 4 may be characteristic for an object (e.g., 110) exhibiting a substantially lower equivalent conductivity (e.g., $\sigma>5$ MS/m) and substantially no ferromagnetic effect (relative permeability $\mu_r\approx1$) at the sense frequency. A piece of thin foil or metallized paper (e.g., aluminum coated paper) as illustrated in FIG. 6 by object 110*b* (e.g., with a thickness of the metal layer smaller than the skin depth δ at the sense frequency) may reflect an impedance $\Delta Z_r$ in the angle range 604 for a sense frequency in the MHz range.

The angle range 606 (around 0°) in quadrant 4 and 1 may be characteristic for an object (e.g., object 110*c*) exhibiting a relatively high conductivity (e.g., $\sigma>10$ MS/m) and a substantial ferromagnetic effect (e.g., $\mu_r>50$) at the sense frequency. An object made of ferromagnetic steel may reflect an impedance $\Delta Z_r$ in the angle range 606 for a sense frequency in the MHz range. Ferromagnetism ($\mu_r>1$) in the metallic object 110*c* generally reflects an impedance $\Delta Z_r$ with an imaginary part $\mathrm{Im}\{\Delta Z_r\}>0$. On the other hand, the electrical conductivity of the metallic object 110*d* generally reflects an impedance $\Delta Z_r$ with $\mathrm{Im}\{\Delta Z_r\}<0$ and $\mathrm{Re}\{\Delta Z_r\}>0$. Superimposing the two opposing effects may result in a net reflected impedance $\Delta Z_r$ e.g., in the angle range 606.

The angle range 608 (e.g., around 45°) in quadrant 1 may be characteristic for an object (e.g., object 110*d*) exhibiting a relatively high conductivity (e.g., $\sigma>10$ MS/m) and a substantial ferromagnetic effect (e.g., $\mu_r>50$) at the sense frequency and with a length substantially larger than a thickness. An object made of ferromagnetic steel and with such geometry may reflect an impedance $\Delta Z_r$ in the angle range 606 for a sense frequency in the MHz range. Ferromagnetism ($\mu_r>1$) in the metallic object 110*d* generally reflects an impedance $\Delta Z_r$ with a positive imaginary part that prevails the conductivity effect acting in the opposite direction as described above with reference to the object 110*c*. Superimposing the two effects results is a net reflected impedance $\Delta Z_r$ with a positive imaginary part ($\mathrm{Im}\{\Delta Z_r\}>0$) substantially equal to the real part $\mathrm{Re}\{\Delta Z_r\}$ corresponding to the angle range 608. A reflected impedance $\Delta Z_r$ in this angle range may also be observed from a paper clip made of ferromagnetic steel (not shown in FIG. 6).

Finally, the angle range 610 (e.g., close to 90°) in the quadrant 1 may be characteristic for a substantially non-conductive object (e.g., object 112, object 114) that exhibits a dielectric effect ($\varepsilon_r>1$) at the sense frequency. A dielectric object (e.g., object 112) may reflect an impedance $\Delta Z_r$ in the angle range 610. A living object (e.g., object 114) may also reflect an impedance $\Delta Z_r$ in the angle range 610. As previously discussed in connection with FIG. 5A, dielectric objects (e.g., object 112 or 114) may interact with the sense coil (e.g., sense coil 502 of FIG. 5A) via the electric stray field generated by the sense coil's parasitic capacitances (e.g., $C_{iw}$, $C_{gnd}$, and $C_{wpt}$) as illustrated in FIG. 5A. Further, the angle range 610 (e.g., close to 90°) in quadrant 1 may be characteristic for a substantially non-conductive object (e.g., object 113) that exhibits a ferromagnetic effect ($\mu_r>1$) at the sense frequency. An object made of ferrite material (e.g., object 113) may reflect an impedance $\Delta Z_r$ in the angle range 610.

In an aspect of the multi-purpose detection circuit 100, objects 110 (e.g., object 110*a*, 110*b*, 110*c*, 110*d*) reflecting an impedance $\Delta Z_r$ in the respective angle ranges 602, 604, 606, and 608 or anywhere between these ranges may be subject of induction heating if exposed to the strong WPT magnetic field. This may be particularly true for thin foils (e.g., object 110*b*) and objects that are both substantially electrically conductive and ferromagnetic (e.g., objects 110*c* and 110*d*). Ferromagnetism in a metallic object (e.g., object 110*c*) may result in a pronounced skin effect displacing the induced eddy currents into a thin layer (skin) at the surface of the object. This may substantially reduce the effective electrical conductivity of the object causing substantially higher power dissipation if compared to a non-ferromagnetic metallic object. Further, lengthy ferromagnetic, metallic objects (e.g., objects 110*d*) that may reflect an impedance $\Delta Z_r$ in the angle range 608 tend to experience magnetic saturation resulting in excessive hysteresis losses and consequent heating. Therefore, this object category may be characterized by the highest loss power density (e.g., in Watt per unit surface area) and thus highest heating temperatures. Therefore, it may be desirable to selectively increase a sensitivity of a multi-purpose detection circuit 100 to objects (e.g., objects 110) of this category as disclosed in U.S. Pat. No. 10,495,773 titled Improving Foreign Object Detection for Ferromagnetic Wire-Like Objects, the entire contents of which are hereby incorporated by reference.

In another aspect of the multi-purpose detection circuit 100, the inductive sense circuit (e.g., inductive sense circuit 501 of FIG. 5A using sense coil 502) may be used for capacitive sensing of living objects (e.g., a human hand, a cat, or any other animal) that are predominantly dielectric and that may be located in proximity of the sense coil. Such a case may require the multi-purpose detection circuit 100 to be able to discriminate dielectric objects (e.g., object 112*b* or 114) from metallic objects (e.g., object 110) considering different measures may apply upon detection of a dielectric object (e.g., object 112 or 114) than for a metallic object (e.g., object 110*b*). In some implementations, detection of a metallic object (e.g., object 110*b*) may require immediate shutdown of the WPT while detection of a dielectric object (e.g., object 112) may be ignored.

In a further aspect of the multi-purpose detection circuit 100 relying on a time-differential detection scheme as previously described with reference to FIG. 1, the complex impedance plane of FIG. 6 may refer to the complex output of a time-differential detector. An object (e.g., object 110*a*) brought into proximity of the sense coil 502 may cause the time-differential detector to produce a complex output $\Delta Z/\Delta t$ whose angle $\arg\{\Delta Z/\Delta t\}$ is indicative of the angle of the reflected impedance $\Delta Z_r$ of the object. However, if this object is removed from the proximity of sense coil 502, it may cause the time-differential detector to temporarily produce an output $-\Delta Z/\Delta t$ whose angle is indicative of the angle of $-\Delta Z_r$ (the sign inverted reflected impedance). Therefore, outputs of a time-differential detector may fall in all four quadrants of the complex plane 600, depending on the reflected impedance $\Delta Z_r$ of the object and whether it is brought into or removed from the proximity of the sense coil 502.

It may be appreciated that discriminating objects (e.g., object 112 from object 110*a*) reflecting an impedance $\Delta Z_r$ close to the imaginary axis (angle ranges 610 and 602, respectively) based on the angle of complex outputs of a time-differential detector may require accurate measurement of the angle $\arg\{\Delta Z_r\}$. With the object 112, an error in the measured angle of a few degrees may cause the output of the time-differential detector to infringe into the angle range 602, when the object 112 is removed from the proximity of the sense coil 502 as explained above. Such event may pretend a metal object (e.g., object 110*a*) brought into the proximity of sense coil 502 and a cause for a false detection.

In some implementations of the multi-purpose detection circuit 100, a reliable discrimination between the object 112 and the object 110*a* based on the angle of complex outputs of a time-differential detector can hardly be achieved. This may cause an issue e.g., in presence of water accumulation on the surface of the housing of a wireless power transfer structure (e.g., housing 328 of the wireless power transfer structure 200 with reference to FIG. 2). Such water accumulation may be caused by rain, condensation, melting of snow or ice, or splashing from passing vehicles. Due to the cohesiveness of water (surface tension) and a hydrophobic plastic surface of the housing 328, water accumulation may form puddles that may be considered as a dielectric object 112. Due to an uneven (e.g., slightly cambered) surface and the limited water storage capacity on the surface of the housing 328, a water bubble is generally moving with a trend towards an edge of the surface of the housing 328 where it eventually flows down the ramp of the housing 328 (as shown in FIG. 3) towards ground as part of a natural draining process. A water object (e.g., a water bubble, object 112) moving (flowing) on the surface of the housing 328 into the proximity of a sense coil 502 may first cause an output of the time-differential detector in the angle range 610. However, when leaving the proximity of a sense coil 502, it may cause a complex output in the angle range 602 (due to the angle error) potentially triggering a false positive detection of a metal object (e.g., metal object 110*a*).

Because the magnitude of the complex output $\Delta Z/\Delta t$ of the time-differential detector increases with the speed of movement (first time derivative) of the water object, the probability of a false positive detection of a metal object (e.g., metal object 110*a*) increases with the speed of the water flow.

In another aspect, experiments with drain water flows on the surface of a wireless power transfer structure have shown that the impedance $\Delta Z_r$ as reflected by the water object depends on its shape but also on its ion concentration (e.g., salinity). More specifically, these experiments with water of any non-zero ion concentration (excluding pure distilled water) have shown the angle $\arg\{\Delta Z_r\}$ changing with the shape of the water object. An elongated water bubble typically reflects an impedance $\Delta Z_r$ with an angle $\arg\{\Delta Z_r\}$ substantially smaller than 90° (with a substantial real part), while the angle produced by a more rotund bubble and an ion-concentration equal to or less than sea water can be found close to 90°. This water phenomena are described in more detail in connection with FIGS. 8A to 8H. Because the shape of a water object in a draining process is continuously changing to some extent, temporal variations of the angle $\arg\{\Delta Z_r\}$ can be used as a characteristic for detecting drain water flows on the surface of a wireless power transfer structure.

In a further aspect to reduce the probability of false positive detections due to presence of drain water flow on the surface of a wireless power transfer structure, some implementations of the multi-purpose detection circuit 100 employ a water flow detector configured for detecting formation and flow of water puddles. Outputs of the water flow detector are used to discriminate a water object (e.g., object 112, water bubble) from a metal object (e.g., object 110*a*) and thus to prevent a false positive detection.

In some implementations, the water flow detector is based on a pattern recognition approach using a plurality of time series of complex outputs of a time-differential detector. Each time series is associated to a sense element of the plurality of sense elements 107*a*, 107*b*, . . . , 107*n* in the array 107. More specifically, water flow detection exploits the peculiar characteristics in the temporal and spatial patterns as produced by the drain water flow affecting a cluster of sense elements of the plurality of sense elements 107*a*, 107*b*, . . . , 107*n* in the array 107. In some implementations, a spatial pattern is created by mapping quasi-concurrent outputs of the time-differential detector onto a two-dimensional matrix consisting of a plurality of elements arranged in lines and columns. The position of each matrix element corresponds to the position of the associated sense element in the two-dimensional array 107. A temporal and spatial pattern refers to a three-dimensional matrix consisting of a plurality of elements arranged in lines, first columns, and second columns where the elements of a second column are consecutively received outputs of the time-differential detector associated to a sense coil (e.g., sense element 107*a* with reference to FIG. 1).

In another implementation, the water flow detector is based on a pattern recognition approach using at least in part a plurality of time series of complex detector outputs indicative of the impedance $Z_{11}$ with reference to FIGS. 5A to 5C. In a further implementation, the water flow detector is based on a pattern recognition approach using at least in part a plurality of time series of complex detector outputs indicative of the impedance $Z_{21}$ with reference to FIGS. 5D and 5E. In yet another implementation, the water flow detector is based on a pattern recognition approach using at least in part a plurality of time series of detector outputs indicative of another electrical characteristic of a sense coil (e.g., sense element 107*a*) or the sense circuit (e.g., sense circuit 106*a*).

FIGS. 7A to 7I illustrate example implementations of another portion of the multi-purpose detection circuit 100 of FIG. 1 based on capacitive sensing by measuring at least one electrical characteristic (e.g., a complex impedance). These examples are to illustrate the principle of the sensing and measurement technique and do not show all the details of a multi-purpose detection circuit 100. Particularly, for illustrative purposes, they only show a single capacitive sense circuit rather than the plurality of capacitive sense circuits (e.g., the plurality of capacitive sense circuits 108*a*, 108*b*, . . . , 108*n* with reference to FIG. 1). Further, they do not show the details of the signal generation, signal processing, and evaluation as it may be required e.g., for determining at least one of a presence of a foreign object, a living object, a vehicle, a type of vehicle, and a position of the vehicle and as illustrated by the block diagram of FIG. 4.

The descriptions of the circuits 700, 710, 720, 730, 740, and 750 of FIGS. 7A to 7F, respectively, are based on measuring a one-port impedance $Z_{11}$, while the circuits 760, 770, and 780 of FIGS. 7F to 7I, respectively, employ a two-port transimpedance $Z_{21}$ measurement at the sense frequency e.g., using a sinusoidal sense signal. However, this should not exclude implementations configured to measure other electrical characteristics using other sense signal waveforms (e.g., multi frequency signals, pulse signals, pseudo random signals, etc.).

In some implementations, the sense signal is a high frequency signal with a spectrum substantially in the MHz range (e.g., in a range from 2.5 MHz to 3.5 MHz). In other implementations, the sense signal is constraint to the range from 3.155 MHz to 3.400 MHz for frequency regulatory reasons as previously mentioned in connection with FIGS. 5A to 5F. In some geographic regions or countries, this frequency range may permit higher magnetic field strength level H in the specified distance from the plurality of capacitive sense elements (e.g., the plurality of capacitive sense elements 109 of the multi-purpose detection circuit 100).

The ground symbol shown in the schematic diagrams of FIGS. 7A to 7I indicate a network node on ground potential referred to as the "circuit ground". However, this should not exclude non-ground-based implementations or implementations that use different grounds on different potentials.

The circuit 700 of FIG. 7A illustrates an example implementation based on measuring a complex impedance $Z_{11}$ of a one-port capacitive sense circuit 701 (shown in FIG. 7A as the circuit on the right side of the dashed line). More specifically, the impedance $Z_{11}$ is measured at the measurement port 708 (indicated in FIG. 7A by a terminal and a dashed line) by applying, from the current source 512, a sinusoidal current $I_0$ at the sense frequency (e.g., in the MHz range) with a defined amplitude and phase and by measuring, using a voltage measurement circuit 510, the complex open-circuit voltage V (amplitude and phase) as previously described with reference to FIG. 5A.

The sense circuit 701 comprises a single-electrode capacitive sense element 702 (single-ended sense electrode 702) having a signal terminal 703, a capacitance C and an equivalent series resistance R, a series inductor 704 having an inductance $L_s$ and an equivalent series resistance $R_{Ls}$ electrically connected in series to the sense electrode 702 at the signal terminal 703, and a parallel inductor 706 having an inductance $L_p$ and an equivalent series resistance $R_{Lp}$ electrically connected to the series inductor 704 and in parallel to the measurement port 708.

It may be appreciated that electrical losses in the series inductor 704 and in the parallel inductor 706 are the most prominent losses in the capacitive sense circuit 701. These losses may prevail the electrical losses intrinsic to the sense electrode 702 and extraneous losses in its surrounding materials (e.g., the Litz wire of the WPT coil 202, the ferrite, and the plastic housing of the wireless power transfer structure 200 where the sense electrode 702 may be integrated). These materials may interact with the predominantly electric field as generated by the sense electrode 702 causing some losses that may be included in the equivalent series resistance R as indicated in FIG. 7A.

The sense electrode's 702 capacitance C may include various capacitances as indicated in FIG. 7A by dashed lines. Particularly, it may include capacitance $C_{eg}$ of the sense electrode 702 towards ground and a capacitance $C_{ew}$ towards the WPT coil 202 with reference to FIG. 2. The circuit 700 further illustrates the sense signal current source 512 and the voltage measurement circuit 510 both electrically connected to the sense circuit 701 at the measurement port 708.

The sense electrode 702 may also include a self-inductance (not indicated in FIG. 7A). The associated magnetic fields may interact with a metallic object (e.g., object 110). However, this effect may be insignificant compared to that of the electric field that also interacts with a metallic object (e.g., object 110).

The sense circuit 701 may be configured to provide a local minimum in the impedance magnitude $|Z_{11,0}(\omega)|$ (series resonance) substantially at the nominal sense frequency (e.g., at 3 MHz), where $Z_{11,0}$ refers to the impedance as presented by the sense circuit 701 at the measurement port 708 in absence of a foreign object with reference to FIG. 3. Alternatively, the sense circuit 701 may be configured to provide a local minimum of the admittance magnitude function $|Y_{11,0}(\omega)|$ (parallel resonance) substantially at the nominal sense frequency, where $Y_{11,0}$ ($=1/Z_{11,0}$) refers to the admittance as presented by the sense circuit 701 at the measurement port 508 in absence of a foreign object.

In an example series resonant configuration of the sense circuit 701, the reactance of the series inductor 704 substantially compensates for the reactance of the sense electrode 702 at the nominal sense frequency providing an impedance $Z_{11,0}$ that is substantially real (resistive). In this configuration, the inductance $L_p$ of the parallel inductor 706 may be similar or larger than the inductance $L_s$ of the series inductor 704. In other terms, the impedance magnitude of the parallel inductor 706 may be substantially (e.g., 10 times) higher than the impedance magnitude $|Z_{11,0}|$ as presented at the nominal sense frequency. In this configuration, the parallel inductor 706 may exert a negligible impact on the impedance $|Z_{11,0}|$ at the nominal sense frequency.

In an example parallel resonant configuration of the sense circuit 701, the reactance of the series inductor 704 under-compensates for the reactance of the sense electrode 702 at the nominal sense frequency. The residual capacitive susceptance of the series connection of the inductor 704 and the sense electrode 702 is substantially compensated for by the susceptance of the parallel inductor 706 providing an admittance $Y_{11,0}$ that is substantially real (resistive). In this configuration, the inductance $L_p$ of the parallel inductor 706 may be smaller, similar, or larger than the inductance $L_s$ of the series inductor 704. Stated in other terms, the admittance magnitude of the parallel inductor 706 may be substantially (e.g., 20 times) higher than the admittance magnitude $|Y_{11,0}|$ as presented at the nominal sense frequency. In this configuration, the parallel inductor 706 exerts a significant impact on the admittance $Y_{11,0}$ at the nominal sense frequency.

In some implementations, the parallel inductor 706 together with the series inductor 704 are used for purposes of resonance tuning and impedance transformation, e.g., to transform the impedance $Z_{11}$ to match the sense circuit 701 with an operating impedance range as previously mentioned with reference to FIG. 1. The inductance ratio $L_s/L_p$ may be a parameter to control the impedance magnitude $|Z_{11,0}|$.

Impedance transformation may be particularly effective, if the sense circuit 701 is configured for parallel resonance. More specifically, increasing the inductance ratio $L_s/L_p$, while maintaining parallel resonance at the nominal sense frequency, may substantially increase the admittance $|Y_{11,0}|$ of the parallel resonant configuration at the nominal sense frequency.

Increasing the inductance ratio $L_s/L_p$, while maintaining resonance at the nominal sense frequency, may also somewhat decrease the impedance $|Z_{11,0}|$ as presented at the nominal sense frequency in the series resonant configuration of the sense circuit 701. However, impedance transformation may be limited and far less effective than that of the parallel resonant configuration.

In another aspect of resonance tuning, at least one of the series inductor 704 and the parallel inductor 706 include a variable inductor as previously discussed with reference to FIG. 5A. In some implementations of the circuit 70, at least one of the variable inductors 704 and 706 is used to compensate for a temperature drift, an aging, or a detuning of the sense circuit 701 caused by an external impact and to maintain its resonance substantially at the nominal sense frequency. In a further aspect, the variable inductor 704 in combination with the variable inductor 706 are used to vary the impedance $|Z_{11,0}|$ of the sense circuit 711.

In yet another aspect, the sense electrode's 702 capacitance C in combination with the parallel inductor 706 form a $2^{nd}$ order high pass filter to attenuate a low frequency disturbance component in the voltage V for purposes as previously discussed with reference to FIG. 5A. This low frequency disturbance component may emanate from a disturbance current capacitively coupled into the sense electrode 702 (e.g., via capacitance $C_{ew}$) during wireless power transfer.

With reference to FIG. 1, the sense circuit 701, the sense electrode 702, and the series inductor 704 may correspond e.g., to the capacitive sense circuit 108*a*, the capacitive sense element 109*a* (comprising a double-ended sense electrode that may be electrically connected in parallel to form a single-ended sense electrode), and the associated inductive element, respectively. The current source 512 may include the signal generator circuit 406 and the driver circuit 402, while the voltage measurement circuit 510 may include the measurement amplifier circuit 404 and the signal processing circuit 408 with reference to FIG. 4.

In some implementations, the current source 512 may be characterized by a quasi-ideal current source and the voltage measurement circuit 510 by a quasi-ideal voltage measurement circuit as previously defined with reference to FIG. 5A.

Though not shown herein, other impedance measurement techniques (e.g., the voltage source current measurement technique) may also be contemplated as previously discussed with reference to the circuit 500 of FIG. 5A.

Further, in some implementations, measurement of the voltage V and thus of the impedance $Z_{11}$ may be affected by noise and other disturbance signals reducing a detection sensitivity of the multi-purpose detection circuit 100. The noise may include circuit intrinsic noise as generated in active and passive components of the circuit 700 of FIG. 7A. It may also include quantization noise e.g., generated in a digital implementation of the signal generator circuit 406 and the signal processing circuit 408 with reference to FIG. 4. Other disturbance signals may emanate from sources external to the circuit 700 (e.g., from the WPT system during wireless power transfer, from a switched-mode power supply, from a digital processing unit, etc.). These circuit extrinsic disturbance signals may be capacitively coupled (e.g., via capacitance $C_{ew}$) to the sense electrode 702 and may include the fundamental and harmonics of the WPT operating frequency and other switching noise components as generated by the WPT system. Therefore, in some implementations, the voltage measurement circuit 510 includes a filter to selectively filter the sense signal and to suppress noise and other disturbance signal components as previously discussed with reference to FIG. 5A Moreover, in implementations employing a selective voltage measurement circuit 510 as discussed above, the sense signal waveform as generated by the current source 512 and the corresponding filter of the voltage measurement circuit 510 are adapted e.g., to improve the SNR and consequently to improve the detection sensitivity as previously discussed with reference to FIG. 5A.

With reference to FIG. 1, FIG. 7A also illustrates the non-living objects 110 and 112 and the living object 114 proximate to the sense electrode 702. Presence of the object 110,112, 114, or vehicle 330 may cause a change in one or more electrical characteristics of the sense circuit 701. As non-limiting examples, it may cause a change in the capacitance C and in the equivalent series resistance R resulting in an impedance change $\Delta Z$ with respect to the impedance $Z_{11,0}$ as measured in absence of a foreign object with reference to FIG. 3. Presence of an object (e.g., object 114) may be determined if $\Delta Z$ satisfies certain criteria (e.g., the magnitude of $\Delta Z$ exceeds a detection threshold). Though not shown in FIG. 7A, a change $\Delta Z$ in the measured impedance $Z_{11}$ may also be caused by the underbody of a vehicle or by the vehicle-based wireless power transfer structure (e.g., vehicle 330 and vehicle-based wireless power transfer structure 310 with reference to FIG. 3), which may indicate presence of a vehicle above the sense electrode 702. Further, an impedance change $\Delta Z$ may also be caused by a substantially conductive (metallic) object (e.g., object 110) proximate to the sense electrode 702 since it also interacts with the electric field as generated by the sense electrode 702. Stated in other terms, a metal object (e.g., object 110) proximate to the sense electrode 702 may change one or more the capacitances $C_{eg}$ and $C_{ew}$ as illustrated in FIG. 7A as well as the self-inductance as previously mentioned.

In an implementation of the circuit 700 based on measuring the admittance $Y_{11}$, presence of the object 110, 112, 114, or vehicle 330 may cause a change $\Delta Y$ with respect to the admittance $Y_{11,0}$ as measured in absence of a foreign object. Analogously, presence of an object (e.g., object 110) may be determined if $\Delta Y$ satisfies certain criteria (e.g., the magnitude of $\Delta Y$ exceeds a detection threshold).

As previously discussed with reference to the circuit 500 of FIG. 5A using a quasi-ideal current source 512, a change $\Delta Z$ in the impedance $Z_{11}$ (e.g., due to the presence of the object 114) manifests in a change $\Delta V$ in the voltage V that is proportional to $\Delta Z$ while the current $I_0$ remains substantially unaffected. Therefore, measuring the complex voltage V may be equivalent to measuring the complex impedance $Z_{11}$ and there may be no requirement for additionally measuring the current I thus reducing complexity of the measurement circuit (e.g., measurement circuit 104 of FIG. 1)

With reference to Equation (8) and (9), the fractional change $\Delta Z'$ (or $\Delta Y'$) caused by a defined test object (e.g., object 112) placed at a defined position relative to the sense electrode 702 may relate to the detection sensitivity of an object detection circuit (e.g., the multi-purpose detection circuit 100 of FIG. 1) based on the one-port capacitive sense circuit 701. More specifically, increasing the fractional change $\Delta Z'$ (or $\Delta Y'$) may increase the SNR as defined by Equation (10). As non-limiting examples, the fractional change $\Delta Z'$ (or $\Delta Y'$) may be increased by optimizing the design of the sense electrode 702 with respect to its geometry and its integration into the wireless power transfer structure (e.g., wireless power transfer structure 200 with reference to FIGS. 2 and 3), by resonance tuning e.g., using the series inductor 704, and by improving the Q-factor of the sense circuit 701. Improving the Q-factor may increase the SNR, if the noise voltage $V_n$ is predominantly circuit intrinsic noise as discussed below with reference to FIG. 7J.

As further analyzed and discussed below with reference to FIG. 7J, use of the parallel inductor 506 for purposes of parallel resonance tuning and impedance transformation may result in a lower fractional change if compared to the fractional change of the series resonant configuration of the sense circuit 701.

As previously discussed with reference to the circuit 500 of FIG. 5A, it may be desirable to discriminate between certain categories of objects e.g., between living objects (e.g., object 114) and non-living objects (e.g., object 112). In another aspect, it may also be desirable to discriminate e.g., between living objects (e.g., object 114) and the vehicle 330 with reference to FIG. 3. As further discussed below with reference to FIG. 8A, this may be accomplished based on characteristics of the change of the sense electrode's 702 impedance as produced by any of the objects 110, 112, 114, or vehicle 330, also referred to herein as the reflected impedance $\Delta Z_r$. As further discussed below with reference to FIG. 8A, the reflected impedance $\Delta Z_r$ and particularly the angle $\arg\{\Delta Z_r\}$ may reflect electrical properties of the object 110, 112, 114, or vehicle 330. The same is true for the reflected admittance $\Delta Y_r$.

In some implementations and configurations of the circuit 700 of FIG. 7A, the change $\Delta Z$ in the impedance $Z_{11}$ caused by an object (e.g., object 114) is indicative of the reflected impedance $\Delta Z_r$. Therefore, in an aspect of object discrimination, the circuit 700 may be configured to determine the angle $\arg\{\Delta Z\}$ with the required accuracy. However, in some implementations, measuring the angle $\arg\{\Delta Z\}$ may be subject to errors for various reasons as previously discussed with reference to FIG. 5A.

In an aspect of reducing an error in the measurement of the angle $\arg\{\Delta Z\}$, some implementations of a multipurpose detection circuit 100 employ a phase calibration of the analog circuitry (e.g., the analog front end portion of the measurement circuit 104 with reference to FIG. 4) as previously described with reference to FIG. 5A.

Reactance compensation (resonance tuning) in the sense circuit 701 produces a local extremum (minimum or maximum) in the impedance magnitude function $|Z_{11,0}(\omega)|$ and hence in the voltage magnitude $|V|$ across the measurement port 708. Therefore, reactance compensation provides a mean to calibrate the voltage measurement circuit 510 and hence the impedance measurement with respect to the angle $\arg\{\Delta Z\}$.

In a first step of an example calibration procedure applicable to the series resonant configuration of the circuit 700 of FIG. 7A, the sense frequency is adjusted to the local minimum of the voltage magnitude $|V|$ as measured by the voltage measurement circuit 510 supposing absence of a foreign object. At this frequency, the complex impedance $Z_{11,0}$ and hence the complex voltage V across the measurement port 708 may be substantially real. Otherwise stated, the angles $\arg\{Z_{11,0}\}$ and $\arg\{V\}$ are substantially zero. In a second step of the example calibration procedure, the voltage measurement circuit 510 is corrected by applying a phase shift (impedance plane rotation) as previously described with reference to FIG. 5A and defined by Equation (13).

Applying the angle correction of Equation (13), an object (e.g., object 114) reflecting an impedance $\Delta Z_r$ that is imaginary (reactive) may cause a measured voltage change $\Delta V_{cal}$ that is substantially imaginary. Nevertheless, a small residual error may remain in the angle $\arg\{\Delta V_{cal}\}$ due to the impact of the parallel inductor 706 and the electrical losses in the sense circuit 701. The residual angle error of an example series resonant configuration of the circuit 700 and for an example object 114 is provided in TABLE 4.

In some implementations, the residual error described above is reduced by configuring the parallel inductor 706 with an inductance $L_p$ whose impedance $Z_{Lp}$ is substantially larger (e.g., 10 times larger) than the series resonant resistance of the sense circuit 701. In other implementations, the residual error is reduced by measuring the impedance $Z_{11,0}$ at two or more substantially different frequencies and by determining the elements of an equivalent circuit model of the sense circuit 701 (e.g., the equivalent circuit model illustrated in FIG. 7J) based on the measured impedances $Z_{11,0}$ employing a best fit method. In some implementations, these two or more frequencies include at least the frequency of the minimum and the maximum of $|Z_{11,0}(\omega)|$.

In an implementation of the multipurpose detection circuit 100 using a plurality of capacitive sense circuits (e.g., capacitive sense circuits 108*a*, 108*b*, . . . , 108*n*), each including a respective capacitive sense element (e.g., capacitive sense element 109*a*, 109*b*, . . . , 109*n*), a residual error may be caused by a parasitic resonance effect of sense circuits associated to adjacent capacitive sense elements of an arrangement of sense electrodes. More precisely, a residual error in a first sense circuit (e.g., capacitive sense circuit 108*a*) including a first capacitive sense element (e.g., capacitive sense element 109*a*) may be caused by a parasitic resonance effect of at least one second capacitive sense circuit (e.g., capacitive sense circuit 108*b*) including a second capacitive sense element (e.g., capacitive sense element 109*b*) that is located adjacent to the first capacitive sense element.

Therefore, in some implementations of the multipurpose detection circuit 100, the measurement accuracy of the angle $\arg\{\Delta Z\}$ and thus of the angle $\arg\{\Delta Z_r\}$ is increased by an optimized design of the sense electrode 702 and by introducing some spacing between adjacent sense electrodes 702 in an arrangement of sense electrodes.

In an implementation configured for parallel resonance as defined above, the circuit 700 may be configured to measure the admittance $Y_{11}$ and corresponding changes $\Delta Y$ of $Y_{11}$ as caused by the object 110, 112, 114, or vehicle 330. In this case, the admittance change $\Delta Y$ may be indicative of the reflected impedance $\Delta Z_r$ as previously introduced. As discussed above with reference to the series resonant configuration, the angle $\arg\{\Delta Y\}$ may be subjected to an error and therefore may require calibration to reduce an error in the measurement of the angle $\arg\{\Delta Y\}$ and thus of the angle $\arg\{\Delta Z_r\}$.

In an implementation configured for parallel resonance, the circuit 700 may be calibrated analogously to the series resonant configuration however using the local minimum of the admittance function $|Y_{11,0}(\omega)|$ where susceptance compensation occurs.

In a first step of an example calibration procedure applicable to the parallel resonant configuration of the circuit 700 of FIG. 7A, the sense frequency is adjusted to the local maximum of the voltage magnitude $|V|$ as measured by the uncalibrated voltage measurement circuit 510 supposing absence of a foreign object. At this frequency, the admittance $Y_{11,0}$ and hence the voltage V across the measurement port 708 may be substantially real. Otherwise stated, the angles $\arg\{Y_{11,0}\}$ and $\arg\{V\}$ are substantially zero. In a second step of the example calibration procedure, the voltage measurement circuit 510 is corrected by applying a phase shift (impedance plane rotation) as defined above by Equation (13).

Applying the angle correction of Equation (13), an object (e.g., object 114) reflecting an impedance $\Delta Z_r$ that is imaginary (reactive) produces a measured voltage change $\Delta V_{cal}$ that is substantially imaginary. A residual error may remain in the angle $\arg\{\Delta V_{cal}\}$ due to the transformation of $\Delta Z_r$ to $\Delta Y$ in the lossy sense circuit (e.g., sense circuit 701). The residual angle error of an example parallel resonant configuration of the circuit 700 and for an example reflected impedance $\Delta Z_r$ is provided in TABLE 4.

In an example implementation, the residual error due to the transformation of $\Delta Z_r$ to $\Delta Y$ is reduced by measuring the admittance $Y_{11,0}$ at two or more substantially different frequencies, supposing absence of a foreign object, and by determining the elements of an equivalent circuit model (e.g., the equivalent circuit model of FIG. 7J) based on the measured admittances $Y_{11,0}$ employing a best fit method. In some implementations, these two or more frequencies include at least the frequency of the minimum and the maximum of $|Y_{11,0}(\omega)|$.

The series and the parallel resonant configuration of the circuit 700 of FIG. 7A are analyzed below with reference to FIG. 7J with respect to various characteristics such as the Q-factor, fractional change, and various definitions of SNR based on an equivalent circuit model.

The circuit 710 of FIG. 7B illustrates another example implementation based on measuring a complex impedance $Z_{11}$ of a one-port capacitive sense circuit 711 (shown in FIG. 7B as the circuit on the right side of the dashed line). More specifically, the impedance $Z_{11}$ is measured at the measurement port 718 (indicated in FIG. 7B by a terminal and a dashed line) by applying, from the current source 512, a sinusoidal current $I_0$ and by measuring, using the voltage measurement circuit 510, the complex open-circuit voltage V as previously described with reference to FIG. 5A.

As the sense circuit 701 of FIG. 7A, the sense circuit 711 comprises the single-electrode capacitive sense element 702 (single-ended sense electrode 702) having the signal terminal 703 and the capacitance C with reference to FIG. 7A, a series inductor 714 having an inductance $L_s$ electrically connected in series to the sense electrode 702, and a parallel inductor 716 having an inductance $L_p$ electrically connected to the series inductor 714 and in parallel to the measurement port 718. The capacitance C may include the capacitances $C_{eg}$ and $C_{ew}$ (not shown in FIG. 7B) as previously discussed with reference to FIG. 7A. The sense circuit 711 further includes a parallel capacitor 715 having a capacitance $C_p$. The circuit 710 further illustrates the sense signal current source 512 and the voltage measurement circuit 510 electrically connected to the measurement port 718.

Though not shown in FIG. 7B for purposes of illustration, the inductive and capacitive elements of the sense circuit 711 may also cause electrical losses that may be represented by a respective equivalent series resistance.

As with the sense circuit 701 of FIG. 7A, the sense circuit 711 may be configured to provide a local minimum in the impedance magnitude function $|Z_{11,0}(\omega)|$ (series resonance) substantially at the nominal sense frequency. Alternatively, the sense circuit 711 may be configured to provide a local minimum of the admittance magnitude function $|Y_{11,0}(\omega)|$ (parallel resonance) substantially at the nominal sense frequency.

In an example series resonant configuration of the sense circuit 711, the reactance of the series inductor 714 substantially compensates for the reactance of the sense electrode 702 in parallel to the capacitor 715 at the nominal sense frequency providing an impedance $Z_{11,0}$ that is substantially real (resistive). In this configuration, the inductance $L_p$ of the parallel inductor 706 may be similar or larger than the inductance $L_s$ of the series inductor 714. In other terms, the impedance magnitude of the parallel inductor 716 may be substantially (e.g., 10 times) higher than the impedance magnitude $|Z_{11,0}|$ as presented at the nominal sense frequency. In this configuration, the parallel inductor 716 may exert a negligible impact on the impedance $|Z_{11,0}|$ at the nominal sense frequency.

In an example parallel resonant configuration of the sense circuit 711, the reactance of the series inductor 714 undercompensates for the reactance of the sense electrode 702 in parallel to the capacitor 715 at the nominal sense frequency. The residual capacitive susceptance of the series connection of the inductor 704 and the parallel connection of the sense electrode 702 and capacitor 715 is substantially compensated for by the susceptance of the parallel inductor 716 providing an admittance $Y_{11,0}$ that is substantially real (resistive). In this configuration, the inductance $L_p$ of the parallel inductor 706 may be smaller, similar, or larger than the inductance $L_s$ of the series inductor 714. Stated in other terms, the admittance magnitude of the parallel inductor 716 may be substantially (e.g., 20 times) higher than the admittance magnitude $|Y_{11,0}|$ as presented at the nominal sense frequency. In this configuration, the parallel inductor 716 exerts a significant impact on the admittance $Y_{11,0}$ at the nominal sense frequency.

In some implementations, the parallel inductor 716 together with the series inductor 714 and the parallel capacitor 715 are used for purposes of resonance tuning and impedance transformation, e.g., to transform the impedance $Z_{11}$ to match the sense circuit 711 with an operating impedance range as previously mentioned with reference to FIG. 1. The inductance ratio $L_s/L_p$ and the capacitance ratio $C/C_p$ may be parameters to control the impedance magnitude $|Z_{11,0}|$.

If configured for series resonance, the impedance magnitude $|Z_{11,0}|$ may be decreased mainly by decreasing the capacitance ratio $C/C_p$. If configured for parallel resonance, the admittance magnitude $|Y_{11,0}|$ may be increased mainly by increasing the inductance ratio $L_s/L_p$.

In another aspect of resonance tuning, the parallel capacitor 715 may include a variable capacitor whose capacitance $C_s$ can be electronically controlled (e.g., a DC controlled capacitor) forming a variable capacitor 715. In some implementations of the circuit 700, a variable capacitor 715 is used to compensate for a temperature drift, an aging, or a detuning of the sense circuit 701 caused by an external impact and to maintain its resonance substantially at the nominal sense frequency. In a further aspect, the variable capacitor 714 in combination with a variable inductor 714 are used to vary the impedance $|Z_{11,0}|$ of the sense circuit 701.

In a further aspect, the sense electrode's 702 capacitance C in combination with the parallel inductor 716 form a $2^{nd}$ order high pass filter to attenuate a low frequency disturbance component in the voltage V for purposes as previously discussed with reference to FIG. 5A.

With reference to FIG. 1, FIG. 7B also illustrates the objects 110, 112, and 114 proximate to the capacitive sense element 702. As previously discussed with reference to FIG. 7A, presence of the object 110, 112, 114, or vehicle 330 may cause a change in one or more electrical characteristics of the sense circuit 711.

The circuit 720 of FIG. 7C illustrates a further example implementation based on measuring a complex impedance $Z_{11}$ of a one-port capacitive sense circuit 721 (shown in FIG. 7C as the circuit on the right side of the dashed line). More specifically, the impedance $Z_{11}$ is measured at the measurement port 728 (indicated in FIG. 7C by a terminal and a dashed line) by applying, from the current source 512, a sinusoidal current $I_0$ and by measuring, using the voltage measurement circuit 510, the complex open-circuit voltage V as previously described with reference to FIG. 7A.

As the sense circuit 701 of FIG. 7A, the sense circuit 721 comprises the single-electrode capacitive sense element 702 (also referred to herein as a single-ended sense electrode) having the capacitance C with reference to FIG. 7A, a series inductor 724 having an inductance $L_s$ electrically connected in series to the single-ended sense electrode 702. However, the sense circuit 721 shows the parallel inductor 706 replaced by a transformer 726 with a transformation ratio $n_T$:1 as indicated in FIG. 7C. As previously described with reference to FIG. 5B, the transformer may include a primary winding and a galvanically insulated secondary winding wound on a common core as suggested by the transformer symbol in FIG. 7C. However, other transformer implementations may apply as previously mentioned with reference to FIG. 5B. FIG. 7C also indicates the main inductance $L_m$, the series (leakage) inductance $L_\sigma$, and the equivalent series resistances $R_{Lm}$ and $R_w$ referring to the equivalent circuit model of a non-ideal transformer illustrated in FIG. 5H. FIG. 7C shows its primary winding electrically connected in parallel to the measurement port 728, while its secondary winding is electrically connected to the series inductor 724. The circuit 720 further illustrates the sense signal current source 512 and the voltage measurement circuit 510 both electrically connected to the sense circuit 721 at the measurement port 728.

Though not indicated in FIG. 7C for purposes of illustration, the series inductor 724 and the sense electrode 702 may also cause electrical losses that may be represented by a respective equivalent resistance as previously discussed with reference to FIG. 7A.

The sense circuit 721 may be configured to provide a local minimum in the impedance magnitude function $|Z_{11,0}(\omega)|$ (series resonance) substantially at the nominal sense frequency. Alternatively, it may be configured to provide a local minimum in the admittance magnitude function $|Y_{11,0}(\omega)|$ (parallel resonance) substantially at the nominal sense frequency using the transformer's 726 secondary referred main inductance $L_m$ in a manner similar to using the inductance $L_p$ as described above with reference to FIG. 7A.

In an example series resonant configuration of the sense circuit 721, the reactance of the series inductor 724 together with the transformer's 726 secondary referred leakage inductance $L_\sigma$ substantially compensates for the reactance of the sense electrode 702 at the nominal sense frequency providing an impedance $Z_{11,0}$ at the measurement port 728 that is substantially real (resistive). In this configuration, the transformer's 726 secondary referred main inductance $L_m$ may be similar or larger than the inductance $L_s$ of the series inductor 724. Stated in other terms, the primary referred open-circuit impedance of the transformer 726 may be substantially (e.g., 10 times) higher than the impedance magnitude $|Z_{11,0}|$ as presented at the nominal sense frequency. Apart from the impedance transformation by the factor $n_T^2$, the transformer 726 may exert a negligible impact on the impedance $|Z_{11,0}|$ at the nominal sense frequency.

In an example parallel resonant configuration of the sense circuit 721, the reactance of the series inductor 724 together with the transformer's 726 secondary referred leakage inductance $L_\sigma$ undercompensates for the reactance of the sense electrode 702 at the nominal sense frequency. The residual capacitive susceptance of the series connection of the inductor 724, the transformer's 726 leakage inductance $L_\sigma$, and the sense electrode 702 is substantially compensated for by the susceptance of the transformer's 726 secondary referred inductance $L_m$ providing an admittance $Y_{11,0}$ that is substantially real (resistive). In this configuration, the inductance $L_m$ may be smaller, similar, or larger than the inductance $L_s$ of the series inductor 724. Stated in other terms, the primary referred open-circuit admittance of the transformer 726 may be substantially (e.g., 20 times) higher than the admittance magnitude $|Y_{11,0}|$ as presented at the nominal sense frequency. In this configuration and apart from the admittance transformation, the transformer 726 exerts a significant impact on the admittance $Y_{11,0}$ at the nominal sense frequency.

The transformer 726 may serve for various purposes. In some implementations, the transformer 726 is a $n_T$:1 transformer with $n_T \neq 1$ used at least for impedance transformation e.g., to match the impedance magnitude $|Z_{11}|$ of the sense circuit 721 with an operating impedance range as previously mentioned with reference to FIG. 5A. In an example implementation configured for series resonance, the transformer 726 increases the impedance $|Z_{11}|$ by a factor $n_T^2$ with $n_T>1$. In another example implementation configured for parallel resonance, it increases the admittance $|Y_{11}|$ by a factor $1/n^2$ with $n<1$. In yet other implementations, it is a balancing transformer used to reduce a leakage current e.g., on the feeder cable of the wireless power transfer structure (e.g., wireless power transfer structure 200 of FIGS. 2 and 3) where the sense electrode 702 is integrated. Reducing this leakage current may reduce an unwanted sensitivity of other WPT system parts to a living object (e.g., living object 114). In yet another implementation, the transformer 726 is also part of the resonance tuning using its main inductance $L_p$ in a manner similar to the parallel inductor 506 with reference to FIG. 5A.

Apart from the transformation ratio $n_T$:1, the inductance ratio $L_s/L_m$ may be an additional parameter to match the admittance magnitude $|Y_{11,0}|$ of the parallel resonant configuration with an operating admittance range of the multipurpose detection circuit 100 with reference to FIG. 1.

In a further aspect, the sense electrode's 702 capacitance C in combination with the transformer's 726 main inductance $L_m$ form a $2^{nd}$ order high pass filter to attenuate a low frequency disturbance component in the voltage V for purposes as previously discussed in connection with FIG. 5A.

With reference to FIG. 1, FIG. 7C also illustrates the objects 110, 112, and 114 proximate to the sense electrode 702. As previously discussed with reference to FIG. 7A, presence of the object 110, 112, 114, or vehicle 330 may cause a change in one or more electrical characteristics of the sense circuit 741 as previously discussed with reference to FIG. 5A.

Figure 7D:
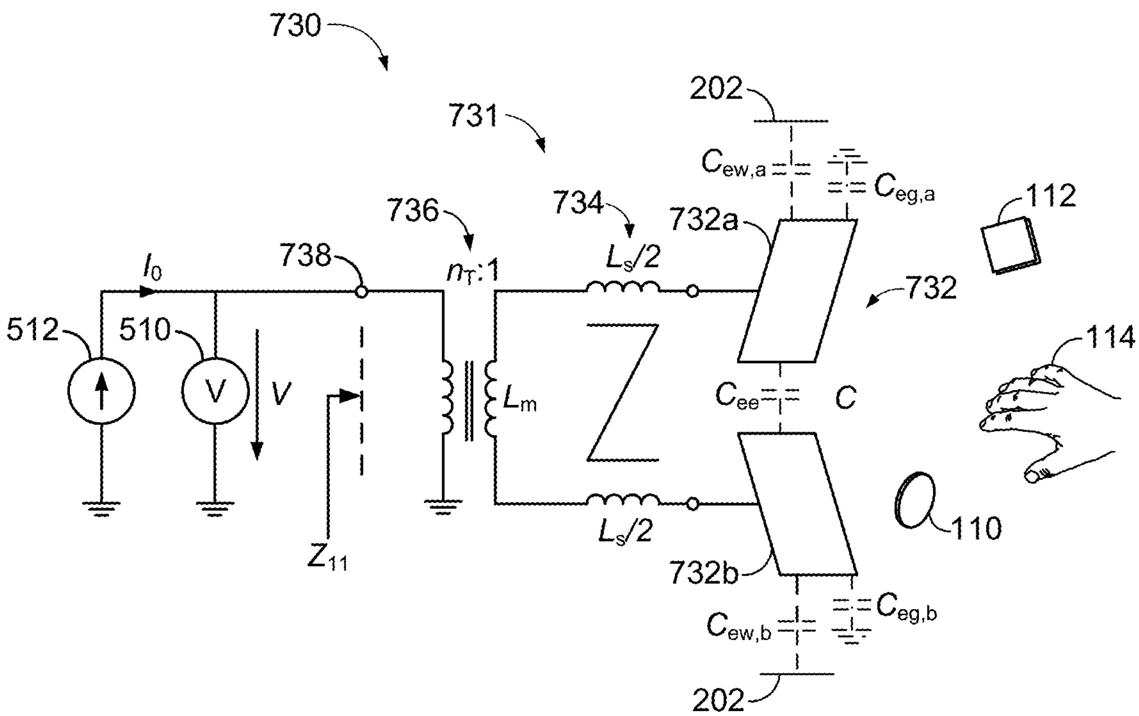
FIG. 7D is a schematic diagram of a circuit illustrating yet another example implementation of a portion of the multi-purpose detection circuit of FIG. 1 based on capacitive sensing and the impedance measurement approach of FIG. 5A, and the living and the non-living object of FIG. 1.

The circuit 730 of FIG. 7D illustrates yet another example implementation based on measuring a complex impedance $Z_{11}$ of a one-port capacitive sense circuit 731 (shown in FIG. 7D as the circuit on the right side of the dashed line). More specifically, the impedance $Z_{11}$ is measured at the measurement port 738 (indicated in FIG. 7D by a terminal and a dashed line) by applying, from the current source 512, a sinusoidal current $I_0$ and by measuring, using the voltage measurement circuit 510, the complex open-circuit voltage V as previously described with reference to FIG. 5A.

As opposed to the sense circuits 701, 711, and 721, the sense circuit 731 is operated in a differential mode and uses a substantially symmetric double-electrode capacitive sense element (e.g., double-ended sense electrode 732) composed of electrodes 732*a* and 732*b* (also referred to herein as a double-ended sense electrode) providing a differential-mode capacitance C. The sense circuit 731 may be split into a first branch and a second branch with an equal topology. The sense circuit 731 may be substantially symmetric (balanced) with respect to its capacitances and inductances. Further, the sense circuit 731 comprises a differential-mode series inductor 734 having an inductance $L_s/2$ in each branch and that is electrically connected to the double-ended sense electrode 732. Moreover, the sense circuit 731 comprises a transformer 736 with a transformation ratio $n_T$:1 and secondary referred main inductance $L_m$ with reference to FIG. 5H. Its primary winding is electrically connected in parallel to the measurement port 738, while its secondary winding is electrically connected to the differential-mode series inductor 734. The circuit 730 further illustrates the sense signal current source 512 and the voltage measurement circuit 510 both electrically connected to the sense circuit 731 at the measurement port 738.

The double-ended sense electrode 732 provides a differential-mode capacitance C that may include various capacitances as indicated in FIG. 7D by dashed lines. In particular, it may include an interelectrode capacitance $C_{ee}$ between electrodes 732*a* and 732*b*, a capacitance $C_{eg,a}$ and $C_{eg,b}$ towards ground and a capacitance $C_{ew,a}$ and $C_{ew,b}$ towards the WPT coil 202 for the respective electrode 732*a* and 732*b*.

Though not indicated in FIG. 7D for purposes of illustration, the capacitive and inductive elements of the sense circuit 731 may cause electrical losses that may be represented by a respective equivalent series resistance as previously discussed with reference to FIG. 7A.

The sense circuit 731 may be configured to provide a local minimum in the impedance magnitude function $|Z_{11,0}(\omega)|$ (series resonance) substantially at the nominal sense frequency. Alternatively, it may be configured to provide a local minimum in the admittance magnitude function $|Y_{11,0}(\omega)|$ (parallel resonance) substantially at the nominal sense frequency using the transformer's 736 secondary referred main inductance $L_m$ as described above with reference to FIG. 7C.

In an example series resonant configuration of the sense circuit 731, the reactance of the differential-mode series inductor 734 together with the transformer's 736 secondary-referred leakage inductance $L_\sigma$ substantially compensates for the reactance of the double-ended sense electrode 732 at the nominal sense frequency providing an impedance $Z_{11,0}$ at the measurement port 738 that is substantially real (resistive). In this configuration, the transformer's 736 secondary referred main inductance $L_m$ may be similar or larger than the inductance $L_s$ of the differential-mode series inductor 734. Stated in other terms, the primary referred open-circuit impedance of the transformer 736 may be substantially (e.g., 10 times) higher than the impedance magnitude $|Z_{11,0}|$ as presented at the nominal sense frequency. Apart from the impedance transformation by the factor $n_T^2$, the transformer 736 may exert a negligible impact on the impedance $|Z_{11,0}|$ at the nominal sense frequency.

In an example parallel resonant configuration of the sense circuit 731, the reactance of the differential-mode series inductor 734 together with the transformer's 736 secondary referred leakage inductance $L_\sigma$ undercompensates for the reactance of the double-ended sense electrode 732 at the nominal sense frequency. The residual capacitive susceptance of the series connection of the differential-mode series inductor 734, the transformer's 736 leakage inductance $L_\sigma$, and the double-ended sense electrode 732 is substantially compensated for by the susceptance of the transformer's 736 secondary referred inductance $L_m$ providing an admittance $Y_{11,0}$ that is substantially real (resistive). In this configuration, the inductance $L_m$ may be smaller, similar, or larger than the inductance $L_s$ of the differential-mode series inductor 734. Stated in other terms, the primary referred open-circuit admittance of the transformer 736 may be substantially (e.g., 20 times) higher than the admittance magnitude $|Y_{11,0}|$ as presented at the nominal sense frequency. In this configuration and apart from the admittance transformation, the transformer 736 exerts a significant impact on the admittance $Y_{11,0}$ at the nominal sense frequency.

In a further aspect, the double-ended sense electrode's 732 capacitance C in combination with the transformer's 736 main inductance $L_m$ form a $2^{nd}$ order high pass filter to attenuate a low frequency disturbance component in the voltage V for purposes as previously discussed with reference to FIG. 5A.

In some implementations, the differential-mode series inductor 734 is configured to also provide a common mode inductance e.g., to attenuate a disturbance signal component in the voltage V emanating from a common mode current capacitively and inductively coupled into the double-ended sense electrode 732 (e.g., via capacitances $C_{ew,a}$ and $C_{ew,b}$) during wireless power transfer.

The transformer 736 may serve for various purposes. In some implementations, the transformer 736 is used to match the impedance $Z_{11}$ of the sense circuit 731 with an operating impedance range as previously discussed with reference to FIG. 5B. In other implementations, it is a 1:1 balancing (balun) transformer used to reduce a common mode disturbance current capacitively coupled to the double-ended sense electrode 732 (e.g., via capacitance $C_{ew,a}$ and $C_{ew,b}$). In yet further implementations, it is a $n_T$:1 transformer with $n_T \neq 1$ and serves for both impedance transformation and balancing.

Apart from the transformation ratio $n_T$:1, the inductance ratio $L_s/L_m$ may be an additional parameter to match the admittance magnitude $|Y_{11,0}|$ of the parallel resonant configuration with an operating admittance range of the multi-purpose detection circuit 100 with reference to FIG. 1.

With reference to FIG. 1, the sense circuit 731, the double-ended sense electrode 732, and the differential-mode series inductor 734 may correspond e.g., to the capacitive sense circuit 108*a*, the capacitive sense element 109*a* (comprising a double-ended sense electrode), and the associated inductive element, respectively.

With reference to FIG. 1, FIG. 7D also illustrates the objects 110, 112, and 114 proximate to the electrodes 732*a* and 732*b*. As previously discussed with reference to FIG. 7A, presence of the object 110, 112, 114, or vehicle 330 may cause a change in one or more electrical characteristics of the sense circuit 731.

In another aspect, the use of a double-ended sense electrode (e.g., double-ended sense electrode 732) may reduce a disturbance voltage component in the voltage V e.g., emanating from the voltage capacitively coupled into the sense electrode by the electric field as generated during wireless power transfer. Due to its symmetry, the double-ended sense electrode 732 integrated into a wireless power transfer structure (e.g., wireless power transfer structure 200 of FIG. 1) may pick-up substantially less disturbance voltage as compared to an equivalent single-ended sense electrode (sense electrode 702 of FIG. 7A) formed by connecting the electrodes 732*a* and 732*b* in parallel. On the other hand, the fractional change defined by Equation (8) and (9) of a sense circuit (e.g., sense circuit 731) using the double-ended sense electrode 732 may be substantially smaller than that of a sense circuit (e.g., sense circuit 701) using an equivalent single-ended sense electrode 702 formed by connecting the electrodes 732*a* and 732*b* in parallel. Therefore, the resulting SNR (e.g., defined by Equation (10)) as obtained for the sense circuits 731 and 701 when driven with the same current $I_0$ may not differ that much. However, there may be locations, where the sense circuit 731 using the double-ended sense electrode 732 is less sensitive for detecting an object (e.g., living object 114) than the sense circuit 701 using an equivalent single-ended sense electrode 702.

In a further aspect, the electromagnetic emissions produced by the double-ended sense electrode 732 when driving the sense circuit 731 with a current $I_0$ may be substantially lower than that of the equivalent single-ended sense electrode 702 when driving the sense circuit 701 with the same current $I_0$. Therefore, if the drive current to is emission constraint (e.g., for frequency regulatory reasons), the sense circuit 731 may be driven with a substantially higher current $I_0$ than the sense circuit 701 improving the SNR to compete with the sense circuit 701 using the single-ended sense electrode 702.

Figure 7E:
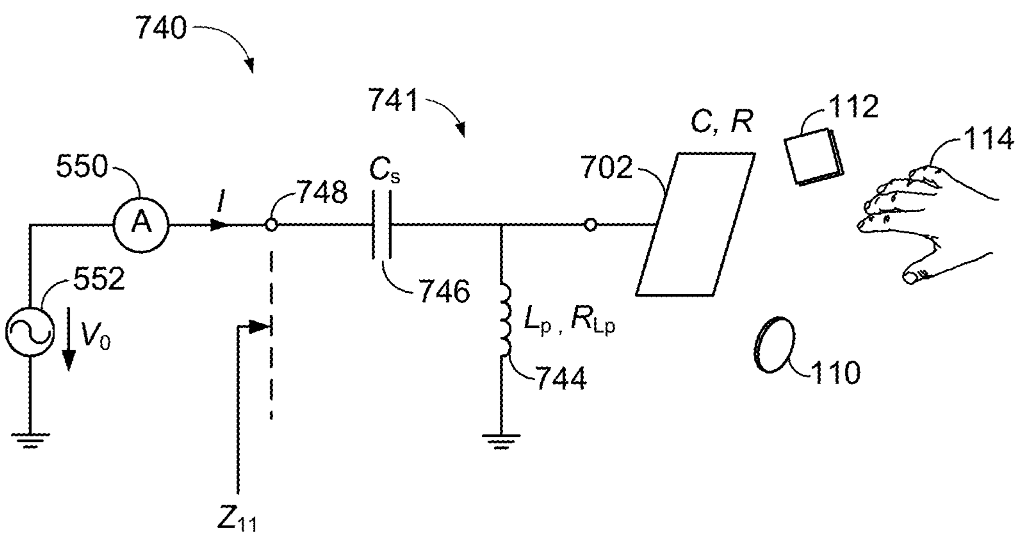
FIG. 7E is a schematic diagram of a circuit illustrating an example implementation of a portion of the multi-purpose detection circuit of FIG. 1 based on capacitive sensing and the impedance measurement approach of FIG. 5C, and the living and the non-living object of FIG. 1.

The circuit 740 of FIG. 7E illustrates another example implementation based on measuring a complex impedance $Z_{11}$ of a one-port inductive sense circuit (e.g., sense circuit 741, shown in FIG. 7E as the circuit on the right side of the dashed line). More specifically, the impedance $Z_{11}$ is measured at the measurement port 748 (indicated in FIG. 7E by a terminal and a dashed line) by applying, from a voltage source 552, a sinusoidal voltage $V_0$ and by measuring, using a current measurement circuit 550, the complex short-circuit current I as previously mentioned with reference to FIG. 5A (voltage source current measurement technique).

The circuit 740 may be considered as electrically dual to the circuit 700 of FIG. 7A. The circuit 740 includes the sense circuit 741 comprising the single-ended sense electrode 702 having a capacitance C and an equivalent series resistance R with reference to FIG. 7A, a parallel inductor 744 having an inductance $L_p$ and an equivalent series resistance $R_{Lp}$, a series capacitor 746 having a capacitance $C_s$ electrically connected in series to the parallel connection of the sense electrode 702 and the parallel inductor 744. The circuit 740 further illustrates the sense signal voltage source 552 electrically connected to the sense circuit 741 at the measurement port 748 via the current measurement circuit 550. As opposed to FIG. 5C, FIG. 7E illustrates the current source (e.g., the current measurement circuit 550) as non-ground-based (floating).

In an example implementation (not shown herein), the non-ground-based current source is accomplished by using a ground-based current source with an output transformer providing galvanic isolation.

As previously discussed with reference to the circuit 700 of FIG. 7A, the circuit 740 of FIG. 7E may be configured to be operated at parallel resonance substantially at the nominal sense frequency. Alternatively, it may be configured for series resonance substantially at the nominal sense frequency.

In an example parallel resonant configuration of the sense circuit 741, the susceptance of the parallel inductor 744 substantially compensates for the susceptance of the sense electrode 702 at the nominal sense frequency providing an admittance $Y_{11,0}$ that is substantially real (resistive). In this configuration, the capacitance $C_s$ of the series capacitor 746 may be similar or larger than the capacitance C of the sense electrode 702. Stated otherwise, the admittance magnitude of the series capacitor 746 may be substantially (e.g., 10 times) higher than the admittance magnitude $|Y_{11,0}|$ as presented at the nominal sense frequency. In this configuration, the series capacitor 746 may exert a negligible impact on the admittance $|Y_{11,0}|$ at the nominal sense frequency.

In an example series resonant configuration of the sense circuit 741, the susceptance of the parallel inductor 744 overcompensates for the susceptance of the sense electrode 702 at the nominal sense frequency. The residual inductive reactance of the parallel connection of the parallel inductor 744 and the sense electrode 702 is substantially compensated for by the reactance of the series capacitor 746 providing an impedance $Z_{11,0}$ that is substantially real (resistive). In this configuration, the capacitance $C_s$ of the series capacitor 746 may be smaller, similar, or larger than the capacitance C of the sense electrode 702. Stated otherwise, the impedance magnitude of the series capacitor 746 may be substantially (e.g., 20 times) higher than the impedance magnitude $|Z_{11,0}|$ as presented at the nominal sense frequency. In this configuration, the series capacitor 746 exerts a significant impact on the impedance $Z_{11,0}$ at the nominal sense frequency.

In some implementations, the series capacitor 746 together with the parallel inductor 744 are used for purposes of resonance tuning and impedance transformation e.g., to transform the impedance $Z_{11}$ to match the sense circuit 741 with an operating impedance range as previously mentioned with reference to FIG. 1. The capacitance ratio $C/C_s$ may be a parameter to control the impedance magnitude $|Z_{11,0}|$.

Impedance transformation may be particularly effective, if the sense circuit 741 is configured for series resonance. More specifically, increasing the capacitance ratio $C/C_s$, while maintaining series resonance at the nominal sense frequency, may substantially increase the impedance magnitude $|Z_{11,0}|$ at the nominal sense frequency. Therefore, in an aspect, the sense circuit 741 in the series resonant configuration may be considered as an alternative to the sense circuit 711 of FIG. 7B using the parallel capacitor 715 or to the sense circuit 721 of FIG. 7C using the transformer 726.

Increasing the capacitance ratio $C/C_s$, while maintaining resonance at the nominal sense frequency, may also somewhat decrease the admittance magnitude $|Y_{11,0}|$ as presented at the nominal sense frequency in the parallel resonant configuration of the sense circuit 741. However, impedance transformation may be limited and far less effective than that of the series resonant configuration.

In a further aspect, the sense electrode's 702 capacitance C in combination with the parallel inductor 744 and the series capacitor 746 form a higher order high pass filter for purposes as previously discussed in connection with FIG. 5A.

With reference to FIG. 1, FIG. 7E also illustrates the objects 110, 112, and 114 proximate to the sense electrode 702. As previously discussed with reference to FIG. 1, presence of the object 110, 112, 114, or vehicle 330 may cause a change in one or more electrical characteristics of the sense circuit 751. As non-limiting examples, they may cause a change in the capacitance C and in an equivalent series resistance R that is considered included in $R_{Ls}$. This change results in a change ΔZ with respect to the impedance $Z_{11,0}$ as measured in absence of a foreign object with reference to FIG. 3.

The fractional change ΔY' (or ΔZ') as defined by Equations (8) and (9) and with respect to a defined test object (e.g., object 112) placed at a defined position relative to the sense electrode 702 may relate to the detection sensitivity of an object detection circuit (e.g., the multi-purpose detection circuit 100 of FIG. 1) based on the sense circuit 741. More specifically, increasing the fractional change ΔY' (or ΔZ') may increase a signal-to-noise ratio (SNR) e.g., as defined by Equation (14).

As non-limiting examples, the fractional change may be increased by optimizing the design of the sense electrode 702 with respect to its geometry and its integration into the wireless power transfer structure (e.g., wireless power transfer structure 200 with reference to FIGS. 2 and 3), by resonance tuning e.g., using the parallel inductor 744, and by improving the Q-factor of the sense circuit 741. Improving the Q-factor may increase the SNR, if the noise current $I_n$ is predominantly circuit intrinsic noise as discussed above with reference to FIG. 5G.

As previously discussed with reference to the circuit 700 of FIG. 7A, it may be desirable to discriminate between certain categories of objects (e.g., object 110 and 112) e.g., based on the reflected admittance $\Delta Y_r$ that may be indicative of electrical properties of the object 110, 112, 114, or vehicle 330.

In some implementations and configurations of the circuit 740 of FIG. 7E, the change ΔY in the admittance $Y_{11}$ caused by an object (e.g., object 114) is indicative of the reflected admittance $\Delta Y_r$. Therefore, in an aspect of object discrimination, the circuit 740 may be configured to determine the angle arg{ΔY} and thus the angle arg{$\Delta Y_r$} with the required accuracy. However, in some implementations, measuring the admittance $Y_{11}$ including the change ΔY may be subject to errors for various reasons as previously discussed with reference to the circuit 700 of FIG. 7A.

Susceptance compensation in the sense circuit 741 exhibiting a local extremum (minimum or maximum) in the admittance magnitude function $|Y_{11,0}(\omega)|$ and hence in the resulting current magnitude |I| at the measurement port 748 provides a mean to calibrate the current measurement circuit 550 and hence the admittance measurement with respect to the angle arg{ΔY}.

In a first step of an example calibration procedure applicable to the parallel resonant configuration of the circuit 740 of FIG. 7E, the sense frequency is adjusted to the local minimum of the current magnitude |I| as measured by the uncalibrated current measurement circuit 550 supposing absence of a foreign object. At this frequency, the admittance $Y_{11,0}$ and hence the current I at the measurement port 748 may be substantially real. Otherwise stated, the angles arg{$Y_{11,0}$} and arg{I} are substantially zero. In a second step of the example calibration procedure, the current measurement circuit 550 is corrected by applying a phase shift such that the imaginary part of the complex current value as determined and output by the current measurement circuit 550 at this frequency vanishes. Applying the phase shift is equivalent to rotating the admittance plane by an angle arg{$I_{uncal}$} where $I_{uncal}$ refers to the complex current value as determined by the uncalibrated current measurement circuit 550 (before any correction is applied). This angle correction may be expressed by Equation (15).

Applying the angle correction of Equation (15), an object (e.g., object 114) reflecting an admittance $\Delta Y_r$ that is imaginary (reactive) may result in a measured current change $\Delta I_{cal}$ that is substantially imaginary. Nevertheless, a residual error may remain in the angle arg{$\Delta I_{cal}$} due to the impact of the series capacitor 746 and the electrical losses in the sense circuit 741. The residual angle error of an example parallel resonant configuration of the circuit 740 and for an example object 110 is provided in TABLE 4.

In some implementations, the residual error is reduced by configuring the series capacitor 746 with a capacitance $C_s$ whose admittance $Y_{Cs}$ is substantially larger (e.g., 10 times larger) than the parallel resonant conductance of the sense circuit 741. In other implementations, the residual error is reduced by measuring the admittance $Y_{11,0}$ at two or more substantially different frequencies and by determining the elements of an equivalent circuit model of the sense circuit 741 (e.g., the equivalent circuit model illustrated in FIG. 7K) based on the measured admittances $Y_{11,0}$ employing a best fit method. In some implementations, these two or more frequencies include at least the frequency of the minimum and the maximum of $|Y_{11,0}(\omega)|$.

In an implementation configured for series resonance as defined above, the circuit 540 may be configured to measure the impedance $Z_{11}$ and corresponding changes ΔZ of $Z_{11}$ as caused by the object 110, 112, 114, or vehicle 330. In this case, the impedance change ΔZ may be indicative of the reflected admittance $\Delta Y_r$ as previously introduced. As discussed above with reference to the parallel resonant configuration, the angle arg{ΔZ} may be subjected to an error and therefore may require calibration to reduce an error in the measurement of the angle arg{ΔZ} and thus of the angle arg{$\Delta Y_r$}.

In an implementation configured for series resonance, the circuit 740 may be calibrated analogously to the parallel resonant configuration however using the local minimum of the impedance function $|Z_{11,0}(\omega)|$ where reactance compensation occurs.

In a first step of an example calibration procedure applicable to the series resonant configuration of the circuit 740 of FIG. 7E, the sense frequency is adjusted to the local maximum of the current magnitude |I| as measured by the uncalibrated current measurement circuit 550 supposing absence of a foreign object. At this frequency, the impedance $Z_{11,0}$ and hence the current I at the measurement port 748 may be substantially real. Otherwise stated, the angles arg{$Z_{11,0}$} and arg{I} are substantially zero. In a second step of the example calibration procedure, the current measurement circuit 550 is corrected by applying a phase shift (impedance plane rotation) as given above by Equation (15).

Applying the angle correction of Equation (15), an object (e.g., object 114) reflecting an admittance $\Delta Y_r$ that is imaginary (reactive) may result in a measured current change $\Delta I_{cal}$ that is substantially imaginary. Nevertheless, a residual error may remain in the angle arg{$\Delta I_{cal}$} due to the transformation of $\Delta Y_r$ to ΔZ in the lossy sense circuit (e.g., sense circuit 741). The residual angle error of an example series resonant configuration of the circuit 540 and for an example object 110 is provided in TABLE 4.

In an example implementation, the residual error due to the transformation of $\Delta Y_r$ to ΔZ is reduced by measuring the impedance $Z_{11,0}$ at two or more substantially different frequencies, supposing absence of a foreign object, and by determining the elements of an equivalent circuit model (e.g., the equivalent circuit model of FIG. 7K) based on the measured impedances $Z_{11,0}$ employing a best fit method. In some implementations, these two or more frequencies include at least the frequency of the minimum and the maximum of $|Z_{11,0}(\omega)|$.

In some implementations and configurations, the change $\Delta Y$ in the admittance $Y_{11}$, if correctly measured at the measurement port 748, directly relates to the reflected admittance $\Delta Y_r$ as previously defined. Therefore, in an aspect of object discrimination, the circuit 740 may be configured to determine the angle $\arg\{\Delta Y\}$ and thus the angle $\arg\{\Delta Y_r\}$ with sufficient accuracy. However, in some implementations, measuring the admittance $Y_{11}$ including the change $\Delta Y$ may be subject to errors for various reasons. In particular, there may exist an unknown phase error between the generated sense voltage $V_0$ as generated by the voltage source 552 and the current I as measured by the current measurement circuit 550 causing an error in the angle $\arg\{Y_{11}\}$ and thus in the admittance change $\Delta Y$ related to $\Delta Y_r$.

Analogously to reactance compensation in the sense circuit 701 of FIG. 7A, susceptance compensation (resonance tuning) of the sense circuit 741 may provide a mean to calibrate the admittance measurement and hence improve its accuracy e.g., with respect to the angle $\arg\{Y_{11}\}$. In an implementation configured for parallel resonance, the circuit 740 is calibrated according to the procedure as previously described with reference to the circuit 540 of FIG. 5C. Nevertheless, a residual error may remain in the angle $\arg\{\Delta Y\}$ due to the impact of the series capacitor 746. In some implementations, the error in the angle $\arg\{\Delta Y\}$ or in the angle $\arg\{\Delta Y_r\}$ is reduced analogously to the procedures as previously discussed with reference to FIG. 5A.

In an implementation configured for series resonance as defined above, the circuit 740 may be configured to measure the impedance $Z_{11}$ and corresponding changes $\Delta Z$ of $Z_{11}$ as caused by the object 110, 112, 114, or vehicle 330. However, as opposed to the parallel resonant configuration, the angle $\arg\{\Delta Z\}$ may disagree with the angle $\arg\{\Delta Z_r\}$ of the reflected impedance as previously defined with reference to FIG. 7A. There may be a substantial offset between $\arg\{\Delta Z\}$ and $\arg\{\Delta Z_r\}$ as shown below in TABLE 2. Therefore, the phase calibration procedure as described above may not directly apply to the series resonant configuration.

In an example implementation configured for series resonance, calibration is performed by measuring the impedance $Z_{11,0}$ at substantially different frequencies, supposing absence of a foreign object, and by determining the elements of an equivalent circuit model (e.g., the equivalent circuit model of FIG. 7K) based on the measured impedances $Z_{11,0}$ employing a best fit method. In some implementations, at least the frequency of the minimum and the maximum of $|Z_{11,0}|$ are measured to determine the unknown parameter values of the equivalent circuit model.

In an implementation variant of the circuit 740 of FIG. 7E (not shown herein), a ground-based current measurement circuit 550 and a non-ground-based (floating) voltage source 552 is used.

In an implementation variant of the circuit 740 of FIG. 7E (not shown herein), both the voltage source 552 and the current measurement circuit 550 are ground-based and a transformer is used for purposes of galvanic separation. The transformer may be considered inserted between the measurement port 748 and the series capacitor 746.

Figure 7F:
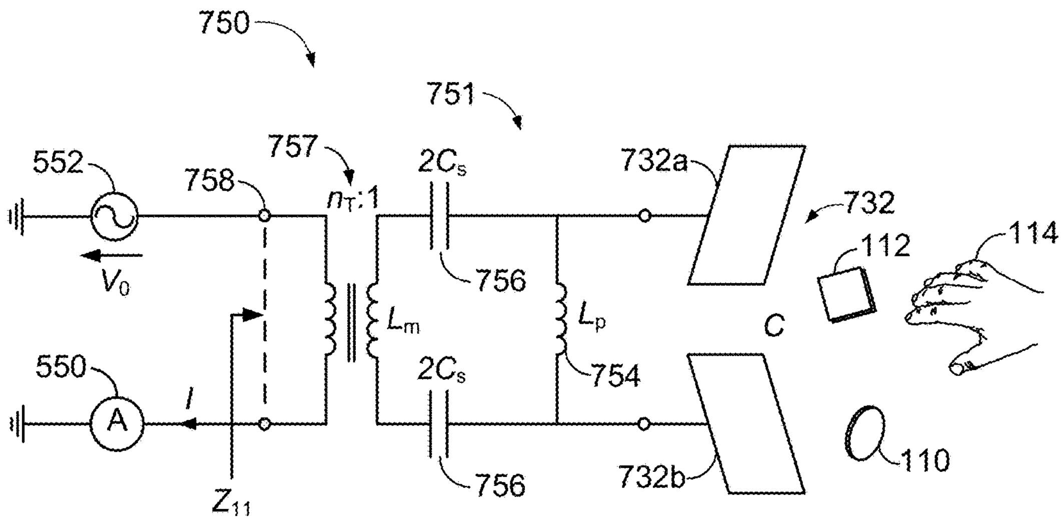
FIG. 7F is a schematic diagram of a circuit illustrating another example implementation of a portion of the multi-purpose detection circuit of FIG. 1 based on capacitive sensing and the impedance measurement approach of FIG. 5C, and the living and the non-living object of FIG. 1.

The circuit 750 of FIG. 7F illustrates yet another example implementation based on measuring a complex impedance $Z_{11}$ of a one-port inductive sense circuit 751 (shown in FIG. 7F as the circuit on the right side of the dashed line). More specifically, the impedance $Z_{11}$ is measured at the measurement port 758 (indicated in FIG. 7F by a terminal and a dashed line) by applying, from a voltage source 552, a sinusoidal voltage $V_0$ and by measuring, using a current measurement circuit 550, the complex short-circuit current I as previously mentioned with reference to FIG. 5A (voltage source current measurement technique).

The circuit 750 is a modification of the circuit 740 of FIG. 7E to operate with the double-ended sense electrode 732 of FIG. 7D. The circuit 750 includes the sense circuit 751 comprising the double-ended sense electrode 732 having a differential-mode capacitance C, a parallel inductor 754 having an inductance $L_p$, a series capacitor 756 having a capacitance $C_s$ electrically connected in series to the parallel connection of the inductor 754 and the double-ended sense electrode 732. In the example implementation as shown by FIG. 7F, the series capacitor 756 is split into two capacitors, each with a capacitance $2C_s$, providing a symmetric topology. Further, the sense circuit 751 includes a transformer 757 having a transformation ratio $n_T$:1 and a secondary referred main inductance $L_m$. Its secondary winding is electrically connected to the series capacitor 756, while its primary winding is electrically connected to the measurement port 758. The circuit 750 further illustrates the sense signal voltage source 552 and the current measurement circuit 550 both electrically connected to the sense circuit 751 at the measurement port 758. As opposed to the sense circuit 741 of FIG. 7E, the current measurement circuit 550 of the circuit 740 is ground-based.

Though not indicated in FIG. 7F for purposes of illustration, the capacitive and inductive elements of the sense circuit 751 may cause electrical losses that may be represented by a respective equivalent series resistance as previously discussed with reference to FIGS. 7A and 7E.

As previously discussed with reference to the circuit 700 of FIG. 7A, the circuit 750 of FIG. 7F may be configured to be operated at parallel resonance substantially at the nominal sense frequency. Alternatively, it may be configured for series resonance substantially at the nominal sense frequency.

In some implementations, the transformer's 757 main inductance $L_m$, the series capacitor 756, and the parallel inductor 754 are used for purposes of resonance tuning and impedance transformation, e.g., to transform the impedance $Z_{11}$ to match the sense circuit 711 with an operating impedance range as previously mentioned with reference to FIG. 1. The inductance ratio $L_m/L_p$ and the capacitance ratio C/C, may be parameters to control the impedance magnitude $|Z_{11,0}|$.

In some implementations, the transformer 757 is a 1:1 transformer and serves for balancing. In other implementations, it is a $n_T$:1 transformer ($n_T \neq 1$) and is also used for impedance transformation.

In a further aspect, the double-ended sense electrode's 732 capacitance C in combination with the parallel inductor 754, the series capacitor 756, and the transformer's 757 main inductance $L_m$ form a higher order high pass filter to attenuate a low frequency disturbance component in the current I for purposes as previously discussed in connection with FIG. 5A.

With reference to FIG. 1, FIG. 7F also illustrates the objects 110, 112, and 114 proximate to the double-ended sense electrode 732. As previously discussed with reference to FIG. 1, presence of the object 110, 112, 114, or vehicle 330 may cause a change in one or more electrical characteristics of the sense circuit 751. As non-limiting examples, it may a change the capacitance C and an equivalent series resistance (not shown in FIG. 7F) resulting in an impedance change $\Delta Z$ with respect to the impedance $Z_{11,0}$ as measured in absence of a foreign object with reference to FIG. 3.

In an implementation variant of the circuit 750 of FIG. 7F (not shown herein), the inductor 754 is replaced by the transformer 757 having a secondary referred main inductance $L_m=L_p$. In this implementation variant, the series capacitor 756 may be composed of a single capacitor 756 having capacitance $C_s$ directly connecting to the terminal of the measurement port 758 and to the transformer's 757 primary winding.

Figure 7G:
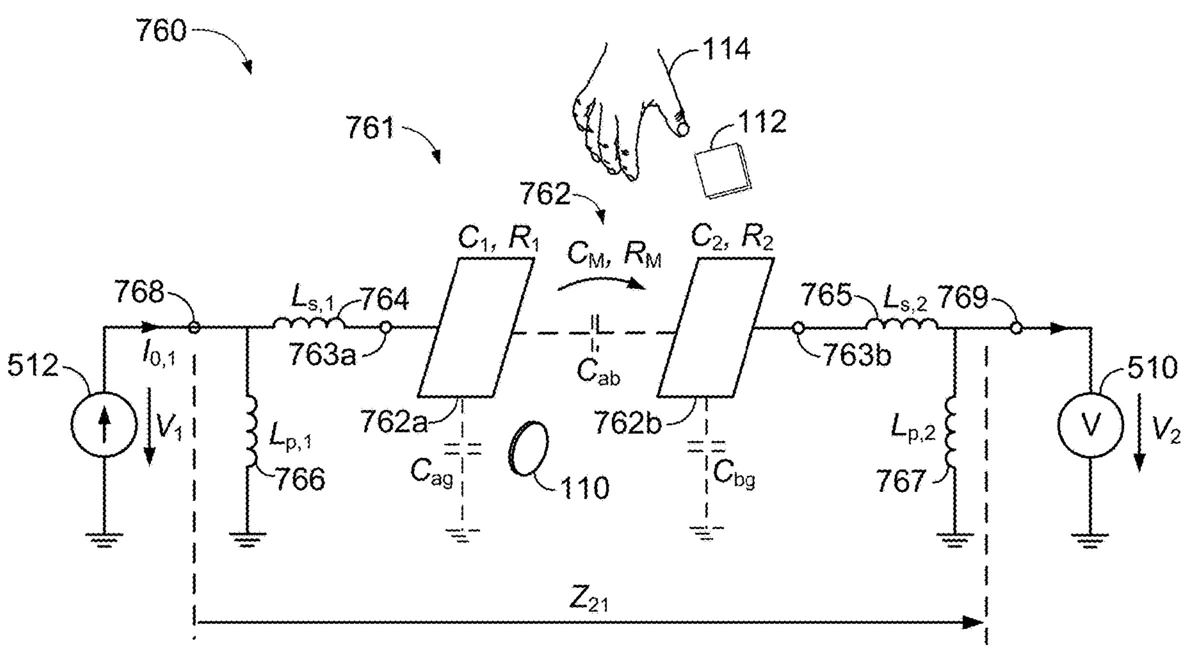
FIG. 7G is a schematic diagram of a circuit illustrating an example implementation of a portion of the multi-purpose detection circuit of FIG. 1 based on capacitive sensing and the transimpedance measurement approach of FIG. 5D, and the living and the non-living object of FIG. 1.

The circuit 760 of FIG. 7G illustrates an example implementation based on measuring a complex transimpedance $Z_{21}$ of a two-port capacitive sense circuit 761 (shown in FIG. 7G as the circuit between the left and the right dashed line). More specifically, the transimpedance $Z_{21}$ is measured by applying, from the current source 512, a sinusoidal current $I_{0,1}$ at the sense frequency with a defined amplitude and phase to the measurement port 768 (indicated in FIG. 7G by a terminal and a dashed line) and by measuring, using a voltage measurement circuit 510, the complex open-circuit voltage $V_2$ (amplitude and phase) at the measurement port 769 (indicated in FIG. 7G by a terminal and a dashed line) as previously described with reference to FIG. 5D.

The sense circuit 761 comprises a double-electrode capacitive sense element 762 comprising a first single-ended sense electrode 762*a* having a single terminal 763*a* and a second single-ended-sense electrode 762*b* having a single terminal 763*b*. The sense circuit 761 further comprises a first series inductor 764 having an inductance $L_{s,1}$ electrically connected in series to the first sense electrode 762*a* at the terminal 763*a* and a second series inductor 765 having an inductance $L_{s,2}$ electrically connected in series to the second sense electrode 762*b* at the terminal 763*b*. The sense circuit 761 further comprises a first parallel inductor 766 having an inductance $L_{p,1}$ electrically connected to the first series inductor 764 and in parallel to the measurement port 768 and a second parallel inductor 767 having an inductance $L_{p,2}$ electrically connected to the second series inductor 765 and in parallel to the measurement port 769. The circuit 760 further illustrates the sense signal current source 512 connected to the measurement port 768 and the voltage measurement circuit 510 connected to the measurement port 769.

Though not indicated in FIG. 7G for purposes of illustration, the inductors 764, 765, 766, and 767 may also cause electrical losses that may be represented by a respective equivalent series resistance as indicated in FIG. 7A.

FIG. 7G indicates, in dashed lines, a capacitance $C_{ag}$ between the first sense electrode 762*a* and ground, a capacitance $C_{ab}$ between the first sense electrode 762*a* and the second sense electrode 762*b*, and a capacitance $C_{bg}$ between the second sense electrode 762*b* and ground. The capacitances $C_{ag}$, and $C_{bg}$ may include other capacitances as discussed with reference to FIG. 7A.

Analogously to the self-inductances $L_1$, $L_2$, and the mutual inductance $L_M$ of a two-port inductive sense element (e.g., inductive sense element 562 of FIG. 5D comprising the sense coils 562*a* and 562*b*), a first self-capacitance $C_1$, a second self-capacitance $C_2$, and a mutual capacitance $C_M$ as indicated in FIG. 7G may be attributed to the two-port capacitive sense element 762. The self-capacitance $C_1$ may be defined as the capacitance as measured between the terminal 763*a* of the first sense electrode 762*a* and ground with the terminal 763*b* shortened to ground. Likewise, the self-capacitance $C_2$ may be defined as the capacitance as measured between the terminal 763*b* of the second sense electrode 762*b* and ground with the terminal 763*a* shortened to ground. FIG. 7G also indicates corresponding equivalent series resistance $R_1$, $R_2$, and $R_M$ representing electrical losses in the capacitive sense element 762.

Neglecting any effect of $R_1$, $R_2$, and $R_M$, the following relations may apply between the capacitances $C_{ag}$, $C_{ab}$, $C_{bg}$ and the capacitances $C_1$, $C_2$, $C_M$:

$$C_1=C_{ag}+C_{ab} \tag{182}$$

$$C_2=C_{bg}+C_{ab} \tag{183}$$

$$C_M=C_{ab} \tag{184}$$

Analogously to the inductive coupling factor, a capacitive coupling factor may be defined as:

$$k_C=C_M(C_1C_2)^{-1/2} \tag{185}$$

Substituting $C_1$, $C_2$, $C_M$ in Equation (185) by Equations (182), (183), and (184) provides:

$$k_C=C_{ab}(C_{ag}+C_{ab})^{-1/2}(C_{bg}+C_{ab})^{-1/2} \tag{186}$$

Figure 7H:
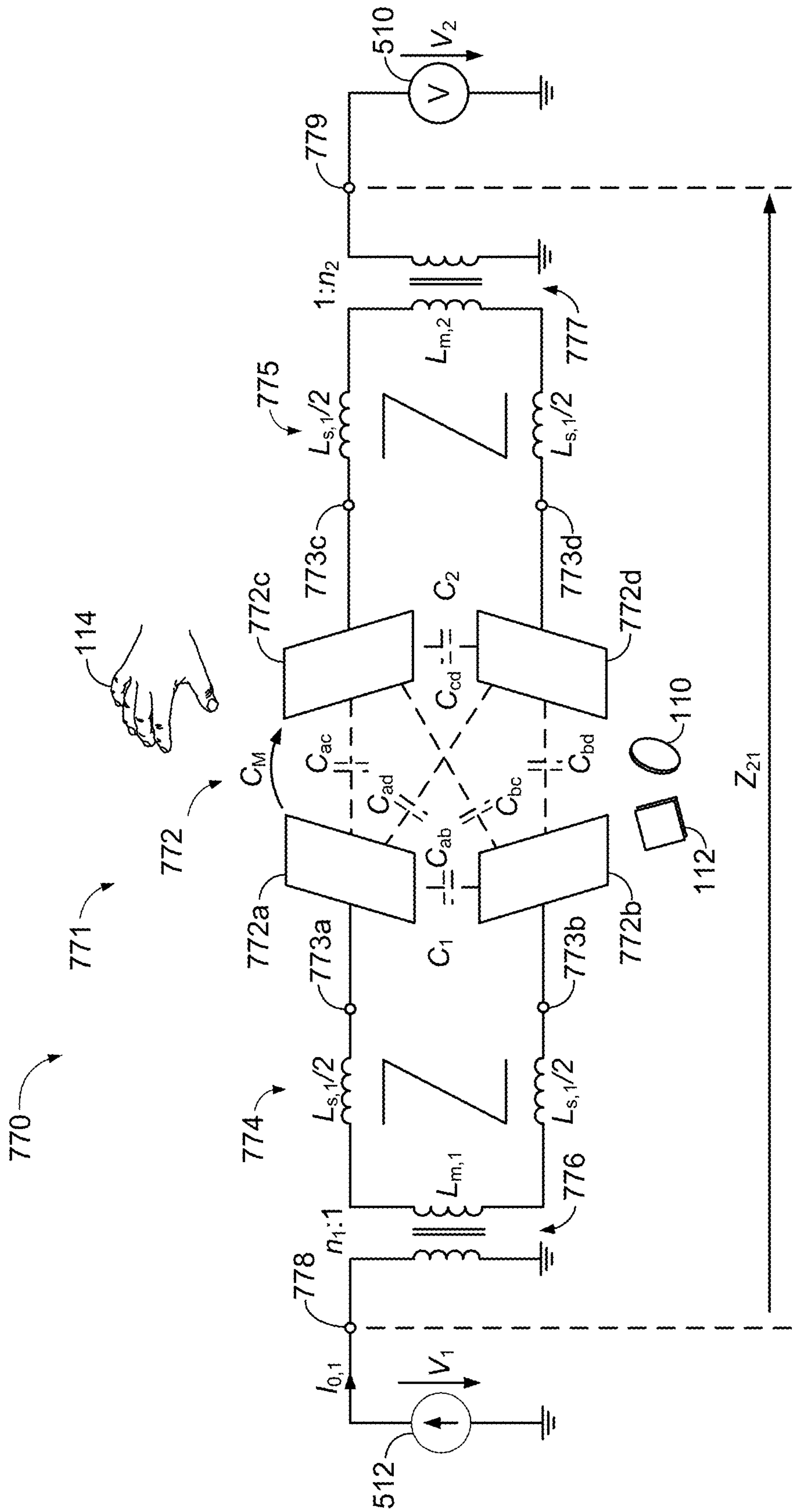
FIG. 7H is a schematic diagram of a circuit illustrating another example implementation of a portion of the multi-purpose detection circuit of FIG. 1 based on capacitive sensing and the transimpedance measurement approach of FIG. 5D, and the living and the non-living object of FIG. 1.
Figure 7I:
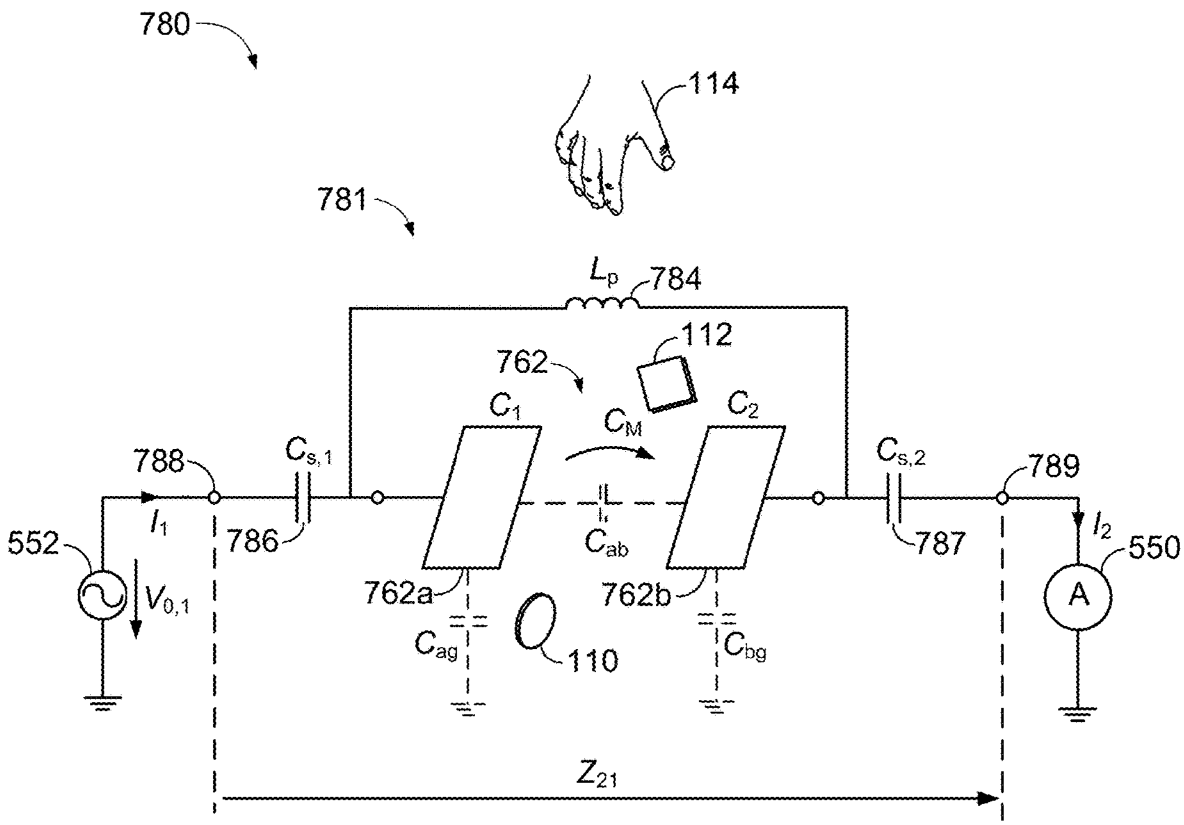
FIG. 7I is a schematic diagram of a circuit illustrating a further example implementation of a portion of the multi-purpose detection circuit of FIG. 1 based on capacitive sensing and the transimpedance measurement approach of FIG. 5D, and the living and the non-living object of FIG. 1.
Figure 7J:
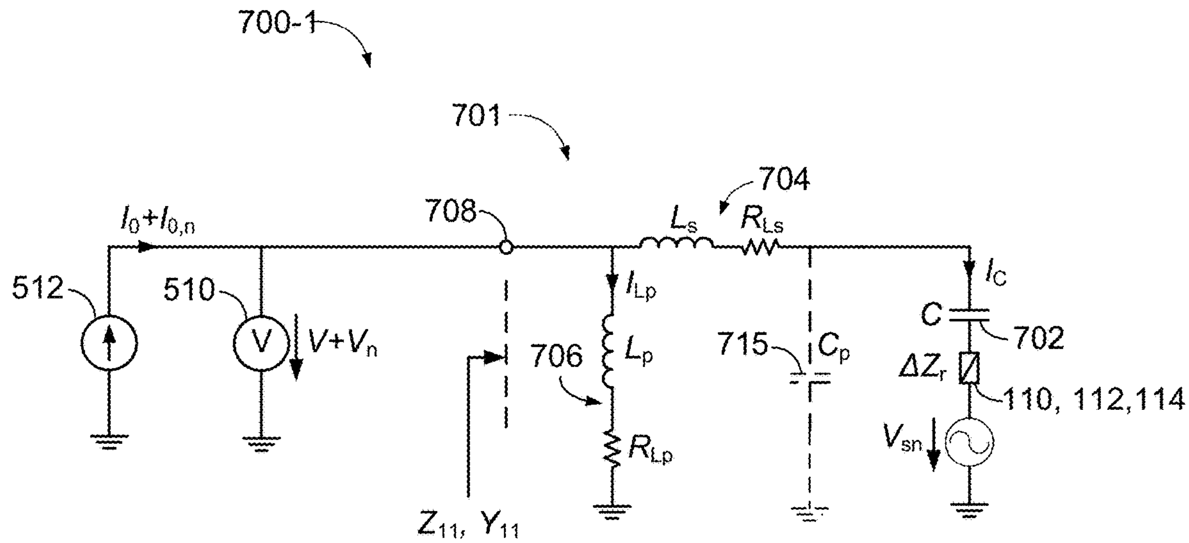
FIG. 7J illustrates an equivalent circuit model of the example implementation of FIG. 7A.
Figure 7K:
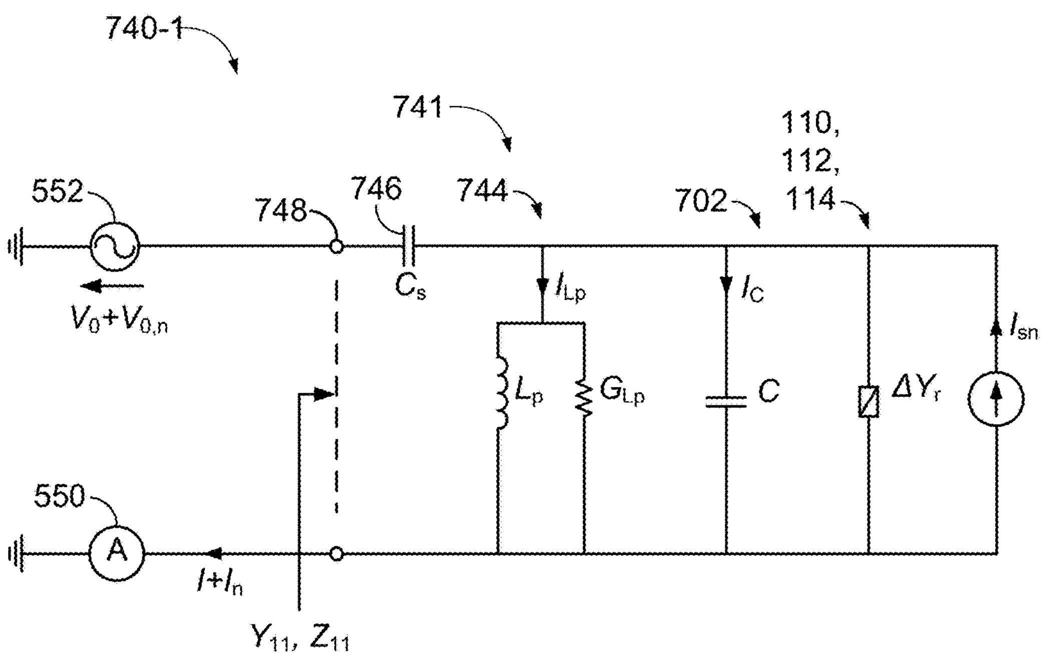
FIG. 7K illustrates an equivalent circuit model of the example implementation of FIG. 7E.
Figure 7L:
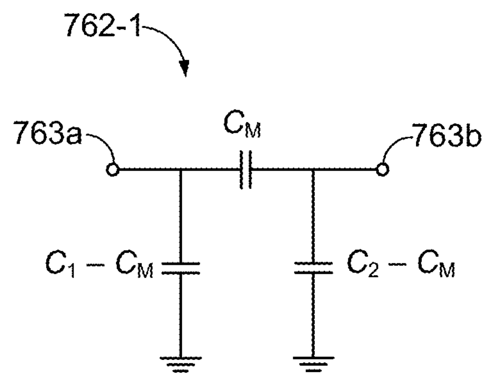
FIG. 7L illustrates an equivalent circuit model of a portion of the circuits of FIGS. 7G, 7H, and 7I.
Figure 7M:
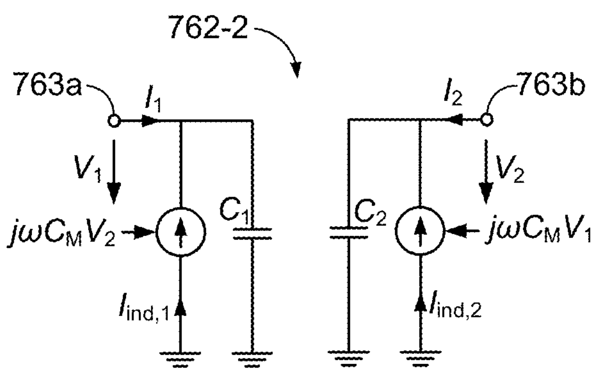
FIG. 7M illustrates another equivalent circuit model of a portion of the circuits of FIGS. 7G, 7H, and 7I.

Analogously to the "T"-equivalent circuit model 562-1 of a two-port inductive sense element (e.g., inductive sense element 562) illustrated in FIG. 5I, a two-port capacitive sense element (e.g., capacitive sense element 762) may be modeled by a "π"-equivalent circuit based on capacitances $C_1$, $C_2$, $C_M$ as illustrated in FIG. 7L. Alternatively, a two-port capacitive sense element (e.g., capacitive sense element 762) may be modeled by an equivalent circuit illustrated by FIG. 7M comprising the capacitances $C_1$, $C_2$ in parallel to the voltage-controlled current sources with respective currents:

$$I_{ind,1}=j\omega C_M V_2 \tag{187}$$

$$I_{ind,2}=j\omega C_M V_1 \tag{188}$$

representing the currents induced into the primary and secondary electrodes, respectively, as indicated in FIG. 7M. As with the equivalent circuit models 762-1 of FIG. 7L and 562-1 of FIG. 5I, the equivalent circuit model 762-1 of FIG. 7M is electrically dual to the equivalent circuit model 562-2 of FIG. 5J.

In some implementations, the reactance of $L_{s,1}$ substantially compensates for the reactance of $C_1$ providing a local impedance minimum $|Z_{11}|$ (series resonance) substantially at the nominal sense frequency, while the reactance of $L_{s,2}$ substantially compensates for the reactance of $C_2$ $L_2$ providing a local impedance minimum $|Z_{22}|$ (series resonance) substantially at the nominal sense frequency.

In another implementation, the sense circuit 761 is configured to provide a local minimum of the admittance magnitude functions $|Y_{11}(\omega)|$ and $|Y_{22}(\omega)|$ (parallel resonance) substantially at the nominal sense frequency.

In a further implementation, the sense circuit 761 is configured to provide a local minimum of the admittance magnitude function $|Y_{11}(\omega)|$ (parallel resonance) and a local minimum of the impedance magnitude function $|Z_{22}(\omega)|$ (series resonance) substantially at the nominal sense frequency.

In yet another implementation, the sense circuit 761 is configured to provide a local minimum of the impedance magnitude function $|Z_{11}(\omega)|$ (series resonance) and a local minimum of the admittance magnitude function $|Y_{22}(\omega)|$ (parallel resonance) substantially at the nominal sense frequency.

In implementations configured for primary-side and secondary-side series resonance, the reactance of the parallel inductors 766 and 767 is substantially higher than the impedance magnitudes $|Z_{11}|$ and $|Z_{22}|$, respectively, of the sense circuit 761 at the nominal sense frequency.

In a further example implementation, at least one of the series inductors 764 and 765 is omitted and the sense circuit 761 is operated as a non-resonant or partially resonant circuit.

In a further aspect, the capacitance $C_1$ of the first sense electrode 762*a* in combination with the first parallel inductor 766 form a $2^{nd}$ order high pass filter to attenuate a low frequency disturbance component in the voltage $V_1$. Likewise, the capacitance $C_2$ of the second sense electrode 762*b* form a $2^{nd}$ order high pass filter to attenuate a low frequency disturbance component in the voltage $V_2$ for purposes as previously discussed in connection with FIG. 5A.

With reference to FIG. 1, the sense circuit 761, the capacitive sense element 762 (including sense electrodes 762*a* and 762*b*), and the respective series inductors 764 and 765 may correspond e.g., to the capacitive sense circuit 108*a*, the capacitive sense element 109*a* (including a double-ended sense electrode), and the respective associated capacitive elements.

Though not shown herein, other transimpedance measurement techniques such as the voltage source current measurement technique or any other combination may apply (e.g., a voltage source voltage measurement technique). In some implementations (also not shown herein), at least one of the impedances $Z_{11}$ and $Z_{22}$ of the sense circuit 781 is additionally measured to the transimpedance $Z_{21}$ (e.g., using one or more of the techniques as previously discussed with reference to FIG. 5A). In these alternative implementations, presence of an object (e.g., object 114) is determined based on a change in at least one of an impedance $Z_{11}$, $Z_{22}$, and $Z_{21}$.

Moreover, at least one of an impedance transformation and balancing may apply to at least one of the primary-side and secondary-side of the sense circuit 761 (not shown herein). More specifically, with reference to the sense circuit 721 of FIG. 7C, a transformer (e.g., transformer 726) may be used instead of the parallel inductors 766 and 767. Alternatively, with reference to the sense circuit 741 of FIG. 7E, a series capacitor and an inductor connected in parallel to the sense electrode (e.g., series capacitors 746 and parallel inductor 744) may apply at least on the primary side.

With reference to FIG. 1, FIG. 7G also illustrates the objects 110, 112, and 114 proximate to the capacitive sense element 762. As previously discussed with reference to FIG. 1, presence of the object 110, 112, 114, or vehicle 330 may cause a change in one or more electrical characteristics of the sense circuit 761. As non-limiting examples, it may change at least one of the self-capacitances $C_1$, $C_2$, the equivalent series resistances $R_1$, $R_2$, the mutual capacitance $C_M$ and the mutual equivalent series resistance $R_M$ generally resulting in a change $\Delta Z$ of the transimpedance $Z_{21,0}$ as measured in absence of a foreign object. Presence of an object (e.g., object 114) may be determined if $\Delta Z$ satisfies certain criteria (e.g., the magnitude of $\Delta Z$ exceeds a detection threshold) as previously discussed with reference to FIG. 7A.

Using a quasi-ideal current source 512, a change $\Delta Z$ in the transimpedance $Z_{21}$ (e.g., due to presence of the object 114) manifests in a change $\Delta V$ in the voltage $V_2$ while the current $I_{0,1}$ remains substantially unaffected. Therefore, measuring the complex voltage $V_2$ may be equivalent to measuring the complex transimpedance $Z_{21}$. In other words, the complex voltage $V_2$ may be indicative of the complex transimpedance $Z_{21}$ and there may be no requirement for additionally measuring the current $I_{0,1}$ thus reducing complexity of the measurement circuit (e.g., measurement circuit 104 of FIG. 1)

As with the sense circuit 561 of FIG. 5D, the fractional change $\Delta Z'$ (or $\Delta Y'$) caused by a defined test object (e.g., object 112) placed at a defined position relative to the capacitive sense element 762 may relate to the detection sensitivity of an object detection circuit (e.g., the multi-purpose detection circuit 100 of FIG. 1) based on a two-port capacitive sense circuit 761. Increasing the fractional change $\Delta Z'$ (or $\Delta Y'$) may increase a detection sensitivity of the circuit 760. More specifically, it may increase a signal-to-noise ratio (SNR) e.g., as defined by Equation (21)

As non-limiting examples, the fractional change $\Delta Z'$ (or $\Delta Y'$) may be increased by optimizing the design and the arrangement of the sense electrodes 762*a* and 762*b*, their integration into the wireless power transfer structure (e.g., wireless power transfer structure 200 with reference to FIGS. 2 and 3), by resonance tuning using series inductors 764 and 765 as previously described, and by improving a Q-factor of the sense circuit 761.

The circuit 770 of FIG. 7H illustrates another example implementation based on measuring a complex transimpedance $Z_{21}$ of a two-port capacitive sense circuit 771 (shown in FIG. 7H as the circuit between the left and the right dashed line). More specifically, the transimpedance $Z_{21}$ is measured by applying, from the current source 512, a sinusoidal current $I_{0,1}$ at the sense frequency with a defined amplitude and phase to the measurement port 778 (indicated in FIG. 7H by a terminal and a dashed line) and by measuring, using the voltage measurement circuit 510, the complex open-circuit voltage $V_2$ (amplitude and phase) at the measurement port 779 (indicated in FIG. 7H by a terminal and a dashed line) as previously described with reference to FIG. 5D.

As opposed to the sense circuit 761, the sense circuit 771 is operated in a differential mode. It may be split into a first branch and a second branch with an equal topology. The sense circuit 771 may be substantially symmetric (balanced) with respect to its capacitances and inductances. The sense circuit 771 includes a quad-electrode capacitive sense element 772 comprising a first double-ended sense electrode composed of sense electrodes 772*a* and 772*b* having respective terminals 773*a* and 773*b* and a second double-ended sense electrode composed of sense electrodes 772*c* and 772*d* having respective terminals 773*c* and 773*d*. The first double-ended sense electrode 772*a/b* is electrically connected to a differential-mode inductor 774 providing an inductance $L_{s,1}/2$ in each branch. The second double-ended sense electrode 772*c/d* is electrically connected to a differential-mode inductor 775 providing an inductance $L_{s,2}/2$ in each branch. The sense circuit 771 also includes a transformer 776 with a transformation ratio $n_1$:1 and a secondary referred main inductance $L_{m,1}$. Its primary winding is electrically connected in parallel to the measurement port 778, while its secondary winding is electrically connected to the differential-mode inductor 774. Further, the sense circuit 771 includes a transformer 777 with a transformation ratio 1:$n_2$ and a primary referred main inductance $L_{m,2}$. Its primary winding is electrically connected to the differential-mode inductor 775, while its secondary winding is electrically connected in parallel to the measurement port 779. The circuit 770 further illustrates the sense signal current source 512 electrically connected to the measurement port 778 and the voltage measurement circuit 510 electrically connected to the measurement port 779.

Though not indicated in FIG. 7H for purposes of illustration, the sense circuit 771 may cause electrical losses in the inductive and capacitive elements that may be represented by a respective equivalent series resistance as previously described with reference to FIGS. 7A and 7G. More specifically, the capacitive sense element 772 may cause electrical losses that may be represented by corresponding equivalent series resistances $R_1$, $R_2$, $R_M$.

Further, FIG. 7H indicates, in dashed lines, a plurality of capacitances comprising a capacitance $C_{ab}$ between electrodes 772a and 772b, a capacitance $C_{ac}$ between electrodes 772a and 772c, a capacitance $C_{ad}$ between electrodes 772a and 772d, a capacitance $C_{bc}$ between electrodes 772b and 772c, a capacitance $C_{bd}$ between electrodes 772b and 772d, and a capacitance $C_{cd}$ between electrodes 772c and 772d. These capacitances may refer to capacitances as measured between respective terminals 773a, 773b, 773c, and 773d with the differential-mode inductors 774 and 775 disconnected from the respective sense electrodes. The capacitances $C_{ab}$ and $C_{cd}$ may further include various capacitances as previously illustrated with reference to FIG. 7A.

As with the capacitive sense element 762 of FIG. 7G, a first self-capacitance $C_1$, a second self-capacitance $C_2$, and a mutual capacitance $C_M$ as indicated in FIG. 7H may be attributed to the capacitive sense element 772. Since the sense circuit 771 is operated in a differential mode, these capacitances may be considered as differential-mode capacitances. Analogously to the circuit 760 of FIG. 7G, the quad-electrode capacitive sense element (e.g., capacitive sense element 762) may be modeled by the "π"-equivalent circuit model based on capacitances $C_1$, $C_2$, $C_M$ as illustrated in FIG. 7L. If required, the ground-based "π" circuit may be replaced by an equivalent ground-symmetric network having a mutual capacitance $C_M/2$ in each branch (not shown herein). Alternatively, it may be modeled by the equivalent circuit model illustrated in FIG. 7M comprising the capacitances $C_1$, $C_2$ in parallel to the voltage-controlled current sources.

The following relations between the capacitances $C_{ab}$, $C_{ac}$, $C_{ad}$, $C_{bc}$, $C_{bd}$, $C_{cd}$ and $C_1$, $C_2$, $C_M$ may be found:

$$C_1=C_{ab}+((C_{ac}+C_{ad})(C_{bc}+C_{bd})/\Sigma C) \quad (189)$$

$$C_2=C_{cd}+((C_{ac}+C_{bc})(C_{ad}+C_{bd})/\Sigma C) \quad (190)$$

$$C_M=(C_{ac}C_{bd}-C_{ad}C_{bc})/\Sigma C \quad (191)$$

with ΣC denoting the sum of the coupling capacitances:

$$\Sigma C=(C_{ac}+C_{ad}+C_{bc}+C_{bd}) \quad (192)$$

For an entirely symmetric capacitive sense element 772 with capacitances:

$$C_{ab}=C_{cd}=C_a \quad (193)$$

$$C_{ac}=C_{db}=C_b \quad (194)$$

$$C_{ad}=C_{bc}=C_c \quad (195)$$

the mutual capacitance of Equation (191) becomes:

$$C_M=(C_b-C_c)/2 \quad (196)$$

and the self-capacitances of Equations (189) and (190):

$$C_1=C_2=C_a+((C_b+C_c)/2) \quad (197)$$

and the capacitive coupling factor:

$$k_C=(C_b-C_c)/(2C_a+C_b+C_c) \quad (198)$$

In some implementations, the reactance of $L_{s,1}$ substantially compensates for the reactance of $C_1$ providing a local impedance minimum $|Z_{11}|$ (series resonance) substantially at the nominal sense frequency, while the reactance of $L_{s,2}$ substantially compensates for the reactance of $C_2$ providing a local impedance minimum $|Z_{22}|$ (series resonance) substantially at the nominal sense frequency.

In another implementation, the sense circuit 771 is configured to provide a local minimum of the admittance magnitude functions $|Y_{11}(\omega)|$ and $|Y_{22}(\omega)|$ (parallel resonance) substantially at the nominal sense frequency.

In a further implementation, the sense circuit 771 is configured to provide a local minimum of the admittance magnitude function $|Y_{11}(\omega)|$ (parallel resonance) and a local minimum of the impedance magnitude function $|Z_{22}(\omega)|$ (series resonance) substantially at the nominal sense frequency.

In yet another implementation, the sense circuit 771 is configured to provide a local minimum of the impedance magnitude function $|Z_{11}(\omega)|$ (series resonance) and a local minimum of the admittance magnitude function $|Y_{22}(\omega)|$ (parallel resonance) substantially at the nominal sense frequency.

In implementations configured for primary-side and secondary-side series resonance, the reactance of the transformer's 776 primary referred main inductance and the transformer's 776 secondary referred main inductance is substantially higher than the impedance magnitudes $|Z_{11}|$ and $|Z_{22}|$, respectively, of the sense circuit 771 at the nominal sense frequency.

In a further example implementation, at least one of the differential-mode inductors 774 and 775 is omitted and the circuit 771 is operated as a non-resonant or partially resonant circuit.

In a further aspect, the capacitance $C_1$ of the first double-ended sense electrode 772a/b in combination with the first transformer's 776 main inductance $L_{m,1}$ form a $2^{nd}$ order high pass filter to attenuate a low frequency disturbance component in the voltage $V_1$. Likewise, the capacitance $C_2$ of the second double-ended sense electrode 772c/d in combination with the second transformer's 777 main inductance $L_{m,2}$ form a $2^{nd}$ order high pass filter to attenuate a low frequency disturbance component in the voltage $V_2$ for purposes as previously discussed in connection with FIG. 5A.

With reference to FIG. 1, the sense circuit 771, the capacitive sense element 772 (including electrodes 772a, 772b, 772c, and 772d), and the respective differential-mode inductors 774 and 775 may correspond e.g., to the capacitive sense circuit 108a, the capacitive sense element 109a (including a pair of double-ended sense electrodes, not shown in FIG. 1), and the respective associated capacitive elements.

Though not shown herein, other transimpedance and impedance measurement techniques as previously discussed with reference to FIG. 7G may apply.

With reference to FIG. 1, FIG. 7H also illustrates the objects 110, 112, and 114 proximate to the capacitive sense element 772. As previously discussed with reference to FIG. 7G, presence of the object 110, 112, 114, or vehicle 330 may cause a change in one or more electrical characteristics of the sense circuit 771. As non-limiting examples, it may change at least one of the capacitances $C_1$, $C_2$, $C_M$ and the equivalent series resistances $R_1$, $R_2$, $R_M$ generally resulting in a change $\Delta Z$ of the transimpedance $Z_{21,0}$ as measured in absence of a foreign object. Presence of an object (e.g., object 114) may be determined as previously discussed with reference to FIG. 7A.

As with the sense circuit 561 of FIG. 5D, the fractional change $\Delta Z'$ (or $\Delta Y'$) caused by a defined test object (e.g., object 112) placed at a defined position relative to the capacitive sense element 772 may relate to the detection sensitivity of an object detection circuit (e.g., the multi-purpose detection circuit 100 of FIG. 1) based on a two-port capacitive sense circuit 771. Increasing the fractional change $\Delta Z'$ (or $\Delta Y'$) may increase a detection sensitivity of the circuit 770 as previously discussed with reference to FIG. 7G.

As non-limiting examples, the fractional change $\Delta Z'$ (or $\Delta Y'$) may be increased by optimizing the design and the arrangement of the double-ended sense electrodes 772*a/b* and 772*c/d*, their integration into the wireless power transfer structure (e.g., wireless power transfer structure 200 with reference to FIGS. 2 and 3), by resonance tuning using series inductors (e.g., differential-mode inductors 774 and 775) as previously described, and by improving a Q-factor of the sense circuit 761.

In an example implementation and in analogy to the implementation of the inductive sense element 562 as described with reference to FIG. 5D, the capacitive sense element 772 is configured for the mutual capacitance $C_M$ to vanish in absence of a foreign object, resulting in a transimpedance $|Z_{21,0}|$ that is substantially zero. According to Equation (191), the mutual capacitance vanishes ($C_M \approx 0$) if the capacitances $C_{ab}$, $C_{cd}$, $C_{ad}$, and $C_{bc}$ satisfy:

$$C_{ac}C_{bd} \approx C_{ad}C_{bc} \tag{199}$$

For an entirely symmetric capacitive sense element 772 using Equation (196), the mutual capacitance vanishes if:

$$C_b \approx C_c \tag{200}$$

Figure 12A:
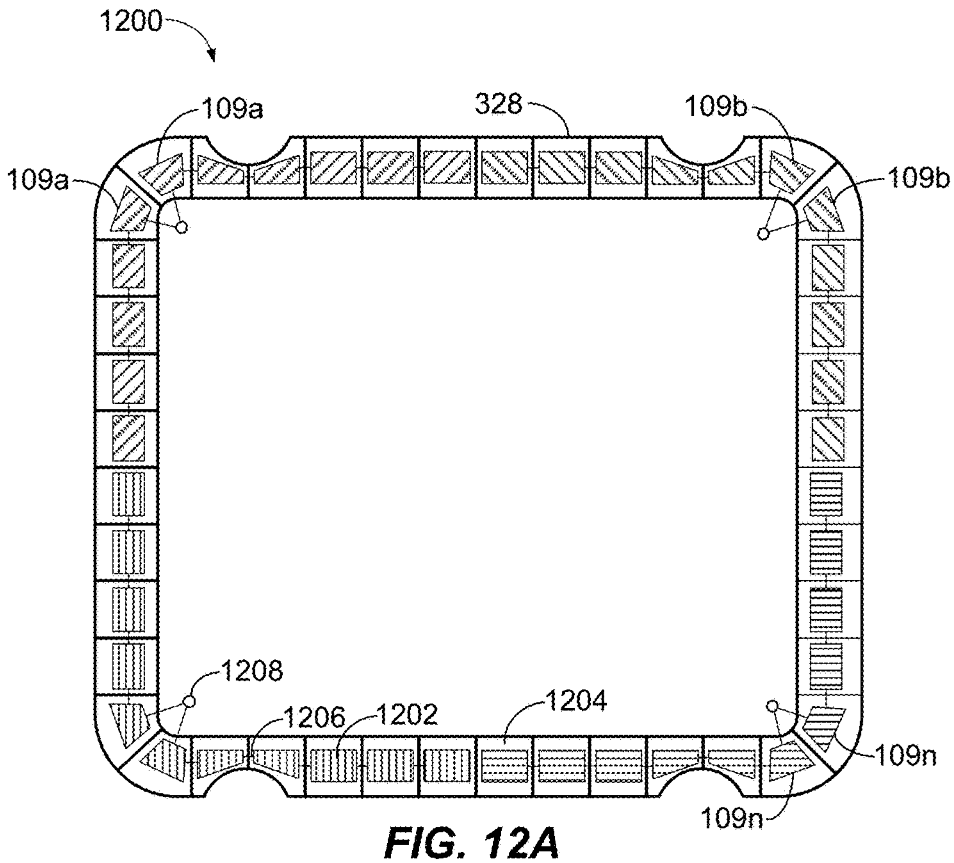
FIG. 12A is a schematic view illustrating an example implementation of the housing of the ground-based wireless power transfer structure integrating single-ended capacitive sense elements of the multi-purpose detection circuit of FIG. 1.

An example implementation of a capacitive sense element 772 using an arrangement of four single-ended sense electrodes that may provide a substantially zero mutual capacitance ($C_M \approx 0$) is illustrated in FIG. 12A.

The circuit 780 of FIG. 7I illustrates yet another example implementation based on measuring a complex transimpedance $Z_{21}$ of a two-port capacitive sense circuit 781 (shown in FIG. 7I as the circuit between the left and the right dashed line). More specifically, the transimpedance $Z_{21}$ is measured by applying, from the voltage source 552, a sinusoidal voltage $V_{0,1}$ at the sense frequency with a defined amplitude and phase to the measurement port 788 (indicated in FIG. 7I by a terminal and a dashed line) and by measuring, using the current measurement circuit 550, the complex short-circuit current $I_2$ (amplitude and phase) at the measurement port 789 (indicated in FIG. 7I by a terminal and a dashed line). The circuit 780 of FIG. 7I may be considered as electrically dual to the circuit 580 of FIG. 5E.

The sense circuit 781 includes the double-electrode capacitive sense element 762 with reference to FIG. 7G composed of the first single-ended sense electrode 762*a* and the second single-ended sense electrode 762*b* with reference to FIG. 7G. FIG. 7I also indicates capacitances $C_{ag}$, $C_{ab}$, $C_{bg}$ and the related capacitances $C_1$, $C_2$, $C_M$ as previously discussed with reference to FIG. 7G. The first electrode 762*a* is electrically connected to the first terminal of a parallel inductor 784 having an inductance $L_p$ and the second electrode 762*b* is electrically connected to the second terminal of the parallel inductor 784. Further, the first electrode 762*a* and the second electrode 762*b* is electrically connected to the first terminal of a first series capacitor 786 and to the first terminal of a second series capacitor 787, respectively, while the second terminal of the series capacitor 786 and 787 is electrically connected to the measurement ports 788 and 789, respectively.

Though not indicated in FIG. 7I for purposes of illustration, the sense circuit 781 may cause electrical losses in the inductive and capacitive elements that may be represented by a respective equivalent series resistance as previously described with reference to FIGS. 7A and 7G. More specifically, the capacitive sense element 762 may include the equivalent series resistances $R_1$, $R_2$, and $R_M$.

The basic topology of the circuit 780 of FIG. 7I equals the topology of the circuit 760 of FIG. 7F if the transformer 757 is omitted. Therefore, some implementations or configurations of the circuit 780 measuring a transimpedance $Z_{21}$ may be considered equivalent to the circuit 760 measuring an impedance $Z_{11}$.

In an example implementation, the sense electrodes 762*a* and 762*b* are tightly coupled resulting in a capacitive coupling factor kc as defined by Equation (186) that is near unity ($k_C \approx <1$).

The sense circuit 781 may be configured to provide a local minimum in the transimpedance magnitude function $|Z_{21,0}(\omega)|$ (series resonance) substantially at a nominal sense frequency. Alternatively, the sense circuit 581 may be configured to provide a local minimum in the transadmittance magnitude function $|Y_{21,0}(\omega)|$ substantially at the nominal sense frequency.

In an example parallel resonant configuration of the sense circuit 781 using a capacitive sense element 762 with $k_C 26<1$, the susceptance of the parallel inductor 784 substantially compensates for the susceptance of the mutual capacitance $C_M$ providing a local minimum in the transadmittance magnitude function $|Y_{21,0}(\omega)|$ (parallel resonance) substantially at the nominal sense frequency. The principle of mutual susceptance compensation may become more evident by contemplating FIG. 7L illustrating the "π"-equivalent circuit model 762-1 of the two-port capacitive sense element 762 and by considering the inductance $L_p$ of the parallel inductor 784 inserted in parallel to the mutual capacitance $C_M$. With $k_C \approx <1$, both the parallel capacitances $C_1$-$C_M$ and $C_2$-$C_M$ become substantially zero.

In this parallel resonant configuration, the capacitances $C_{s,1}$ and $C_{s,2}$ of the series capacitor 786 and 787, respectively, may be similar or larger than the capacitance $C_1$ and $C_2$ of the sense electrodes 762*a* and 762*b*, respectively. Stated in other terms, the admittance magnitude of the series capacitor 786 and 787 may be substantially higher than the admittance magnitude $|Y_{11}|$ and $|Y_{22}|$, respectively, of the sense circuit 781 at the nominal sense frequency. In this configuration, the series capacitor 786 and 787 may exert a negligible impact on the admittances and transadmittance $|Y_{11}|$, $|Y_{22}|$, and $|Y_{21}|$, respectively, at the nominal sense frequency.

In an example series resonant configuration of the sense circuit 781 using a capacitive sense element 762 with $k_L \approx <1$, the susceptance of the parallel inductor 784 overcompensates for the susceptance of the mutual capacitance $C_M$ at the nominal sense frequency. The residual inductive reactance of the parallel connection of the parallel inductor 784 and the mutual capacitance $C_M$ is substantially compensated for by the reactance of the series capacitors 786 and 787 providing a transimpedance $Z_{21,0}$ that is substantially real (resistive).

In this series resonant configuration, the capacitances $C_{s,1}$ and $C_{s,2}$ of the series capacitors 786 and 787, respectively, may be smaller, similar, or larger than the capacitances $C_1$ and $C_2$ of the sense electrodes 762*a* and 762*b*, respectively. Stated in other terms, the impedance magnitude of each of the series capacitors 786 and 787 may be substantially (e.g., 20 times) higher than the impedance magnitudes $|Z_{11}|$ and $|Z_{22}|$, respectively, as presented at the nominal sense frequency. In this configuration, the series capacitors 786 and 787 exert a significant impact on the impedance and transimpedance magnitudes $|Z_{11}|$, $|Z_{22}|$, and $|Z_{21}|$, respectively, at the nominal sense frequency.

In a further aspect, the capacitance $C_1$ of the first sense electrode 762$a$ in combination with the first series capacitor 786 form a high pass filter to attenuate a low frequency disturbance component in the current $I_1$. Likewise, the capacitance $C_2$ of the second sense electrode 762$b$ in combination with the second series capacitor 787 form a high pass filter to attenuate a low frequency disturbance component in the current $I_2$ for purposes as previously discussed in connection with FIG. 5A.

In yet a further aspect, the capacitance $C_M$ of the capacitive sense element 762 in combination with the parallel inductor 784 form a $2^{nd}$ order high pass filter to attenuate a differential low frequency disturbance voltage between the sense electrodes 762$a$ and 762$b$.

With reference to FIG. 1, the sense circuit 781, the capacitive sense element 762 (including sense electrodes 762$a$ and 762$b$), and the parallel inductor 784 may correspond e.g., to the capacitive sense circuit 108$a$, the capacitive sense element 109$a$ (including a double-ended sense electrode), and the respective associated inductive element, respectively.

Though not shown herein, other transimpedance and impedance measurement techniques may apply as previously mentioned with reference to FIG. 7G.

Moreover, as previously mentioned with reference to FIG. 7G, at least one of an impedance transformation and balancing may apply to at least one of a primary-side and secondary side of the sense circuit 781 (not shown herein).

With reference to FIG. 1, FIG. 7I also illustrates the objects 110, 112, and 114 proximate to the capacitive sense element 762. As previously discussed with reference to FIG. 1, presence of the object 110, 112, 114, or vehicle 330 may cause a change in one or more electrical characteristics of the sense circuit 781 as previously discussed with reference to FIG. 7D. Particularly, a change in the mutual capacitance $C_M$, and the equivalent mutual resistance $R_M$ generally results in a change $\Delta Z$ with respect to the transimpedance $Z_{21,0}$ as measured in absence of a foreign object.

As with the sense circuit 561 of FIG. 5D, the fractional change $\Delta Z'$ (or $\Delta Y'$) caused by a defined test object (e.g., object 112) may relate to the detection sensitivity of the sense circuit 781. As non-limiting examples, the fractional change $\Delta Z'$ (or $\Delta Y'$) may be increased by optimizing the design and the arrangement of the sense electrodes 762$a$ and 762$b$, their integration into the wireless power transfer structure (e.g., wireless power transfer structure 200 with reference to FIGS. 2 and 3), by resonance tuning using the parallel inductor 784 as previously described, and by improving a Q-factor of the sense circuit 781.

It may be appreciated that the sense circuit 781 configured for a capacitive coupling factor $k_C \approx< 1$ reduces the impact of the equivalent series resistances $R_1$ and $R_2$ on the fractional change, if compared e.g., to the circuit 700 of FIG. 7A. Moreover, the impedance change $\Delta Z$ may reflect electrical properties of an object (e.g., object 110) as discussed with reference to the circuit 700 of FIG. 7A. It may further allow calibration and correction of the angle $\arg\{\Delta Z\}$ in a procedure as previously described with reference to FIG. 5A.

FIGS. 7J and 7K illustrate equivalent circuit models 700-1 and 740-1, respectively, used below for purposes of a theoretical analysis and performance comparison. More specifically, the equivalent circuit model 700-1 is used to analyze the circuit 700 of FIG. 7A, the circuit 710 of FIG. 7B (using the parallel capacitor 715), and the circuit 720 of FIG. 7C (using the transformer 726), while the equivalent circuit model 740-1 serves for the analysis of the circuit 740 of FIG. 7E (the electrically dual of the circuit 700). Each of the circuits 700, 710, 720, and 740 are analyzed with respect to its series and parallel resonant configuration and with respect to various characteristics such as the impedance and the Q-factor of the sense circuit at resonance, the fractional change, and the various SNRs as previously defined with reference to FIGS. 5F and 5G.

For purposes of comparison, an identical sense electrode 702 an equal sense electrode current level $|I_C|$ is assumed for both configurations of the circuits 700, 710, 720, and 740, though practical implementations configured for parallel resonance may prefer a sense electrode 702 with a higher capacitance C. Comparing SNRs at the same sense electrode current level $|I_C|$ may be meaningful e.g., if the current level $|I_C|$ is emission or power constraint. Further, it is assumed that the circuits in both configurations are adjusted to a common resonant frequency substantially corresponding with the nominal sense frequency that is substantially higher than the WPT operating frequency.

The equivalent circuit model 700-1 as illustrated in FIG. 7J comprises the sense electrode's 702 capacitance C, the series inductor's 704 inductance $L_s$ and its equivalent series resistance $R_{Ls}$, the parallel inductor's 706 inductance $L_p$ and its equivalent series resistance $R_{Lp}$, an ideal sense signal current source 512 and an ideal voltage measurement circuit 510. As already noted above, FIG. 7J also includes the capacitance $C_p$ of the parallel capacitor 715 (as optional in dashed lines) with reference to the circuit 710 of FIG. 7B. It may be appreciated that in practical implementations losses in capacitors (including the sense electrode 702) are generally substantially lower than losses in inductors. Therefore, an equivalent series resistances R and $R_{Cp}$ of the sense electrode 702 and the optional parallel capacitor 715, respectively, (both not shown in FIG. 7J) are neglected in the analysis below. The equivalent circuit model 700-1 further includes an impedance $\Delta Z_r$ in series to the capacitance C representing the reflected impedance of the object 110, 112, or 114 proximate to the sense electrode 702 as previously discussed with reference to FIG. 7A. (The reflected impedance $\Delta Z_r$ may be regarded as the object 110, 112, or 114 as illustrated in FIG. 7A abstracted away). The equivalent circuit model 700-1 also includes a noise voltage source $V_{sn}$ in series to the capacitance C representing the noise voltage induced into the sense electrode 702 primarily by the electric field as generated when WPT is active. The noise voltage $V_{sn}$ may include any low frequency component (e.g., at the fundamental of the WPT operating frequency and harmonics thereof) as well as any high frequency component (e.g., switching noise at the sense frequency). The equivalent circuit model 700-1 of the circuit 700 further indicates the impedance $Z_{11}$ and the admittance $Y_{11}$ ($=1/Z_{11}$), the sense signal current $I_0$ with an additive noise component $I_{0,n}$, the sense signal voltage V with an additive noise voltage $V_n$, and the measurement port 708 (indicated by the terminal and the dashed line) where the current $I_0+I_{0,n}$ is injected, the voltage $V+V_n$ is measured, and where $Z_{11}$ or $Y_{11}$ refer to.

It may be appreciated that the equations for the series and parallel resonant configuration of the sense circuit 701 with respect to the impedance $Z_{11}$, the admittance $Y_{11}$, the respective resonant angular frequencies $\omega_s$ and $\omega_p$, the impedance change $\Delta Z$, the admittance change $\Delta Y$, the fractional changes $\Delta Z'$ and $\Delta Y'$, and the various circuit intrinsic and extrinsic SNRs as previously defined with reference to FIG. 5F may be derived analogously to Equations (27) to (177) by replacing $C_s$ by C, L by $L_s$, R by $R_{Ls}$, etc. Therefore, the mathematical derivations are generally omitted. Because the equivalent circuit model 700-1 applies to the circuit 700 of FIG. 7A or the circuit 720 of FIG. 7C, the reference numerals 700 and 720, respectively, are used instead in the following theoretical analysis.

To analyze the series and parallel resonant configuration of the circuit 700 of FIG. 7J, the common assumptions:

$$\omega L_s >> R_{Ls} \tag{201}$$

$$\omega L_p >> R_{Lp} \tag{202}$$

$$|\Delta Z_r| << R \tag{203}$$

are made for a frequency range about the resonant frequency.

In an implementation configured for series resonance and with a reactance:

$$\omega L_p >> |Z_{11}| \tag{204}$$

in a frequency range about the resonant frequency, the impedance $Z_{11}$ at the measurement port 708 of the circuit 700 of FIG. 7J in presence of an object (e.g., object 112) may be expressed as:

$$Z_{11} \approx R_{Ls} + j\omega L_s + (j\omega C)^{-1} + \Delta Z_r \tag{205}$$

In absence of a foreign object, a local minimum of $|Z_{11,0}(\omega)|$ (series resonance) occurs substantially at an angular frequency ω satisfying:

$$(j\omega L_s)^{-1} + j\omega C \approx 0 \tag{206}$$

yielding the series resonant angular frequency:

$$\omega_s \approx (C\,L_s)^{-1/2} \tag{207}$$

At this frequency, the impedance $Z_{11,0}$ becomes substantially real:

$$Z_{11,0} \approx Re\{Z_{11,0}\} = R_s \approx R_{Ls} \tag{208}$$

with $R_s$ denoting the series resonant resistance, while the impedance $Z_{11}$ in presence of an object (e.g., object 112) is approximately:

$$Z_{11} \approx R_s + \Delta Z \approx R_{Ls} + \Delta Z_r \tag{209}$$

with $\Delta Z_r$ referring to the reflected impedance as previously defined with reference to FIG. 7A.

The fractional change ΔZ' for the series resonant configuration of the circuit 700 of FIG. 7J becomes approximately:

$$\Delta Z' = \Delta Z / R_s \approx \Delta Z_r / R_{Ls} \tag{210}$$

Defining the normalized reflected impedance:

$$\Delta Z'_r = \Delta Z_r \omega_s C \tag{211}$$

the Q-factor of the series inductor 704:

$$Q_{Ls} = \omega_s L_s / R_{Ls} \tag{212}$$

and the Q-factor of the series resonant configuration of the sense circuit 701 of FIG. 7J:

$$Q_s \approx 1/(\omega_s C\,R_s) \approx Q_{Ls} \tag{213}$$

the fractional change may also be written in terms of $\Delta Z'_r$ and $Q_s$ or $Q_{Ls}$:

$$\Delta Z' \approx Q_s \Delta Z'_r \approx Q_{Ls} \Delta Z'_r \tag{214}$$

To analyze the parallel resonant configuration of the equivalent circuit model 700-1 of FIG. 7J, the following additional assumption:

$$\omega L_s - (\omega C)^{-1}| >> R_{Ls} \tag{215}$$

is made for a frequency range about the resonant frequency. The admittance $Y_{11}$ at the measurement port 708 in presence of an object (e.g., object 112) may be expressed:

$$Y_{11} = (R_{Lp} + j\omega L_p)^{-1} + (R_{Ls} + j\omega L_s + (j\omega C)^{-1} + \Delta Z_r)^{-1} \tag{216}$$

and using Equation (38) approximated as:

$$Y_{11} \approx (j\omega L_p)^{-1} - R_{Lp}(j\omega L_p)^{-2} + (j\omega L_s + (j\omega C)^{-1})^{-1} - (R_{Ls} + \Delta Z_r)(\omega L_s + (\omega C)^{-1})^{-2} \tag{217}$$

In absence of a foreign object, a local minimum of $|Y_{11,0}(\omega)|$ (parallel resonance) occurs substantially at an angular frequency ω satisfying:

$$(j\omega C)^{-1} + j\omega(L_s + L_p) \tag{218}$$

yielding for the parallel resonant angular frequency:

$$\omega_p \approx (C(L_s + L_p))^{-1/2} \tag{219}$$

At this frequency, the admittance $Y_{11,0}$ becomes substantially real:

$$Y_{11,0} \approx Re\{Y_{11,0}\} = G_p \approx (R_{Ls} + R_{Lp})/(\omega_p L_p)^2 \tag{220}$$

with $G_p$ denoting the parallel resonant conductance, while the admittance $Y_{11}$ in presence of an object (e.g., object 112) is approximately:

$$Y_{11} \approx G_p + \Delta Y \approx (R_{Ls} + R_{Lp} + \Delta Z_r)/(\omega_p L_p)^2 \tag{221}$$

with:

$$\Delta Y \approx \Delta Z_r / (\omega_p L_p)^2 \tag{222}$$

Defining the Q-factor of the series inductor 704 in terms of $L_s$ and $R_{Ls}$:

$$Q_{Ls} \approx \omega_p L_s / R_{Ls} \tag{223}$$

the Q-factor of the parallel inductor 706 in terms of $L_p$ and $R_{Lp}$:

$$Q_{Lp} \approx \omega_p L_p / R_{Lp} \tag{224}$$

and the inductance ratio:

$$n_L = L_s / L_p \tag{225}$$

the admittance $Y_{11,0}$ at $\omega_p$ may be expressed as:

$$Y_{11,0} = G_p \approx (1 + n_L)((1/Q_{Lp}) + (n_L/Q_{Ls}))\omega_p C \tag{226}$$

For $Q_{Lp} = Q_{Ls}$ and $n_L > 1$, the parallel resonant conductance $G_p$ as presented at the measurement port 708 becomes approximately $(1+n_L)^2 \omega_p\,C/Q_{Ls}$. Using Equations (219) and (225), the admittance $Y_{11}$ at $\omega_p$ of Equations (221) may also be expressed as:

$$Y_{11} \approx G_p + \Delta Y \approx G_p + (1 + n_L)^2 (\omega_p C)^2 \tag{227}$$

According to Equation (226), the admittance $Y_{11}$ at $\omega_p$ of Equation (225) of the sense circuit 701 of FIG. 7J can be increased by increasing the inductance ratio $n_L = L_s/L_p$, while maintaining parallel resonance substantially at the nominal sense frequency. Therefore, in some implementations, the parallel resonant configuration of the circuit 700 of FIG. 7A is employed as an alternative to using a transformer (e.g., transformer 726) for transforming the admittance $Y_{11}$ to be within a suitable operating admittance range as previously discussed with reference to FIGS. 7B and 7C.

Based on Equation (9), the fractional change ΔY' for the parallel resonant configuration of the circuit 700 of FIG. 7J may be written as:

$$\Delta Y' = \Delta Y / G_p \approx \Delta Z_r / (R_{Ls} + R_{Lp}) \tag{228}$$

showing that the admittance change ΔY is substantially proportional to the reflected impedance $\Delta Z_r$. Therefore, the angle arg{ΔY} of the measured admittance change ΔY is indicative of the angle arg{$\Delta Z_r$}. In some implementations, the accuracy of the measured angle is improved by applying the angle correction based on the calibration procedure as previously described with reference to the circuit 500 of FIG. 5A. Defining the Q-factor of the parallel resonant configuration of the sense circuit 701 of FIG. 7J as:

$$Q_p \approx \omega_p(L_p+L_s)/(R_{Ls}+R_{Lp}) \quad (229)$$

which may be expresses in terms of the Q-factors:

$$Q_p \approx Q_{Ls}(1+n_L)/((Q_{Ls}/Q_{Lp})+n_L) \quad (230)$$

and the normalized reflected impedance:

$$\Delta Z'_r = \Delta Z_r \omega_p C \quad (231)$$

the fractional change ΔY' may also be written as:

$$\Delta Y' \approx Q_p \Delta Z'_r \quad (232)$$

With reference to the circuit 710 of FIG. 7B, adding the parallel capacitor 715 to the circuit 700 of FIG. 7J, the impedance $Z_{11}$ at measurement port 708 in presence of an object (e.g., object 112) for the series resonant configuration becomes:

$$Z_{11} \approx R_{Ls}+j\omega L_s+(j\omega C_p+((j\omega C)^{-1}+\Delta Z_r)^{-1})^{-1} \quad (233)$$

Using the approximation of Equation (38), the impedance $Z_{11}$ may be approximated as:

$$Z_{11} \approx R_{Ls}+j\omega L_s+(j\omega(C+C_p))^{-1}+\Delta Z_r C^2/(C+C_p)^2 \quad (234)$$

Series resonance in absence of a foreign object occurs approximately at an angular frequency satisfying:

$$(j\omega(C+C_p))^{-1}+j\omega L_s \approx 0 \quad (235)$$

yielding the series resonant angular frequency:

$$\omega_s \approx (L_s(C+C_p))^{-1/2} \quad (236)$$

At this frequency, the impedance $Z_{11,0}$ becomes substantially real:

$$Z_{11,0} \approx Re\{Z_{11,0}\} = R_s \approx R_{Ls} \quad (237)$$

with $R_s$ denoting the series resonant resistance, while the impedance $Z_{11}$ in presence of an object (e.g., object 110) is approximately:

$$Z_{11} \approx R_s+\Delta Z \approx R_{Ls}+\Delta Z_r C^2/(C+C_p)^2 \quad (238)$$

Defining the capacitance ratio:

$$n_C = C/C_p \quad (239)$$

the impedance $Z_{11,0}$ of Equation (238) may also be expressed in terms of the Q-factor $Q_{Ls}$ of the series inductor 714, the capacitance C of the sense electrode 702, and the capacitance ratio $n_C$ as:

$$Z_{11,0} \approx R_s \approx n_C/((1+n_C)\omega_s C\, Q_{Ls}) \quad (240)$$

According to Equation (240), the impedance $Z_{11}$ of the sense circuit 711 of FIG. 7B can be reduced by decreasing the capacitance ratio $n_C=C/C_p$, while maintaining the series resonance $\omega_s$ substantially at the nominal sense frequency. For $n_C=1/2$, the series resonant resistance $R_s$ amounts to 1/3 of that of the sense circuit 501 of FIG. 5F. Therefore, in some implementations, the series resonant configuration of the circuit 710 of FIG. 7B using the parallel capacitor is employed as an alternative to using a transformer (e.g., transformer 726 of FIG. 7C) for transforming the impedance $Z_{11}$ to be within a suitable operating admittance range as discussed with reference to FIG. 7C.

Based on Equation (238), the impedance change ΔZ resulting at the measurement port 718 of the sense circuit 711 of FIG. 7B becomes approximately:

$$\Delta Z \approx (n_C/(1+n_C))^2 \Delta Z_r \quad (241)$$

Defining the Q-factor of the series resonant configuration of the sense circuit 711 of FIG. 7B as:

$$Q_s \approx \omega_s L_s/R_s = Q_{Ls} \quad (242)$$

the fractional change ΔZ' may be expressed as:

$$\Delta Z' \approx \Delta Z/R_s \approx n_C/(1+n_C) Q_s \Delta Z'_r \quad (243)$$

Based on Equation (243), adding a parallel capacitor 715 (as shown in FIG. 5C) for purposes of impedance matching as previously discussed with reference to FIGS. 5A and 5B may substantially reduce the fractional change. Though not shown herein, the same reduction may also apply to the parallel resonant configuration of the circuit 710 of FIG. 7B.

In some implementations based on the circuit 700 of FIG. 7J, the current level $I_0$ of the current source 512 is adjusted to match a specified current $|I_C|$ in the sense electrode 702. Therefore, in an aspect, the required current level $I_0$, the resulting voltage V at the measurement port 708, and the drive power level P may be considered. For the series resonant configuration of the circuit 700 of FIG. 7J, the current level $I_0$ approximately equals $|I_C|$:

$$I_0 \approx |I_C| \quad (244)$$

resulting in a voltage across the measurement port 708:

$$V \approx |Z_{11,0}| I_0 \approx R_{Ls} I_C \quad (245)$$

and in a drive power level:

$$P \approx V\, I_0 \approx R_{Ls}|I_C|^2 \quad (246)$$

For the parallel resonant configuration of the circuit 700 of FIG. 7J, the level $|I_C|$ of the current through the sense electrode 702 is approximately $Q_p$ times higher than the drive current level $I_0$ providing:

$$I_0 \approx |I_C|(\omega_p L_s-(1/\omega_p C))G_p \approx |I_C|\omega_p L_p G_p \approx |I_C|(1+n_L)/Q_p \quad (247)$$

The voltage across the measurement port 708 becomes approximately:

$$V \approx I_0/|Y_{11,0}| \approx |I_C|\omega_p L_p \quad (248)$$

and the power:

$$P \approx V\, I_0 \approx (R_{Ls}+R_{Lp})|I_C|^2 \quad (249)$$

In a further aspect, the differential narrowband extrinsic SNR of the series resonant configuration of the circuit 700 of FIG. 7J may be expressed as:

$$\Delta SNR_{ex,s} \approx |\Delta Z_r||I_C|/V_{sn} \approx (|I_C|/V_{sn})|\Delta Z'_r|/(\omega_s C) \quad (250)$$

with $|I_C|$ denoting the magnitude of the sense signal current in the sense electrode 702, which approximately equals the current magnitude $|I_0|$, and $V_{sn}$ the noise voltage capacitively coupled into the sense electrode 702 as illustrated in FIG. 7G by the series voltage source $V_{sn}$. The differential narrowband extrinsic SNR $\Delta SNR_{ex,s}$ may also be expressed in terms of the normalized reflected impedance $|\Delta Z'_r|$ as shown on the right side of Equation (250).

Since the sense circuit 701 transforms the voltage drop across $\Delta Z_r$ to ΔV in the same way as it transforms $V_{sn}$ to $V_n$, Equation (250) also applies to the parallel resonant configuration as well as to the series and parallel resonant configuration of the circuit 700 of FIG. 7J, meaning that:

$$\Delta SNR_{ex,p} = \Delta SNR_{ex,s} \quad (251)$$

Equations (250) and (251) indicate that the differential narrowband extrinsic SNR of the series and parallel resonant configuration of the circuit 700 of FIG. 7J are no function of the Q-factor.

Adding the capacitor 715 with reference to the circuit 710 of FIG. 7B may not impact the differential narrowband extrinsic SNR if the sense electrode current level $|I_C|$ in the sense electrode 702 is maintained. However, the current $|I_0|$ to be delivered by the current source 512 may increase by the factor $(1+n_C)/n_C$, hence increasing the losses in the equivalent series resistances $R_{Ls}$ of the inductor 704 by the factor $((1+n_C)/n_C)^2$.

In implementations and operations where the noise current $I_{0,n}$ as indicated in FIG. 7J may cause the predominant contribution in $V_n$ as previously discussed with reference to FIG. 5F, the noise voltage $V_n$ for the series resonant configuration is approximately:

$$V_n \approx R_{Ls} I_{0,n} \quad (252)$$

while the voltage change $|\Delta V|$ in presence of an object (e.g., object 112) is:

$$|\Delta V| = |I_C||\Delta Z_r| \approx |I_0||\Delta Z_r| \quad (253)$$

The differential narrowband intrinsic SNR with respect to the drive current noise $I_{0,n}$ for the series resonant configuration of the circuit 700 of FIG. 7J may be expressed as:

$$\Delta SNR_{int,s} \approx (|I_0|/I_{0,n})|\Delta Z_r|/R_{Ls} = (|I_0|/I_{0,n})|\Delta Z'| \quad (254)$$

Equation (254) may also be written in terms of the Q-factor $Q_s$ and $\Delta Z'_r$ as:

$$\Delta SNR_{int,s} \approx (|I_0|/I_{0,n}) Q_s |\Delta Z'_r| \quad (255)$$

With the noise current $I_{0,n}$ as the predominant contribution, the noise voltage $V_n$ at parallel resonance becomes approximately:

$$V_n \approx I_{0,n}/|Y_{11,0}| \quad (256)$$

Using Equation (256) and applying Equation (70), the differential narrowband intrinsic SNR with respect to the noise current $I_{0,n}$ for the parallel resonant configuration of the circuit 700 of FIG. 7J may be expressed as:

$$\Delta SNR_{int,p} \approx (|I_0|/I_{0,n})|\Delta Z_r|/(R_{Lp}+R_{Ls}) = (|I_0|/I_{0,n})|\Delta Y'| \quad (257)$$

Equation (257) may also be written in terms of the Q-factor $Q_p$ and $\Delta Z'_r$ as:

$$\Delta SNR_{int,p} \approx (|I_0|/I_{0,n}) Q_p |\Delta Z'_r| \quad (258)$$

which is a linear function of the Q-factor $Q_p$.

Similar considerations may be made for the thermal noise though not repeated herein for the circuit 700 of FIG. 7J. Equations for the intrinsic narrowband SNR with respect to the thermal noise are provided in the table of FIG. 7N.

Since $\Delta SNR_{int,s}$ and $\Delta SNR_{int,p}$ are both proportional to the magnitude of the fractional change $|\Delta Z'|$ and since adding the capacitor 715 reduces the fractional change $|\Delta Z'|$ by the factor $n_C/(1+n_C)$, the differential narrowband intrinsic SNR of the circuit 710 of FIG. 7B in both the series and parallel resonant configuration may be $(1+n_C)/n_C$ times lower if compared with the circuit 700 of FIG. 7J. For $n_C=1/2$, it is approximately three times lower.

In another aspect, the broadband extrinsic SNR as defined by Equation (62) with respect to the induced voltage component $V_{sW}$ at the fundamental WPT operating angular frequency $\omega_W$ is considered. Assuming electric field coupling as the predominant contribution, the disturbance signal voltage $V_{sn}$ may relate to the WPT coil voltage $V_{WPT}$ as follows:

$$V_{sn} \approx V_{sW} \approx (C_{sW}/C) V_{WPT} \quad (259)$$

where $C_{sW}$ denotes the mutual capacitance between the sense electrode 702 and the WPT coil (e.g., WPT coil 202 with reference to FIGS. 2 and 3). Further assuming:

$$1/(\omega_W C) >> \omega_W L_s \quad (260)$$

$$\omega_s >> \omega_W \quad (261)$$

the disturbance voltage component $V_W$ in the voltage V for the series resonant configuration of the circuit 700 of FIG. 7J becomes approximately:

$$V_W \approx V_{sW}\omega_W C \omega_W L_p \approx V_{sW}(\omega_W/\omega_s)^2/n_L \quad (262)$$

The factor $(\omega_W/\omega_s)^2/n_L$ may be considered as the attenuation of the low frequency induced voltage $V_{sW}$ by the high pass filter effect of the sense circuit 701. Using:

$$|V| = |I_0|R_s \approx |I_C|R_{Ls} \quad (263)$$

the broadband extrinsic SNR with respect to the fundamental WPT fundamental disturbance component $V_{sW}$ for the series resonant configuration of the circuit 700 of FIG. 7J may be expressed as:

$$SNR_{W,s} \approx (|I_C|/V_{sW})(1/\omega_s C)(\omega_s/\omega_W)^2 n_L/Q_s \quad (264)$$

For a given ratio $|I_C|/V_{sW}$ and susceptance $\omega_s C$, the broadband extrinsic SNR for the series resonant configuration of the circuit 700 of FIG. 7J is proportional to the inductance ratio $n_L$, the square of the frequency ratio $\omega_s/\omega_W$, but inverse proportional to the Q-factor $Q_s$ of the sense circuit 701.

The disturbance voltage component $V_W$ in the voltage V for the parallel resonant configuration of the circuit 700 of FIG. 7J becomes approximately:

$$V_n = V_W \approx V_{sW}\omega_W C \omega_W L_p \approx V_{sW}(\omega_W/\omega_p)^2/(1+n_L) \quad (265)$$

The factor $(\omega_W/\omega_p)^2/(1+n_L)$ may be considered as the attenuation of the low frequency induced voltage $V_{sW}$ by the high pass filter effect of the sense circuit 701. Further, expressing the sense signal voltage $|V|$ at the angular frequency $\omega_p$ in terms of the sense electrode current $|I_C|$:

$$|V| \approx |I_C|((\omega_p C)^{-1} - \omega_p L_s) \approx |I_C|\omega_p L_p \quad (266)$$

the broadband extrinsic SNR with respect to the WPT fundamental disturbance voltage component $V_{sW}$ for the parallel resonant configuration of the circuit 700 of FIG. 7J may be expressed as:

$$SNR_{W,p} \approx (|I_C|/V_{sW})(1/\omega_p C)(\omega_p/\omega_W)^2 \quad (267)$$

For a given ratio $|I_C|/V_{sW}$ and susceptance $\omega_p C$, the broadband extrinsic SNR for the parallel resonant configuration of the circuit 700 of FIG. 7J is proportional to the square of the frequency ratio $\omega_p/\omega_W$, but no function of $Q_p$ and $n_L$.

For $\omega_s=\omega_p$, the following relation may be found between the broadband extrinsic SNRs of the series and parallel resonant configurations of the circuit 700 of FIG. 7G as given by Equations (264) and (267), respectively:

$$SNR_{W,p} \approx SNR_{W,s} Q_s/n_L \quad (268)$$

where $Q_s$ refers to the Q-factor of the series resonant configuration of the circuit 700. From Equation (268), it can be seen that the broadband extrinsic SNR for the parallel resonant configuration of the circuit 700 of FIG. 7J may be substantially higher than that of the series resonant configuration. In an example implementation with $L_p=L$ ($n_L=1$), $Q_s \approx Q=30$ for the series and parallel resonant configuration, the broadband extrinsic SNR of the parallel resonant configuration may be 36 dB higher.

It may be appreciated that adding the capacitor 715 with reference to FIG. 7B has virtually no impact on the low frequency disturbance voltage $V_W$ as resulting at the measurement port 708 if:

$$(\omega_W C_p)^{-1} >> \omega_W(L_s+L_p) \quad (269)$$

and:

$$\omega_s=\omega_p >> \omega_W \quad (270)$$

holds. The same is true for the sense signal voltage |V| that may be expressed for the series resonant configuration of the circuit 700 of FIG. 7J including the capacitor 715 as:

$$|V| \approx I_0 R_s \approx |I_C|/(\omega_s C\, Q_{Ls}) \tag{271}$$

if the sense current level $|I_C|$ is maintained by adjusting $I_0$ to:

$$I_0 \approx |I_C|(1+n_C)/n_C \tag{272}$$

Therefore, it may be concluded that the broadband extrinsic SNR given by Equation (264) also applies to the series resonant configuration of the circuit 710 of FIG. 7B using the parallel capacitor 715.

Equations (201) to (268) may also apply to the circuit 720 of FIG. 7C with some minor modifications e.g., by replacing the inductance $L_s$ by $L_s+L_\sigma$, the series resistance $R_{Ls}$ by $R_{Ls}+R_w$, the inductance $L_p$ by $L_m$, and the series resistance $R_{Lp}$ by $R_m$, where $L_\sigma$ denotes the transformer's 726 secondary referred leakage inductance, $R_w$ its secondary referred equivalent series resistance with respect to the conductor losses, $L_m$ its secondary referred main inductance, and $R_m$ its secondary referred equivalent series resistance with respect to the core losses with reference to FIG. 5H. Further, if $L_\sigma$ is a substantial portion of $L+L_\sigma$, the inductance ratio $n_L=L/L_p$ can be replaced by $(L+L_\sigma)/L_m$. Though not proven herein, the conclusions drawn from the analysis of the circuit 520 of FIG. 5B may also apply to the circuit 720 of FIG. 7C.

The equivalent circuit model 740-1 as illustrated in FIG. 7K comprises the sense electrode's 702 capacitance C, the parallel inductor's 744 inductance $L_P$ and its equivalent parallel conductance $G_{Lp}$, the series capacitor's 746 capacitance $C_s$, an ideal sense signal voltage source 552, and an ideal current measurement circuit 550. It may be appreciated that in practical implementations, losses in the capacitors (including the sense electrode 702) are generally substantially lower than the losses in the parallel inductor 744. Therefore, an equivalent series resistance of the capacitors 746 and the sense electrode 702 are neglected (not shown) in the equivalent circuit model 740-1 of FIG. 7K. Further, the equivalent circuit model 740-1 includes an admittance $\Delta Y_r$ in parallel to the capacitance C representing the reflected admittance of the object 110, 112, or 114 proximate to the sense electrode 702. (The reflected admittance $\Delta Y_r$ may be regarded as the object 110, 112, or 114 as illustrated in FIG. 7E abstracted away). The equivalent circuit model 740-1 also includes a noise current source $I_{sn}$ in parallel to the capacitance C representing the noise current induced into sense electrode 702 by the electric field as generated when WPT is active. The noise current $I_{sn}$ may include any low frequency component (e.g., the fundamental of the WPT operating frequency and harmonics thereof) as well as any high frequency component (e.g., switching noise at the sense frequency). The equivalent circuit model 740-1 further indicates the admittance $Y_{11}$ and the impedance $Z_{11}$ $(=1/Y_{11})$, the sense signal voltage $V_0$ with an additive noise voltage component $V_{0,n}$, the sense signal current I with an additive noise current component $I_n$, and the measurement port 748 (indicated by the terminal and the dashed line) where the voltage $V_0+V_{0,n}$ is applied, the current $I+I_n$ is measured, and where $Y_{11}$ or $Z_{11}$ refer to. Because the equivalent circuit model 740-1 applies to the circuit 740 of FIG. 7E, the reference numeral 740 is used instead in the following theoretical analysis.

With the assumption of an identical sense electrode 702 in the circuits 700 and 740, the following relations may apply:

$$\Delta Y'_r = \Delta Z'_r \tag{273}$$

$$\Delta Y_r \approx \Delta Z_r (\omega C)^2 \tag{274}$$

$$I_{sn} \approx V_{sn}\omega C \tag{275}$$

$\Delta Y'_r$, $\Delta Z'_r$, $\Delta Z_r$, and $V_{sn}$ referring to the normalized reflected admittance, the normalized reflected impedance, the reflected impedance of the object 110 in the sense electrode 702, and the disturbance voltage $V_{sn}$ with reference to the circuit 700 of FIG. 7J, respectively.

To analyze the series and parallel resonant configuration of the circuit 740 of FIG. 7K, the assumptions:

$$1/\omega L_p >> G_{Lp} \tag{276}$$

$$|\Delta Y_r| << G_{Lp} \tag{277}$$

are made for a frequency range about the resonant frequency.

In an implementation configured for parallel resonance and with a susceptance:

$$\omega C_s >> |Y_{11}| \tag{278}$$

in a frequency range about the resonant frequency, the admittance $Y_{11}$ at the measurement port 748 of the circuit 740 of FIG. 7K in presence of an object (e.g., object 112) may be expressed as:

$$Y_{11} \approx G_{Lp} + (j\omega L_p)^{-1} + j\omega C + \Delta Y_r \tag{279}$$

In absence of a foreign object, a local minimum of $|Y_{11,0}(\omega)|$ (parallel resonance) occurs substantially at an angular frequency ω satisfying:

$$(j\omega L_p)^{-1} + j\omega C \approx 0 \tag{280}$$

yielding the parallel resonant angular frequency:

$$\omega_p \approx (L_p C)^{-1/2} \tag{281}$$

At this frequency, the admittance $Y_{11,0}$ becomes approximately real:

$$Y_{11,0} \approx Re\{Y_{11,0}\} = G_p \approx G_{Lp} \tag{282}$$

with $G_p$ denoting the parallel resonant conductance, while the admittance $Y_{11}$ in presence of an object (e.g., object 112) is approximately:

$$Y_{11} \approx G_p + \Delta Y_r \approx G_{Lp} + \Delta Y_r \tag{283}$$

with $\Delta Y_r$ referring to the reflected admittance as previously defined with reference to FIG. 7A.

The fractional change ΔY' for the parallel resonant configuration of the circuit 740 of FIG. 7K becomes approximately:

$$\Delta Y' \approx \Delta Y_r/G_p \approx \Delta Y_r/G_{Lp} \tag{284}$$

Defining the normalized reflected admittance as:

$$\Delta Y'_r = \Delta Y_r/(\omega_p C) \tag{285}$$

the Q-factor of the parallel inductor 744:

$$Q_{Lp} = 1/(\omega_p L_p G_{Lp}) \tag{286}$$

and the Q-factor of the parallel resonant configuration of the sense circuit 741 of FIG. 7K as:

$$Q_p \approx \omega_p C/G_p \approx Q_{Lp} \tag{287}$$

the fractional change may also be written in terms of $\Delta Y'_r$ and $Q_p$:

$$\Delta Y' \approx Q_p \Delta Y'_r \tag{288}$$

According to Equation (288) with (214), the parallel resonant configuration of the circuit 740 of FIG. 7K is equivalent to the series resonant configuration of the circuit 700 of FIG. 7J with respect to the fractional change.

To analyze the series resonant configuration of the circuit 740 of FIG. 7K, the additional assumption:

$$|\omega C_p-(\omega L_p)^{-1}|>>G_{Lp} \quad (289)$$

is made for a frequency range about the resonant frequency. The impedance $Z_{11}$ at the measurement port 748 in presence of an object (e.g., object 112) may be expressed as:

$$Z_{11}=(j\omega C_s)^{-1}+(G_{Lp}+(j\omega L_p)^{-1}+j\omega C+\Delta Y_r)^{-1} \quad (290)$$

Using the approximation of Equation (38), the impedance $Z_{11}$ may be approximated as:

$$Z_{11}\approx(j\omega C_s)^{-1}+(j\omega C+(j\omega L_p)^{-1})^{-1}+(G_{Lp}+\Delta Y_r)/(\omega C-(\omega L_p)^{-1})^2 \quad (291)$$

In absence of a foreign object, a local minimum of $|Z_{11,0}(\omega)|$ (series resonance) occurs substantially at an angular frequency $\omega$ satisfying:

$$(j\omega L_p)^{-1}+j\omega(C+C_s)\approx 0 \quad (292)$$

yielding for the series resonant angular frequency:

$$\omega_s\approx(L(C+C_s))^{-1/2} \quad (293)$$

At this frequency, the impedance $Z_{11,0}$ becomes substantially real:

$$Z_{11,0}\approx Re\{Z_{11,0}\}=R_s=G_{Lp}/(\omega_s C_s)^2 \quad (294)$$

with $R_s$ denoting the series resonant resistance, while the impedance $Z_{11}$ in presence of an object (e.g., object 112) is approximately:

$$Z_{11}\approx R_s+\Delta Z\approx(G_{Lp}+\Delta Y_r)/(\omega_s C_s)^2 \quad (295)$$

with:

$$\Delta Z\approx\Delta Y_r/(\omega_s C_s)^2 \quad (296)$$

Further, the Q-factor of the parallel inductor 744 may be defined as:

$$Q_{Lp}=1/(\omega_s L_p G_{Lp}) \quad (297)$$

and the capacitance ratio:

$$n_C=C/C_s \quad (298)$$

Equation (294) at $\omega_s$ may be expressed as:

$$Z_{11,0}=R_s\approx n_C(1+n_C)/(Q_{Lp}\omega_s C) \quad (299)$$

For $n_C>>1$, the series resonant resistance $R_s$ becomes approximately:

$$R_s\approx n_C^2/(Q_{Lp}\omega_s C) \quad (300)$$

According to Equation (299), the impedance $Z_{11}$ at $\omega_s$ of the sense circuit 741 of FIG. 7K can be increased or reduced by adjusting the capacitance ratio $n_C=C/C_s$ accordingly, while maintaining series resonance substantially at the nominal sense frequency. Therefore, in some implementation the series resonant configuration of the circuit 740 of FIG. 7K is employed as an alternative to using a transformer (e.g., transformer 726 of FIG. 7C) for transforming the impedance $Z_{11}$ to be within a suitable operating impedance range as previously discussed with reference to FIG. 7C.

The fractional change $\Delta Z'$ for the series resonant configuration of the circuit 740 of FIG. 7K becomes approximately:

$$\Delta Z'=\Delta Z/R_s\approx\Delta Y_r/G_{Lp} \quad (301)$$

According to Equation (301), the impedance change $\Delta Z$ is proportional to the reflected admittance $\Delta Y_r$. Therefore, the angle $\arg\{\Delta Z\}$ of the measured impedance change $\Delta Z$ is indicative of the angle $\arg\{\Delta Y_r\}$. In some implementations, the accuracy of the measured angle is improved by applying the angle correction based on the calibration procedure as previously described with reference to the circuit 700 of FIG. 7A.

The Q-factor of the series resonant configuration of the sense circuit 741 of FIG. 7K may be defined as:

$$Q_s\approx\omega_s(C+C_s)/G_{Lp}\approx 1/(\omega_s L_p G_{Lp})=Q_{Lp} \quad (302)$$

which equals the Q-factor of the parallel inductor 744. Using definitions above, Equation (302) may also be expressed in terms of the series resonant resistance $R_s$, the electrode 702 capacitance C, and the capacitance ratio $n_C$ as:

$$Q_s\approx n_C(1+n_C)/(R_s\omega_s C) \quad (303)$$

Further, the normalized reflected admittance may be defined as:

$$\Delta Y'_r=\Delta Y_r/(\omega_s C) \quad (304)$$

The fractional impedance change $\Delta Z'$ may also be written in terms of $Q_s$ and $\Delta Y'_r$ as:

$$\Delta Z'\approx Q_s\Delta Y'_r n_C/(1+n_C) \quad (305)$$

In some implementations based on the circuit 740 of FIG. 7K, the voltage level $V_0$ of the voltage source 542 is adjusted to match a specified current $|I_C|$ in the sense electrode 702. Therefore, in an aspect, the required voltage level $V_0$, the resulting current/at the measurement port 748, and the drive power level P may be considered. For the parallel resonant configuration of the circuit 740 of FIG. 7K, the voltage level $V_0$ approximately equals the voltage across the sense electrode 702 providing the relation:

$$V_0\approx|I_C|/(\omega_p C) \quad (306)$$

The current I at the measurement port 748 becomes approximately:

$$I\approx|Y_{11,0}|V_0\approx G_{Lp}V_0 \quad (307)$$

and the drive power level:

$$P\approx V_0 I\approx|I_C|^2 G_{Lp}/(\omega_p C)^2=|I_C|^2 Q_{Lp}/(\omega_p C) \quad (308)$$

For the series resonant configuration of the circuit 740 of FIG. 7K, the voltage $|V_C|$ across the sense electrode 702 is approximately:

$$|V_C|\approx|I_C|/(\omega_s C) \quad (309)$$

yielding for the drive power level:

$$P\approx|V_C|^2 G_{Lp}\approx|I_C|^2 G_{Lp}/(\omega_s C)^2\approx|I_C|^2 Q_{Lp}/(\omega_s C) \quad (310)$$

which equals the drive power level of the parallel resonant configuration of the circuit 740 of FIG. 7K.

In a further aspect, it may be meaningful to define the narrowband SNR at the measurement port 748 of the circuit 740 of FIG. 7K as given by Equation (14), where $|\Delta I|$ denotes the magnitude of the current change in the measured current I due to the presence of an object (e.g., object 112) and $I_n$ the additive noise voltage component as indicated in the circuit 740 of FIG. 7K. More specifically, the current change $|\Delta I|$ may refer to the r.m.s. current and $I_n$ to the r.m.s. noise current as measured at the nominal sense frequency in the bandwidth $B_m$ of the current measurement circuit 550. This noise current $I_n$ may include circuit intrinsic and extrinsic noise components as discussed above. The SNR as given by Equation (14) is referred herein as to the differential narrowband SNR.

In another aspect, it may be meaningful to define the broadband extrinsic SNR at the measurement port 748 of the circuit 740 of FIG. 7K as given by Equation (147), where $|I|$ denotes the magnitude of the sense signal current and $I_W$ the disturbance current at the fundamental WPT operating frequency, which may be a prominent component in $I_n$ when WPT is active. More specifically, the current |I| may refer to the r.m.s. current and $I_W$ to the r.m.s. disturbance current as measured at the measurement port 748 at the fundamental WPT operating frequency.

Using Equation (14), the differential narrowband extrinsic SNR of the parallel resonant configuration of the circuit 740 of FIG. 7K may be expressed as:

$$\Delta SNR_{ex,p} \approx (|I_C|/I_{sn})(|\Delta Y_r|/\omega_p C) = (|I_C|/I_{sn})|\Delta Y'_r| \quad (311)$$

with $I_{sn}$ the noise current as illustrated in FIG. 7K.

Since the sense circuit 741 transforms the shunt current through $\Delta Y_r$ to the current change $\Delta I$ in the same way as it transforms $I_{sn}$ to $I_n$, Equation (311) also applies to the series resonant configuration, meaning that:

$$\Delta SNR_{ex,s} \approx \Delta SNR_{ex,p} \quad (312)$$

In implementations with the noise voltage $V_{0,n}$ causing the predominant noise contribution in $I_n$ as previously discussed, the noise current $I_n$ for the parallel resonant configuration of the circuit 740 is approximately:

$$I_n \approx G_p V_{0,n} \quad (313)$$

while the current change in presence of an object (e.g., object 112) is:

$$|\Delta I| = |V_L||\Delta Y_r| \approx |V_0||\Delta Y_r| \quad (314)$$

Applying Equations above to Equation (14), the differential narrowband intrinsic SNR with respect to the noise voltage $V_{0,n}$ for the parallel resonant configuration of the circuit 740 of FIG. 7K may be expressed as:

$$\Delta SNR_{int,p} \approx (|V_0|/V_{0,n})|\Delta Y_r|/G_p \quad (315)$$

Equation (315) may also be written as:

$$\Delta SNR_{int,p} \approx (|V_0|/V_{0,n})Q_p|\Delta Y'_r \quad (316)$$

Using:

$$\Delta Z' << 1 \quad (317)$$

the current change magnitude |ΔI| for the series resonant configuration of the circuit 740 of FIG. 7G may be written as:

$$|\Delta I| \approx |V_0||\Delta Z|/|Z_{11,0}|^2 \quad (318)$$

With the noise voltage $V_{0,n}$ as the predominant noise contribution, the noise current $I_n$ at series resonance becomes:

$$I_n = V_{0,n}/|Z_{11,0}| \quad (319)$$

The differential narrowband intrinsic SNR with respect to the noise voltage $V_{0,n}$ for the series resonant configuration of the circuit 540 of FIG. 5G may be expressed as:

$$\Delta SNR_{int,s} \approx (|V_0|/V_{0,n})|\Delta Z'| \approx (|V_0|/V_{0,n})|\Delta Y_r|/G_{Lp} \quad (320)$$

Equation (320) may also be written in terms of the Q-factor $Q_s$ and the normalized reflected admittance $\Delta Y'_r$ as:

$$\Delta SNR_{int,s} \approx (|V_0|/V_{0,n})Q_s|\Delta Y'_r|n_C/(1+n_C) \quad (321)$$

Similar considerations may be made for the thermal noise though not repeated herein for the circuit 740 of FIG. 7K. An equation for the differential narrowband intrinsic SNR with respect to thermal noise is given in the table of FIG. 7N.

In a further aspect, the broadband extrinsic SNR as defined by Equation (147) with respect to the induced current component:

$$I_{sn} = I_{sW} \quad (322)$$

at the fundamental WPT operating angular frequency $\omega_W$ is considered. Further, assuming:

$$1/(\omega_W C) >> \omega_W L_p \quad (323)$$

the disturbance current component $I_W$ in the current I for the parallel resonant configuration of the circuit 740 of FIG. 7K becomes approximately:

$$I_n = I_W \approx I_{sW}\omega_W L_p \omega_W C_s \approx I_{sW}(\omega_W/\omega_p)^2/n_C \quad (324)$$

The factor $(\omega_W/\omega_p)^2/n_C$ may be considered as the attenuation of the low frequency induced current $I_{sW}$ by the high pass filter effect of the sense circuit 741. Using:

$$|I| \approx |V_C|G_{Lp} \quad (325)$$

the broadband extrinsic SNR of the parallel resonant configuration of the circuit 740 of FIG. 7K may be expressed as:

$$SNR_{W,p} \approx (|V_C|G_{Lp}/I_{sW})(\omega_p/\omega_W)^2 n_C \quad (326)$$

with:

$$|V_C| \approx |I_C|/(\omega_p C) \quad (327)$$

representing the voltage across the sense electrode 702. Equation (326) may also be written in terms of the Q-factor $Q_p$ and the inductance ratio $n_C$ as:

$$SNR_{W,p} \approx (|I_C|/I_{sW})(\omega_p/\omega_W)^2 n_C/Q_p \quad (328)$$

The disturbance current $I_W$ in the current I for the series resonant configuration of the circuit 740 of FIG. 7K becomes approximately:

$$I_W \approx I_{sW}\omega_W L \omega_W C_s \approx I_{sW}(\omega_W/\omega_s)^2/(1+n_C) \quad (329)$$

The factor $(\omega_W/\omega_p)^2/(1+n_C)$ may be considered as the attenuation of the low frequency induced current $I_{sW}$ by the high pass filter effect of the sense circuit 741. Further, expressing the sense signal current |I| at the angular frequency co, in terms of the sense electrode 702 voltage $|V_C|$ is as follows:

$$|I| \approx |V_C|(\omega_s C - (\omega_s L_p)^{-1}) \approx |V_C|\omega_s C_s \quad (330)$$

The broadband extrinsic SNR with respect to the WPT fundamental disturbance current component $I_{sW}$ for the series resonant configuration of the circuit 740 of FIG. 7K may be expressed as:

$$SNR_{W,s} \approx (|V_C|\omega_s C_s/I_{sW})(\omega_s/\omega_W)^2(1+n_C) \quad (331)$$

Using the relation:

$$|V_C| \approx |I_C|/\omega_s C \quad (332)$$

Equation (331) may also be written as:

$$SNR_{W,s} \approx (|I_C|/I_{sW})(\omega_s/\omega_W)^2(1+n_C)/n_C \quad (333)$$

Based on Equations (328) and (333) and $\omega_s = w_p$, the following relation between the broadband extrinsic SNRs of the parallel and series resonant configurations of the circuit 740 of FIG. 7K may be found:

$$SNR_{W,s} \approx SNR_{W,p}Q_p(1+n_C)/n_C^2 \quad (334)$$

A selection of equations with respect to the resonant frequency, the Q-factor, the impedance/admittance of the sense circuit, the fractional change, and the various SNRs for the series and parallel resonant configurations of the circuit 700 of FIG. 7J and the circuit 740 of FIG. 7K are listed in the table of FIG. 7N. As previously noted, these equations are valid for the assumptions made with reference to FIGS. 7J and 7K.

TABLE 3 provides example parameter values as used for a numerical analysis of the series and parallel resonant configuration of the circuit 700 of FIG. 7J and the circuit 740 of FIG. 7K. Values for the induced disturbance voltage $V_{sW}$, the noise voltage $V_{sn}$, and the equivalent respective currents $I_{sW}$ and $I_{sn}$ of the circuit 740 may be considered typical for the multi-purpose detection circuit 100 integrated into a wireless power transfer structure (e.g., wireless power transfer structure 200 with reference to FIG. 2). The normalized reflected impedance of the object 114 as given in TABLE 1 may be typical for a human extremity (e.g., a hand) in a distance of 150 mm from a single-ended sense electrode 702 (e.g., capacitive sense element 109*a*) composed of two sections (as illustrated in FIG. 1) each with a form factor of about 350×45 mm and electrically connected in parallel. The example sense current level $|I_C|$ may be within a constraint given by an electromagnetic emission limit of an established EMC standard (e.g., EN 300330). The example SNRs $|I_0|/I_{0,n}$ and $|V_0|/V_{0,n}$ may be typical for a digital implementation of a sense signal source (e.g., sense signal current source 512 and sense signal voltage source 552), respectively, as previously described with reference to FIGS. 4 and 5F.

TABLE 3

| Circuit Configuration | 700 of FIG. 7J Series resonant | 700 of FIG. 7J Parallel resonant | 740 of FIG. 7K Series resonant | 740 of FIG. 7K Parallel resonant |
|---|---|---|---|---|
| Nominal sense frequency | 3 MHz | 3 MHz | 3 MHz | 3 MHz |
| WPT operating frequency | 85 kHz | 85 kHz | 85 kHz | 85 kHz |
| Capacitance Cof sense electrode 702 | 30 pF | 30 pF | 30 pF | 30 pF |
| Inductance/capacitance ratio | $n_L = 1$ | $n_L = 2$ | $n_C = 2.5$ | $n_C = 1$ |
| Q-factor of inductor 704/inductor 744 | $Q_{Ls} = 30$ | $Q_{Ls} = 30$ | $Q_{Lp} = 30$ | $Q_{Lp} = 30$ |
| Q-factor of sense electrode 702 | $Q >> Q_{Ls}$ | $Q >> Q_{Ls}$ | $Q >> Q_{Lp}$ | $Q >> Q_{Lp}$ |

TABLE 3-continued

| Circuit Configuration | 700 of FIG. 7J Series resonant | 700 of FIG. 7J Parallel resonant | 740 of FIG. 7K Series resonant | 740 of FIG. 7K Parallel resonant |
|---|---|---|---|---|
| Q-factor of inductor 706/capacitor 746 | $Q_{Lp} = 30$ | $Q_{Lp} = 30$ | $Q_{Cs} >> Q_{Lp}$ | $Q_{Cs} >> Q_{Lp}$ |
| Normalized reflected impedance | $\|\Delta Z_r'\| =$ 100 ppm | $\|\Delta Z_r'\| =$ 100 ppm | $\|\Delta Y_r'\| =$ 100 ppm | $\|\Delta Y_r'\| =$ 100 ppm |
| Angle of reflected impedance $\arg\{\Delta Z_r\}$ | $\arg\{\Delta Z_r\}=$ 45° | $\arg\{\Delta Z_r\}=$ 45° | $\arg\{\Delta Y_r\}=$ 45° | $\arg\{\Delta Y_r\}=$ 45° |
| Sense electrode 702 current level $\|I_c\|$ | 5 $mA_{rms}$ | 5 $mA_{rms}$ | 5 $mA_{rms}$ | 5 $mA_{rms}$ |
| Extrinsic noise voltage $V_{sn}$/ current $I_{sn}$ (WPT switching noise) | 25 $\mu V_{rms}$ | 25 $\mu V_{rms}$ | 14.1 $nA_{rms}$ | 14.1 $nA_{rms}$ |
| SNR of sense signal source 512/552 | $\|I_0\|/I_{0,n} =$ 80 dB | $\|I_0\|/I_{0,n} =$ 80 dB | $\|V_0\|/V_{0,n} =$ 80 dB | $\|V_0\|/V_{0,n} =$ 80 dB |
| Ambient temperature T | 350 K | 350 K | 350 K | 350 K |
| Equiv. noise bandwidth $B_m$ of measurement circuit 510/540 | 200 Hz | 200 Hz | 200 Hz | 200 Hz |
| WPT fundamental disturbance voltage $V_{sW}$/current $I_{sW}$ | 150 $V_{rms}$ | 150 $V_{rms}$ | 2.4 $mA_{rms}$ | 2.4 $mA_{rms}$ |

Numerical results as obtained based on the numerical assumptions of TABLE 3 using the relevant equations as defined above with reference to FIGS. 7J and 7K are listed in TABLE 6. TABLE 6 additionally includes numerical results for the angle error $\arg\{\Delta Z'\}$ as noted in connection with FIG. 7A. Further, it includes the drive current level $I_0$, the drive power level P to drive the sense electrode 702 of the sense circuit 701 with the sense current $|I_C|$ as specified in TABLE 5. Accordingly, it includes the drive voltage level $V_0$, the drive power level P to drive the sense electrode 702 of the sense circuit 741 with the sense current $|I_C|$ as specified in TABLE 5. Some of the results listed in TABLE 6 were determined using a circuit analysis tool.

TABLE 4

| Circuit Configuration | 700 of FIG. 7J Series resonant | 700 of FIG. 7J Parallel resonant | 740 of FIG. 7K Series resonant | 740 of FIG. 7K Parallel resonant |
|---|---|---|---|---|
| Inductance of inductor 704/744 | $L_s = 93.8$ µH | $L_s = 62.5$ µH | $L_p = 67$ µH | $L_p = 93.8$ µH |
| Inductance/capacitance of inductor706/ capacitor 746 | $L_p = 93.8$ µH | $L_p = 31.3$ µH | $C_s = 12$ pF | $C_s = 30$ pF |
| Q-factor of sense circuit 501/541 | $Q_s \approx 30$ | $Q_p \approx 30$ | $Q_s \approx 30$ | $Q_p \approx 30$ |
| Precise frequency of minimum $\|Z_{11,0}\|/\|Y_{11,0}\|$ | 3.0017 MHz | 2.9967 MHz | 2.9959 MHz | 3.0017 MHz |
| Impedance $\|Z_{11,0}\|$ of sense circuit 501/541 | 58.8 Ω | 5.9 kΩ | 511 Ω | 53.1 kΩ |
| Fractional change $\|\Delta Z'\|$ | 0.30% | 0.30% | 0.21% | 0.30% |
| Impedance angle error ε | −0.04° | −1.9° | −1.9° | −0.04° |
| Drive current $I_0$/ drive voltage $V_0$ | ≈5 $mA_{rms}$ | ≈0.5 $mA_{rms}$ | ≈1.0 $V_{rms}$ | ≈8.8 $V_{rms}$ |
| Voltage across $\|Z_{11,0}\|$/ current through $\|Z_{11,0}\|$ | ≈0.29 $V_{rms}$ | ≈3 $V_{rms}$ | ≈2 $mA_{rms}$ | ≈0.17 $mA_{rms}$ |
| Drive power P | ≈1.5 mW | ≈1.5 mW | ≈2 mW | ≈1.5 mW |
| Differential narrow-band extrinsic SNR (WPT switching noise) | $\Delta SNR_{ex,s} \approx$ 31 dB | $\Delta SNR_{ex,p} \approx$ 31 dB | $\Delta SNR_{ex,s} \approx$ 31 dB | $\Delta SNR_{ex,p} \approx$ 31 dB |
| Differential narrow-band intrinsic SNR (Sense signal noise) | $\Delta SNR_{int,s} \approx$ 29.5 dB | $\Delta SNR_{int,p} \approx$ 29.5 dB | $\Delta SNR_{int,s} \approx$ 26.6 dB | $\Delta SNR_{int,p} \approx$ 29.5 dB |
| Differential narrow-band intrinsic SNR (Thermal noise) | $\Delta SNR_{int,s} \approx$ 95.3 dB | $\Delta SNR_{int,p} \approx$ 95.4 dB | $\Delta SNR_{int,s} \approx$ 95.4 dB | $\Delta SNR_{int,p} \approx$ 95.4 dB |
| Broadband extrinsic SNR | $SNR_{W,s} \approx$ | $SNR_{W,p} \approx$ | $SNR_{W,s} \approx$ | $SNR_{W,p} \approx$ |

TABLE 4-continued

| Circuit Configuration | 700 of FIG. 7J Series resonant | 700 of FIG. 7J Parallel resonant | 740 of FIG. 7K Series resonant | 740 of FIG. 7K Parallel resonant |
|---|---|---|---|---|
| (WPT fundamental disturbance) | 7.8 dB | 37.3 dB | 71.2 dB | 38.7 dB |

Based on numerical results listed in TABLE 4, the following conclusions may be drawn. The high impedance magnitude $|Z_{11,0}|$ as generally presented by the parallel resonant configuration of the circuit 700 of FIG. 7A can be substantially decreased without loss in fractional change by configuring the sense circuit 701 with an inductance ratio $n_L>1$ (e.g., $n_L=2$). Conversely, the low impedance magnitude $|Z_{11,0}|$ as generally presented by the series resonant configuration of the circuit 740 of FIG. 7E can be increased at the expense of a moderate loss in fractional change by configuring the sense circuit 741 with a capacitance ratio $n_C>1$ (e.g., $n_C=2.5$). Further, the results in TABLE 4 show the circuits and configurations equivalent in terms of the differential narrowband extrinsic SNR ($\Delta SNR_{ex}$) e.g., with respect to WPT switching noise. Moreover, the numbers for the differential narrowband intrinsic SNR with respect to thermal (resistance) noise show the circuits and configurations equivalent. They also indicate that thermal noise may have a negligible impact on the overall noise, even when WPT is inactive. The numbers resulting for the broadband extrinsic SNR with respect to the WPT fundamental disturbance voltage ($V_{sW}$) show a substantial difference (>60 dB) between the series resonant configuration of the circuit 700 and 740. The parallel resonant configuration of the circuit 700 and 740 are almost equivalent and the broadband extrinsic SNRs of the circuits and configurations are above 6 dB, which may be a minimum requirement in a practical implementation. TABLE 4 further shows a negligible angle error $|\varepsilon|$ for the series resonant configuration of the circuit 700 and the parallel resonant configuration of the circuit 740 and an angle error of about 2° for each of the other configurations. With the exception of the parallel resonant configuration of the circuit 740, the current or voltage levels as required at the respective measurement port 708 and 748 for driving the sense electrode 702 with the specified sense current level $|I_C|$ may be within suitable ranges of low power electronics for the other circuits and configurations as theoretically analyzed herein. The voltage as required to drive the circuit 740 in the parallel resonant configuration may exceed a constraint as given by electronic circuitry and may require transformation e.g., using the transformer 726.

FIG. 7L illustrates a "π"-equivalent circuit model applicable to the capacitive sense elements used in the 760, 770, and 780 of FIGS. 7G, 7H, and 7I, respectively. The circuit model 762-1 comprises three capacitances connected in a "π"-topology and related to the capacitances $C_1$, $C_2$, and the mutual capacitance $C_M$ as indicated in FIGS. 7G, 7H, and 7I.

FIG. 7M illustrates another equivalent circuit model 762-2 applicable to the capacitive sense elements used in the circuits 760, 770, and 780 of FIGS. 7G, 7H, and 7I, respectively. The circuit model 762-2 comprises the capacitances $C_1$ and $C_2$ in parallel to the respective voltage-controlled current sources $I_{ind,1}$ and $I_{ind,2}$ representing the current induced into the primary and secondary sense electrode, respectively. As with the equivalent circuit models 762-1 of FIG. 7L and 562-1 of FIG. 5I, the equivalent circuit model 762-2 of FIG. 7M is electrically dual to the equivalent circuit model 562-2 of FIG. 5J.

FIG. 7N shows a table of a summary of selected equations with respect to the resonant frequency, the Q-factor and the impedance or admittance of the sense circuit, fractional change, and the various SNRs for the series and parallel resonant configurations of the circuit 700 of FIG. 7J and the circuit 740 of FIG. 7K. As previously noted, these equations are valid for the assumptions made with reference to FIGS. 7J and 7K.

Figure 8A:
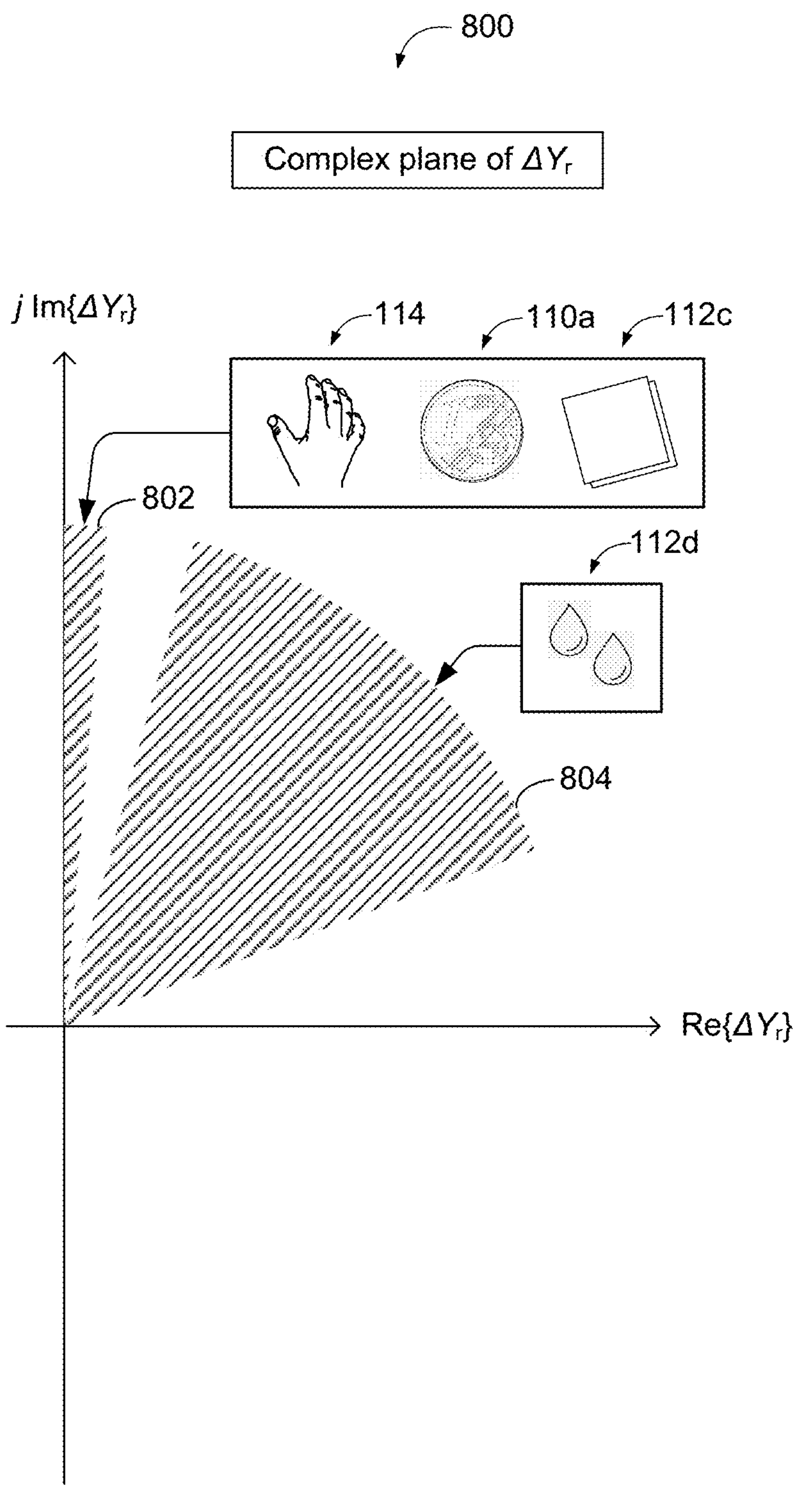
FIG. 8A illustrates a complex admittance plane, different types of objects of FIG. 1, and corresponding areas where changes of admittance may occur in presence of the object.

FIG. 8A illustrates a complex plane 800 or more precisely a portion of the complex plane comprising quadrant 1 where the reflected admittance $\Delta Y_r$ of different types (categories) of objects (e.g., object 110, 112, 114, or vehicle 330) may occur if proximate to a capacitive sense element (e.g., sense electrode 702 with reference to FIG. 7A). More specifically, FIG. 8A shows shaded areas (angle ranges 802 and 804) where the reflected admittance $\Delta Y_r$ of different types (categories) of objects (e.g., object 110, 112, 114) may be measured at a sense frequency (e.g., in the MHz range). To emphasize the characteristics of the different categories of objects, the angle ranges 802 to 804 indicated in FIG. 8A may be not drawn to scale and should be considered qualitative rather than quantitative. There may exist objects (e.g., 110, 112, 114, or vehicle 330) reflecting an admittance $\Delta Y_r$ with angles outside the ranges 802 and 804. Moreover, the actual angle ranges may also depend on the particular sense frequency, certain characteristics of the capacitive sense element (e.g., sense element 702), the inductive sensing effect of the capacitive sense element as previously discussed with reference to FIG. 1, the size, position, and orientation of an object relative to the capacitive sense element.

The complex plane 800 and the shaded areas (e.g., angle ranges 802 and 804) may also apply to the reflected impedance $\Delta Z_r$ by simply relabeling the real and imaginary axis by $\mathrm{Re}\{\Delta Z_r\}$ and $j\mathrm{Im}\{\Delta Z_r\}$, respectively (not shown in FIG. 8A).

Further, FIG. 8A illustrates a metallic object 110 represented by a 1 € cent coin (object 110*a*), two different types of non-living dielectric objects 112 such as a piece of plastic (object 112*c*) and water drops (object 112*d*). Moreover, it illustrates a living object 114 representing a hand (symbolizing a human extremity). FIG. 8A shows the metallic object 110*a*, the dielectric object 112*c*, and the living object 114 associated with the angle range 802. Further, FIG. 8A shows water drops (object 112*d*) associated with the angle range 804.

In some implementations of the multi-purpose detection circuit 100, water dripping from a wet underbody of a vehicle (e.g., vehicle 330) onto the housing of a wireless power transfer structure (e.g., housing 328 of wireless power transfer structure 200 of FIG. 3) integrating a capacitive sense element (e.g., capacitive sense element 109*a*) may cause a false positive detection. Therefore, it may be desirable to discriminate water drops (object 112*d*) based on the angle $\arg\{\Delta Y_r\}$ to prevent a false positive detection due to the water drops. The peculiarities of water drops with respect to the reflected admittance $\Delta Y_r$ are analyzed and discussed below with reference to FIGS. 8B, 8C, 8D, 8E, 8F, and 8H.

Figure 8B:
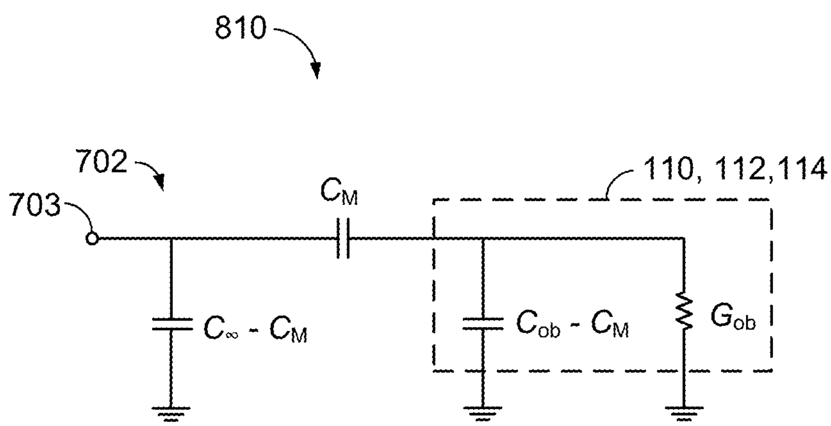
FIG. 8B illustrates an equivalent circuit model applicable to an object of FIG. 1 proximate to the capacitive sense element of FIG. 7A.

The effect of an object (e.g., object 110, 112, 114, or vehicle 330) proximate to a single-ended capacitive sense element (e.g., sense electrode 702) having a signal terminal 703 may be modeled empirically by a ground-related one-port equivalent circuit model 810 illustrated in FIG. 8B. This circuit is based on the "π"-equivalent circuit model of capacitive coupling illustrated in FIG. 7L. The equivalent circuit model 810 comprises a primary parallel capacitance $C_\infty$-$C_M$, a secondary parallel capacitance $C_{ob}$-$C_M$, a parallel conductance $G_{ob}$, and a mutual capacitance $C_M$. The capacitance $C_{ob}$-$C_M$ together with conductance $G_{ob}$ represents an abstract model of the object (e.g., object 110, 112, 114, or vehicle 330) indicated in FIG. 8B by a dashed box. The capacitance $C_\infty$ refers to the sense electrode's 702 capacitance to ground as it may be measured at the signal terminal 703 in presence of an object (e.g., object 110, 112, or 114) that is modeled by at least one of an infinite capacitance $C_{ob}$ and infinite conductance $G_{ob}$ (secondary-side short circuit). Likewise, the capacitance $C_{ob}$ refers to the equivalent capacitance of the object in presence of the sense electrode 702 shortened to ground at its signal terminal 703 (primary-side short circuit). The mutual capacitance $C_M$ stands for the capacitive coupling between the sense electrode 702 and the object. Both capacitances $C_{ob}$ and $C_M$ may relate to the object's size, geometry, position, and orientation relative to the sense electrode 702 and ground, but also to electrical properties of the materials the object is composed of. It may be appreciated that the equivalent circuit model also applies to any other capacitive sense element such as e.g., 732, 762, and 772 illustrated in FIGS. 7F to 7I.

It is assumed that any real heterogenous object (e.g., object 110, 112, or 114) composed of different materials may be substituted by an artificial homogenous object consisting of an equivalent material having a complex relative permittivity defined as:

$$\varepsilon_r = \varepsilon'_r - j\varepsilon''_r \qquad (335)$$

where $\varepsilon'_r$ refers to the relative real permittivity and $\varepsilon''_r$ to the relative imaginary permittivity related to the electrical losses of the material. The relative imaginary permittivity may comprise a dielectric loss coefficient $\varepsilon_{d,r}''$ attributed to bound charge and dipole relaxation phenomena of the material and another loss coefficient attributed to the material's electrical conductivity σ. The relative imaginary permittivity may be defined as:

$$\varepsilon''_r = \varepsilon_{d,r}'' + \sigma/(\omega\varepsilon_0) \qquad (336)$$

where ω denotes the angular frequency and $\varepsilon_0$ refers to the absolute permittivity of a vacuum. In case of an inhomogeneous object, the complex relative permittivity of the equivalent material may also depend on the size, geometry, position, and orientation of the real object relative to the capacitive sense element (e.g., sense electrode 702). The ratio $\varepsilon_r''/\varepsilon_r'$ is commonly known as the loss tangent of a dielectric material:

$$\tan\delta = (\varepsilon_{d,r}'' + \sigma/(\omega\varepsilon_0))/\varepsilon'_r \qquad (337)$$

where δ is also referred to as the loss angle. At frequencies below 10 MHz, the dielectric loss coefficient $\varepsilon_{d,r}''$ is normally negligible meaning that electrically insulating materials with virtually zero conductivity (σ→0) exhibit a loss angle close to zero (δ→0). For example, the imaginary relative permittivity of distilled water is $\varepsilon''_r \approx 0$, while for water with some ion content, $\varepsilon''_r$ is governed by its conductivity σ. In the opposite extreme of an electrical conductor (e.g., metal object 110), tan δ may approach infinity (δ→90°).

In the equivalent circuit model 810 of FIG. 8B and at angular sense frequency ω, the object (e.g., object 110, 112, 114, or vehicle 330) represents an admittance $Y_{ob}=G_{ob}+j\omega C_{ob}$. It is further assumed that the object admittance $Y_{ob}$ is a function of the complex relative permittivity $\varepsilon_r$ of the material (or the equivalent homogenous object) as follows:

$$Y_{ob} = G_{ob} + j\omega C_{ob} = j\omega C_{ob,0} f(\varepsilon_r) \qquad (338)$$

where $C_{ob,0}$ refers to the capacitance of a fictitious ("stealth") object of a material with $\varepsilon'_r=1$ and $\varepsilon''_r=0$ (σ=0) that is indistinguishable from air and thus from the absence of a foreign object. From other theoretical considerations (not included herein), the function $f(\varepsilon_r)$ may be of the form:

$$f(\varepsilon_r) = (\varepsilon_r + a - 1)/a = (\chi + a)/a \qquad (339)$$

The factor a is indicative of how easily a dielectric object (e.g., object 112) can be polarized by an externally applied electric field and herein referred to as polarizability. The polarizability a generally depends on the size, geometry, position, and orientation of the object relative to the sense electrode 702 and the ground. For objects made of an ordinary dielectric material, the polarizability must be in a range $1 \le a < \infty$. The coefficient $\chi=\varepsilon_r-1$ is known as the electric susceptibility of the dielectric material. Equation (339) satisfies $f(1-j\,0)=1$, $f(|\varepsilon_r|\to\infty)\to\infty$ for any a in the range defined above. For $a\to\infty$, the function converges to 1 for any $\varepsilon_r$ and $\varepsilon'_r>1$.

In analogy to exposing a ferromagnetic object to a magnetic field, exposing a dielectric object (e.g., object 112) to an electric field polarizes its material in turn starting to generate its own (secondary) electric field referred to as a polarization field. This polarization field counteracts the applied field in the object's material until an equilibrium state is reached. This mechanism is also known as depolarization. Depolarization is commonly quantified by the depolarization factor in analogy to the magnetic depolarization in ferromagnetic bodies. The depolarization factor may be defined as the reciprocal 1/a of the polarization factor. For small a (e.g., $1 \le a \ll |\varepsilon_r|$), the internal electric field (in the material) may be substantially reduced (e.g., virtually canceled out) by the polarization field. In contrast, a dielectric object with high a (e.g., $a \gg |\varepsilon_r|$) experiences little depolarization, resulting in an internal field substantially equal to the applied field.

Polarizability of a thin dielectric sheet may be close to one (a→1) with respect to an electric field perpendicular to the sheet. For an oblate dielectric sphere subjected to a uniform electric field parallel to its short (minor) axis, the polarizability can be found in the range $1<a<3$. The polarizability a is higher in any other axis and is thus anisotropic. The polarizability of a dielectric sphere is isotropic and a=3. For a dielectric ellipsoid, polarizability is again anisotropic and highest in its major axis (a>3). Therefore, the major axis is sometimes also referred to as the "easy" axis. For an infinitely thin dielectric needle, the polarizability a with respect to its major axis approaches infinity (a→∞). If the needle is rotated by an angle φ relative to the applied field, its polarizability $a_\varphi$ may be lower (e.g., $a_\varphi=a\cos\varphi$) but still very high.

While the polarization field neutralizes a portion of the internal field, it contributes to the external field. It may be appreciated that an increase of the external field also causes an increase of the capacitance and thus an increase of the susceptance (imaginary admittance) as measured at terminal 703 when the object is introduced. Since electric losses can only be generated in the material by the internal field, even an object with a substantial loss angle (e.g., $\delta=45°$) may generate comparatively low losses if there is substantial depolarization. In other words, depolarization may prevent generating losses resulting in a reflected admittance (susceptance) that is substantially imaginary (e.g., with $\arg\{\Delta Y_r\}$ in the angle range 802 of FIG. 8A). However, if depolarization is weak, the losses may become more prominent, reflecting an admittance whose angle $\arg\{\Delta Y_r\}$ tends to the complementary loss angle $90°-\delta$ (e.g., in the angle range 804 of FIG. 8A).

Returning to Equation (339), the function $f(\varepsilon_r)$ may be considered as an effective complex relative permittivity of the object denoted as:

$$\varepsilon_{r,eff}=f(\varepsilon_r) \quad (340)$$

For certain dielectric bodies (e.g., a sphere) producing a uniform internal field when a uniform field is applied, the effective relative permittivity $\varepsilon_{r,eff}$ corresponds to the ratio of the applied field strength to the internal field strength. For the thin sheet ($a\to 1$), this ratio approaches the material's relative permittivity ($\varepsilon_{r,eff}\to\varepsilon_r$). For the sphere, this ratio is known to be $\varepsilon_{r,eff}=(\varepsilon_r+2)/3$. However, with increasing a, $|\varepsilon_{r,eff}|$ converges to unity ($|\varepsilon_{r,eff}|\to 1$). The thin dielectric needle ($a\to\infty$) experiences virtually no depolarization, hence the inner field strength approaches the applied field strength. Based on the equivalent circuit model 810, the admittance as presented at the signal terminal 703 of the sense electrode 702 in presence of an object (e.g., object 110, 112, 114) may be found as:

$$Y=j\omega C_\infty+\omega^2 C_M^2/Y_{ob} \quad (341)$$

Defining the capacitive coupling factor $k_C$ according to Equation (185) and with respect to the capacitance $C_{ob,0}$ as:

$$k_C^2=C_M^2/(C_\infty C_{ob,0}) \quad (342)$$

and applying Equations (338) and (340) to Equation (341) yields:

$$Y=j\omega C_\infty(1-k_C^2/\varepsilon_{r,eff}) \quad (343)$$

Further, using Equation (343) and defining C as the sense electrode's 702 capacitance in absence of a foreign object ($\varepsilon_{r,eff}=1$), the capacitance $C_\infty$ may be expressed as:

$$C_\infty=C/(1-k_C^2) \quad (344)$$

and the admittance in absence of a foreign object as:

$$Y_0=j\omega C \quad (345)$$

Using Equations (343), (344), and (345), the reflected admittance of the object (e.g., object 110, 112, 114, or vehicle 330) may be expressed in terms of the capacitance C, the capacitive coupling factor $k_C$, and the effective relative permittivity $\varepsilon_{r,eff}$ as:

$$\Delta Y_r=Y-Y_0=j\omega C\, k_C^2/(1-k_C^2)(1-1/\varepsilon_{r,eff}) \quad (346)$$

From further theoretical considerations (not included herein), it may be found that the mutual capacitance $C_M$ and thus $k_C$ generally are also a function of the polarizability a of the object and may be of the form:

$$k_C^2=1/(1+1/(\alpha(a-1))) \quad (347)$$

where $\alpha$ is a geometry factor related to the size, position, and orientation of the object (e.g., object 110, 112, 114) relative to the sense electrode 702 and ground. It may be found in the range $0<\alpha<1$. For the thin dielectric sheet ($a\to 1$), the coupling factor approaches zero ($k_C\to 0$) while for the thin dielectric needle ($a\to\infty$), it approaches unity ($k_C\to 1$).

According to the discussions above, the shape (form factor) of an object (e.g., object 112) is responsible for its polarizability in a substantially uniform electric field. Exposing an object (e.g., object 112) to a substantially uniform field requires the object to be small compared to its distance to the sense electrode 702. Referring to FIG. 8B, this implies a low mutual capacitance $C_M$ (e.g., substantially lower than the object's equivalent capacitance $C_{ob}$) and consequently a low coupling factor $k_C$ (a weakly coupled regime). In contrast, a comparatively large object closely proximate to the sense electrode 702 may be subjected to a substantially non-uniform field. Such a scenario may be characterized by a relatively high mutual capacitance $C_M$ (e.g., higher than the object's equivalent capacitance $C_{ob}$) and consequently a coupling factor near or even close to one ($k_C\to 1$) (a strongly coupled regime). Given that $\alpha<1$, it may be appreciated that only a high factor a (e.g., $a\to\infty$) can satisfy Equation (347) for $k_C\to 1$ and it may be concluded that an object (e.g., object 112) exposed to an electric field in a strongly coupled regime experiences enforced polarization regardless of its shape. Enforced polarization may be illustrated by the example of a cube-shaped dielectric body (e.g., object 112) filling the air space between the plates of a parallel plate capacitor whose first and second plate may be considered as the sense electrode 702 and the ground, respectively. The dielectric body may have an unfavorable formfactor with respect to polarizability in a uniform field. It may be appreciated that both $\alpha$ and $k_C$ of such an arrangement must be close to one. Based on Equation (347), this requires the factor a to approach infinity ($a\to\infty$). Substituting $k_C$ and $\varepsilon_{r,eff}$ in Equation (346) by the right side of Equations (347) and (339), respectively, and determining the limit of Equation (346) for $a\to\infty$ yields a reflected admittance of:

$$\Delta Y_r=Y-Y_0=j\omega C(\varepsilon_r-1) \quad (348)$$

Equation (348) corresponds to the admittance increase when inserting dielectric material with $\varepsilon_r$ into the parallel plate capacitor. Using the definition of the complex relative permittivity $\varepsilon_r$ in Equation (335) and the loss angle $\delta$ of Equation (337), Equation (348) demonstrates that the angle $\arg\{\Delta Y_r\}$ directly reflects the complementary loss angle $90°-\delta$ of a dielectric fill material with $|\varepsilon_r|>>1$ similarly to a dielectric object (e.g., object 112) with a formfactor favorable for high polarization if subjected to a substantially uniform electric field as previously discussed. It may be argued that the field as produced by the parallel plate capacitor is also uniform. However, this is only true for the space between the capacitor's plates (in the dielectric fill material) but false if the space outside is considered too. In fact, the parallel plate capacitor shows an example of a highly non-uniform field.

Summarizing, it may be concluded that the angle $\arg\{\Delta Y_r\}$ is indicative of the complementary loss angle $90°-\delta$ of a dielectric object (e.g., object 112) if the object's formfactor is favorable for polarization ($a>>|\varepsilon_r|$) or if the object is in a strongly coupled regime. An object with low polarizability in a weakly coupled regime may reflect an angle $\arg\{\Delta Y_r\}$ close to 90° regardless of its loss angle $\delta$.

In a further aspect, it may be useful to normalize the reflected admittance $\Delta Y_r$ as defined by Equation (346) on the magnitude of the limit reflected admittance:

$$\Delta Y_{r,\infty}=j\omega C\, k_C^2/(1-k_C^2) \quad (1)$$

as obtained for an infinite relative permittivity ($|\varepsilon_r| \rightarrow \infty$) as follows:

$$\Delta Y_r / |\Delta Y_{r,\infty}| = j(1 - 1/\varepsilon_{r,eff}) \tag{2}$$

Note that this normalization does not alter the angle of $\Delta Y_r$. Inspecting Equation (350), it may be appreciated that an object (e.g., object 112) with low polarizability (e.g., $1<a<<|\varepsilon_r|$) thus high $|\varepsilon_{r,eff}|>>1$ reflects a normalized admittance $\Delta Y_r/|\Delta Y_{r,\infty}| \approx j$ (e.g., in the angle range 802 of FIG. 8A) over a wide range of loss angle (e.g., $\delta<45°$). In contrast, a lossy dielectric object with a high polarizability (e.g., $a>>|\varepsilon_r|$) thus low $|\varepsilon_{r,eff}|$ may reflect a normalized admittance with low magnitude (e.g., $|\Delta Y_r/|\Delta Y_{r,\infty}||<<1$) and an angle $\arg\{\Delta Y_r\}$ similar to the complementary loss angle $90°-\delta$ of the dielectric material (e.g., in the angle range 804 of FIG. 8A).

Figure 8C:
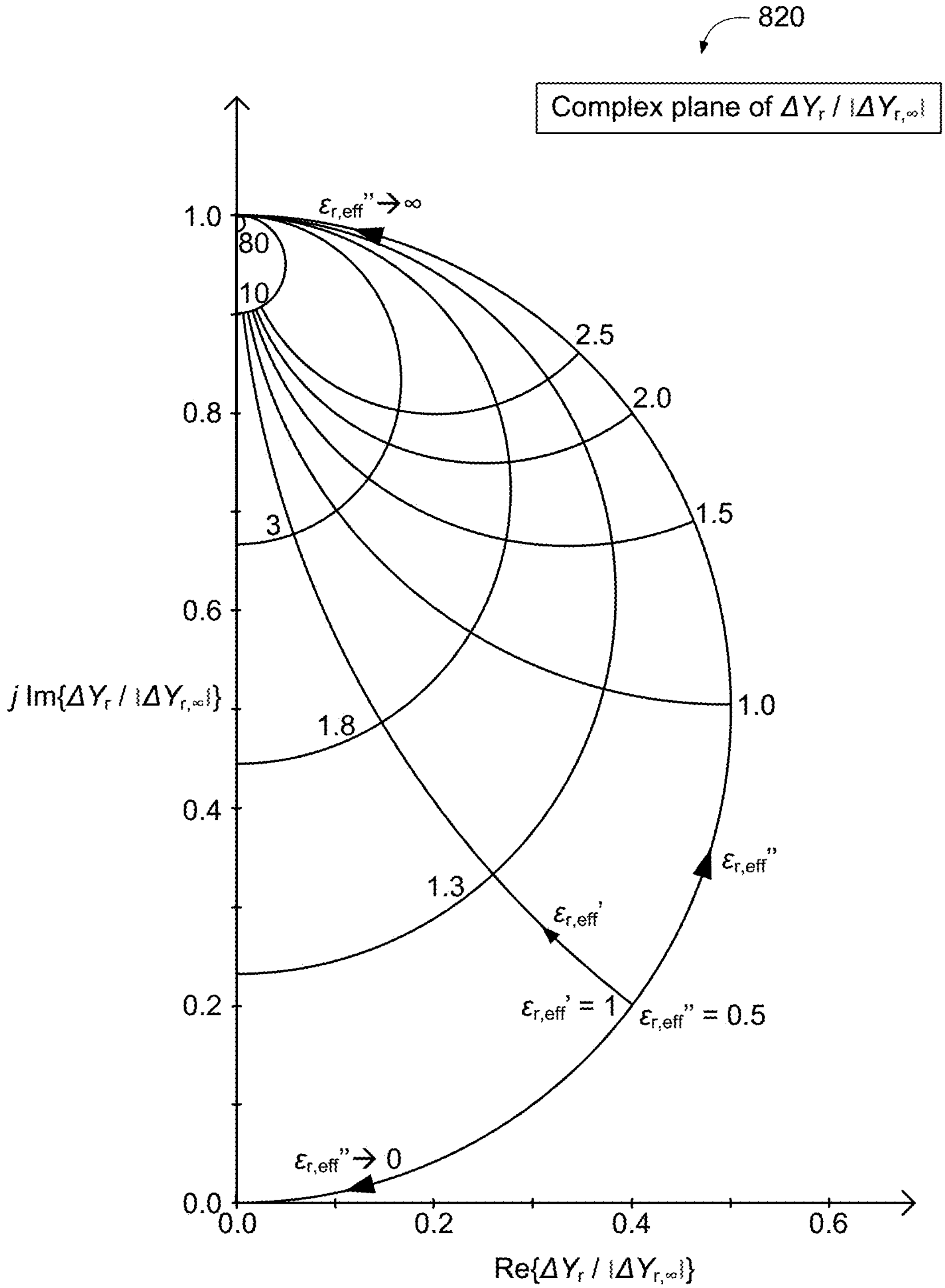
FIG. 8C shows a normalized admittance chart indicating lines of constant real permittivity and constant imaginary permittivity.

FIG. 8C illustrates quadrant 1 of another complex plane 820 of the normalized reflected admittance $\Delta Y_r/\Delta Y_{r,\infty}|$ as defined by Equation (350). More specifically, FIG. 8C indicates locus curves of constant $\varepsilon_{r,eff}'$ and constant $\varepsilon_{r,eff}''$. This normalized admittance chart shows that increasing at least one of $\varepsilon_{r,eff}'$ and $\varepsilon_{r,eff}''$ ends up at $\Delta Y_r/\Delta Y_{r,\infty}|=j$. Conversely, decreasing $\varepsilon_{r,eff}'$ and $\varepsilon_{r,eff}''$ ends up in the origin $\Delta Y_r/\Delta Y_{r,\infty}|=0$. As previously discussed, FIG. 8C also shows that objects with a high effective relative permittivity (e.g., $|\varepsilon_{r,eff}|>>1$) reflect a normalized admittance $\Delta Y_r/\Delta Y_{r,\infty}|\approx j$ (e.g., in the angle range 802 with reference to FIG. 8A) regardless of their loss angle $\delta$. This may include objects characterized by a predominant real part $\varepsilon_{r,eff}'>>1$ (e.g., dielectric object 112 or living object 114) as well as objects characterized by a high conductivity $\sigma>>1$ (e.g., metal object 110 or vehicle 330). On the other hand, a dielectric object with a low effective relative permittivity (e.g., $|\varepsilon_{r,eff}|<2$) may reflect an admittance with an angle $\arg\{\Delta Y_r\}$ similar to the complementary loss angle $90°-\delta$ (e.g., in the angle range 804).

In a series of lab experiments, various living and nonliving objects (e.g., objects 110, 112, and 114) were tested with respect to the reflected admittance $\Delta Y_r$ at a sense frequency of 3 MHz when brought into proximity of a capacitive sense element (e.g., sense electrode 702, which may correspond to the capacitive sense element 109*a* of FIG. 2) integrated into a wireless power transfer structure enclosed by a plastic housing (e.g., housing 328 of wireless power transfer structure 200 of FIG. 3). The reflected admittance $\Delta Y_r$ was determined by measuring the change $\Delta Z$ of the impedance $Z_{11}$ at the measurement port 728 of a sense circuit 721 of FIG. 7C using a properly calibrated impedance measurement circuit (e.g., circuit 104 of FIG. 4).

More specifically, living objects (e.g., a human body extremity of an adult, of an infant, a cat, etc.) were tested with respect to their reflected admittance when brought into proximity of the capacitive sense element inside the housing. All tested living objects reflected an admittance $\Delta Y_r$ close to the imaginary axis (e.g., in the angle range 802 of FIG. 8A).

TABLE 5 lists the real and imaginary part of the complex permittivity $\varepsilon_r$ and the related conductivity $\sigma$ of various human tissue types at 3 MHz as they may be found in scientific publications. These tissue types together may constitute a substantial portion of a human body extremity. The numbers in TABLE 5 suggest a relative permittivity generally in a range $\varepsilon'_r>30$ and $\varepsilon''_r>36$ for a living object (e.g., object 114).

TABLE 5

| | Complex permittivity | | Conductivity |
|---|---|---|---|
| Tissue type | $\varepsilon_r'$ | $\varepsilon_r''$ | $\sigma$ [mS/m] |
| Skin | 75 | 360 | 60 |
| Subcutaneous fat | 40 | 300 | 50 |
| Muscle | 50 | 3600 | 600 |
| Blood | 1000 | 8400 | 1400 |
| Bone | 30-85 | 36-660 | 6-110 |

Electromagnetic field exposure regulations may require a living object to be detected already at a distance from the capacitive sense element (e.g., sense electrode 702 of FIG. 7A) in a weakly coupled regime. A living object in a weakly coupled regime (exposed to a substantially uniform electric field) typically exhibits a low polarizability (e.g., a in the order of 3) thus reflecting an admittance $\Delta Y_r$ that is substantially imaginary (e.g., in the angle range 802 of FIG. 8A) as previously discussed and also experimentally observed.

A reflected admittance $\Delta Y_r$ virtually at the imaginary axis (e.g., in the angle range 802 of FIG. 8A) was also measured for metallic objects (e.g., object 110) made of a material with a conductivity e.g., $\sigma>10$ MS/m as expected from Equation (349).

Further, tests were performed with nonliving dielectric objects (e.g., object 112) e.g., a piece of plastic with $\varepsilon_r'<3$, a polyethylene terephthalate (PET) plastic bottle filled with distilled water ($\sigma\approx0$), filled with tap water ($\sigma\approx0.5$ mS/m), filled with salt water ($\sigma\approx40$ mS/m), potting soil, wet foliage, snow, and ice. All test objects reflected an admittance $\Delta Y_r$ virtually at the imaginary axis (e.g., in the angle range 802 of FIG. 8A). TABLE 6 lists $\varepsilon_r'$, $\varepsilon_r''$, and the loss tangent tan $\delta$ of solid and liquid dielectric materials. All listed materials except water (tap water and sea water) exhibit a loss tangent <0.05. According to Equation (350), an object (e.g., object 112) of any of these materials may cause a substantially imaginary reflected admittance (e.g., in the angle range 802). Despite of its relative high loss tangent (e.g., tan $\delta>30$), water filled in a plastic bottle and disposed in a weakly coupled regime may reflect an admittance $\Delta Y_r$ close to the imaginary axis due to its high relative permittivity $\varepsilon_r'' \approx 78$ and low polarizability (e.g., a in the order of 3) as expected from Equations (339) and (350).

TABLE 6

| | Complex permittivity | | |
|---|---|---|---|
| Material | $\varepsilon_r'$ | $\varepsilon_r''$ | tan $\delta$ |
| ABS | 2.4-3.8 | <0.07 | <0.017 |
| Polyethylene | 2.3 | <0.002 | <0.001 |
| Polypropylene | 2.3 | <0.001 | <0.0005 |
| Polyurethane | 3.3-3.9 | <0.2 | <0.05 |
| Polyvinyl chloride (PVC) | 4-8 | <0.12 | <0.015 |
| Polyoxymethylene (POM) | 3.7 | <0.02 | <0.005 |
| Plexiglas | 3 | <0.15 | <0.05 |
| Teflon | 2 | <0.00004 | <0.00002 |
| Nylon | 3.4-4 | <0.32 | <0.08 |
| Glass | 3-10 | <02 | <002 |
| Hard rubber | 3.2-4 | <0.06 | <0.015 |
| Silicon rubber | 2.5-3.2 | <0.015 | <0.005 |
| Wood | 1.2-3 | <0.12 | <0.04 |
| Oil | 2.2-2.8 | <0.002 | <0.0007 |
| Distilled water | ¯78 | <0.01 | <0.0001 |
| Tap water | ¯78 | ¯30 | ¯0.38 |

TABLE 6-continued

| | Complex permittivity | | |
|---|---|---|---|
| Material | $\varepsilon_r'$ | $\varepsilon_r''$ | tan δ |
| Salt water (3.5% salinity) | ~78 | ~3000 | ~38 |
| Ice (T = 268 K) | 3-4 | <0.15 | <0.04 |

Tests were also performed with water dripping on the plastic housing of a wireless power transfer structure (e.g., housing 328 of the wireless power transfer structure 200 with reference to FIG. 3) integrating a capacitive sense element (e.g., capacitive sense element 109*a* of FIG. 3). These tests may be representative for rain water, melt water, or condensation dripping from the vehicle's underbody (e.g., vehicle 330) onto a sensitive area above the capacitive sense element when the vehicle is parked over the wireless power transfer structure. It was observed that tap water droplets, after their impact on the surface of the housing above the capacitive sense element, may reflect an admittance with an angle $\arg\{\Delta Y_r\}$ substantially lower than measured using the same water contained in a plastic bottle as mentioned above. Angles $\arg\{\Delta Y_r\}$ as low as 25° (e.g., in the angle range 804 as indicated in FIG. 8A) were observed after the impact of a water droplet.

Based on the theory above and more specifically by Equation (350), a low angle $\arg\{\Delta Y_r\}$ (e.g., in the range 804 of FIG. 8A) implies an effective relative permittivity $|\varepsilon_{r,eff}|$ that is substantially lower than the relative permittivity of tap water as given in TABLE 6. This reduction in $|\varepsilon_{r,eff}|$ may be explained as follows with reference to FIG. 3: A water droplet falling onto the plastic housing 328 alters its shape from an originally more spheroidal shape (e.g., drop shape) to a strongly oblate shape when it impacts on the housing 328 and gets flattened. Moreover, during free fall, it moves from a weakly coupled regime into a more strongly coupled regime assuming an impact position directly above a capacitive sense element (e.g., capacitive sense element 109*a*). The flattening at impact may cause a substantial increase of its polarizability with respect to a major axis (e.g., from $a \approx 3$ to $a >> 3$) and consequently, the angle $\arg\{\Delta Y_r\}$ to shift from about 90° (e.g., in angle range 802) towards a lower value (e.g., in the angle range 804) as shown by the theory above. This is particularly true at positions where the incident electric field has a substantial component in the major axis of the flattened water object e.g., when the droplet hits a point near the upper edge of a sense electrode (e.g., sense electrode 109*a*) or is gliding down the ramp of housing 328 and reaches the lower edge of the sense electrode. It may be appreciated that the electric field in these edge zones is oblique relative to the surface (ramp) of housing 328 thus has a component in an axis of increased polarizability.

Specific lab experiments were carried out to further investigate this phenomenon using a test set up with water contained in a plastic hose disposed proximate to a capacitive sense element (e.g., capacitive sense element 109*a*). The plastic hose was connected to a water reservoir allowing the water level in the hose to be accurately adjusted. More specifically, in a first experiment, the reflected admittance $\Delta Y_r$ was measured for a change of water level by 60 mm in a first plastic hose with a diameter of 2 mm. In a second experiment, it was measured for a change of water level by 15 mm in a second plastic hose having a diameter of 4 mm. In both experiments, changing the water level by 60 mm and 15 mm, respectively, may be considered equivalent to adding a cylindrically shaped sample of water (e.g., object 112) with a volume of 188.5 $mm^3$ to the water already existing in the hose, however with a different shape (form factor). Being equal in volume, the shape of the two water samples may be quantified by their volume-to-surface area ratio in Millimeter units. The volume-to-surface area ratio of the 2×60 mm water sample used in the first experiments amounts to 0.49 mm vs. 0.88 mm in the second experiment. For comparison, a spherical water droplet of 4 mm diameter provides a volume-to-surface area of 0.66 mm. Further, to investigate the impact of the water's conductivity σ, the first and second experiments were performed with commercially off-the-shelf distilled water, tap water with about 0.03% of calcium and magnesium ions, and with water of different salinity using a NaCl solution. Starting with distilled water, the NaCl concentration was successively increased (doubled) in a series of measurements.

Figure 8D:
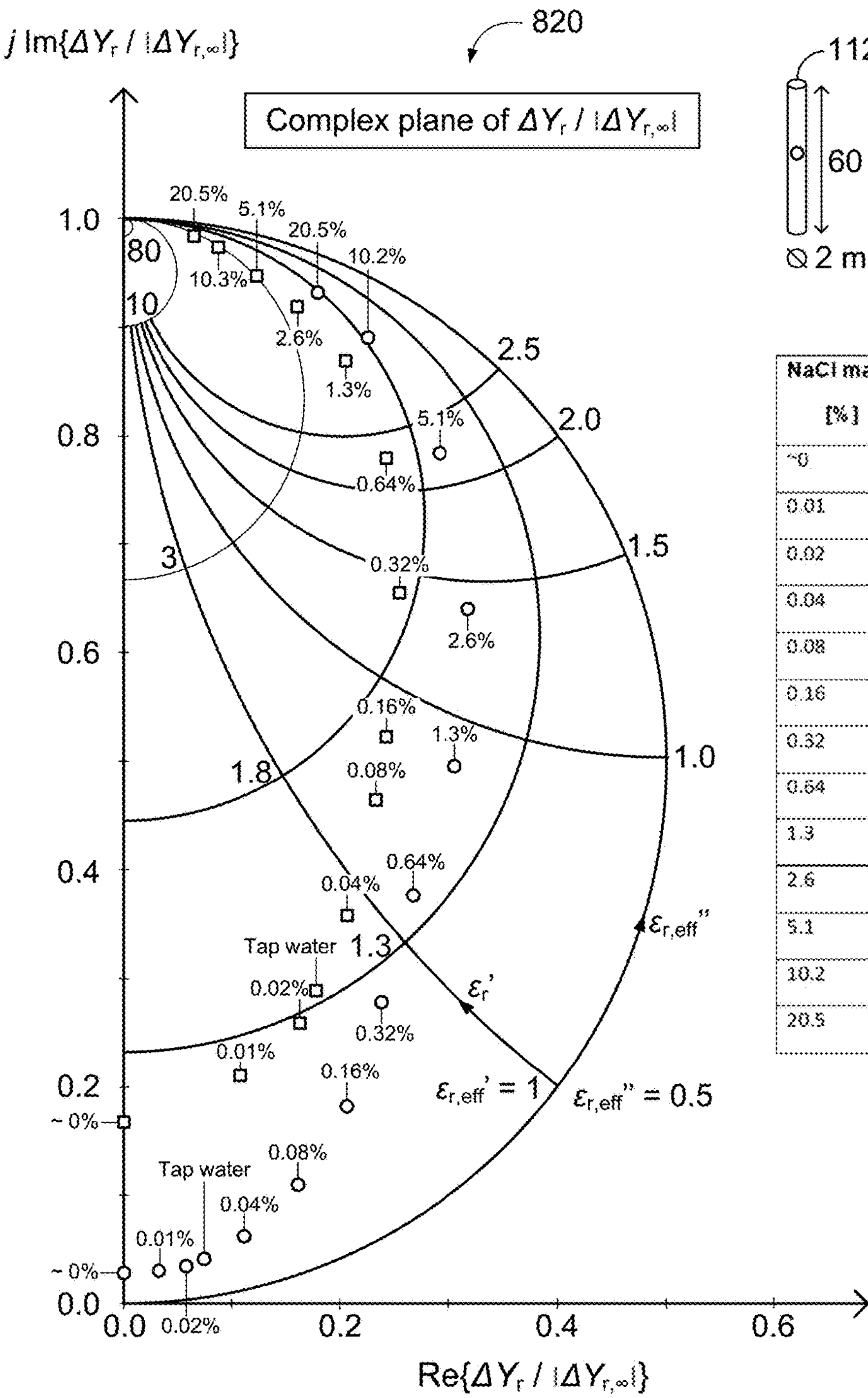
FIG. 8D shows the normalized admittance chart of FIG. 8C indicating measured admittance changes in presence of an object of FIG. 1.
Figure 8D:
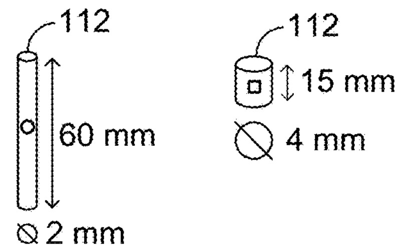

FIG. 8D displays the normalized reflected admittances $\Delta Y_r/|\Delta Y_{r,\infty}|$ as determined for the different NaCl concentrations in the complex plane 820 also showing the contour lines of constant $\varepsilon_{r,eff}'$ and constant $\varepsilon_{r,eff}''$ with reference to FIG. 8C. The limit reflected admittance $\Delta Y_{r,\infty}$ was determined by extrapolating the series of measured data points ($\Delta Y_r$) towards a fictitious water sample with an infinite conductivity σ. Further, it illustrates objects 112 referring here to the cylindrically shaped water samples that are added to the existing water column in the first and second experiment as described above. It is noted that the reflected admittance $\Delta Y_r$ as determined in the first and second experiment refers to the admittance change as produced by increasing the water level in the hose by 60 mm and 15 mm, respectively. It is also noted that a different admittance change may result if the water samples (object 112) are introduced in absence of the hose (e.g., in a thin plastic capsule with 2×60 mm fill volume). The circular and rectangular marks refer to the normalized reflected admittance as determined for the 2×60 mm and for the 4×15 mm water sample, respectively, using distilled water, tap water, and the NaCl solution at concentrations as indicated in percentage (%). The table on the right also indicates the mass percentage of NaCl dissolved in water, the corresponding molarity (in moles per liter), and the conductivity σ in mS/m as predicted by theory. The data points displayed in FIG. 8D suggest that the effective relative permittivity $\varepsilon_{r,eff}'$ of water with a low NaCl concentration (e.g., <0.1%) substantially reduces as the volume-to-surface area ratio decreases (e.g., below 1 mm), but steadily increases as the NaCl concentration increases.

Figure 8E:
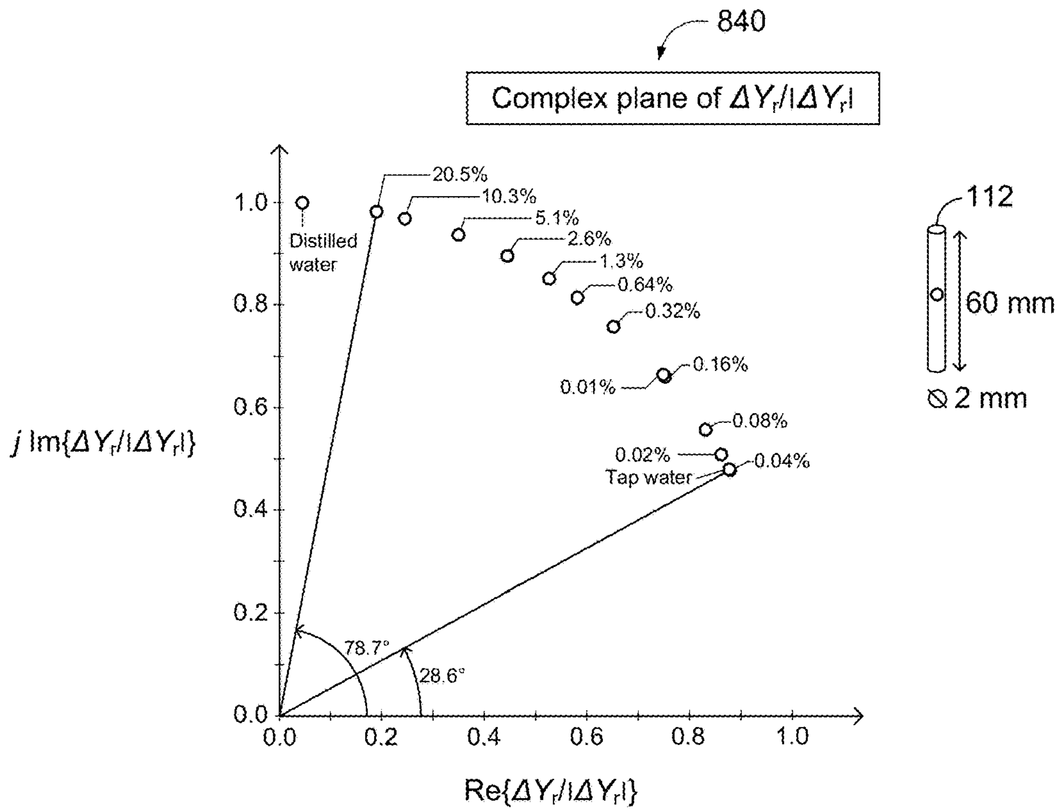
FIG. 8E shows another normalized admittance chart indicating the angle of a portion of the measured admittance changes of FIG. 8D.

To illustrate the variation of the angle $\arg\{\Delta Y_r\}$ over the range of tested ion concentrations in the 2×60 mm water sample, FIG. 8E displays the unity reflected admittance $\Delta Y_r/|\Delta Y_r|$ (the reflected admittance normalized to its magnitude $|\Delta Y_r|$) in a complex plane 840. FIG. 8E shows the angle of the reflected admittance $\Delta Y_r$ extremely sensitive on the ion concentration. A very low NaCl concentration (e.g., <0.01%) is enough to produce an angle that substantially differs from 90°. As apparent from FIG. 8E, even the very low ion concentration in distilled water may cause a measurable deviation from 90°. Further, contemplating FIG. 8E, the angle initially decreases as the NaCl concentration increases reaching a minimum of 28.6° at about 0.04% NaCl. As the concentration is further increased the angle $\arg\{\Delta Y_r\}$ turns around and reaches 86.5° at 20.5%. Coincidentally, the tap water sample reflected an admittance with an angle close to the minimum angle. Further, tests performed with water collected from a vehicle's underbody provide evidence that rain or melt water on the road splashing to the vehicle's underbody already contains enough dissolved minerals to produce an angle substantially different from 90° (e.g., <60°).

Figure 8F:
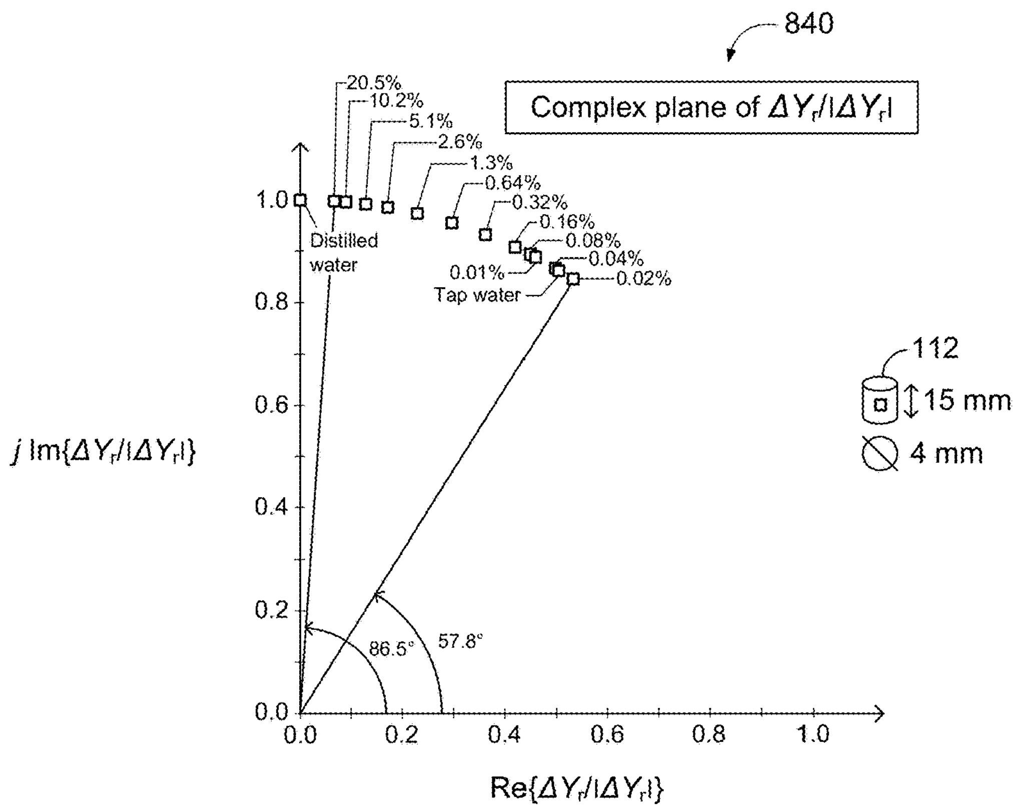
FIG. 8F shows the normalized admittance chart of FIG. 8E indicating the angle of another portion of the measured admittance changes of FIG. 8D.

Likewise, FIG. 8F displays the unity reflected admittance $\Delta Y_r/|\Delta Y_r|$ in the complex plane 840 for the 4×15 mm water sample showing an angle variation ratio of 86.5°/57.8°≈1.5 versus 78.7°/28.6°≈2.75 as obtained from the first experiment with the 2×60 mm water sample. The data suggests that the angle variation ratio reduces as the volume-to-area ratio of the water sample increases, which may be explained by the theory of capacitive sensing of dielectric objects as provided herein.

Figure 8G:
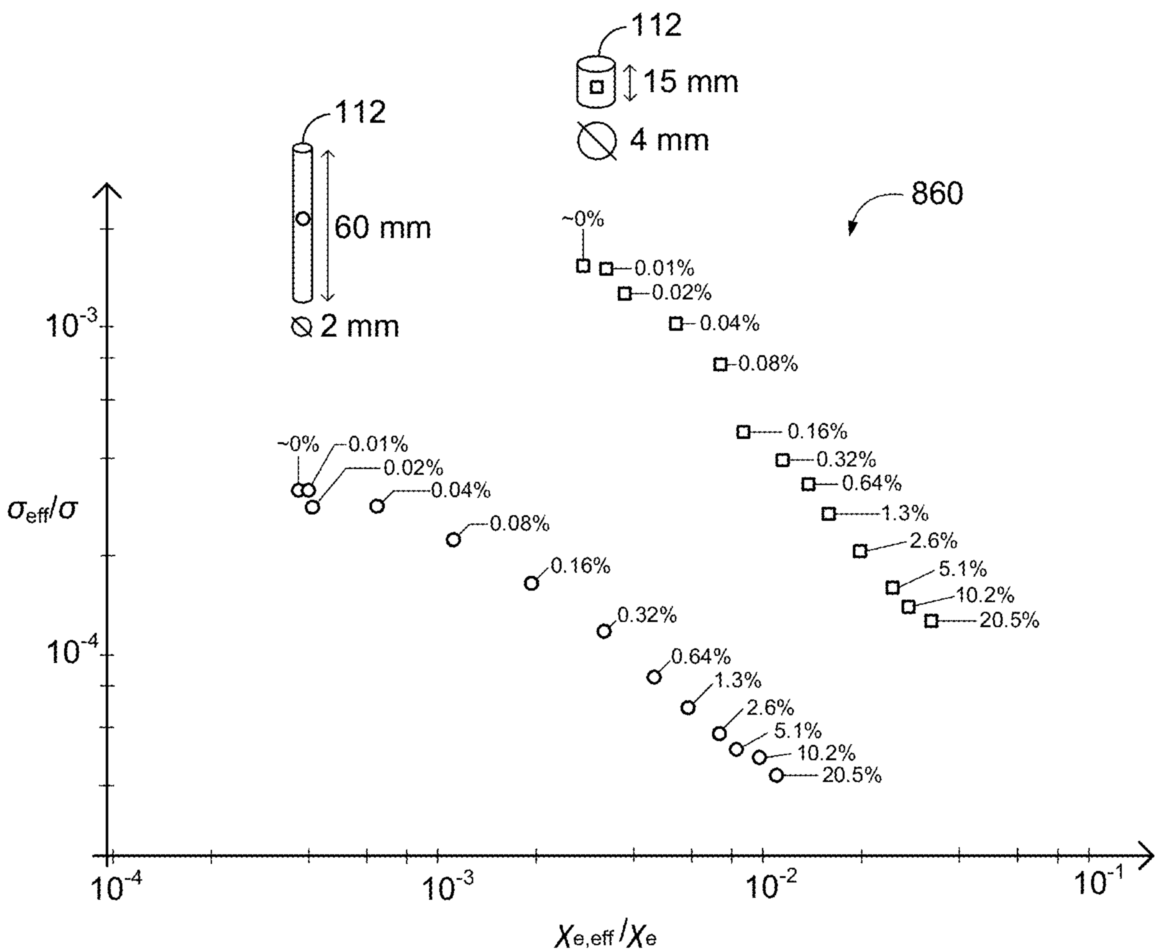
FIG. 8G shows a diagram indicating a normalized effective conductivity and susceptibility as determined from the measured admittance changes of FIG. 8D.

In a further aspect, the effective electric susceptibility defined as:

$$\chi_{e,eff}=\varepsilon_{r,eff}'-1 \quad (351)$$

and the effective conductivity $\sigma_{eff}$ of the 2×60 mm and 4×15 mm water samples are analyzed based on the measured reflected admittances and Equations (337), (335), and (336) assuming a negligible loss coefficient $\varepsilon_{d,r}''$ as previously discussed. FIG. 8G displays the ratios $\chi_{e,eff}/\chi_e$ vs. the ratio $\sigma_{eff}/\sigma$ in a log-log diagram 860, where $\chi_e$ and $\sigma$ denote the electric susceptibility and the conductivity, respectively, of water as predicted by theory for the NaCl concentrations as indicated in FIG. 8G, for 3 MHz, and for a water temperature of 25° C. The diagram 860 of FIG. 8G reveals that the ratio $\leftrightarrow_{e,eff}/\leftrightarrow_e$ increases with increasing NaCl concentration while the ratio $\sigma_{eff}/\sigma$ decreases. However, both ratios converge to a limit value for a vanishing NaCl concentration (e.g., <0.02%). In the first and second experiment, a limit value of ~$2.4\times10^{-4}$ was determined for the 2×60 mm water sample and ~$2\times10^{-3}$ for the 4×15 mm sample, respectively.

Figure 8H:
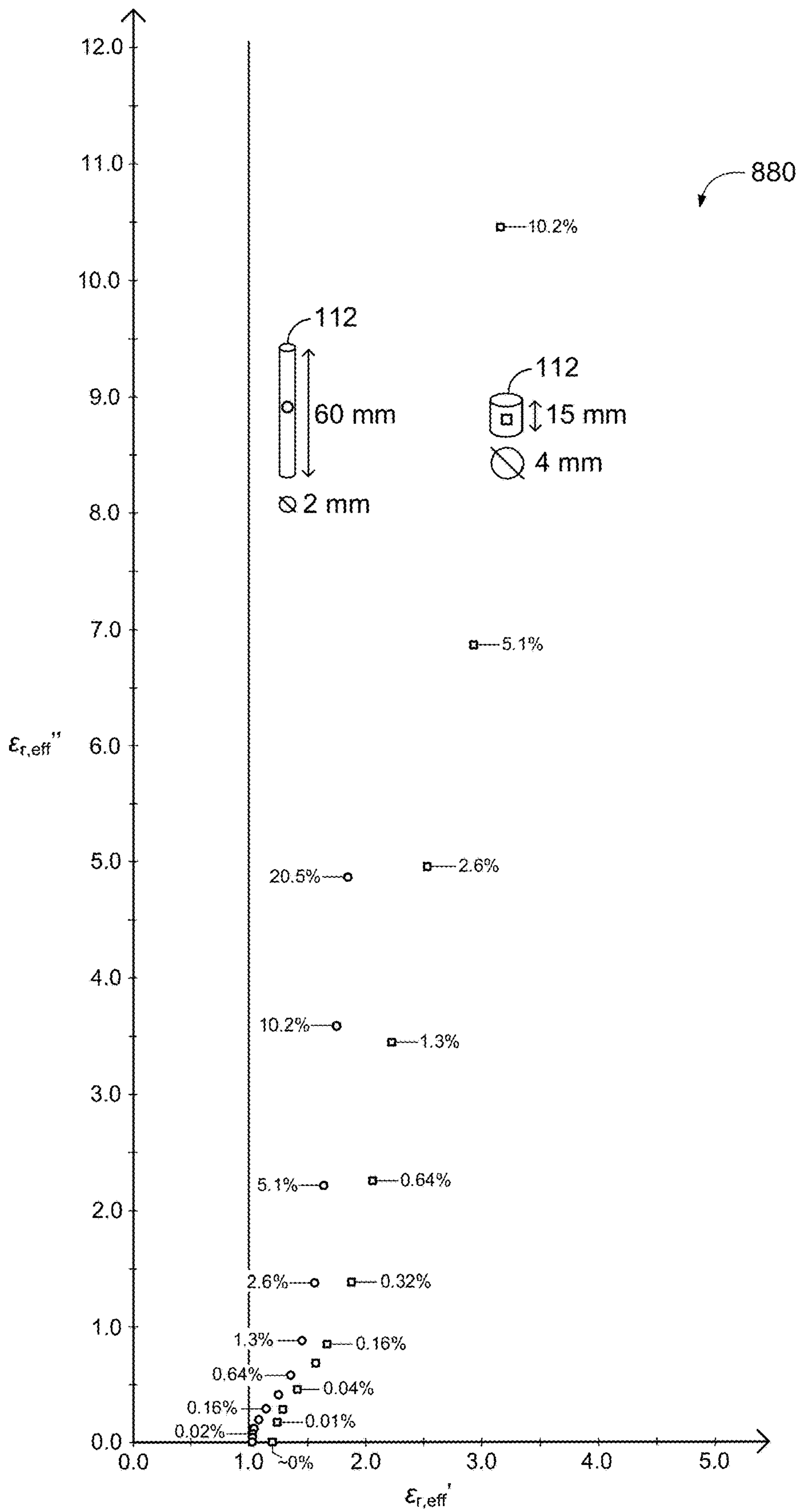
FIG. 8H illustrates a complex plane indicating an effective complex permittivity as determined from the measured admittance changes of FIG. 8D.

Finally, the diagram 880 of FIG. 8H displays the relation between the effective complex permittivity $\varepsilon_{r,eff}=\varepsilon_{r,eff}'-j\varepsilon_{r,eff}''$ and the NaCl concentration as determined by adding the 2×60 mm and the 4×15 mm water sample. The diagram 880 shows the real part $\varepsilon_{r,eff}'$ of the effective relative permittivity of the 2×60 mm water sample close to one at ~0% NaCl (distilled water) and increasing as the NaCl concentration increases reaching a value of ~1.8 at 20.5% NaCl, while the absolute value of the imaginary part (representing the electrical loss) $\varepsilon_{r,eff}''$ varies between ~0 and ~4.8. For the 4×15 mm water sample, the effective relative permittivity $\varepsilon_{r,eff}'$ starts at ~1.2 for ~0% NaCl (distilled water) and reaches ~3.1 at 20.5% NaCl, while $\varepsilon_{r,eff}''$ varies between ~0 and ~10.5.

The outcomes of the lab experiments as described above indicate the potential to discriminate between water (e.g., object 112) dripping from the vehicle's (e.g., vehicle 330) underbody and living objects (e.g., living object 114) based on the angle $\arg\{\Delta Y_r\}$. Therefore, in some implementations of the multi-purpose detection circuit 100 (e.g., based on the circuit 700 of FIG. 7A), detections caused by an impedance change $\Delta Z$ with an angle $\arg\{\Delta Z\}$ or an admittance change $\Delta Y$ with an angle $\arg\{\Delta Y\}$ substantially deviating from 90° (e.g., in the angel range 804) are suppressed.

Though described above for measuring a change in an admittance or impedance, discriminating water (e.g., object 112) dripping from the vehicle's (e.g., vehicle 330) underbody may also be accomplished based on other electrical characteristics as they may be measured in some implementations of the multi-purpose detection circuit 100 and as mentioned in any of the US patent applications herein incorporated by reference. As observed in the reflected admittance $\Delta Y$ water (e.g., object 112) dripping from the vehicle's (e.g., vehicle 330) underbody may also cause a change in an electrical characteristic different from a change produced by other objects (e.g., object 110 and 114).

Figure 9A:
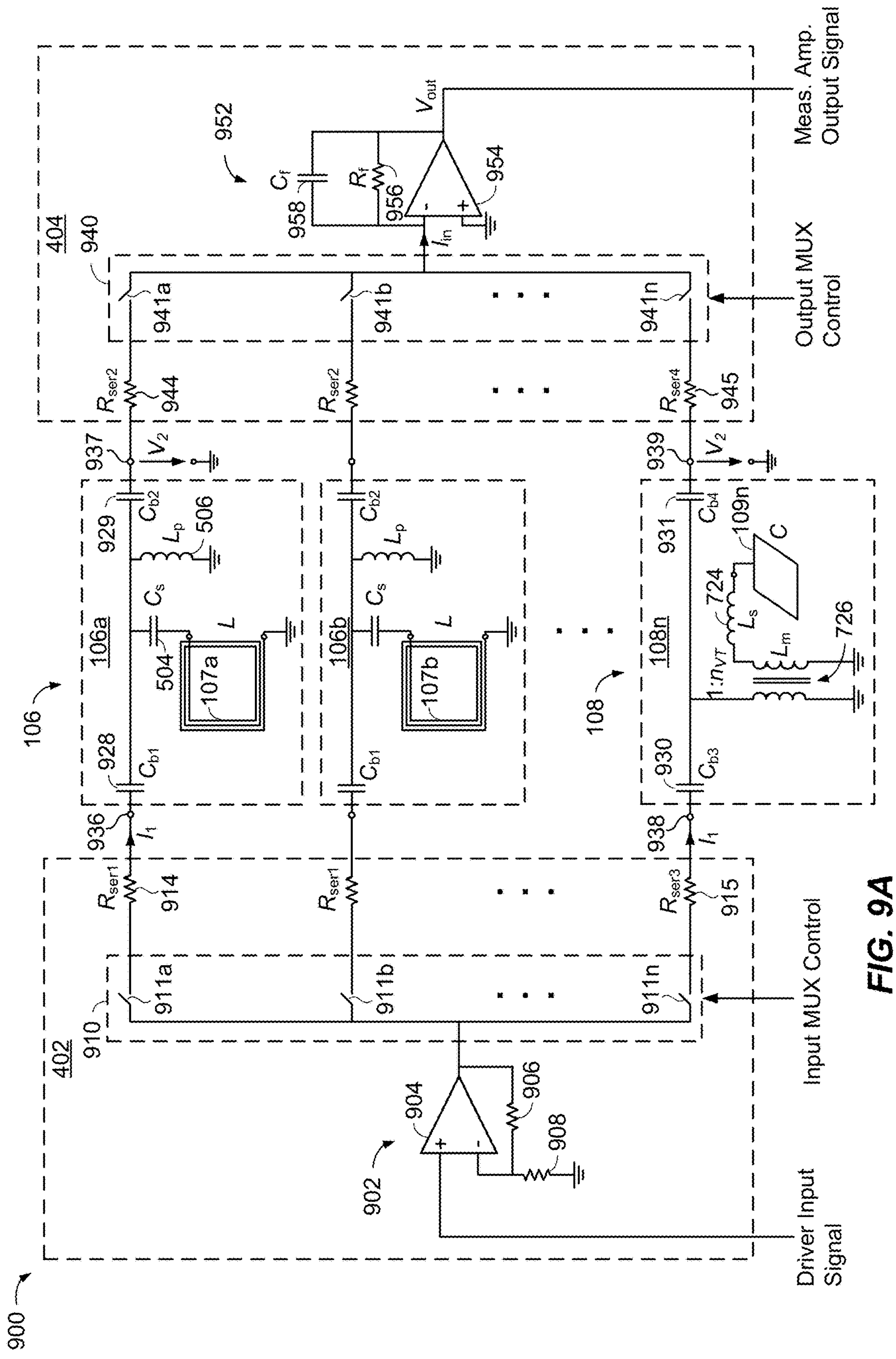
FIG. 9A is a schematic diagram of a circuit illustrating an example implementation of a portion of the multi-purpose detection circuit of FIG. 1 including a plurality of inductive and capacitive sense circuits.

FIG. 9A is a circuit diagram of a circuit 900 illustrating an example implementation of a portion of a multi-purpose detection circuit 100. The circuit 900 of FIG. 9A illustrates an analog front-end circuit portion of the multi-purpose detection circuit 100 with reference to FIGS. 1 and 4. FIG. 9A excludes various other signal generation, processing, control, and evaluation circuits (e.g., as shown in FIG. 4) that may be needed in some implementations of a multi-purpose detection circuit 100. The circuit 900 implements inductive and capacitive sensing measuring an impedance based on the current source voltage measurement approach as previously described in connection with FIGS. 5A and 7A, respectively.

The circuit 900 may be subdivided into a driver circuit 402, a plurality of inductive sense circuits 106, a plurality of capacitive sense circuits 108, and a measurement amplifier circuit 404 with reference to the generic block diagram of FIG. 4. The driver circuit 402 and the measurement amplifier circuit 404 constitute a portion of the measurement circuit 104 with reference to FIGS. 1 and 4. The plurality of inductive sense circuits 106 includes sense circuits 106*a*, 106*b*, . . . , 106*n* (106*n* not shown in FIG. 9A for purposes of illustration). The plurality of capacitive sense circuits 108 includes sense circuits 108*a*, 108*b*, . . . , 108*n*, (108*a* and 108*b* not shown in FIG. 9A for purposes of illustration). The dots indicated in FIG. 9A shall indicate that the number of inductive sense circuits 106 and/or the number of capacitive sense circuits 108 may be greater than three as previously noted with reference to FIG. 1.

In the example implementation shown in FIG. 9A, each of the plurality of inductive sense circuits 106 have an identical circuit topology. Likewise, each of the plurality of capacitive sense circuits 108 have an identical circuit topology. Therefore, descriptions given below for the inductive sense circuit 106*a* also apply to the other inductive sense circuits (e.g., 106*b*) and descriptions given below for the capacitive sense circuit 108*n* also apply to the other capacitive sense circuits (e.g., 108*a*).

Each of the plurality of inductive sense circuits 106 provides a first measurement port 936 (indicated in FIG. 9A by a terminal) for driving the inductive sense circuit (e.g., sense circuit 106) with an electrical current $I_1$ (as indicated in FIG. 9A) and a second measurement port 937 (indicated in FIG. 9A by a terminal) for measuring an electrical voltage $V_2$ (as indicated in FIG. 9A) e.g., in response to the current $I_1$. Therefore, the sense circuits 106 may be considered as two-port circuits. Likewise, each of the plurality of capacitive sense circuits 108 provides a first measurement port 938 (indicated in FIG. 9A by a terminal) for driving the capacitive sense circuit (e.g., sense circuit 108*n*) with the current $I_1$ (as indicated in FIG. 9A) and a second measurement port 939 (indicated in FIG. 9A by a terminal) for measuring the voltage $V_2$ (as indicated in FIG. 9A) e.g., in response to the current $I_1$. Therefore, the sense circuits 108 may be considered as two-port circuits.

The driver circuit 402 includes an input multiplexer circuit 910 to selectively (e.g., sequentially) drive each of the plurality of sense circuits 106 and 108 with the current $I_1$. Likewise, the measurement amplifier circuit 404 includes an output multiplexer circuit 940 configured to selectively (e.g., sequentially) measure the voltage $V_2$ in each of the plurality of sense circuits 106 and 108. More specifically, but not indicated in FIG. 9A for purposes of illustration, the current $I_1$ driving the sense circuit 106*a* may be denoted by $I_{1a}$, the current $I_1$ driving the sense circuit 106*b* may be denoted as $I_{1b}$, etc. Likewise, the voltages $V_2$ in the sense circuits 106*a* and 106*b* may be denoted by $V_{2a}$ and $V_{2b}$, respectively.

The circuit 900 may be configured and operated in a mode to selectively (e.g., sequentially) measure an intra-sense circuit transimpedance $Z_{21}$ e.g., between the measurement ports 936 and 937 of each of the plurality of the sense circuits 106. This intra-sense circuit transimpedance $Z_{21}$ and may be defined for the sense circuit 106*a* as:

$$Z_{2a1a} \approx V_{2a}/I_{1a} \tag{352}$$

For certain configurations of the sense circuits 106 and 108 (example given below), the two-port transimpedance $Z_{21}$ substantially equals the one-port impedance $Z_{11}$ as it may be measured at the first measurement port (e.g., measurement port 936) with the second measurement port (e.g., measurement port 937) open-circuited.

However, the circuit 900 may also be configured and operated in a mode to selectively (e.g., sequentially) measure an inter-sense circuit transimpedance $Z_{21}$ e.g., between each of a plurality of pairs of sense circuits associated with neighboring sense elements (e.g., inductive sense element 107*a* and 107*b*) providing sufficient cross-coupling. The inter-sense circuit transimpedance $Z_{21}$ as measured between the measurement port 936 of sense circuit 106*a* and the measurement port 937 of sense circuit 106*b* may be defined as:

$$Z_{2a1b} \approx V_{2b}/I_{1a} \tag{353}$$

In some implementations or operations, inter-sense circuit transimpedance $Z_{21}$ measurements are performed between pairs of inductive sense circuits (e.g., inductive sense circuits 106*a* and 106*b*) and between pairs of capacitive sense circuits (e.g., capacitive sense circuits 108*a* and 108*b*). For simplicity, the intra-sense circuit transimpedance $Z_{21}$ herein is often referred to as the impedance $Z_{11}$ and the inter-sense circuit transimpedance $Z_{21}$ as the transimpedance $Z_{21}$. However, in a strict sense, both $Z_{11}$ and $Z_{21}$ may represent a transimpedance.

In an aspect, an object (e.g., object 110) proximate to at least one of the neighboring sense elements (e.g., 107*a* and 107*b*) may change both the impedance $Z_{11}$ and the transimpedance $Z_{21}$. Therefore, additionally measuring $Z_{21}$ may improve the detection reliability of the multipurpose detection circuit 100. Example implementations and operations of object detection circuits configured to measure both the impedance $Z_{11}$ and the transimpedance $Z_{12}$ are described in U.S. patent application Ser. No. 16/358,534, titled Foreign Object Detection Circuit Using Mutual Impedance Sensing, the entire contents of which are hereby incorporated by reference.

The inductive sense circuit 106*a* includes an inductive sense element 107*a* including a sense coil (e.g., sense coil 502 of FIG. 5A) with an inductance L, a first capacitor (e.g., capacitor 504 of FIG. 5A) with capacitance $C_s$, an inductor (e.g., inductor 506 of FIG. 5A) with an inductance $L_p$, a second capacitor 928 with a capacitance $C_{b1}$, and a third capacitor 929 with a capacitance $C_{b2}$. The first capacitor 504 is electrically connected in series to the inductive sense element 107*a* that also connects to ground. The inductor 506 is electrically connected in parallel to the series circuit of capacitor 504 and inductive sense element 107*a*. The second capacitor 928 capacitively couples the series circuit capacitor 504 and inductive sense element 107*a* to the measurement port 936, while the third capacitor 929 capacitively couples to the measurement port 937.

In an example implementation or configuration of the circuit 900 of FIG. 9A, each of the plurality of inductive sense circuits 106 is configured (tuned) to provide a minimum of the impedance $|Z_{11}|$ (series resonance) substantially at the sense frequency as previously discussed with reference to the circuit 500 of FIG. 5A.

In some implementations, at least the capacitor 504 is of a type with a low temperature coefficient providing high thermal stability (e.g., a NP0-type capacitor) reducing thermal drift of an electrical characteristic (e.g., an impedance $Z_{11}$) as measured at each of the plurality of inductive sense circuits 106*a*, 106*b*, . . . , 106*n*. In other implementations, the capacitor 504 is a temperature compensation capacitor configured to compensate at least a portion of a temperature drift of the inductive sense element 107*a*. In a further aspect, the inductor 506 may use a ferrite core or may be an air coil e.g., for purposes of a higher linearity.

In yet further implementations of the circuit 900 using a printed circuit board (PCB), the plurality of inductors 506 is arranged to reduce a magnetic field coupling between neighboring inductors 506, e.g., by an alternating orientation. In yet other implementations, the inductor 506 is electromagnetically shielded to reduce at least one of a magnetic field coupling between neighboring inductors 506 and a disturbance voltage induced into the inductor 506 e.g., by the magnetic field as generated by the wireless power transfer structure (e.g., wireless power transfer structure 200 with reference to FIGS. 2 and 3).

Moreover, as previously mentioned in connection with the circuit 500 of FIG. 5A, the first capacitor 504 together with the parallel inductor 506 form a $2^{nd}$ order high pass filter to attenuate a low frequency disturbance component (e.g., at the WPT frequency) in the voltage V as previously discussed with reference to FIG. 5A. The capacitor 504 together with the parallel inductor 506 may be configured to attenuate this low frequency disturbance component to a level e.g., significantly below the level of the voltage $V_2$ in response to the respective current $I_1$ at the sense frequency. Therefore, this high pass filter may substantially reduce dynamic range requirements in the measurement amplifier circuit 404 and in a further processing (e.g., in the signal processing circuit 408 with reference to FIG. 4). It may also reduce any cross-modulation effects between any low frequency signals at the WPT operating frequency (fundamental and harmonics thereof) and the sense signal at the sense frequency. Cross-modulation may be produced e.g., by non-linear distortion effects in the measurement amplifier circuit 404. At the sense frequency, this high pass filter may exert a minor impact on the voltage $V_2$ and thus on the measured impedance $Z_{11}$ and which may be corrected in a further processing (e.g., in the signal processing circuit 408 of FIG. 4). Any phase shift caused by this high pass filter may be determined e.g., by performing a calibration as previously discussed with reference to FIG. 5A.

The second capacitor 928 may be needed in some implementations to block any DC flow at the output of the driver circuit 402. In an aspect, the capacitor 928 may also help to attenuate any residual low frequency voltage component (e.g., at the WPT operating frequency) at the output of the driver circuit 402. Moreover, in some implementations, it may also be used to compensate or partially compensate for the effect of the reactance of parallel inductor 506 in the measured impedance (e.g., $Z_{11}$) and hence to reduce an error in the measured angle $\arg\{\Delta Z\}$ as previously discussed with respect to FIG. 5A. Likewise, the third capacitor 929 may be needed in some implementations to block any DC flow at the input of the measurement amplifier circuit 404. In some aspect, the capacitor 929 may also help to attenuate any residual low frequency current component (e.g., at the WPT operating frequency) at the input of the measurement amplifier circuit 404. Moreover, in some implementations, it may also help to compensate or partially compensate for the effect of the reactance of the parallel inductor 506 in the measured impedance $Z_{11}$ as discussed with reference to FIG. 5A. In implementations or configurations using a capacitor 929 providing a reactance substantially smaller than an input impedance of the measurement amplifier circuit 404, the intra-sense circuit transimpedance $Z_{21}$ substantially equals the impedance $Z_{11}$ as discussed above.

The impedance $|Z_{11}|$ of the inductive sense circuit 106*a* at series resonance is assumed in the suitable measuring range of the measurement circuit (e.g., measurement circuit 104 with reference to FIG. 4). Therefore, the inductive sense circuits 106 as illustrated in FIG. 9A do not include a transformer (e.g., transformer 526 of FIG. 5B).

The capacitive sense circuit 108*n* includes a capacitive sense element 109*n* including a sense electrode (e.g., sense electrode 702 of FIG. 7C illustrating a single-ended sense electrode) having a capacitance C, a series inductor 724 (e.g., series inductor 724 of FIG. 7C) having an inductance $L_s$, and a transformer 726 (e.g., transformer 726 of FIG. 7C) providing a primary and secondary port, a secondary-referred main inductance $L_m$ and a voltage transformation ratio $1{:}n_{VT}$. Further, it includes a first capacitor 930 with a capacitance $C_{b3}$, and a second capacitor 931 with a capacitance $C_{b4}$ e.g., for purposes as previously discussed with reference to the inductive sense circuits 106 of FIG. 9A. The inductor 724 is electrically connected in series to the capacitive sense element 109*n*. The series circuit of inductor 724 and capacitive sense element 109*n* is electrically connected to the transformer's 726 secondary port that also connects to ground. The transformer's 726 primary port is capacitively coupled to the measurement ports 938 and 939 via capacitors 930 and 931, respectively, and also electrically connects to ground.

Figure 10:
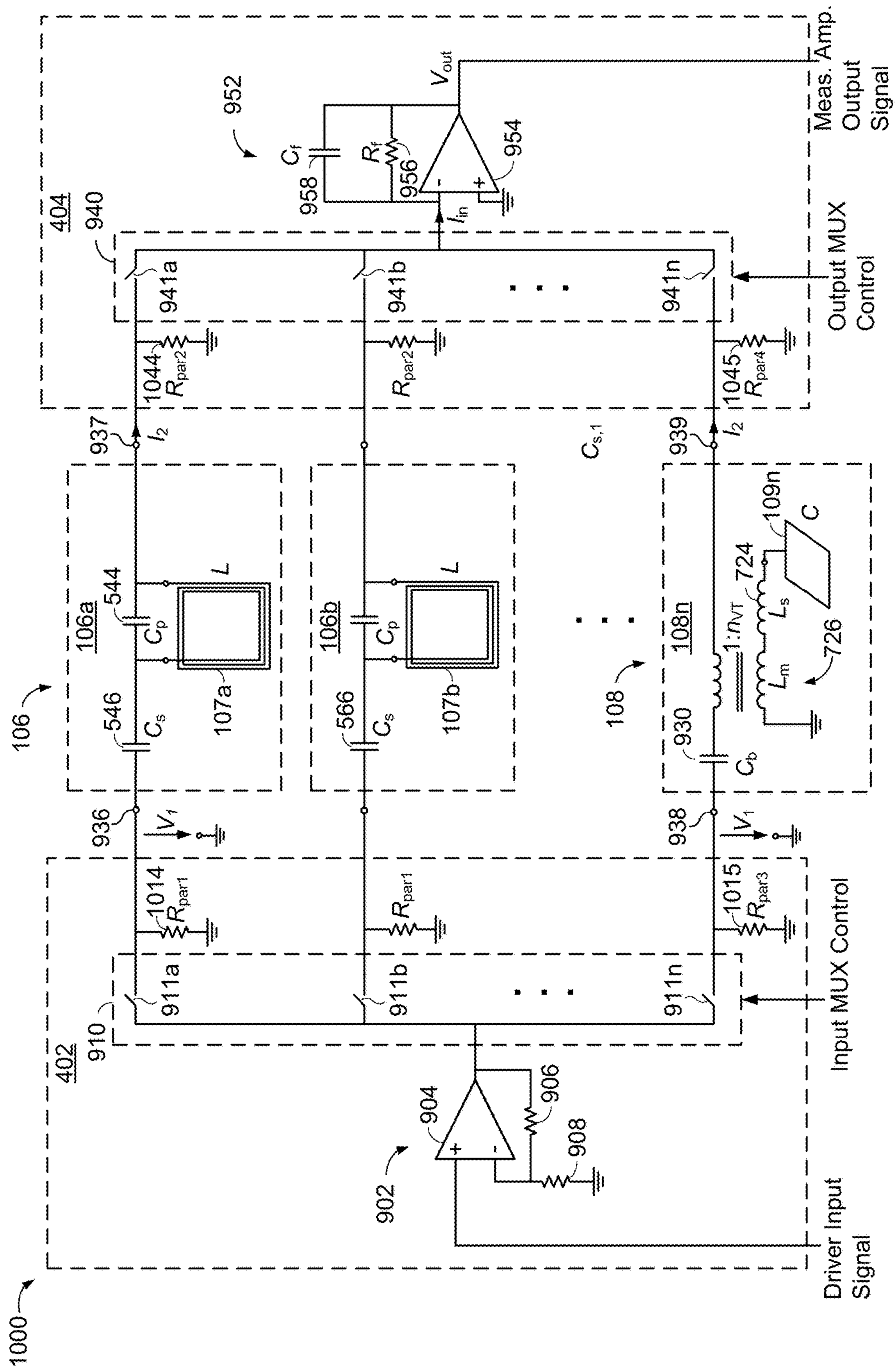
FIG. 10 is a schematic diagram of a circuit illustrating another example implementation of a portion of the multi-purpose detection circuit of FIG. 1 including a plurality of inductive and capacitive sense circuits.

In some implementations, the transformer 726 comprises a primary winding and a galvanically isolated secondary winding, both windings wound on a common ferrite core as indicated in FIG. 10. An example transformer 726 configured for a nominal sense frequency in the MHz-range uses a two-hole ferrite core.

In the example implementation or configuration of the circuit 900 of FIG. 9A, each of the plurality of capacitive sense circuits 108 is configured (tuned) to provide a minimum of the impedance magnitude $|Z_{11}|$ (series resonance) substantially at the sense frequency as previously discussed with reference to the circuit 720 of FIG. 7C.

In some implementations, at least the inductor 704 may be of a type with a low temperature coefficient providing higher thermal stability reducing thermal drift of the impedance $Z_{11}$ as measured at each of the plurality of the capacitive sense circuits 108. In other implementations, the inductor 704 is a temperature compensation inductor configured to compensate at least a portion of a temperature drift of the capacitive sense element 109*n*. In further implementations (not shown herein), a supplementary temperature compensation capacitor is electrically connected in parallel to the capacitive sense element 109*n* (e.g., as illustrated by capacitor 715 in FIG. 7B) configured to compensate at least a portion of the total temperature drift of the inductor 704 and the capacitive sense element 109*n*. Further, the inductor 724 may uses a ferrite core or is an air coil providing higher linearity.

In another aspect and in some implementations of the circuit 900 built on a printed circuit board, the plurality of inductors 724 is arranged to reduce a magnetic field coupling between neighboring inductors 724 and a neighboring inductor 506 of an inductive sense circuit (e.g., inductive sense circuit 106*a*), e.g., by an alternating orientation. In yet other implementations, at least one of the inductor 724 and the transformer 726 is electromagnetically shielded to reduce at least one of a magnetic field coupling between neighboring inductors 724, 506, and a disturbance voltage induced e.g., by the magnetic field as generated by the wireless power transfer structure (e.g., wireless power transfer structure 200 with reference to FIGS. 2 and 3).

In further implementations, at least a portion of the required inductance $L_s$ is realized by a leakage inductance of the transformer 726 as previously mentioned with reference to the circuit 720 of FIG. 7C.

As also mentioned in connection with the circuit 720 of FIG. 7C, the secondary-referred main inductance $L_m$ of the transformer 726 together with capacitance C of the capacitive sense element 109*n* form a $2^{nd}$ order high pass filter to attenuate a low frequency disturbance component in the voltage $V_2$ as previously discussed with reference to FIGS. 7A, 7C, and the inductive sense circuits 106 of FIG. 9A. The transformer 726 may be configured to attenuate this low frequency disturbance component to a level e.g., significantly below the level of the voltage $V_2$ in response to the respective current $I_1$ at the sense frequency. At the sense frequency, this high pass filter may exert a minor impact on the voltage $V_2$ and thus on the measurement of the impedance $Z_{11}$ and which may be corrected in a further processing (e.g., in the signal processing circuit 408 of FIG. 4). Any phase shift caused by this high pass filter may be determined e.g., by performing a calibration as previously discussed with reference to FIG. 7A.

In a further aspect, the transformer 726 may be employed to transform the impedance $Z_{11}$ of the sense circuit 108*n* as presented at the series resonance into the suitable measuring range of the measurement circuit (e.g., measurement circuit 104 of FIG. 4) by adjusting the transformation ratio $1{:}n_{VT}$ accordingly.

The driver circuit 402 includes a driver amplifier circuit 902, an input multiplexer circuit 910 illustrated in FIG. 9A as a plurality of switches 911*a*, 911*b*, . . . , 911*n*, and a plurality of series resistors 914 and 915. The series resistors 914 connected to the inductive sense circuits 106 have a resistance $R_{ser1}$, while the series resistors 915 connected to the capacitive sense circuits have a resistance $R_{ser3}$ that generally differs from $R_{ser1}$. Each of the outputs of the input multiplexer circuit 910 connects to the respective sense circuit of the plurality of sense circuits 106 and 108 via the respective series resistors 914 and 915. The driver circuit 402 is configured to operate as a current source (e.g., current source 512 as described in connection with FIG. 5A) and to selectively (e.g., sequentially) apply a drive current signal $I_1$ at the sense frequency to each of the plurality of inductive sense circuits 106 and to each of the plurality of the capacitive sense circuits 108. The drive current signal $I_1$ (e.g., a sinusoidal signal) is based on a driver input signal which may be an output of the signal generator circuit 406 with reference to FIG. 4. The driver amplifier circuit 902 as illustrated in FIG. 9A by example includes an amplifier 904 and external resistance circuitry comprising a first (feedback) resistor 906 and a second resistor 908 for adjusting a gain. In some implementations, the amplifier is at least one of a low noise operational amplifier and an operational amplifier providing high linearity. The driver amplifier circuit 902 is configured to receive the driver input signal and to provide a corresponding output with an accurate and stable voltage (a voltage source output). As previously mentioned, in some implementations, a DC voltage may be present at any of the plurality of outputs of the driver circuit 402 caused e.g., by a DC offset in the amplifier's 904 output voltage or by certain types of analog switches (e.g., switch 911*a*) of the input multiplexer circuit 910.

The driver amplifier circuit 902 together with series resistors (e.g., series resistor 914) mimic a current source characteristic at each of the plurality of outputs of the driver circuit 402. It may be appreciated that the series resistor (e.g., series resistor 914) with a resistance (e.g., $R_{ser1}$) substantially larger (e.g., 10 times larger) than the impedance magnitude $|Z_{11}|$ at series resonance e.g., of the sense circuit 106 may transform the voltage source output of the driver amplifier circuit 902 into a current source output meeting the requirements of a current source 512 as previously defined in connection with FIG. 5A. Increasing the series resistance (e.g., $R_{ser1}$) may improve the current source characteristic but results in a lower level of drive current $I_0$. The drive current level may impact a SNR as previously defined with reference to FIG. 5F. Therefore, in some implementations, the series resistances $R_{ser1}$ and $R_{ser3}$ may represent a trade-off between a current source characteristic and a SNR.

In an alternative configuration, the current source characteristic is realized using a resistor (e.g., series resistor 914) with a lower resistance (e.g., $R_{ser1}$) instead using the DC block capacitor (e.g., capacitor 928) with a higher reactance, together providing an impedance substantially larger (e.g., 10 times larger) than the impedance as presented at the primary port of the transformer 726 at series resonance. In another implementation variant (not shown herein), the resistor (e.g., series resistor 914) is omitted entirely and the high impedance is realized by the DC block capacitor (e.g., capacitor 928). In a further implementation variant (not shown herein), the high series impedance as required to mimic a current source characteristic is realized at least in part by using at least one of an inductor (not shown in FIG. 9A) and a leakage inductance of a transformer.

Figure 9B:
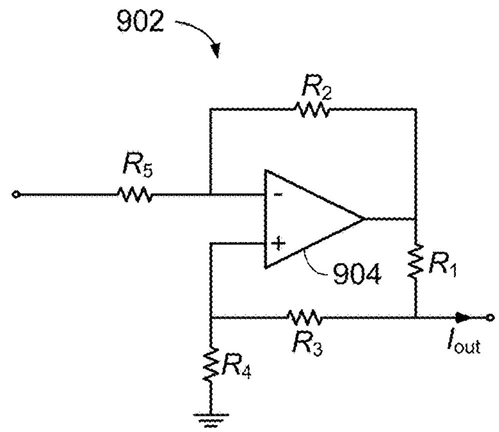
FIG. 9B is a schematic diagram illustrating an example implementation of a portion of the circuit of FIG. 9A.

In yet another implementation variant, the current source characteristic is realized using a driver amplifier circuit 902 configured as a regulated current source. An example current source circuit using an operational amplifier is illustrated in FIG. 9B. However, the current source characteristic as apparent at each of the plurality of outputs of the of the driver circuit 402 may be significantly impaired by the parasitic capacitances of the switch (e.g., switch 911*a*) as previously described. Therefore, this implementation variant (not shown herein), may incorporate the input multiplexer circuit 910 into the driver amplifier circuit 902 also employing an additional (third) multiplexer circuit in a feedback path. This implementation variant may provide a regulated (stable) current source characteristic at each of the plurality of outputs of the driver circuit 402 substantially eliminating the effect of the switch' parasitic capacitances.

In another implementation variant (not shown herein), the driver amplifier circuit 902 additionally includes an output transformer e.g., for purposes of transforming an output voltage. As opposed to lowering the resistance (e.g., $R_{ser1}$), the use of an output transformer may allow the drive current level $I_1$ and thus the sense element current levels $I_L$ and $I_C$ to be increased without compromising the current source characteristic of the driver circuit 402

The input multiplexer circuit 910 includes a plurality of switches 911*a*, 911*b*, . . . , 911*n* and is configured to selectively connect each of the plurality of inductive sense circuits 106 and each of the plurality of capacitive sense circuits 108 via the respective series resistor 914 and 915 to the driver circuit 402 to selectively (e.g., sequentially) drive each of the plurality of inductive sense circuits 106 and each of the plurality of capacitive sense circuits 108 with the current $I_1$ at the sense frequency. Therefore, each of the plurality of switches 911*a*, 911*b*, . . . , 911*n* is electrically connected to the driver amplifier circuit's 902 output that is also referred to as the common input node. The input multiplexer circuit 910 is further configured to receive an input MUX control signal from a control circuit (e.g., from the control and evaluation circuit 102 of FIG. 4) that controls the input multiplexer circuit 910.

Figure 9C:
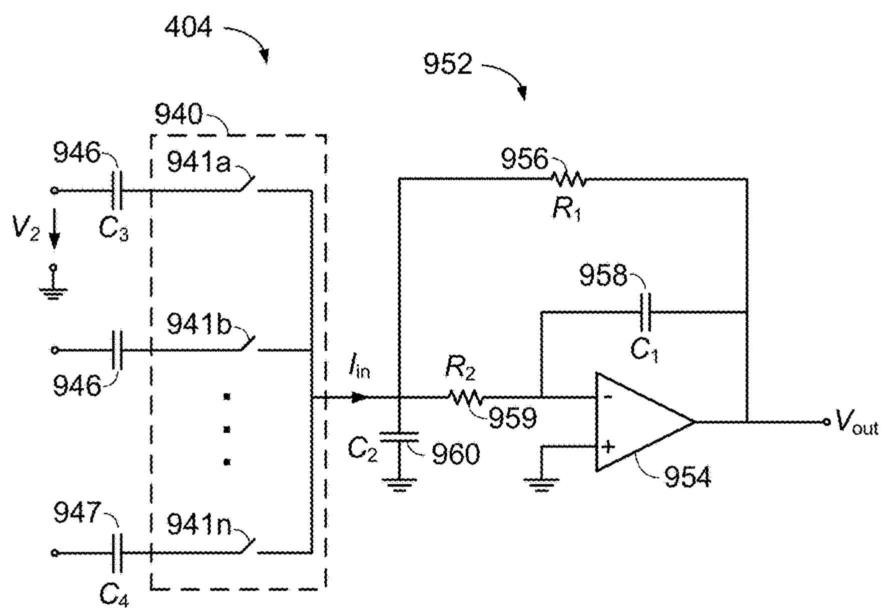
FIG. 9C is a schematic diagram illustrating an example implementation of another portion of the circuit of FIG. 9A.
Figure 9D:
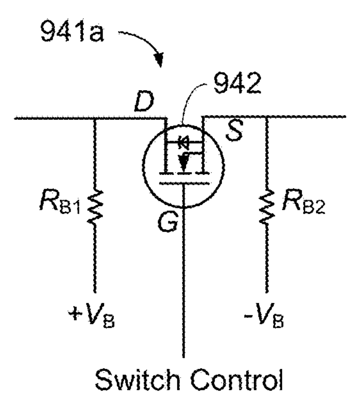
FIG. 9D is a schematic diagram illustrating an example implementation of a further portion of the circuit of FIG. 9A.

Each of the plurality of switches 911*a*, 911*b*, . . . , 911*n* may be one of a semiconductor analog switch (e.g., a single field effect transistor (FET) switch, a complementary FET switch composed of a p-channel and a n-channel type FET), a micro-mechanical systems (MEMS) switch or any other type of switch providing a sufficiently low series resistance, when the switch is closed (closed-state) and a sufficiently high current signal attenuation, when the switch is open (open-state). An example implementation of an analog switch (e.g., switch 911*a*) based on a single FET is illustrated in FIG. 9D.

The switches (e.g., switch 911*a*) may be characterized by a closed-state series resistance, an equivalent open-state series capacitance, and an equivalent parallel capacitance at each side of the switch. It may be appreciated that the closed-state resistance of the switch (e.g., switch 911*a*) is non-critical as it merges with the resistance (e.g., $R_{ser1}$) of the series resistor (e.g., series resistor 914). It may also be appreciated that the total capacitive load produced by the plurality of parallel capacitances at the common input node may be non-critical since it is in parallel to the voltage source output of the driver amplifier circuit 902.

The switch (e.g., switch 911*a*) of an example input multiplexer circuit 910 may use complementary FET switches with a closed-state resistance of 5Ω, an equivalent open-state series capacitance of 3 pF (corresponding to a series reactance of 17.7 kΩ at a sense frequency of 3 MHz), and an equivalent parallel capacitance of 12 pF on each side of the switch.

In a further aspect, the closed-state resistance of a semiconductor analog switch (e.g., switch 911*a*) may be subject of a temperature drift that may impact the temperature stability of the driver circuit 402. Therefore, in some implementations, the impact of the input multiplexer circuit 910 switch (e.g., switch 911*a*) is reduced by using a resistor (e.g., series resistor 914) whose resistance (e.g., $R_{ser1}$) is substantially larger than the closed-state resistance of the switch. Therefore, in some implementations, the series resistances $R_{ser1}$ and $R_{ser3}$ may also represent a trade-off between a temperature stability and a SNR as discussed above.

In an implementation variant of the circuit 900 (not shown herein), the order of the series resistor (e.g., series resistor 914) and the switch (e.g., switch 911*a*) is reversed, meaning that the plurality of series resistors 914 and 915 are electrically connected to the output of the driver amplifier circuit 902 (common input node) and the input multiplexer circuit 910 is inserted between the plurality of series resistors 914 and 915 and the plurality of sense circuits 106 and 108. Reversing the order may be advantageous for the design of the switch (e.g., switch 911*a*) as the voltage $V_2$ across the sense circuit may be substantially lower than the voltage at the output of the driver amplifier circuit 902.

As discussed above, a low frequency disturbance voltage (e.g., at WPT frequency) may be present at the driver circuit 402 output and at the measurement amplifier circuit 404 input e.g., due to the voltage induced into the sense element (e.g., sense element 107*a*) by the WPT magnetic field. If a switch (e.g., switch 911*b*) is in open-state, a substantial low frequency voltage may also be present across the switch. This may be particularly true during active WPT operation. If too large, the open-switch voltage may affect any of the switch' open-state electrical characteristic or cause damage to the switch. In some implementations, the open-switch voltage is limited by configuring the inductive and capacitive sense circuits (e.g., sense circuit 106*a* and sense circuit 108) accordingly, trading-off the open-switch voltage vs. other impacts.

The measurement amplifier circuit 404 is configured to operate as the analog front-end part of a voltage measurement circuit (e.g., voltage measurement circuit 510 as described in connection with FIG. 5A). It is configured to selectively (e.g., sequentially) buffer and amplify the voltage $V_2$ in each of the plurality of inductive sense circuits 106 and in each of the plurality of capacitive sense circuits 108 and to provide a measurement amplifier output voltage signal $V_{out}$ (as indicated in FIG. 9A) based on the respective voltage $V_2$ at a level suitable for further processing e.g., in the signal processing circuit 408 with reference to FIG. 4. In some implementations providing a voltage gain, the voltage $V_{out}$ is larger than $V_2$. In other implementations, the measurement amplifier circuit 404 mainly serves for impedance buffering and is configured for unity gain. In further implementations, the output voltage $V_{out}$ is even smaller than $V_2$. As previously mentioned, a DC flow at any of the plurality of inputs of the measurement amplifier circuit 404 may be present e.g., caused by a DC offset at the amplifier's 954 input or by certain types of analog switches (e.g., switch 941*a*).

The measurement amplifier circuit 404 includes a transimpedance amplifier circuit 952, an output multiplexer circuit 940 illustrated in FIG. 9A as a plurality of switches 941*a*, 941*b*, . . . , 941*n*, and a plurality of resistors 944 and 945 (series resistors) connected in series to the respective output of the output multiplexer circuit 940. The series resistors 944 connected to the inductive sense circuits 106 have a resistance $R_{ser2}$ that may differ from the series resistance $R_{ser1}$, while the series resistors 945 connected to the capacitive sense circuits 108 have a resistance $R_{ser4}$ that may differ from $R_{ser3}$ and $R_{ser2}$. Further, it includes. The plurality of switches 941*a*, 941*b*, . . . , 941*n* are electrically connected to the transimpedance amplifier circuit's 952 input that is also referred to herein as the common output node of the output multiplexer circuit 940.

The example transimpedance amplifier circuit 952 as illustrated in FIG. 9A includes an amplifier 954, a feedback resistor 956 having a resistance $R_f$, and a feedback capacitor 958 having a capacitance $C_f$. In some implementations, the amplifier 954 is at least one of a low noise operational amplifier and an amplifier providing high linearity. The positive input (+) of the amplifier 954 connects to ground. Both the feedback resistor 956 and the feedback capacitor 958 are electrically connected between the output ($V_{out}$) and the negative input (−) of the amplifier 954. Further, the transimpedance amplifier circuit 952 is configured to receive an input current $I_{in}$, which is the output current at the common output node of the output multiplexer circuit 940 and to convert the input current $I_{in}$ into a proportional output voltage $V_{out}$. The conversion gain (transimpedance) is determined by the impedance of the parallel connection of the feedback resistor 956 and the feedback capacitor 958. Since the voltage at the negative input (−) of the amplifier 954 is virtually zero (virtual ground), the transimpedance amplifier circuit 952 presents a virtually zero input impedance at its negative input (−).

The transimpedance amplifier circuit 952 together with the series resistor (e.g., resistor 944) mimic a voltage measurement circuit characteristic at each of the plurality of inputs of the measurement amplifier circuit 404. It may be appreciated that the series resistor (e.g., resistor 944) with a resistance (e.g., $R_{ser2}$) substantially larger (e.g., 10 times larger) than the impedance magnitude $|Z_{11}|$ at series resonance e.g., of the sense circuit 106*a* transforms the virtually zero impedance input of the transimpedance amplifier circuit 952 into a high impedance input satisfying the requirements of a voltage measurement circuit 510 as previously specified in connection with FIG. 5A. They form together a sign inverting voltage amplifier with an output voltage $V_{out}$ proportional to the sign inverse of the voltage $V_2$.

In an aspect, increasing the resistance (e.g., $R_{ser2}$) of the series resistor (e.g., resistor 944) may improve a voltage measurement circuit characteristic but reduce the input current level $I_{in}$. The input current level $I_{in}$ may impact a SNR as previously defined with reference to FIG. 5F. Moreover, increasing the resistance (e.g., $R_{ser2}$) may reduce an impact of the output multiplexer circuit 940 switch (e.g., switch 941*a*) (e.g., a temperature drift) as discussed above in connection with the input multiplexer circuit 910. Therefore, in some implementations, the resistances $R_{ser2}$ and $R_{ser4}$ may represent a trade-off between a voltage measurement circuit characteristic, a temperature stability, and a SNR.

In an example implementation variant (not shown herein), an impact of the output multiplexer circuit 940 switch (e.g., switch 941*a*) (e.g., a temperature drift) is reduced by omitting the output multiplexer circuit 940, instead using a plurality (bank) of measurement amplifiers (not shown herein), whose inputs are electrically connected to the respective measurement port (e.g., measurement port 937) of the respective sense circuit (e.g., sense circuit 106*a*) and whose outputs are electrically connected to a common output ($V_{out}$). Each measurement amplifier circuit 404 is configured to provide a high input impedance and includes an operational amplifier (e.g., amplifier 954) providing a mute control input to apply a logic signal indicative for the output MUX control signal as indicted in FIG. 9A. The operational amplifier is further configured to provide a virtually zero gain and a high output impedance when muted. An example circuit using a bank of operational amplifiers is disclosed in U.S. patent application Ser. No. 16/226,156, titled Foreign Object Detection Circuit Using Current Measurement, the entire contents of which are hereby incorporated by reference.

In an example configuration of the circuit 900, the voltage measurement circuit characteristic is realized using a resistor (e.g., resistor 944) with a lower resistance (e.g., $R_{ser2}$) instead using the DC block capacitor (e.g., capacitor 929 of sense circuit 106*a*) with a higher reactance, together providing a series impedance substantially larger (e.g., 10 times larger) than the impedance of the series circuit e.g., of the sense element 107*a* and the capacitor 504 at series resonance. In an implementation variant, the series resistor (e.g., resistor 944) is omitted and the voltage measurement circuit characteristic is realized using the DC block capacitor (e.g., capacitor 929) configured to provide a high enough series impedance. In another implementation variant (not shown herein), the high series impedance as required to mimic a current source characteristic is realized at least in part by using at least one of an inductor (not shown in FIG. 9A) and a leakage inductance of a transformer.

The feedback capacitor 958 provides the transimpedance amplifier circuit 952 with a first order low pass filter characteristic to attenuate disturbance signal components at frequencies higher than the sense frequency (e.g., high order WPT harmonics). In some implementations, the capacitance $C_f$ may be a trade-off between a reduction in gain at the sense frequency and an attenuation of the high frequency signal components. The feedback capacitor 958 may reduce a risk for signal clipping or non-linear distortion in the amplifier 954 or in the further processing (e.g., the signal processing circuit 408 with reference to FIG. 4) e.g., during WPT operation. In other words, it may reduce the dynamic range requirements for the measurement amplifier circuit 404 and in the further processing.

In an implementation variant (not shown herein), the transimpedance amplifier circuit 952 is further enhanced by a supplementary feedback inductor electrically connected in parallel to the feedback capacitor 958 providing the transimpedance amplifier circuit 952 with a bandpass characteristic tuned to the sense frequency. This inductor may help to further suppress low frequency disturbance signal components (e.g., the WPT fundamental and low frequency harmonics thereof). In such an implementation, the feedback capacitor 958 may be a temperature compensation capacitor to compensate for at least a portion of the feedback inductor's temperature drift.

In another implementation variant (not shown in FIG. 9A), the measurement amplifier circuit 404 is configured as an active filter providing a bandpass characteristic similar to the implementation variant described above using a parallel feedback inductor. This circuit may not use any inductors. An example implementation of a measurement amplifier circuit 404 using an active filter is illustrated in FIG. 9C.

The output multiplexer circuit 940 including the plurality of switches 941*a*, 941*b*, . . . , 941*n* is configured to selectively connect each of the plurality of inductive sense circuits 106 and each of the plurality of capacitive sense circuits 108 via the respective series resistors 944 and 945 to the transimpedance amplifier circuit 952 to selectively (e.g., sequentially) buffer and amplify the voltage $V_2$ at each of the plurality of sense circuits 106 and 108 in response to a current $I_0$ at the sense frequency. Therefore, each of the plurality of switches 941*a*, 941*b*, . . . , 941*n* is electrically connected to the common output node that is electrically connected to the negative input of the transimpedance amplifier circuit 952. The output multiplexer circuit 940 is further configured to receive an output MUX control signal from a control circuit (e.g., from the control and evaluation circuit 102 of FIG. 4) that controls the output multiplexer circuit 940.

As for the input multiplexer circuit 910, each of the plurality of switches 941*a*, 941*b*, . . . , 1041*n* may be one of a semiconductor analog switch (e.g., a single FET switch, a complementary FET switch composed of a p-channel and a n-channel type FET), a micro-mechanical systems (MEMS) switch or any other type of switch providing a sufficiently high current signal attenuation in the open-state. An example implementation of an analog switch (e.g., switch 941*a*) based on a single FET is illustrated in FIG. 9D.

As previously discussed in connection with the input multiplexer circuit 910, each of the plurality of switches 941*a*, 941*b*, . . . , 941*n* may exhibit a closed-state series resistance, an equivalent open-state series capacitance, and an equivalent parallel capacitance on each side of the switch. It may be appreciated that the closed-state series resistance (e.g., of switch 941*a*) may be non-critical for the functioning of the measurement amplifier circuit 404 since it merges into an overall series resistance $R_{ser2}$ or $R_{ser4}$. It may also be appreciated that the total capacitive load produced by the plurality of parallel capacitances at the common output node of the output multiplexer circuit 940 may be non-critical since it is in parallel to the virtually zero-impedance input of the transimpedance amplifier circuit 952.

An example output multiplexer circuit 940 for a sense frequency of 3 MHz may use complementary FET switches with the same characteristics as those used for the example input multiplexer circuit 910 as specified above.

As previously discussed with reference to the input multiplexer circuit 910, a low frequency voltage (e.g., at WPT frequency) may also be present across the switch (e.g., switch 941*a*) when WPT is active and the switch in open-state. If too large, this open-switch voltage may affect any of the switch's open-state electrical characteristics or cause damage to the switch. In some implementations, the open-switch voltage is limited as previously discussed for the input multiplexer circuit 910.

In an implementation variant (not shown herein), the order of the series resistor (e.g., resistor 944) and the switch (e.g., switch 941*a*) is reversed, meaning that the series resistor (e.g., resistor 944) is electrically connected to the input of the transimpedance amplifier circuit 952 (common output node) and the output multiplexer circuit 940 is inserted between the plurality of sense circuits 106 and 108 and the plurality of resistors 944 and 945.

A further implementation variant of the circuit 900 (not shown herein) omits the output multiplexer circuit 940 e.g., for reasons of complexity and cost reduction. In theory, the input multiplexer circuit 910 may be enough to selectively (e.g., sequentially) drive a sense circuit (e.g., sense circuit 106*a*) with the current $I_1$ and to selectively measure the voltage $V_2$ at its measurement port 937 in response to the current $I_1$. Because the measurement amplifier circuit 404 is configured as a voltage summation amplifier, its output voltage $V_{out}$ is indicative of the sum of the voltages at each of the plurality of measurement ports 937. Since the voltages $V_2$ at the inactive sense circuits (not driven by the current are ideally zero, the output voltage $V_{out}$ is indicative of the voltage $V_2$ of the active sense circuit (e.g., sense circuit 106*a*) driven by the current $I_1$. However, in practice, disturbance voltages e.g., inductively or capacitively coupled into the sense element (e.g., inductive sense element 107*b*) may also sum up resulting in a lower SNR as compared to a circuit 900 using the output multiplexer circuit 940. Moreover, a circuit 900 omitting the output multiplexer circuit 940 may not support supplementary inter-sense circuit transimpedance $Z_{12}$ measurements as described above. The inter-sense circuit transimpedance $Z_{12}$ between the measurement port 936 of sense circuit 106*a* and the measurement port 937 of sense circuit 106*b* may be measured by setting the switches 911*a* and 941*b* to the close-state and the other switches of the plurality of switches 911*a*, 911*b*, . . . , 911*n* to the open-state.

A numerical specification and some resulting performance figures of an example circuit 900 with respect to the inductive sense circuits 106 configured for a nominal sense frequency $f_s$=3 MHz are given in TABLE 7. A WPT operating frequency $f_{WPT}$=85 kHz is assumed. TABLE 7 also includes a system Q-factor defined as the ratio $$Q_{sys} \approx |\Delta V_{out}'| / |\Delta Z'_r| \tag{354}$$

where $|\Delta V_{out}'|$ denotes the magnitude fractional change of the measurement amplifier circuit's 404 output voltage $V_{out}$ caused by an object (e.g., object 110) and $|\Delta Z'_r|$ the magnitude normalized reflected impedance of the object as defined by Equations (6) an (211) for an inductive sense element (e.g., inductive sense element 107*a*) and a capacitive sense element (e.g., capacitive sense element 109*n*), respectively. Further, TABLE 7 includes a quality of the measurement circuit 104 defined as the ratio:

$$Q_{mc} \approx |\Delta V_{out}'|/|\Delta I_1'| \quad (355)$$

where $|\Delta V_{out}'|$ denotes the magnitude fractional change of the measurement amplifier circuit's 404 output voltage $V_{out}$ caused by an object (e.g., object 110) and $|\Delta I_1'|$ the magnitude fractional change of the driver circuit's 402 output current $I_1$ caused by that object. Moreover, TABLE 7 includes a degradation of the fractional change in the measurement amplifier circuit's 404 output voltage $V_{out}$ defined as:

$$\gamma_{Vout} \approx 1-(|\Delta V_{out}'|/|\Delta Z'|) \quad (356)$$

where $|\Delta Z'|$ denotes the magnitude fractional change of the intra-sense circuit transimpedance $Z_{2a1a}$ as defined by Equation (352) for the sense circuit 106*a* by example. This degradation may be the result of imperfections in the driver circuit 402 and the measurement amplifier circuit 404 and in other circuit elements as needed in a practical implementation.

TABLE 7

| Item | Symbol | Value | Remarks |
|---|---|---|---|
| Input multiplexer circuit 910 switch closed-state resistance | | 5 Ω | |
| Series resistor 914 resistance | $R_{ser1}$ | 100 Ω | |
| DC block capacitor 928 capacitance | $C_{b1}$ | 3.3 nF | |
| Inductive sense element 107a inductance | L | 5 μH | |
| Inductive sense element 107a equivalent series resistance | R | 3.8 Ω | Q-factor Q = 25 |
| Capacitor 504 capacitance | $C_s$ | 563 pF | |
| Parallel inductor 506 inductance | $L_p$ | 18 μH | |
| DC block capacitor 929 capacitance | $C_{b2}$ | 3.3 nF | |
| Series resistor 944 resistance | $R_{ser2}$ | 100 Ω | |
| Output multiplexer circuit 940 switch closed-state resistance | | 5 Ω | |
| Feedback resistor 956 resistance | $R_f$ | 560 Ω | |
| Feedback capacitor 958 capacitance | $C_f$ | 100 pF | |
| Sense circuit 106a parallel resonance | | 1.4 MHz | |
| Exact sense frequency | | 3.0006 MHz | |
| Transimpedance (minimum magn.) | $Z_{210}$ | 3.769 Ω | Meas, port 936 to 937 |
| System Q-factor | $Q_{sys}$ | 23.4 | |
| Quality of measurement circuit 104 | $Q_{mc}$ | 29.2 | |
| Residual angle error | ε | −0.6° | |
| Degradation of fractional change at meas. circuit 104 output ($V_{out}$) | $\gamma_{Vout}$ | 6.5% | |
| Driver amplifier circuit 902 output voltage | | 7.9 $V_{pp}$ | 2.8 $V_{rms}$ |
| Driver amplifier circuit 902 output current | | 25.5 $mA_{rms}$ | |
| Driver amplifier circuit 902 output power | | 71.4 mW | |
| Driver circuit 402 output current | | 25.5 $mA_{rms}$ | |
| Inductive sense element 107a current (sense current) | $I_L$ | 24.6 $mA_{rms}$ | |
| Transimpedance amplifier circuit 952 input current | $I_{in}$ | 0.87 $mA_{rms}$ | 3 MHz sense signal |
| Measurement amplifier circuit 404 output voltage | $V_{out}$ | 0.95 $V_{pp}$ | 3 MHz sense signal, 0.34 $V_{rms}$ |
| WPT fundamental disturbance voltage induced into inductive sense element 107a | $V_{sW}$ | 30 $V_{rms}$ | 85 kHz component |
| WPT fundamental disturbance voltage at measurement amplifier circuit 404 output | | 0.25 $V_{pp}$ | 85 kHz component |
| SNR with respect to WPT fundamental disturbance voltage | $SNR_W$ | 11.7 dB | 85 kHz component |
| WPT fundamental disturbance voltage across input multiplexer circuit 910 switch when open | | 8.2 $V_{pp}$ | 85 kHz component |
| WPT fundamental disturbance voltage across output multiplexer circuit 940 switch when open | | 0.2 $V_{pp}$ | 85 kHz component |

A numerical specification of an example circuit 900 with respect to the capacitive sense circuits 108 configured for a nominal sense frequency $f_s$=3 MHz are given in TABLE 8. A WPT operating frequency $f_{WPT}$=85 kHz is assumed. TABLE 8 also includes the system Q-factor $Q_{sys}$ as defined above by Equation (354), the quality of the measurement circuit 104 as defined by Equation (355), and the degradation of the fractional change in the measurement amplifier circuit's 404 output voltage $V_{out}$ as defined by Equation (356).

TABLE 8

| Item | Symbol | Value | Remarks |
|---|---|---|---|
| Input multiplexer circuit 910 switch closed-state resistance | | 5 Ω | |
| Series resistor 915 resistance | $R_{ser3}$ | 100 Ω | |
| DC block capacitor 930 capacitance | $C_{b3}$ | 3.3 nF | |
| Capacitive sense element 109n capacitance | C | 30 pF | |
| Series inductor 724 inductance | $L_s$ | 94 uH | includes transformer 726 leakage inductance |
| Series inductor 724 equivalent series resistance | $R_{Ls}$ | 118 Ω | Q-factor $Q_{Ls}$ = 15, includes transf. 726 losses |
| Transformer 726 secondary-referred main inductance | $L_m$ | 270 uH | |
| Transformer 726 voltage transformation ratio | $1:n_{VT}$ | 1:5 | |
| DC block capacitor 931 capacitance | $C_{b4}$ | 3.3 nH | |
| Series resistor 945 resistance | $R_{ser4}$ | 100 Ω | |
| Output multiplexer circuit 940 switch closed-state resistance | | 5 Ω | |
| Feedback resistor 956 resistance | $R_f$ | 470 Ω | |
| Feedback capacitor 958 capacitance | $C_f$ | 120 pF | |
| Sense circuit 108a parallel resonance | | 1.52 MHz | |
| Exact sense frequency | | 3.0023 MHz | |
| Transimpedance (minimum magn.) | $Z_{210}$ | 4.713 Ω | Meas, port 938 to 939 |
| System Q-factor | $Q_{sys}$ | 13.8 | |
| Quality of measurement circuit 104 | $Q_{mc}$ | 23.5 | |
| Residual angle error | ε | −0.9° | |
| Degradation of fractional change at meas. circuit 104 output ($V_{out}$) | | 8% | |
| Driver amplifier circuit 902 output voltage | | 7.92 $V_{pp}$ | 2.8 $V_{rms}$ |
| Driver amplifier circuit 902 output current | | 25.3 $mA_{rms}$ | |
| Driver amplifier circuit 902 output power | | 70.8 mW | |
| Drive circuit 402 output current | | 25.3 $mA_{rms}$ | |
| Capacitive sense element 109a current (sense current) | $I_C$ | 4.8 $mA_{rms}$ | |
| Transimpedance amplifier circuit 952 input current | $I_{in}$ | 1.1 $mA_{rms}$ | 3 MHz sense signal |
| Measurement amplifier circuit 404 output voltage | $V_{out}$ | 0.98 $V_{pp}$ | 3 MHz sense signal 0.35 $V_{rms}$ |
| WPT fundamental disturbance voltage induced into capacitive sense element 109a | $V_{sW}$ | 150 $V_{rms}$ | 85 kHz component |
| WPT fundamental disturbance voltage at measurement amplifier circuit 404 output | | 0.16 $V_{pp}$ | 85 kHz component |
| SNR with respect to WPT fundamental disturbance voltage | $SNR_W$ | 15.6 dB | 85 kHz component |
| Voltage across input multiplexer circuit 910 switch when open and WPT active | | 8.1 $V_{pp}$ | 85 kHz component |
| Voltage across output multiplexer circuit 940 switch when open and WPT active | | 0.2 $V_{pp}$ | 85 kHz component |

FIG. 9C is a circuit diagram illustrating an example implementation of a measurement amplifier circuit 404 using an active filter providing a bandpass characteristic as previously mentioned with reference to FIG. 9A. The measurement amplifier circuit 404 is configured to selectively (e.g., sequentially) buffer and amplify the voltage $V_2$ in each of the plurality of inductive sense circuits 106 and in each of the plurality of capacitive sense circuits 108 and to provide an output voltage $V_{out}$ based on the respective voltage $V_2$ at a level suitable for further processing e.g., in the signal processing circuit 408 with reference to FIG. 4. In some implementations, the bandpass filter characteristic of the active filter substantially equals the bandpass pass characteristics of the measurement amplifier circuit 404 based on a transimpedance amplifier circuit 952 including a feedback network comprising a resistor, a capacitor, and an inductor as previously described in connection with FIG. 9A. However, the temperature stability of the measurement amplifier circuit 404 of FIG. 9C using an active filter may be higher than that of a measurement amplifier circuit 404 using a feedback inductor.

The example measurement amplifier circuit 404 of FIG. 9C includes a transimpedance amplifier circuit 952, an output multiplexer circuit 940 including a plurality of switches 941*a*, 941*b*, . . . , 941*n*, and a plurality of capacitors (series capacitors 946 and 947) connected in series to the respective switch. In the measurement amplifier circuit 404 of FIG. 9C, the resistors 944 and 945 with reference to FIG. 9A are supplanted by respective series capacitors 946 and 947 having capacitance $C_3$ and $C_4$ configured to provide the high input impedance and the active filter characteristic as required in some implementations of the measurement amplifier circuit 404. The transimpedance amplifier circuit includes an amplifier 954 (e.g., at least one of a low noise operational amplifier and an operational amplifier providing high linearity). The amplifier's 954 positive input (+) is electrically connected to ground. A feedback capacitor 958 with capacitance $C_1$ is electrically connected between the output ($V_{out}$) and the negative input (−) of the amplifier 954. Further, a feedback resistor 956 with resistance $R_1$ is electrically connected between the output ($V_{out}$) and the input ($I_{in}$) of the transimpedance amplifier circuit 952. A resistor 959 with resistance $R_2$ is electrically connected between the input ($I_{in}$) of the transimpedance amplifier circuit 952 and the negative input (−) of the amplifier 954. A capacitor 960 with capacitance $C_2$ is electrically connected between the input ($I_{in}$) of the transimpedance amplifier circuit 952 and ground. Further, each of the capacitors 946 having a capacitance $C_3$ capacitively couples a respective switch (e.g., switch 941*a*) to the respective inductive sense circuit (e.g., inductive sense circuit 106*a*), while each of the capacitors 947 having a capacitance $C_4$ capacitively couples a respective switch (e.g., switch 941*n*) to the respective capacitive sense circuit (e.g., capacitive sense circuit 108*a*). The second terminal of the plurality of switches 941*a*, 941*b*, . . . , 941*n* is connected to the common output node corresponding to the input ($I_{in}$) of the transimpedance amplifier circuit 952.

Active filters providing a bandpass characteristic may be implemented in a number of ways which may be well known to those skilled in the art. However, not many of these implementations may satisfy the requirements of a voltage measurement circuit (e.g., voltage measurement circuit 510).

FIG. 9D is a circuit diagram illustrating an example implementation of an analog switch (e.g., 941*a*) as used in an example implementation of the output multiplexer circuit 940. The analog switch uses a single field-effect transistor (FET) 942 (e.g., a n-channel metal-oxide-semiconductor field-effect transistor (MOSFET)). The analog switch is controlled by a switch control signal applied to the gate (G) of the FET 942. The Drain (D) of the FET 942 is DC biased with a positive voltage $+V_B$ via a resistor having a resistance $R_{B1}$ (e.g., in the kΩ range). The positive DC voltage $+V_B$ ensures that the voltage across the FET channel remains positive at any time when in open-state and in presence of a superimposed alternating voltage across the FET channel (e.g., during WPT operation as previously discussed with reference to FIG. 9). Further, a negative DC voltage $-V_B$ is applied at the Source (S) of the FET 942. This voltage may be adjusted to substantially compensate for any DC at the input of the transimpedance amplifier circuit 952 caused by the positive DC voltage $+V_B$ and to reduce a DC offset at the output ($V_{out}$).

Figure 9E:
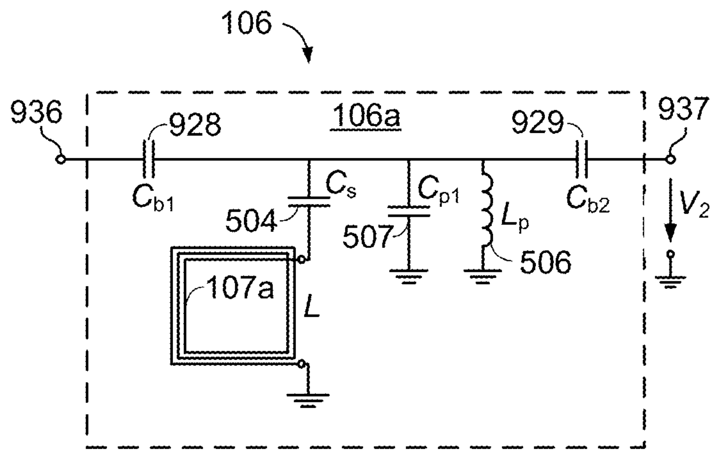
FIG. 9E is a schematic diagram illustrating an example implementation of yet another portion of the circuit of FIG. 9A.

FIG. 9E is a circuit diagram illustrating an alternative example implementation of the inductive sense circuit 106*a* of the plurality of inductive sense circuits 106 of the circuit 900 of FIG. 9A. This alternative example implementation illustrated in FIG. 9E additionally includes a parallel capacitor 507 having a capacitance $C_{p1}$ and applies to any of the plurality of inductive sense circuits 106. In some implementations, the parallel inductor 506 and the parallel capacitor 507 are configured to provide a parallel resonance substantially at the nominal sense frequency.

In an aspect, the sense element 107*a* having inductance L in combination with the parallel capacitor 507 having capacitance $C_{p1}$ form a $2^{nd}$ order low pass filter to attenuate a disturbance component in the voltage $V_2$ at a frequency substantially higher than the nominal sense frequency. In some implementations or operations, this disturbance component emanates from a voltage inductively or capacitively coupled into the sense element 107*a* by the magnetic or electric field, respectively, as generated during wireless power transfer. In other implementations or operations, it emanates from a voltage inductively or capacitively coupled into the sense element 107*a* by the magnetic or electric field, respectively, as generated by another system (not shown herein) e.g., a transmitter of a communication system operating at a frequency substantially higher than the nominal sense frequency and that is cointegrated into the primary wireless power transfer structure 200 with reference to FIG. 2.

Figure 9F:
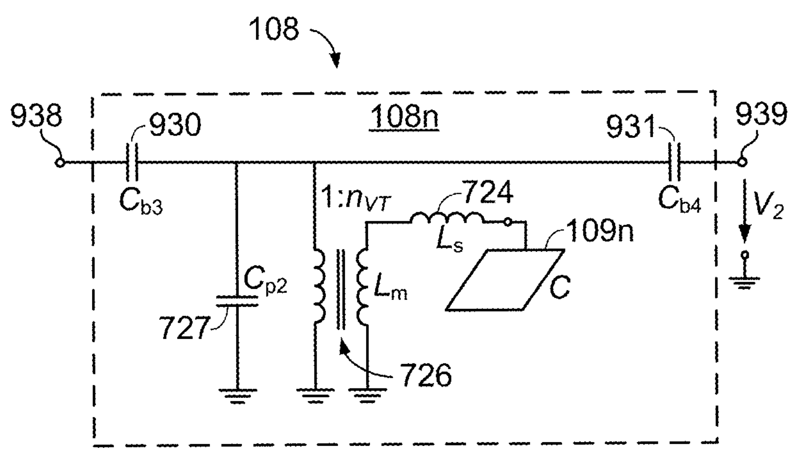
FIG. 9F is a schematic diagram illustrating an example implementation of yet a further portion of the circuit of FIG. 9A.

FIG. 9F is a circuit diagram illustrating an alternative example implementation of the capacitive sense circuit 108*n* of the plurality of capacitive sense circuits 108 of the circuit 900 of FIG. 9A. This alternative example implementation additionally includes a parallel capacitor 727 having a capacitance $C_{p2}$ and applies to any of the plurality of capacitive sense circuits 108. In some implementations, the transformer 726 having the secondary-referred main inductance $L_m$ (with reference to the equivalent circuit of FIG. 5H) and the parallel capacitor 507 having capacitance $C_{p2}$ are configured to provide a parallel resonance substantially at the nominal sense frequency.

In an aspect, the series inductor 724 having inductance $L_s$ in combination with the parallel capacitor 727 having capacitance $C_{p2}$ form a $2^{nd}$ order low pass filter to attenuate a disturbance component in the voltage $V_2$ at a frequency substantially higher than the nominal sense frequency. In some implementations or operations, this disturbance component emanates from a voltage coupled into the sense electrode (e.g., capacitive sense element 109*n*) e.g., by the electric field as generated during wireless power transfer. In other implementations or operations, it emanates from a voltage coupled into the sense electrode (e.g., capacitive sense element 109*n*) e.g., by the electric field as generated by another system (not shown herein) but an example is provided above.

In some implementations, each of the parallel capacitors 507 and 727 as part of a $2^{nd}$ order low pass filter reduces dynamic range requirements of the measurement amplifier circuit 404 and may also protect the driver circuit 402 including the input multiplexer circuit 910 and the measurement amplifier circuit 404 including the output multiplexer circuit 940 from being overloaded. Stated more generally, it may reduce non-linear distortion effects (e.g., signal clipping) in the circuit 900 of FIG. 9A.

FIG. 10 is a circuit diagram of a circuit 1000 illustrating another example implementation of a portion of a multi-purpose detection circuit 100. The circuit 1000 of FIG. 10 illustrates an analog front-end circuit portion of the multi-purpose detection circuit 100 with reference to FIGS. 1 and 4. FIG. 10 excludes various other signal generation, processing, control and evaluation circuits (e.g., as shown in FIG. 4) that may be needed in some implementations of a multi-purpose detection circuit 100. The circuit 1000 implements inductive and capacitive sensing by measuring an impedance based on the current source voltage measurement approach as previously described in connection with FIG. 5C.

As with the circuit 900 of FIG. 9A, the circuit 1000 may be subdivided into a driver circuit 402, a plurality of inductive sense circuits 106 including sense circuits 106*a*, 106*b*, . . . , 106*n* (106*n* not shown in FIG. 10 for purposes of illustration), a plurality of capacitive sense circuits 108 including sense circuits 108*a*, 108*b*, . . . , 108*n* (108*a* and 108*b* not shown in FIG. 10 for purposes of illustration), and a measurement amplifier circuit 404 with reference to the generic block diagram of FIG. 4. However, each of the plurality of inductive sense circuits 106*a*, 106*b*, . . . , 106*n* is based on the sense circuit 541 of FIG. 5C, while each of the plurality of capacitive sense circuits 108*a*, 108*b*, . . . , 108*n* is based on the sense circuit 721 of FIG. 7C. The dots indicated in FIG. 10 shall indicate that the number of inductive sense circuits 106 and/or the number of capacitive sense circuits 108 may be greater than three as previously noted with reference to FIG. 1.

In the example implementation shown in FIG. 10, each of the plurality of inductive sense circuits 106 have an identical circuit topology. Likewise, each of the plurality of capacitive sense circuits 108 have an identical circuit topology. Therefore, descriptions given below for the inductive sense circuit 106*a* also apply to the other inductive sense circuits (e.g., 106*b*) and descriptions given below for the capacitive sense circuit 108*n* also apply to the other capacitive sense circuits (e.g., 108*a*).

Each of the plurality of inductive sense circuits 106 provides a first measurement port 936 (indicated in FIG. 10 by a terminal) for applying an electrical voltage $V_1$ (as indicated in FIG. 10) and a second measurement port 937 (indicated in FIG. 10 by a terminal) for measuring an electrical current $I_2$ (as indicated in FIG. 10) e.g., in response to the voltage $V_1$. Likewise, each of the plurality of capacitive sense circuits 108 provides a first measurement port 938 (indicated in FIG. 10 by a terminal) for applying the voltage $V_1$ (as indicated in FIG. 10) and a second measurement port 939 (indicated in FIG. 10 by a terminal) for measuring the current $I_2$ (as indicated in FIG. 10) e.g., in response to the current $V_1$. Though providing two ports, the sense circuits 106 and 108 as illustrated in FIG. 10 may be considered as one-port circuits as further discussed below.

The driver circuit 402 includes an input multiplexer circuit 910 to selectively (e.g., sequentially) apply the voltage $V_1$ to each of the plurality of sense circuits 106 and 108. Likewise, the measurement amplifier circuit 404 includes an output multiplexer circuit 940 configured to selectively (e.g., sequentially) measure the current $I_2$ in each of the plurality of sense circuits 106 and 108. More specifically, but not indicated in FIG. 10 for purposes of illustration, the voltage $V_1$ applied to the sense circuit 106*a* may be denoted by $V_{1a}$, the voltage $V_1$ applied to the sense circuit 106*b* may be denoted as $V_{1b}$, etc. Likewise, the currents $I_2$ in the sense circuits 106*a* and 106*b* may be denoted by $I_{2a}$ and $I_{2b}$, respectively.

The circuit 1000 may be configured and operated in a mode to selectively (e.g., sequentially) measure the intra-sense circuit transimpedance $Z_{21}$ e.g., between the measurement ports 936 and 937 of each of the plurality of the sense circuits 106 defined as:

$$Z_{2a1a} \approx V_{1a}/I_{2a} \tag{357}$$

As mentioned above and further discussed below, the two-port transimpedance $Z_{21}$ substantially equals the one-port impedance $Z_{11}$ as it may be measured at the first measurement port (e.g., measurement port 936) with the second measurement port (e.g., measurement port 937) short-circuited.

However, as opposed to the circuit 900 of FIG. 9A, the circuit 1000 as illustrated in FIG. 10 may not support measuring the inter-sense circuit transimpedance $Z_{12}$ as described with reference to FIG. 9A. Measuring the inter-sense circuit transimpedance $Z_{12}$ may require a different input multiplexer circuit 910 as discussed in greater detail below.

The inductive sense circuit 106*a* includes an inductive sense element 107*a* including a sense coil (e.g., sense coil 502 of FIG. 5A) with an inductance L, a first capacitor (e.g., capacitor 544 of FIG. 5C) with capacitance $C_p$, a second capacitor (e.g., capacitor 546 of FIG. 5C) with a capacitance $C_s$. As opposed to the sense circuits 106 of the circuit 900 of FIG. 9A, the sense circuits 106 of the circuit 1000 may not require an inductor (e.g., inductor 506) other than the inductive sense element (e.g., inductive sense element 107*a*) since the capacitor 546 may suffice to provide the required high pass filter characteristic. The first capacitor (parallel capacitor 544) is electrically connected in parallel to the inductive sense element 107*a*. The parallel circuit of capacitor 544 and inductive sense element 107*a* is capacitively coupled to the measurement port 936 via capacitor 546 and also electrically connected to the measurement port 936. None of the components of the sense circuit 106*a* is ground-connected, meaning that there is ideally no current flow towards ground when the voltage $V_1$ is applied at the measurement port 936. Therefore, the sense circuit 106*a* may be considered as a one-port rather than a two-port circuit. In practice however, some residual ground current flow may exist due to parasitic capacitances of the inductive sense element 107*a* e.g., as illustrated in FIG. 5A.

In an example implementation of the circuit 1000 of FIG. 10, each of the plurality of inductive sense circuits 106 is configured to provide a minimum of the impedance magnitude $Z_{11}$ (series resonance) substantially at the sense frequency as previously discussed with reference to the circuit 540 of FIG. 5C.

In another aspect, the capacitors 544 and 546 may be configured to provide an impedance magnitude $|Z_{11}|$ at the sense frequency in a suitable range for the measurement circuit (e.g., measurement circuit 104 of FIG. 4) by adjusting the capacitance ratio $n_C = C_p/C_s$ accordingly as previously discussed with reference to FIG. 5G. By increasing the ratio $n_C$, the impedance $|Z_{11}|$ may be increased to a level substantially higher than that of the inductive sense circuit 106*a* of the circuit 900 of FIG. 9A. A higher impedance $|Z_{11}|$ may be a requirement of the voltage source current measurement technique e.g., for selectively applying the voltage $V_1$ to each of the plurality of sense circuits 106 by the driver circuit 402 without exceeding an output current limit. It may also be a requirement for selectively measuring a current in each of the plurality of sense circuits 106 by the measurement amplifier circuit 404 without exceeding an input current limit. Further, it may be a requirement to reduce an impact of the input multiplexer circuit 910 and the output multiplexer circuit 940 as further discussed below.

In some implementations, the capacitors 544 and 546 are of a type with a low temperature coefficient providing high thermal stability (e.g., a NP0-type capacitor) reducing thermal drift of an electrical characteristic (e.g., an impedance) as measured at each of the plurality of inductive sense circuits 106*a*, 106*b*, . . . , 106*n*.

Moreover, as previously discussed in connection with FIGS. 5C, the inductive sense circuit 106*a* in conjunction with the voltage source current measurement technique creates a high pass filter characteristic to attenuate a low frequency disturbance component in the current $I_2$ for purposes as previously discussed with reference to FIG. 9A. The series capacitor 546 together with the parallel capacitor 544 may be configured to attenuate this low frequency disturbance component to a level e.g., below the level of the current $I_2$ in response to the respective sense voltage $V_1$ at the sense frequency, while maintaining series resonance at the sense frequency as previously discussed with reference to FIG. 5G. At the sense frequency, this high pass filter characteristic may exert a minor impact on the current $I_2$ and thus on the measurement of the impedance $Z_{11}$ and which may be corrected in a further processing (e.g., in the signal processing circuit 408 of FIG. 4) as previously discussed with reference to the circuit 900 of FIG. 9A.

In another aspect, the inductive sense circuits 106 may not need any supplementary capacitors (e.g., capacitors 928 and 929) for purposes of DC blocking as previously discussed with reference to the circuit 900 of FIG. 9A, as the series capacitor 546 already blocks any DC. Therefore, the passive component count of the plurality of inductive sense circuit 106*a* of FIG. 10 may be lower as compared to the circuit 900 of FIG. 9A.

The capacitive sense circuit 108*n* includes a capacitive sense element 109*n* including a sense electrode (e.g., sense electrode 702 of FIG. 7C illustrating a single-ended sense electrode) with a capacitance C, a series inductor 724 (e.g., series inductor 724 of FIG. 7C) with an inductance $L_s$, a transformer 726 (e.g., transformer 726 of FIG. 7C) providing a primary and secondary port, a secondary-referred main inductance $L_m$ and a voltage transformation ratio $1:n_{VT}$. Further, it includes a capacitor 930 with a capacitance $C_b$ e.g., for purposes as previously discussed with reference to the sense circuits 106 and 108 of FIG. 9A. The inductor 724 is electrically connected in series to the capacitive sense element 109*n*. The series circuit of inductor 724 and capacitive sense element 109*n* is electrically connected to the transformer's 726 secondary port that also connects to ground. Further, the transformer's 726 primary port is capacitively coupled to the measurement port 938 via capacitor 930 and also electrically connects to the measurement port 939. Though the transformer's 726 secondary port electrically connects to ground, the sense circuit 108*n* ideally may not be ground-related. In an implementation using a transformer 726 composed of a primary winding and a galvanically isolated secondary winding as previously described with reference to FIG. 9A, there is ideally no current flow towards ground when the voltage $V_1$ is applied at the measurement port 938. Therefore, the capacitive sense circuits 108*n* may be considered a one-port rather than a two-port circuit. In practice however, some residual ground current flow may exist due to a parasitic interwinding capacitance of the transformer 726.

In an implementation variant using a capacitive sense element 109*n* including a double-ended sense electrode (not shown herein), the sense circuits 108 may not need a transformer (e.g., transformer 726) for purposes of ground-decoupling. In another implementation variant using a double-ended sense electrode, each of the plurality of capacitive sense circuits 108 is based on the sense circuit 781 as illustrated in FIG. 7I.

In an example implementation of the circuit 1000 of FIG. 10, each of the plurality of capacitive sense circuits 108 is configured to provide a minimum of the impedance magnitude $|Z_{11}|$ (series resonance) substantially at the sense frequency as previously discussed with reference to the circuit 720 of FIG. 7C.

In another aspect, the transformer 726 may be configured to provide an impedance $|Z_{11}|$ at the sense frequency in a suitable range for the measurement circuit (e.g., measurement circuit 104 of FIG. 4) by adjusting the voltage transformation ratio $1:n_{VT}$ accordingly, where n refers to the transformer's 726 secondary-side. By decreasing n, the impedance $|Z_{11}|$ may be increased to a level higher than that of the sense circuit 108*n* of the circuit 900 of FIG. 9A. A higher impedance $|Z_{11}|$ may be a requirement of the voltage source current measurement technique as previously discussed.

The secondary-referred main inductance $L_m$ of the transformer 726 together with the capacitance C of the capacitive sense element 109*n* form a $2^{nd}$ order high pass filter to attenuate a low frequency disturbance component in the current $I_2$ as previously discussed with reference to FIG. 7C. The transformer 726 may be configured to attenuate this low frequency disturbance component to a level e.g., significantly below the level of the current $I_2$ in response to the respective voltage $V_1$ at the sense frequency. At the sense frequency, this high pass filter may exert a minor impact on the current $I_2$ and thus on the measurement of the impedance $Z_{11}$ and which may be corrected in a further processing (e.g., in the signal processing circuit 408 of FIG. 4) as previously discussed with reference to FIG. 7A.

The driver circuit 402 includes a driver amplifier circuit 902, an input multiplexer circuit 910 illustrated in FIG. 10 as a plurality of switches 911*a*, 911*b*, . . . , 911*n*, and a plurality of resistors 1014 and 1015 (parallel resistors) connected in parallel to the respective output of the input multiplexer circuit 910 for purposes as described below. The parallel resistors 1014 connected to the inductive sense circuits 106 have a resistance $R_{par1}$, while the parallel resistors 1015 connected to the capacitive sense circuits 108 have a resistance $R_{par3}$ that may generally differ from $R_{par1}$.

Further, the driver circuit 402 is configured to operate as a voltage source (e.g., voltage source 552 as described in connection with FIG. 5C) and to selectively (e.g., sequentially) apply a voltage signal $V_1$ at the sense frequency to each of the plurality of inductive sense circuits 106 and to each of the plurality of the capacitive sense circuits 108. The voltage signal $V_1$ (e.g., a sinusoidal sense signal) is based on a driver input signal which may be an output of the signal generator circuit 406 with reference to FIG. 4. The driver amplifier circuit 902 as illustrated in FIG. 10 by example includes an amplifier 904 and external resistance circuitry comprising a first (feedback) resistor 906 and a second resistor 908 for adjusting a gain. In some implementations, the amplifier 904 is at least one of a low noise operational amplifier and an operational amplifier providing high linearity. The driver amplifier circuit 902 is configured to receive the driver input signal and to provide a corresponding output with an accurate and stable voltage (a voltage source output).

The input multiplexer circuit 910 includes a plurality of switches 911*a*, 911*b*, . . . , 911*n* and is configured to selectively connect each of the plurality of inductive sense circuits 106 and each of the plurality of capacitive sense circuits 108 to the driver circuit 402 to selectively (e.g., sequentially) apply the voltage $V_1$ at the sense frequency to each of the plurality of inductive sense circuits 106 and to each of the plurality of capacitive sense circuits 108. Therefore, each of the plurality of switches 911*a*, 911*b*, . . . , 911*n* is electrically connected to the driver amplifier circuit's 902 output that is also referred to as the common input node. The input multiplexer circuit 910 is further configured to receive an input MUX control signal from a control circuit (e.g., from the control and evaluation circuit 102 of FIG. 4) that controls the input multiplexer circuit 910.

Each of the plurality of switches 911*a*, 911*b*, . . . , 911*n* may be one of a type as previously mentioned with reference to the circuit 900 of FIG. 9A. It may be appreciated that the closed-state resistance of the switch (e.g., switch 911*a*) may be less critical if the impedance magnitude $|Z_{11}|$ at series resonance e.g., of the sense circuit 106*a* is substantially higher (e.g., if the capacitance ratio $n_C$ is sufficiently large as previously discussed). A high enough impedance magnitude $|Z_{11}|$ may also reduce an impact of the switch' (e.g., switch 911*a*) temperature dependent closed-state resistance and thus improve a temperature stability of the driver circuit 402 as previously discussed with reference to the circuit 900 of FIG. 9A. It may also be appreciated that the total capacitive load produced by the plurality of parallel capacitances at the common input node may be non-critical since it is in parallel to the voltage source output of the driver amplifier circuit 902.

The switch (e.g., switch 911*a*) of an example input multiplexer circuit 910 may use complementary FET switches with a closed-state resistance of 5Ω, an equivalent open-state series capacitance of 3 pF (corresponding to a series reactance of 17.7 kΩ at a sense frequency of 3 MHz), and an equivalent parallel capacitance of 12 pF on each side of the switch.

While in the circuit 900 series resistors 914 and 915 are used to transform the amplifier's 904 voltage source output into a current source output, parallel resistors 1014 and 1015) are employed in the circuit 1000 to limit the open-switch voltage (e.g., at WPT frequency) across the input multiplexer circuit 910 switch (e.g., switch 911*a*). It may be appreciated that decreasing the resistance (e.g., $R_{par1}$) of the parallel resistor (e.g., parallel resistor 1014) may reduce the open-switch voltage. However, it will also increase an output current of the driver amplifier circuit 902 as more current will be diverted to ground. This may increase a voltage drop across the switch (e.g., switch 911*a*) and hence increasing an impact of the switch' as previously discussed with reference to FIG. 9A. Therefore, in some implementations, the resistances $R_{par1}$ and $R_{par3}$ are a trade-off between a driver amplifier circuit 902 output load, temperature stability, and the open-switch voltage. In an example implementation, the parallel resistor (e.g., parallel 1014) provides a resistance (e.g., $R_{par1}$) in the order of the impedance $|Z_{11}|$.

Therefore, in an implementation variant (not shown herein), the input multiplexer circuit 910 is incorporated into the driver amplifier circuit 902 also employing an additional (third) multiplexer circuit in a feedback path. This implementation variant may provide a regulated (stable) voltage source characteristic at each of the plurality of outputs of the driver circuit 402 substantially eliminating the effect of the switch' temperature dependent closed-state resistance. An example circuit of the driver circuit 402, which is voltage regulated, is disclosed in U.S. patent application Ser. No. 16/226,156, titled Foreign Object Detection Circuit Using Current Measurement.

The measurement amplifier circuit 404 is configured to operate as the analog front-end part of a current measurement circuit (e.g., current measurement circuit 550 as described in connection with FIG. 5C). It is configured to selectively (e.g., sequentially) buffer and convert the current $I_2$ in each of the plurality of inductive sense circuits 106 and in each of the plurality of capacitive sense circuits 108 and to provide an output voltage signal $V_{out}$ (as indicated in FIG. 9A) based on the respective current $I_2$ at a level suitable for further processing e.g., in the signal processing circuit 408 with reference to FIG. 4. The measurement amplifier circuit 404 includes a transimpedance amplifier circuit 952, an output multiplexer circuit 940 illustrated in FIG. 10 as a plurality of switches 941*a*, 941*b*, . . . , 941*n*, and a plurality of resistors 1044 and 1055 (parallel resistors) connected in parallel to the respective input of the output multiplexer circuit 940. The parallel resistors 1044 connected to the inductive sense circuits 106 have a resistance $R_{par2}$ that generally differs from the parallel resistance $R_{par1}$, while the parallel resistors 1045 connected to the capacitive sense circuits 108 have a resistance $R_{par4}$ that generally differs from $R_{par3}$ and $R_{par2}$. The plurality of switches 941*a*, 941*b*, . . . , 941*n* are electrically connected to the transimpedance amplifier circuit's 952 input that is also referred to herein as the common output node.

As with the parallel resistor 1014, decreasing the resistance (e.g., $R_{par2}$) of the parallel resistor 1044 will reduce the open-switch voltage (e.g., at WPT frequency) across the output multiplexer circuit 940 switch (e.g., switch 941*a*). As opposed to the parallel resistor 1014, decreasing the resistance of the parallel resistor 1044 may be less critical since the voltage across the parallel resistor 1044 is low when the switch (e.g., switch 941*a*) is in closed-state. In an example implementation, the resistances $R_{par2}$ and $R_{par4}$ substantially match the respective impedance $|Z_{11}|$ at series resonance and are substantially higher than the switch' closed-state resistance.

The example transimpedance amplifier circuit 952 as illustrated in FIG. 10 includes an amplifier 954, a feedback resistor 956 having a resistance $R_f$, and a feedback capacitor 958 having a capacitance $C_f$. In some implementations, the amplifier 954 is at least one of a low noise operational amplifier and an amplifier providing high linearity. The positive input (+) of the amplifier 954 connects to ground. Both the feedback resistor 956 and the feedback capacitor 958 are electrically connected between the output ($V_{out}$) and the negative input (−) of the amplifier 954. Further, the transimpedance amplifier circuit 952 is configured to receive an input current $I_{in}$, which is the output current at the common output node of the output multiplexer circuit 940 and to convert the input current $I_{in}$ into a proportional output voltage $V_{out}$. The conversion gain (transimpedance) is determined by the impedance of the parallel connection of the feedback resistor 956 and the feedback capacitor 958. Since the voltage at the negative input (−) of the amplifier 954 is virtually zero (virtual ground), the transimpedance amplifier circuit 952 presents a virtually zero input impedance at its negative input (−). The feedback capacitor 958 provides the transimpedance amplifier circuit 952 with a first order low pass filter characteristic to attenuate disturbance signal components at frequencies higher than the sense frequency (e.g., high order WPT harmonics) as previously discussed with reference to FIG. 9A.

In other implementation variants (not shown herein), the filtering of the transimpedance amplifier circuit 952 is further enhanced in similar ways as previously described with reference to FIG. 9A.

In a further implementation variant (not shown herein), the transimpedance amplifier circuit 952 additionally includes an input transformer e.g., for purposes of transforming an input current $I_{in}$. The transformer may be used e.g., to reduce the current $I_{in}$ to a level not exceeding an input current constraint of the amplifier 954 and hence allowing the drive current $I_1$ and eventually the sense currents $I_L$ and $I_C$ in the respective sense elements 107*a*, 107*b*, . . . , 107*n* and 109*a*, 109*b*, . . . , 109*n* to be increased. An example transimpedance amplifier circuit 952 using an input transformer is disclosed in U.S. patent application Ser. No. 16/226,156, titled Foreign Object Detection Circuit Using Current Measurement.

The output multiplexer circuit 940 including the plurality of switches 941*a*, 941*b*, . . . , 941*n* is configured to selectively connect each of the plurality of inductive sense circuits 106 and each of the plurality of capacitive sense circuits 108 to the transimpedance amplifier circuit 952 to selectively (e.g., sequentially) buffer and convert the current $I_2$ at each of the plurality of sense circuits 106 and 108 in response to the voltage $V_1$ at the sense frequency. Therefore, each of the plurality of switches 941*a*, 941*b*, . . . , 941*n* is electrically connected to the common output node that is electrically connected to the negative input of the transimpedance amplifier circuit 952. The output multiplexer circuit 940 is further configured to receive an output MUX control signal from a control circuit (e.g., from the control and evaluation circuit 102 of FIG. 4) that controls the output multiplexer circuit 940.

As with the input multiplexer circuit 910, each of the plurality of switches 941*a*, 941*b*, . . . , 1041*n* may be one of a type of switch as previously specified with reference to the output multiplexer circuit 940 of the circuit 900 of FIG. 9A. It may be appreciated that the closed-state series resistance (e.g., of switch 941*a*) may be non-critical for the functioning of the measurement amplifier circuit 404 if the impedance $|Z_{11}|$ of both the sense circuits 106 and 108 is substantially higher than the closed-state series resistance of the switch (e.g., switch 911*a*). It may also be appreciated that the total capacitive load produced by the plurality of parallel capacitances at the common output node of the output multiplexer circuit 940 may be non-critical since it is in parallel to the virtually zero-impedance input of the transimpedance amplifier circuit 952.

An example output multiplexer circuit 940 for a sense frequency of 3 MHz may use complementary FET switches with the same characteristics as those used for the example input multiplexer circuit 910 as specified above.

As mentioned above, the circuit 1000 as illustrated in FIG. 10 may not support measuring the inter-sense circuit transimpedance $Z_{12}$ as described with reference to FIG. 9A. However, in an implementation variant (not shown herein), the circuit 1000 is equipped with an input multiplexer circuit 910 including a plurality of tri-state switches. An example tri-state switch (not shown herein) may be controlled to one of a first state that is an open state, a second state that is a closed state to connect a sense circuit (e.g., sense circuit 106*a*) e.g., to the output of the driver amplifier circuit 902, and a third state that is also a closed-state to shorten the sense circuit at the measurement port (e.g., measurement port 936) to ground. For example, the transimpedance $Z_{12}$ between the measurement port 936 of sense circuits 106*a* and measurement port 937 of sense circuit 106*b* may be measured by setting the tri-state switches 911*a* and 911*b* to the second state, the tri-state switch 911*b* to third state, and all other tri-state switches of the plurality of tri-state switches 911*a*, 911*b*, . . . , 911*n* and 941*a*, 941*b*, . . . , 941*n* to the first state. From a circuit complexity perspective, a tri-state switch may be equivalent to adding a third multiplexer circuit.

A further implementation variant of the circuit 1000 (not shown herein) omits the output multiplexer circuit 940 e.g., for reasons of complexity and cost reduction. In theory, the input multiplexer circuit 910 may be enough to selectively (e.g., sequentially) apply the voltage $V_1$ to a sense circuit (e.g., sense circuit 106*a*) and to selectively measure the current $I_2$ at its measurement port 937 in response to the voltage $V_1$. Because the measurement amplifier circuit 404 is configured as a current summation amplifier, its output voltage $V_{out}$ is indicative of the sum of the currents at each of the plurality of measurement ports 937. As the currents $I_2$ at the inactive sense circuits (e.g., sense circuit 106*b*) (where no voltage $V_1$ is applied) is ideally zero, the output voltage $V_{out}$ is indicative of the current $I_2$ of the active sense circuit (e.g., sense circuit 106*a*) where the voltage $V_1$ is applied. However, in practice, disturbance currents e.g., capacitively coupling into the sense element (e.g., inductive sense element 107*b*) when WPT is active may also sum up resulting in a lower SNR as compared to a circuit 1000 using the output multiplexer circuit 940.

A specification and some resulting performance figures of an example circuit 1000 with respect to the inductive sense circuits 106 configured for a nominal sense frequency $f_s$=3 MHz are given in TABLE 9. A WPT operating frequency $f_{WPT}$=85 kHz is assumed. TABLE 9 also includes the system Q-factor $Q_{sys}$ as defined above by Equation (354), the quality of the measurement circuit 104 defined as the ration:

$$Q_{mc} \approx |\Delta V_{out}'|/|\Delta V_1'| \tag{358}$$

where $|\Delta V_{out}'|$ denotes the magnitude fractional change of the measurement amplifier circuit's 404 output voltage $V_{out}$ caused by an object (e.g., object 110) and $\Delta V_1'$ the fractional change of the driver circuit's 402 output voltage $V_1$ caused by that object. Further, it includes the degradation of the fractional change in the measurement amplifier circuit's 404 output voltage $V_{out}$ as defined by Equation (356).

TABLE 9

| Item | Symbol | Value | Remarks |
|---|---|---|---|
| Input multiplexer circuit 910 switch closed-state resistance | | 5 Ω | |
| Parallel resistor 1014 resistance | $R_{par1}$ | 620 Ω | |
| Inductive sense element 107a inductance | L | 5 μH | |
| Inductive sense element 107a equivalent series resistance | R | 3.8 Ω | Q-factor Q = 25 |
| Parallel capacitor 544 capacitance | $C_p$ | 469 pF | |
| Series capacitor 546 capacitance | $C_s$ | 94 pF | |
| Capacitance ratio $C_p/C_s$ | $n_C$ | 5 | |
| Parallel resistor 1044 resistance | $R_{par2}$ | 220 Ω | |
| Output multiplexer circuit 940 switch closed-state resistance | | 5 Ω | |
| Feedback resistor 956 resistance | $R_f$ | 100 Ω | |
| Feedback capacitor 958 capacitance | $C_f$ | 560 pF | |
| Sense circuit 106a parallel resonance | | 3.29 MHz | |
| Precise sense frequency | | 2.9886 MHz | |
| Transimpedance (minimum magnitude) | $Z_{210}$ | 130.8 Ω | Meas, port 936 to 937 |
| System Q-factor | $Q_{sys}$ | 21.6 | |
| Quality of measurement circuit 104 | $Q_{mc}$ | 27.3 | |
| Residual angle error | ε | −1.7° | |
| Degradation of fractional change at meas. circuit 104 output ($V_{out}$) | | 6.7% | |

TABLE 9-continued

| Item | Symbol | Value | Remarks |
|---|---|---|---|
| Driver amplifier circuit 902 output voltage | | 2 $V_{pp}$ | 0.7 $V_{rms}$ |
| Driver amplifier circuit 902 output current | | 6 $mA_{rms}$ | |
| Driver amplifier circuit 902 output power | | 4.2 mW | |
| Driver circuit 402 output current | | 5 $mA_{rms}$ | |
| Inductive sense element 107a current (sense current) | $I_L$ | 28.2 $mA_{rms}$ | |
| Transimpedance amplifier circuit 952 input current | $I_{in}$ | 4.9 $mA_{rms}$ | 3 MHz sense signal |
| Measurement amplifier circuit 404 output voltage | $V_{out}$ | 0.95 $V_{pp}$ | 3 MHz sense signal, 0.33 $V_{rms}$ |
| WPT fundamental disturbance voltage induced into inductive sense element 107a | $V_{sW}$ | 30 $V_{rms}$ | 85 kHz component |
| WPT fundamental disturbance voltage at measurement amplifier circuit 404 output | | 0.42 $V_{pp}$ | 85 kHz component |
| SNR with respect to WPT fundamental disturbance voltage at $f_{WPT}$ | $SNR_W$ | 7.1 dB | 85 kHz component |
| WPT fundamental disturbance voltage across input multiplexer circuit 910 switch when open | | 4.6 $V_{pp}$ | 85 kHz component |
| WPT fundamental disturbance voltage across output multiplexer circuit 940 switch when open | | 0.9 $V_{pp}$ | 85 kHz component |

A specification and some resulting performance figures of an example circuit 1000 with respect to the capacitive sense circuits 108 configured for a nominal sense frequency $f_s$=3 MHz are given in TABLE 10. A WPT operating frequency $f_{WPT}$=85 kHz is assumed. TABLE 10 also includes the system Q-factor $Q_{sys}$ as defined above by Equation (354), the quality of the measurement circuit 104 as defined by Equation (358), and the degradation of the fractional change in the measurement amplifier circuit's 404 output voltage $V_{out}$ as defined by Equation (356).

TABLE 10

| Item | Symbol | Value | Remarks |
|---|---|---|---|
| Input multiplexer circuit 910 switch closed-state resistance | | 5 Ω | |
| Parallel resistor 1014 resistance | $R_{par3}$ | 1 kΩ | |
| DC block capacitor 930 capacitance | $C_b$ | 2 nF | |
| Capacitive sense element 109n capacitance | C | 30 pF | |
| Series inductor 724 inductance | $L_s$ | 94 uH | includes transformer 726 leakage inductance |
| Series inductor 724 equivalent series resistance | $R_{Ls}$ | 118 Ω | Includes transformer 726 losses, Q-factor $Q_{Ls} \approx 15$ |
| Transformer 726 secondary-referred main inductance | $L_m$ | 150 uH | |
| Transformer 726 voltage transformation ratio | $1{:}n_{VT}$ | 1:1 | |
| Parallel resistor 1044 resistance | $R_{par4}$ | 200 Ω | |
| Output multiplexer circuit 940 switch closed-state resistance | | 5 Ω | |
| Feedback resistor 956 resistance | $R_f$ | 100 Ω | |
| Feedback capacitor 958 capacitance | $C_f$ | 560 pF | |
| Sense circuit 106a parallel resonance | | 3 MHz | |
| Precise sense frequency | | 3.0255 MHz | |
| Transimpedance (minimum magnitude) | $Z_{210}$ | 116 Ω | |
| System Q-factor | $Q_{sys}$ | 14.2 | |
| Quality of measurement circuit 104 | $Q_{mc}$ | 25.2 | |
| Residual angle error | ε | 0.8° | |
| Degradation of fractional change at meas. circuit 104 output ($V_{out}$) | | 4.1% | |
| Driver amplifier circuit 902 output voltage | | 1.98 $V_{pp}$ | 0.7 $V_{rms}$ |
| Driver amplifier circuit 902 output current | | 6.2 $mA_{rms}$ | |
| Driver amplifier circuit 902 output power | | 4.4 mW | |
| Capacitive sense element 109a current (sense current) | $I_C$ | 5.5 $mA_{rms}$ | |
| Transimpedance amplifier circuit 952 input current | $I_{in}$ | 5.4 $mA_{rms}$ | 3 MHz sense signal |
| Measurement amplifier circuit 404 output voltage | $V_{out}$ | 1.05 $V_{pp}$ | 3 MHz sense signal, 0.37 $V_{rms}$ |
| WPT fundamental disturbance voltage induced into capacitive sense element 109a | $V_{sW}$ | 150 $V_{rms}$ | 85 kHz component |
| WPT fundamental disturbance voltage at measurement amplifier circuit 404 output | | 62 $mV_{pp}$ | 85 kHz component |
| SNR with respect to WPT fundamental disturbance voltage | $SNR_W$ | 24.6 dB | 85 kHz component |
| WPT fundamental disturbance voltage | | 2.3 $V_{pp}$ | 85 kHz component |

TABLE 10-continued

| Item | Symbol | Value | Remarks |
|---|---|---|---|
| across input multiplexer circuit 910 switch when open | | | |
| WPT fundamental disturbance voltage across output multiplexer circuit 940 switch when open | | 0.07 $V_{pp}$ | 85 kHz component |

Comparing Tables 9 and 10 with Tables 11 and 12, respectively, shows the circuit 1000 more potential if a higher sense current level $I_L$ and $I_C$ and higher power efficiency was targeted. While an amplifier 904 output voltage constraint may limit the sense currents $I_L$ and $I_C$ in the circuit 900, an amplifier 954 input current constraint may limit these currents in the circuit 1000.

A further aspect to be considered when comparing the circuits 900 and 1000 are cross-coupling effects between neighboring inductive sense elements (e.g., inductive sense elements 107*a* and 107*b* of the array 107). Cross-coupling may degrade the Q-factor of a sense circuit (e.g., sense circuit 106*a* or 108*n*) due to energy absorption and may also distort its impedance function $Z_{11}(\omega)$ eventually compromising performance and the impedance angle measurement accuracy of the multipurpose detection circuit 100. This may be particularly true in a circuit (e.g., circuit 1000) using a plurality of sense circuits 106 or 108 which, when inactive (e.g., deselected by the input and output multiplexer circuits 910 and 940, respectively), exhibit a parasitic parallel resonance as given by Equation (117) close to the sense frequency. For the example implementation of the circuit 900 specified in TABLE 7, the parasitic parallel resonance may be at 1.3 MHz, while for the example implementation of the circuit 1000 specified in TABLE 9, it may occur close to the sense frequency at 3.29 MHz. Therefore, the impact of cross-coupling in the circuit 1000 may be more significant than in the circuit 900.

In an example implementation of the circuit 1000 using an array of sense coils (e.g., array 107), a cross-coupling effect between inductive sense circuits (e.g., sense circuit 106*a* and 106*b*) is reduced by configuring the inductive sense circuits with a lower capacitance ratio $n_C=C_p/C_s$ resulting in a lower impedance $|Z_{11}|$ e.g., by trading-off the impact of cross-coupling and thermal drift of the input and output multiplexer circuits 910 and 940, respectively, as previously discussed with reference to FIG. 10.

In another example implementation of the circuit 1000 using an array of sense coils (e.g., array 107), a cross-coupling effect between inductive sense circuits (e.g., sense circuit 106*a* and 106*b*) is reduced by configuring (tuning) the inductive sense circuits associated with neighboring sense elements (e.g., sense element 107*a* and 107*b*) to a different resonant frequency e.g., following a frequency reuse scheme. However, this approach may cause a conflict in a multipurpose detection circuit 100 used to detect a passive beacon transponder (e.g., passive beacon transponder 313 of FIG. 3) e.g., for purposes of detecting presence of a vehicle (e.g., vehicle 330), a type of vehicle, or for determining a position of a vehicle. In some implementations, detection of a passive beacon transponder requires each of the plurality of inductive sense circuits 106 to be configured (tuned) to a substantially equal resonant frequency.

In a further example implementation using a planar array of sense coils (e.g., array 107), a gap is introduced between adjacent sense coils (e.g., between elements coil 107*a* and 107*b*) to reduce a cross-coupling effect.

In a further aspect of an inductive sense coil array (e.g., array 107), loss effects in the lead lines are considered. In certain implementations, the sense coil (e.g., sense element 107*a*) may be connected to the capacitor 544 of the associated sense circuit (e.g., sense circuit 106*a*) via a long lead line. This may apply to an implementation of the circuit 1000 where the array of sense coils (e.g., array 107) is carried on a separate printed circuit board (PCB) excluding any other components of the circuit 1000. A long lead line may cause substantial electrical losses degrading the Q-factor of a sense circuit (e.g., sense circuit 106*a*) and hence the performance of the multipurpose detection circuit 100.

In an example implementation of the circuit 1000 of FIG. 10 using a sense coil array (e.g., array 107) e.g., implemented on a separate PCB, lead line losses are reduced by placing at least the parallel capacitor 544 at a position close to the terminals of the sense coil (e.g., sense element 107*a*). In such an implementation, the lead line of the sense circuit 106*a* may be between the series capacitor 546 and the parallel circuit of capacitor 544 and the sense element 107*a*. Since the capacitors 544 and 546 transform the impedance, the driver circuit 402 output current and thus the lead line current as required in the circuit 1000 to generate a specified sense coil current $I_L$ may be substantially lower than the corresponding currents in the circuit 900. This is shown by numerical values for the driver circuit 402 output current as given in TABLES 7 and 9, respectively. Increasing the capacitance ratio $n_C=C_p/C_s$, may reduce the lead line losses and hence increasing the Q-factor of a sense circuit (e.g., sense circuit 106*a*).

In an example implementation based on the circuit 900 of FIG. 9A using a sense coil array (e.g., array 107) carried on a separate PCB, lead line losses are reduced by placing the series capacitor 504 and an additional transformer (e.g., transformer 526 with reference to FIG. 5B) providing a transformation ratio $n_T$:1 at a position close to the sense coil (e.g., sense element 107*a*). Increasing $n_T$, may reduce the lead line losses and hence increasing the Q-factor of a sense circuit (e.g., sense circuit 106*a*).

Figure 11:
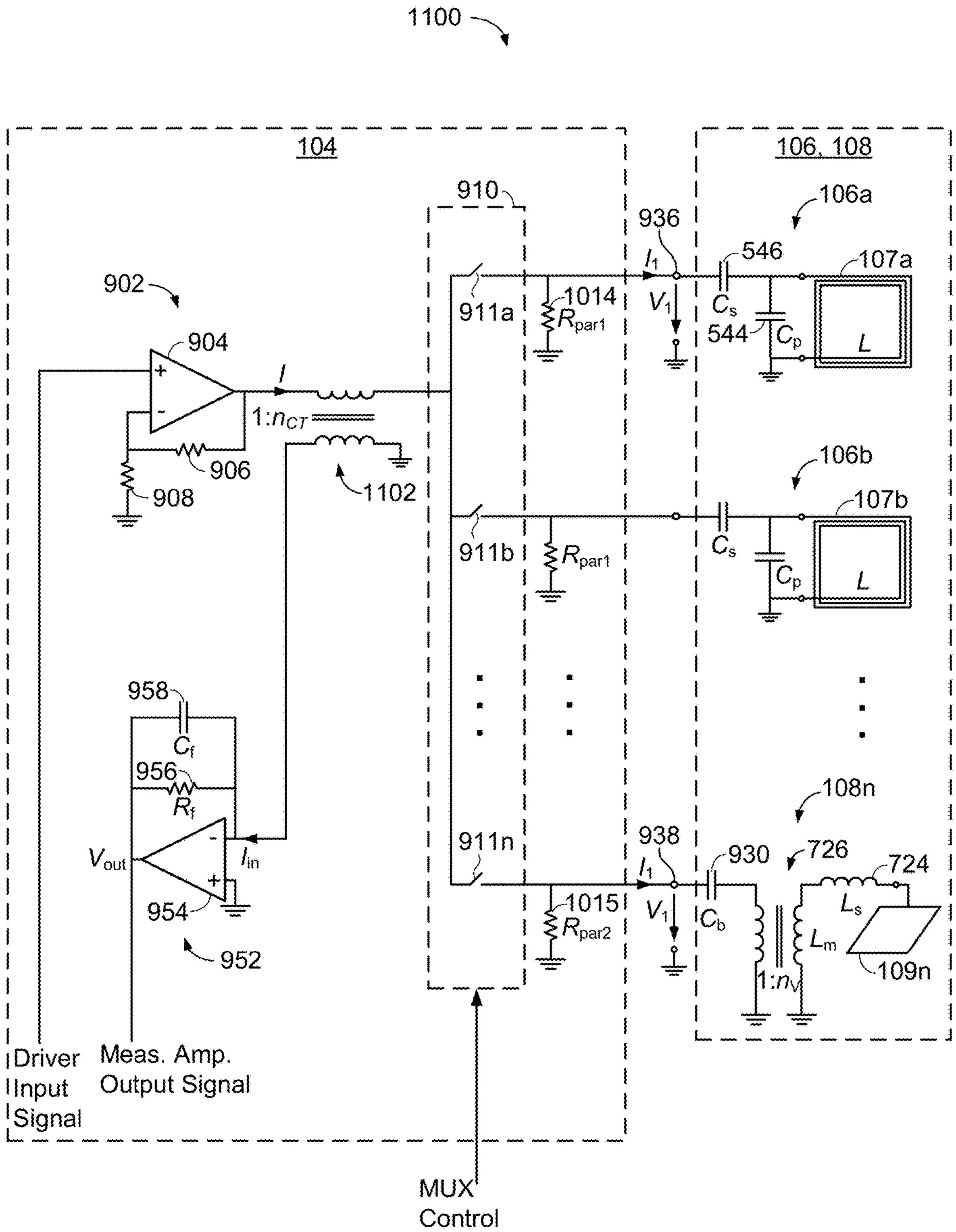
FIG. 11 is a schematic diagram of a circuit illustrating a further example implementation of a portion of the multi-purpose detection circuit of FIG. 1 including a plurality of inductive and capacitive sense circuits.

FIG. 11 is a circuit diagram of a circuit 1100 illustrating another example implementation of a portion of a multi-purpose detection circuit 100. The circuit 1100 of FIG. 11 illustrates an analog front-end circuit portion of the multi-purpose detection circuit 100 with reference to FIGS. 1 and 4. FIG. 11 excludes various other signal generation, processing, control and evaluation circuits (e.g., as shown in FIG. 4) that may be needed in some implementations of a multi-purpose detection circuit 100. The circuit 1100 implements inductive and capacitive sensing by measuring an impedance based on the current source voltage measurement approach as previously described in connection with FIG. 5C.

The circuit 1100 may be subdivided into an analog front-end part of the measurement circuit 104 and a plurality of inductive and capacitive sense circuits 106 and 108 as previously described with reference to the generic block diagram of FIG. 4. The analog-front end part of the measurement circuit 104 merges the driver circuit 402 and the measurement amplifier circuit 404 with reference to FIGS. 1 and 4 and uses a single input multiplexer circuit 910 in common to selectively (e.g., sequentially) apply a voltage $V_1$ to each of the plurality of sense circuits 106 and 108 and to measure a current h in response to the applied voltage $V_1$ as indicated in FIG. 11. The plurality of inductive sense circuits 106 includes sense circuits 106*a*, 106*b*, . . . , 106*n* (106*n* not shown in FIG. 11 for purposes of illustration). The plurality of capacitive sense circuits 108 includes sense circuits 108*a*, 108*b*, . . . , 108*n*, (108*a* and 108*b* not shown in FIG. 11 for purposes of illustration). The dots indicated in FIG. 11 shall indicate that the number of inductive sense circuits 106 and/or the number of capacitive sense circuits 108 may be greater than three as previously noted with reference to FIG. 1.

In the example implementation shown in FIG. 11, each of the plurality of inductive sense circuits 106 have an identical circuit topology. Likewise, each of the plurality of capacitive sense circuits 108 have an identical circuit topology. Therefore, descriptions given below for the inductive sense circuit 106*a* also apply to the other inductive sense circuits (e.g., 106*b*) and descriptions given below for the capacitive sense circuit 108*n* also apply to the other capacitive sense circuits (e.g., 108*a*).

Each of the plurality of inductive sense circuits 106 provides a measurement port 936 (indicated in FIG. 11 by a terminal) for applying an electrical voltage $V_1$ (as indicated in FIG. 11) and for measuring an electrical current $I_1$ (as indicated in FIG. 11) in response to the voltage $V_1$. Likewise, each of the plurality of capacitive sense circuits 108 provides a measurement port 938 (indicated in FIG. 11 by a terminal) for applying the voltage $V_1$ (as indicated in FIG. 11) and for measuring the current $I_1$ (as indicated in FIG. 11) in response to the current $V_1$. The sense circuits 106 and 108 as illustrated in FIG. 11 may be considered as one-port circuits.

As opposed to the circuits 900 and 1000, the measurement circuit 104 of the circuit 1100 includes a single input multiplexer circuit 910 to selectively (e.g., sequentially) apply the voltage $V_1$ to each of the plurality of sense circuits 106 and 108 and to selectively (e.g., sequentially) measure a current $I_1$ in response to the applied voltage $V_1$. More specifically, but not indicated in FIG. 10 for purposes of illustration, the voltage $V_1$ applied to the sense circuit 106*a* may be denoted by $V_{1a}$, the voltage $V_1$ applied to the sense circuit 106*b* may be denoted as $V_{1b}$, etc. Likewise, the currents ii in the sense circuits 106*a* and 106*b* may be denoted by $I_{1a}$ and $I_{1b}$, respectively.

The circuit 1100 may be configured and operated in a mode to selectively (e.g., sequentially) measure the impedance $Z_{11}$ e.g., at the measurement port 936 of each of the plurality of the sense circuits 106 defined as:

$$Z_{11} \approx V_{1a}/I_{1a} \tag{359}$$

However, as opposed to the circuit 900 of FIG. 9A, the circuit 1100 as illustrated in FIG. 11 may be less versatile. It may not support measuring the inter-sense circuit transimpedance $Z_{12}$ as described with reference to FIG. 9A.

The inductive sense circuit 106*a* includes an inductive sense element 107*a* including a sense coil (e.g., sense coil 502 of FIG. 5A) with an inductance L, a first capacitor (e.g., capacitor 544 of FIG. 5C) having a capacitance $C_p$, and a second capacitor (e.g., capacitor 546 of FIG. 5C) with a capacitance $C_s$. The first capacitor (e.g., parallel capacitor 544) is electrically connected in parallel to the inductive sense element 107*a*. The parallel circuit of capacitor 544 and inductive sense element 107*a* electrically connects to ground and is also capacitively coupled to the measurement port 936 via the series capacitor 546. As opposed to the sense circuits 106 of the circuit 900 of FIG. 9A, the sense circuits 106 of the circuit 1100 may not require an inductor (e.g., inductor 506) other than the inductive sense element (e.g., inductive sense element 107*a*) since the capacitor 546 may suffice to provide the required high pass filter characteristic.

In an example implementation of the circuit 1100 of FIG. 11, each of the plurality of inductive sense circuits 106 is configured to provide a minimum of the impedance magnitude $|Z_{11}|$ (series resonance) substantially at the sense frequency as previously discussed with reference to the circuit 540 of FIG. 5C.

In another aspect, the capacitors 544 and 546 may be configured to provide an impedance magnitude $|Z_{11}|$ at the sense frequency in a suitable range for the measurement circuit (e.g., measurement circuit 104 of FIG. 4) by adjusting the capacitance ratio $n_C=C_p/C_s$ accordingly as previously discussed with reference to FIG. 5G. By increasing the ratio $n_C$, the impedance $|Z_{11}|$ may be increased to a level substantially (e.g., 10 times) higher than that of the inductive sense circuit 106*a* of the circuit 900 of FIG. 9A. As previously discussed with reference to FIG. 10, a higher impedance $|Z_{11}|$ may be a requirement of the voltage source current measurement technique.

In some implementations, the capacitors 544 and 546 are of a type with a low temperature coefficient providing high thermal stability (e.g., a NP0-type capacitor) reducing thermal drift of an electrical characteristic (e.g., an impedance) as measured at each of the plurality of inductive sense circuits 106*a*, 106*b*, . . . , 106*n*.

Moreover, as previously discussed in connection with FIGS. 5C, 9A, and 10, the inductive sense circuit 106*a* in conjunction with the voltage source current measurement technique provides a high pass filter characteristic to attenuate a low frequency disturbance component in the current $I_1$. The series capacitor 546 together with the parallel capacitor 544 may be configured to attenuate this low frequency disturbance component to a level e.g., below the level of the current $I_1$ in response to a respective sense voltage $V_1$ at the sense frequency, while maintaining series resonance at the sense frequency as previously discussed with reference to FIG. 5G. At the sense frequency, this high pass filter characteristic may exert a minor impact on the current $I_1$ and thus on the measurement of the impedance $Z_{11}$ and which may be corrected in a further processing (e.g., in the signal processing circuit 408 of FIG. 4) as previously discussed with reference to the circuit 900 of FIG. 9A.

In another aspect, the inductive sense circuits 106 may not need any supplementary capacitor (e.g., capacitor 928) for purposes of DC blocking as previously discussed with reference to the circuit 900 of FIG. 9A, as the series capacitor 546 already blocks any DC.

The capacitive sense circuit 108*n* includes a capacitive sense element 109*n* including a sense electrode (e.g., sense electrode 702 of FIG. 7C illustrating a single-ended sense electrode) with a capacitance C, a series inductor 724 (e.g., series inductor 724 of FIG. 7C) with an inductance $L_s$, a transformer 726 (e.g., transformer 726 of FIG. 7C) providing a primary and secondary port, a secondary-referred main inductance $L_m$ and a voltage transformation ratio $1:n_{VT}$. Further, it includes a capacitor 930 with a capacitance $C_b$ e.g., for purposes as previously discussed with reference to the sense circuits 106 and 108 of FIG. 9A. As opposed to the sense circuit 108*n* of FIG. 10, the sense circuit 108*n* of FIG. 11 provides only one measurement port 938 for measuring the impedance $Z_{11}$. The inductor 724 is electrically connected in series to the capacitive sense element 109*n*. The series circuit of inductor 724 and capacitive sense element 109*n* is electrically connected to the transformer's 726 secondary port that also electrically connects to ground. Further, the transformer's 726 primary port is capacitively coupled to the measurement port 938 via capacitor 930 and also connects to ground.

In an example implementation of the circuit 1100 of FIG. 11, each of the plurality of capacitive sense circuits 108 is configured to provide a minimum of the impedance magnitude $|Z_{11}|$ (series resonance) substantially at the sense frequency as previously discussed with reference to the circuit 720 of FIG. 7C.

In another aspect, the transformer 726 may be configured to provide an impedance magnitude $|Z_{11}|$ at the sense frequency in a suitable range for the measurement circuit (e.g., measurement circuit 104 of FIG. 4) by adjusting the transformation ratio $1{:}n_{VT}$ accordingly as previously described with reference to FIGS. 9A and 10.

The secondary-referred main inductance $L_m$ of the transformer 726 together with the capacitance C of the capacitive sense element 109*n* form a $2^{nd}$ order high pass filter to attenuate a low frequency disturbance component in the current $I_1$ as previously discussed with reference to FIG. 7C. The transformer 726 may be configured to attenuate this low frequency disturbance component to a level e.g., significantly below the level of the current $I_1$ in response to a respective sense voltage $V_1$ at the sense frequency. At the sense frequency, this high pass filter may exert a minor impact on the current I and thus on the measurement of the impedance $Z_{11}$ and which may be corrected in a further processing (e.g., in the signal processing circuit 408 of FIG. 4) as previously discussed with reference to FIG. 7A.

The measurement circuit 104 includes a driver amplifier circuit 902, a transimpedance amplifier circuit (e.g., amplifier 904), a transformer 1102, an input multiplexer circuit 910 illustrated in FIG. 11 as a plurality of switches 911*a*, 911*b*, . . . , 911*n*, and a plurality of resistors 1014 and 1015 (parallel resistors). The parallel resistors 1014 and 1015 are electrically connected in parallel to the respective terminal of the input multiplexer circuit 910 whose terminals are electrically connected to the respective measurement port (e.g., measurement port 936) of the sense circuits 106 and 108. The parallel resistors 1014 connected in parallel to the measurement ports 936 have a resistance $R_{par1}$, while the parallel resistors 1015 connected in parallel to the measurement ports 938 have a resistance $R_{par2}$ that may generally differ from $R_{par1}$.

Further, the measurement circuit 104 is configured to operate as a voltage source (e.g., voltage source 552 as described in connection with FIG. 5C) and to selectively (e.g., sequentially) apply the voltage signal $V_1$ at the sense frequency to each of the plurality of inductive sense circuits 106 and to each of the plurality of the capacitive sense circuits 108. The voltage signal $V_1$ (e.g., a sinusoidal sense signal) is based on a driver input signal which may be an output of the signal generator circuit 406 with reference to FIG. 4. The driver amplifier circuit 902 as illustrated in FIG. 11 by example includes an amplifier 904 and external resistance circuitry comprising a first (feedback) resistor 906 and a second resistor 908 for adjusting a gain. In some implementations, the amplifier 904 is one of a low noise operational amplifier and an amplifier providing high linearity. The driver amplifier circuit 902 is configured to receive the driver input signal and to provide a corresponding output with an accurate and stable voltage (a voltage source output).

The measurement circuit 104 is also configured to operate as the analog front-end part of a current measurement circuit (e.g., current measurement circuit 550 as described in connection with FIG. 5C). It is configured to selectively (e.g., sequentially) buffer and convert an electrical current $I_1$ in each of the plurality of inductive sense circuits 106 and in each of the plurality of capacitive sense circuits 108 and to provide an output voltage signal $V_{out}$ (as indicated in FIG. 11) based on the respective electrical current $I_1$ at a level suitable for further processing e.g., in the signal processing circuit 408 with reference to FIG. 4. The example transimpedance amplifier circuit 952 as illustrated in FIG. 10 includes an amplifier 954, a feedback resistor 956 having a resistance $R_f$, and a feedback capacitor 958 having a capacitance $C_f$. In some implementations, the amplifier 954 is at least one of a low noise operational amplifier and an amplifier providing high linearity. The positive input (+) of the amplifier 954 connects to ground. Both the feedback resistor 958 and the feedback capacitor 958 are electrically connected between the output ($V_{out}$) and the negative input (−) of the amplifier 954. Further, the transimpedance amplifier circuit 952 is configured to receive an input current $I_{in}$ that is a secondary current of the transformer 1102 and to convert the input current $I_{in}$ into a proportional output voltage $V_{out}$. The conversion gain (transimpedance) is determined by the impedance of the parallel connection of the feedback resistor 956 and the feedback capacitor 958. Since the voltage at the negative input (−) of the amplifier 954 is virtually zero (virtual ground), the transimpedance amplifier circuit 952 presents a virtually zero input impedance at its negative input (−). The feedback capacitor 958 provides the transimpedance amplifier circuit 952 with a first order low pass filter characteristic to attenuate disturbance signal components at frequencies higher than the sense frequency (e.g., high order WPT harmonics) as previously discussed with reference to FIG. 9A.

In other implementations, the filtering of the transimpedance amplifier circuit 952 is further enhanced by a supplementary feedback inductor (not shown in FIG. 10) electrically connected in parallel to the feedback capacitor 958. In a further implementation, an active bandpass filter as previously discussed with reference to FIG. 9A is employed.

The transformer 1102 includes a primary winding and a galvanically insulated secondary winding wound on a common core as indicated in FIG. 11. A first terminal of the transformer's 1102 primary winding electrically connects to the output of the driver amplifier circuit 902, while its second terminal is electrically connected to a common node of the input multiplexer circuit 910. The transformer 1102 is configured as a current transformer providing a current transformation ratio $1{:}n_{CT}$. The transformer's primary current corresponding to the driver amplifier circuit's 902 output current I may be indicative for the current $I_1$ in response to the applied voltage $V_1$. In some implementations, the transformer 1102 is configured for $n_{CT}>1$ (e.g., in the range between 2 and 4) and used to reduce a current $I_{in}=I/n_{CT}$ at the input of the transimpedance amplifier circuit 952. Therefore, use of the transformer 1102 with $n_{CT}>1$ may relax a drive current constrain similarly to the input transformer as discussed in connection with the circuit 1000 of FIG. 10.

In some alternative implementations of the circuit 900 of FIG. 9A, the transformer 1102 is supplanted by a parallel inductor (e.g., parallel inductor 716 with reference to the circuit 710 of FIG. 7B. In further implementations, neither a transformer 1102 nor a parallel inductor is used.

The input multiplexer circuit 910 includes a plurality of switches 911*a*, 911*b*, . . . , 911*n* and is configured to selectively connect each of the plurality of inductive sense circuits 106 and each of the plurality of capacitive sense circuits 108 to the driver amplifier circuit 902 and the transimpedance amplifier circuit 952 to selectively (e.g., sequentially) apply the voltage $V_1$ at the sense frequency to each of the plurality of sense circuits 106 and 108 and to selectively (e.g., sequentially) measure the current $I_1$ in response to the applied voltage $V_1$. The input multiplexer circuit 910 is further configured to receive a MUX control signal from a control circuit (e.g., from the control and evaluation circuit 102 of FIG. 4) that controls the input multiplexer circuit 910.

Each of the plurality of switches 911*a*, 911*b*, . . . , 911*n* may be one of a type as previously mentioned with reference to the circuit 900 of FIG. 9A. It may be appreciated that the closed-state resistance of the switch (e.g., switch 911*a*) may be non-critical if the impedance magnitude $|Z_{11}|$ at series resonance of a sense circuit (e.g., sense circuit 106*a*) is substantially higher than the closed-state resistance (e.g., if the capacitance ratio $n_C$ is sufficiently large as previously discussed). A high enough impedance $|Z_{11}|$ may also reduce an impact of the switch (e.g., switch 911*a*) and thus improve a temperature stability of the measurement circuit 104 as previously discussed with reference to FIG. 9A. If the impedance at the transformer's 1102 primary port is small enough, the total capacitive load produced by the plurality of parallel capacitances at the common input/output node may be non-critical given the voltage source output of the driver amplifier circuit 902.

As in the circuit 1000 of FIG. 10, the parallel resistors 1014 and 1015 are used to limit the open-switch voltage (e.g., at WPT frequency) across the input multiplexer circuit 910 switch (e.g., switch 911*a*) when WPT is active as previously discussed with reference to FIG. 10. Decreasing the resistance (e.g., $R_{par1}$) of the parallel resistor (e.g., parallel resistor 1014) will reduce the open-switch voltage. However, it will also increase a voltage drop across the switch (e.g., switch 911*a*) when in closed-state impacting temperature stability of the measurement circuit 104 as previously discussed with reference to FIG. 9A. On the other hand and as opposed to the circuit 1000, there is only one switch (e.g., switch 911*a*) affecting temperature stability. Further, since the resistors (e.g., parallel resistor 1014) are in parallel to the respective measurement port (e.g., measurement port 936), the impedance as measured by the measurement circuit 104 may differ from the impedance $|Z_{11}|$ as presented e.g., at the measurement port 936. Moreover, the fractional change as measured in the measurement circuit 104 may be smaller than the fractional change $|\Delta Z'|$ in $|Z_{11}|$. Therefore, in some implementations, the resistances $R_{par1}$ and $R_{par2}$ may represent a trade-off between an impedance measurement error and an open-switch voltage. In some implementations, the input multiplexer circuit 910 switches (e.g., switch 911*a*) are configured to sustain an open-switch voltage that is substantially (e.g., 5 times) higher than that of the switches used in the circuit 1000 and the resistances $R_{par1}$ and $R_{par2}$ are substantially (e.g., 5 times) higher than $|Z_{11}|$. Using an analog switch rated for a higher open-switch voltage may require other electrical characteristics (e.g., closed-state resistance, parasitic capacitances, etc.) of the switch to be compromised.

A specification and some resulting performance figures of an example circuit 1100 with respect to the inductive sense circuits 106 configured for a nominal sense frequency $f_s$=3 MHz are given in TABLE 11. A WPT operating frequency $f_{WPT}$=85 kHz is assumed. TABLE 10 also includes the system Q-factor $Q_{sys}$ as defined above by Equation (354), the quality of the measurement circuit 104 as defined by Equation (358), and the degradation of the fractional change in the measurement amplifier circuit's 404 output voltage $V_{out}$ as defined by Equation (356).

TABLE 11

| Item | Symbol | Value | Remarks |
|---|---|---|---|
| Input multiplexer circuit 910 switch closed-state resistance | | 5 Ω | |
| Parallel resistor 1014 resistance | $R_{par1}$ | 620 Ω | |
| Inductive sense element 107a inductance | L | 5 μH | |
| Inductive sense element 107a equivalent series resistance | R | 3.8 Ω | Q-factor Q = 25 |
| Parallel capacitor 544 capacitance | $C_p$ | 450 pF | |
| Series capacitor 546 capacitance | $C_s$ | 113 pF | |
| Capacitance ratio $C_p/C_s$ | $n_C$ | 4 | |
| Transformer 1102 current transformation ratio | $1:n_{CT}$ | 1:3 | |
| Feedback resistor 956 resistance | $R_f$ | 150 Ω | |
| Feedback capacitor 958 capacitance | $C_f$ | 330 pF | |
| Sense circuit 106a parallel resonance | | 3.35 MHz | |
| Precise sense frequency | | 2.991 MHz | |
| Impedance (min. magnitude) | $Z_{110}$ | 92 Ω | Meas, port 936 |
| System Q-factor | $Q_{sys}$ | 19.7 | |
| Quality of measurement circuit 104 | $Q_{mc}$ | 16 | |
| Residual angle error | ε | 1° | |
| Degradation of fractional change at meas. circuit 104 output ($V_{out}$) | | 17.3% | |
| Driver amplifier circuit 902 output voltage | | 2.23 $V_{pp}$ | 0.8 $V_{rms}$ |
| Driver amplifier circuit 902 output current | | 9.4 $mA_{rms}$ | |
| Driver amplifier circuit 902 output power | | 7.5 mW | |
| Measurement circuit 104 output current | $I_1$ | 8.2 $mA_{rms}$ | |
| Inductive sense element 107a current (sense current) | $I_L$ | 39.6 $mA_{rms}$ | |
| Transimpedance amplifier circuit 952 input current | $I_{in}$ | 3.1 $mA_{rms}$ | 3 MHz sense signal |

TABLE 11-continued

| Item | Symbol | Value | Remarks |
|---|---|---|---|
| Measurement circuit 104 output voltage | $V_{out}$ | 0.97 $V_{pp}$ | 3 MHz sense signal, 0.35 $V_{rms}$ |
| WPT fundamental disturbance voltage induced into inductive sense element 107a | $Vs_W$ | 30 $V_{rms}$ | 85 kHz component |
| WPT fundamental disturbance voltage at measurement circuit 104 output | | 0.25 $V_{pp}$ | 85 kHz component |
| SNR with respect to WPT fundamental disturbance voltage at $f_{WPT}$ | $SNR_W$ | 11.7 dB | 85 kHz component |
| WPT fundamental disturbance voltage across input multiplexer circuit 910 switch when open | | 5.3 $V_{pp}$ | 85 kHz component |

A specification and some resulting performance figures of an example circuit 1100 with respect to the capacitive sense circuits 108 configured for a nominal sense frequency $f_s$=3 MHz are given in TABLE 12. A WPT operating frequency $f_{WPT}$=85 kHz is assumed. TABLE 10 also includes the system Q-factor $Q_{sys}$ as defined above by Equation (354), the quality of the measurement circuit 104 as defined by Equation (358), and the degradation of the fractional change in the measurement amplifier circuit's 404 output voltage $V_{out}$ as defined by Equation (356).

TABLE 12

| Item | Symbol | Value | Remarks |
|---|---|---|---|
| Input multiplexer circuit 910 switch closed-state resistance | | 5 Ω | |
| Parallel resistor 1015 resistance | $R_{par2}$ | 820 Ω | |
| DC block capacitor 930 capacitance | $C_b$ | 3.3 nF | |
| Capacitive sense element 109n capacitance | C | 30 pF | |
| Series inductor 724 inductance | $L_s$ | 94 uH | includes transformer 726 leakage inductance |
| Series inductor 724 equiv. series resistance | $R_{Ls}$ | 118 Ω | Q-factor $Q_{Ls}$ = 25, includes transf. 726 losses |
| Transformer 726 secondary-referred main inductance | $L_m$ | 150 uH | |
| Transformer 726 voltage transformation ratio | $1{:}n_{VT}$ | 4:3 | |
| Transformer 1102 current transformation ratio | $1{:}n_{CT}$ | 1:3 | |
| Feedback resistor 956 resistance | $R_f$ | 150 Ω | |
| Feedback capacitor 958 capacitance | $C_f$ | 330 pF | |
| Sense circuit 108n parallel resonance | | 1.86 MHz | |
| Precise sense frequency | | 3.009 MHz | |
| Impedance (min. magnitude) | $Z_{110}$ | 208 Q | Meas, port 938 |
| System Q-factor | $Q_{sys}$ | 11.6 | |
| Residual angle error | ε | 1° | |
| Degradation of fractional change at meas. circuit 104 output ($V_{out}$) | | 22.5% | |
| Quality of measurement circuit 104 | $Q_{mc}$ | 33.2 | |
| Driver amplifier circuit 902 output voltage | | 4.24 $V_{pp}$ | 1.5 $V_{rms}$ |
| Driver amplifier circuit 902 output current | I | 8.8 $mA_{rms}$ | |
| Driver amplifier circuit 902 output power | | 13.2 mW | |
| Measurement circuit 104 output current | $I_1$ | 11.5 $mA_{rms}$ | |
| Capacitive sense element 109a current (sense current) | $I_C$ | 9.3 $mA_{rms}$ | |
| Transimpedance amplifier circuit 952 input current | $I_{in}$ | 2.9 $mA_{rms}$ | 3 MHz sense signal |
| Measurement circuit 104 output voltage | $V_{out}$ | 0.91 $V_{pp}$ | 3 MHz sense signal, 0.32 $V_{rms}$ |
| WPT fundamental disturbance voltage induced into capacitive sense element 109a | $V_{sW}$ | 150 $V_{rms}$ | 85 kHz component |
| WPT fundamental disturbance voltage at measurement circuit 104 output | | 85.1 $mV_{pp}$ | 85 kHz component |
| SNR with respect to WPT fundamental disturbance voltage at $f_{WPT}$ | $SNR_W$ | 20.5 dB | 85 kHz component |
| WPT fundamental disturbance voltage across input multiplexer circuit 910 switch when open | | 4.9 $V_{pp}$ | 85 kHz component |

The numerical values as shown in TABLEs 11 and 12 for the circuit 1100 are similar to those obtained for the circuit 1000 listed in TABLEs 9 and 10, respectively. The degradation of the fractional change in the circuit 1100 is larger. However, this drawback may be acceptable considering the potential for circuit complexity reduction in the circuit 1100.

Figure 12B:
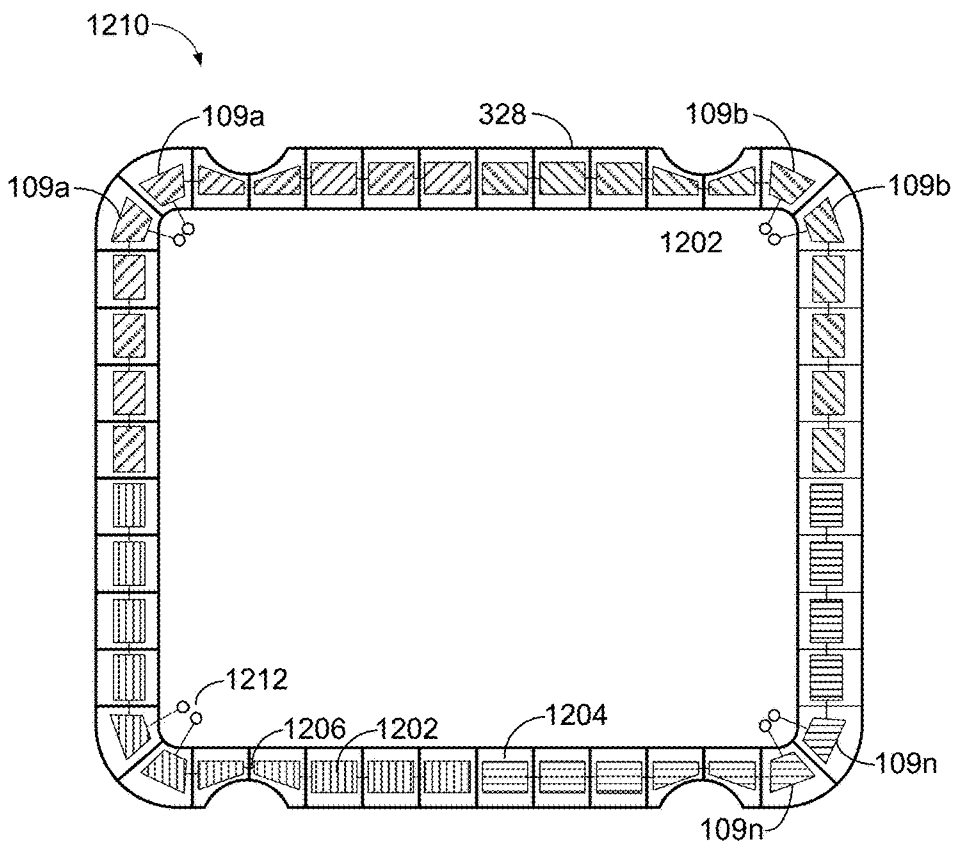
FIG. 12B is a schematic view illustrating an example implementation of the housing of the ground-based wireless power transfer structure integrating double-ended capacitive sense element of the multi-purpose detection circuit of FIG. 1.

FIGS. 12A and 12B illustrate example implementations of capacitive sense elements 109*a*, 109*b*, . . . , 109*n* integrated into the housing 328 (e.g., a plastic enclosure) of a wireless power transfer structure (e.g., wireless power transfer structure 200) with reference to FIGS. 2 and 3. FIGS. 12A and 12B show top views of the example implementations, which, for simplicity of discussion, include only a portion of the housing 328.

More specifically, FIG. 12A shows an arrangement 1200 of four single-ended capacitive sense elements each composed of an electrode pair electrically connected in parallel and providing a single terminal 1208 in the corner of the housing 328. Each electrode is further subdivided into smaller elements 1202 tailored to fit into compartments 1204 of the housing 328. The plurality of elements 1202 belonging to the same electrode are electrically connected e.g., using wires or similar electrical conductors that may pass through slots in the walls dividing the compartments 1204. The compartments 1204 are located along a perimeter of the housing 328. In some aspects, the top surface of the compartments 1204 is inclined toward the interior of the housing 328 to form ramps over which a vehicle may drive.

FIG. 12B shows an arrangement 1210 of four double-ended capacitive sense elements each composed of an electrode pair providing a terminal pair 1212 in the corner of the housing 328. Each electrode is further subdivided into smaller elements 1202 as described above with reference to FIG. 12A.

Figure 13A:
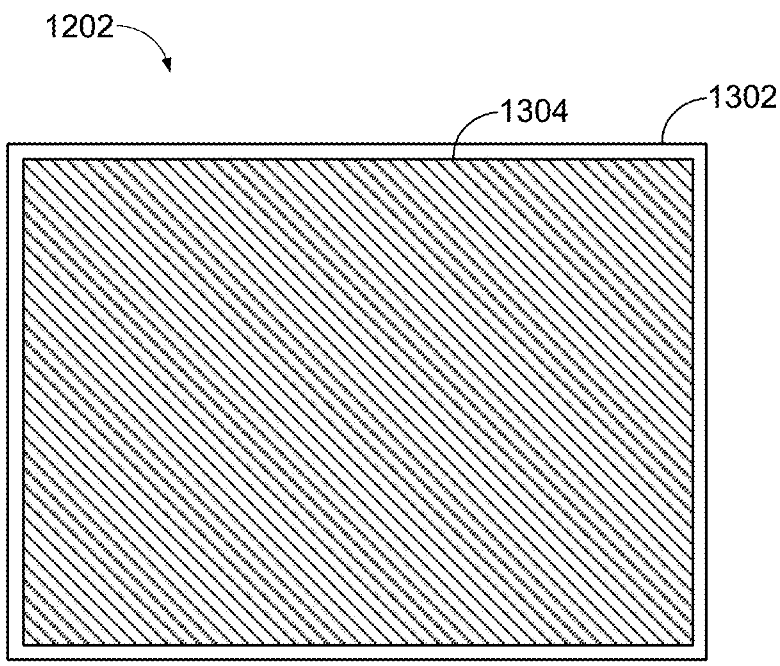
FIG. 13A is a schematic view illustrating an example printed circuit board implementation of a holohedral sense electrode.
Figure 13B:
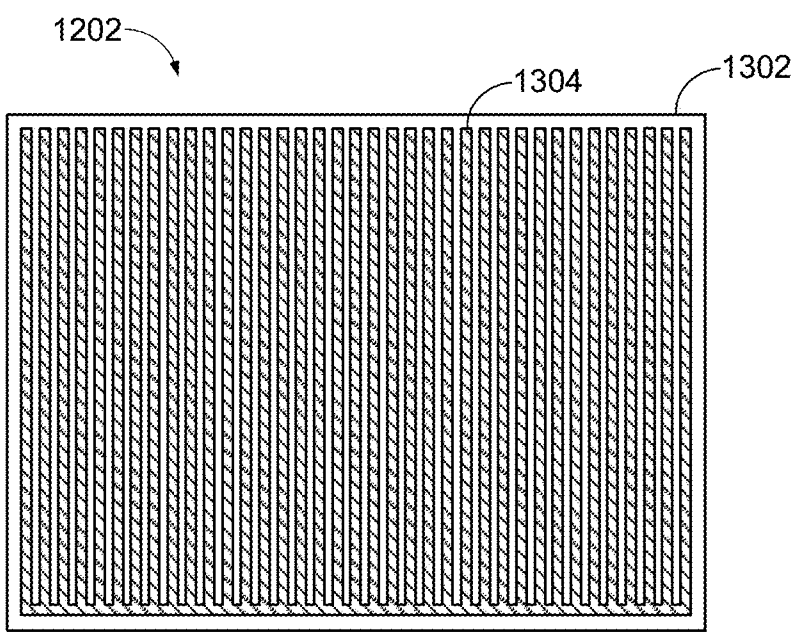
FIG. 13B is schematic view illustrating an example printed circuit board implementation of a sense electrode having a finger structure.

FIGS. 13A and 13B illustrate example implementations of an electrode element (e.g., element 1202) with reference to FIGS. 12A and 12B, respectively. FIG. 13A illustrates holohedral sense electrode (e.g., element 1202) made of a holohedral conductive sheet 1304 (e.g., copper sheet) on a non-conductive substrate 1302.

Integrated into a wireless power transfer structure (e.g., wireless power transfer structure 200), electrodes of capacitive sense elements 109*a*, 109*b*, . . . , 109*n* may experience substantial eddy current heating due to the strong alternating magnetic fields as generated during wireless power transfer. Therefore, in a further aspect of mitigating eddy current heating, electrodes are designed to increase a surface impedance.

FIG. 13B shows an alternative implementation of an element 1202 configured to increase a surface impedance with respect to the holohedral conductive sheet 1204. The element 1202 is shaped as a finger structure comprising a number of conductive strips electrically connected at only one end. This finger structure may increase a surface impedance and thus reduce eddy current flow on the element's 1202 surface and consequent heating. Using a finger structure may also reduce the capacitance C of the capacitive sense element (e.g., capacitive sense element 109*a*). However, the capacitive coupling to the object (e.g., object 114) e.g., as defined by Equation (342), may not change substantially.

In another implementation, the element 1202 is made of a weakly conductive material providing a sufficiently high surface impedance. The material may represent a trade-off between eddy current heating and an equivalent resistance (e.g., equivalent resistance R as indicated in FIG. 7A) of the capacitive sense element (e.g., capacitive sense element 109*a*).

In further implementations, other suitable structures or materials are used to increase the surface impedance of the element 1202 trading-off eddy current heating and an equivalent resistance R of the capacitive sense element (e.g., capacitive sense element 109*a*) at the sense frequency as previously discussed with reference to FIG. 7A.

In some implementations, the element 1202 is made as a printed circuit board (PCB). In other implementations, the plurality of elements 1202 is a flex print that also includes the inter-element connections as mentioned above with reference to FIG. 12A.

In further implementations with reference to FIGS. 12, the electrodes of the capacitive sense elements (e.g., capacitive sense element 109*a*) are directly printed onto the non-conductive inner surface of the housing 328 e.g., using a 3D inkjet printer (conductive ink) or other manufacturing technologies such as Molded Interconnect Device (MID) and Laser Direct Structuring (LDS). In another implementation, electrodes are fully or partially embedded in the plastic material of the housing 328 e.g., using an injection molding process where electrodes are inlaid into the mold prior injection.

Figure 14A:
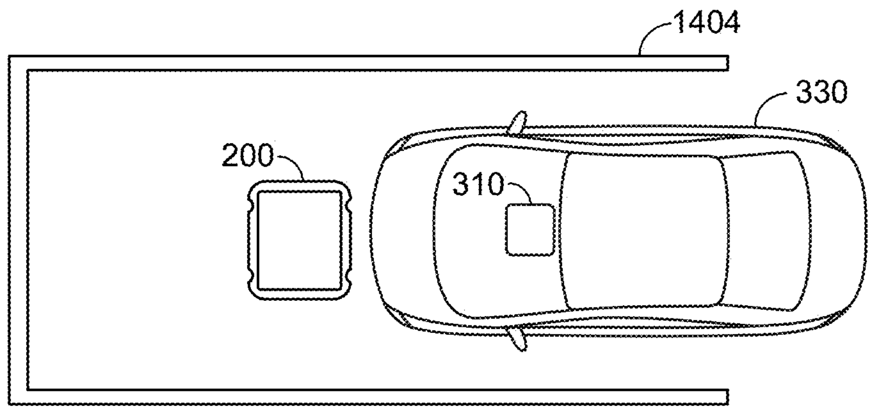
FIGS. 14A to 14C illustrates an electric vehicle approaching a ground-based wireless power transfer structure installed in a parking space.
Figure 14B:
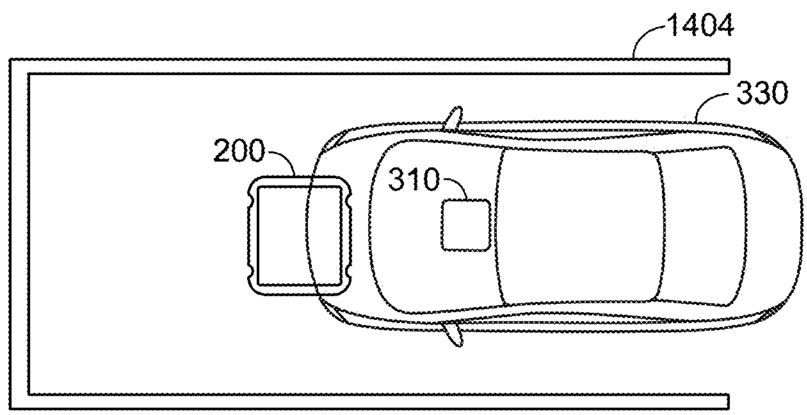
Figure 14C:
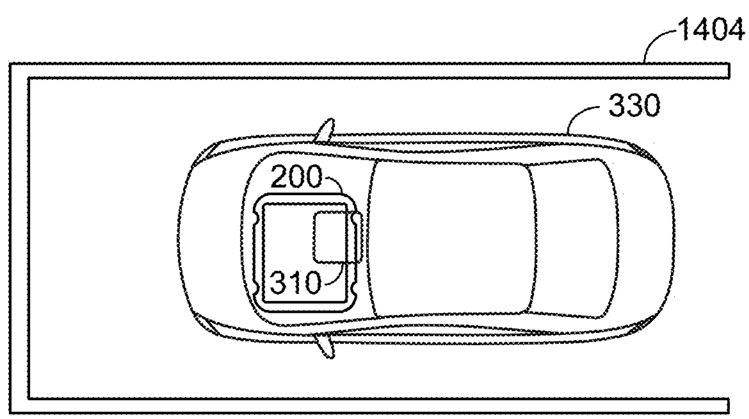

The image (snapshot) sequence of FIGS. 14A to 14C illustrate the electric vehicle 330 driving into a parking place 1404 (e.g., for purposes of charging) at three different positions. The vehicle 330 provides the (secondary) wireless power transfer structure 310 mounted at its underbody at a location as illustrated in FIGS. 14A to 14C and in FIG. 3. The parking place 1404 is equipped with the (primary) wireless power transfer structure 200 with reference to FIGS. 2 and 3 e.g., to wirelessly deliver power to the vehicle 330 as previously described with reference to FIGS. 2 and 3. Further, the wireless power transfer structure 200 integrates the multi-purpose detection circuit 100 including the array 107 of inductive sense elements 107*a*, 107*b*, . . . 107*n* and the arrangement of capacitive sense elements 109*a*, 109*b*, . . . 109*n* as illustrated in FIGS. 2 and 3. The array 107 of inductive elements is assumed to essentially cover the top surface of the wireless power transfer structure 200 as illustrated by FIGS. 2 and 3.

FIG. 14A shows the vehicle 330 approaching the ground-based wireless power transfer structure 200. In FIG. 14B, the vehicle's 330 front partially overlaps the wireless power transfer structure 200, while FIG. 14C represents the vehicle 330 close before its final parking position where the vehicle-mounted wireless power transfer structure 310 will be in sufficient alignment with the ground-based wireless power transfer structure 200 as previously mentioned in the introduction.

Figure 15A:
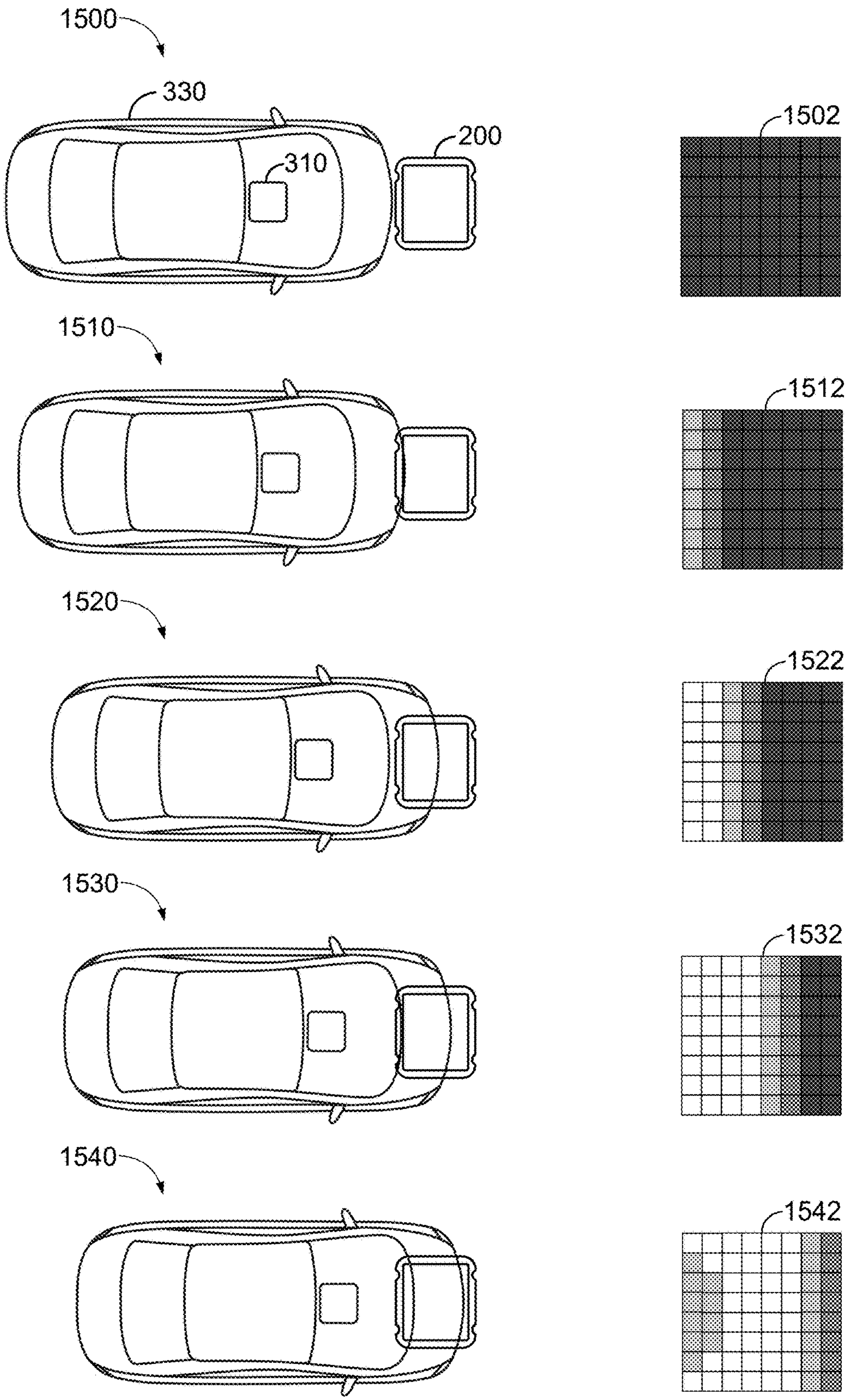
FIGS. 15A and 15B illustrates an example implementation of vehicle position determination (PD) based on pattern detection.
Figure 15B:
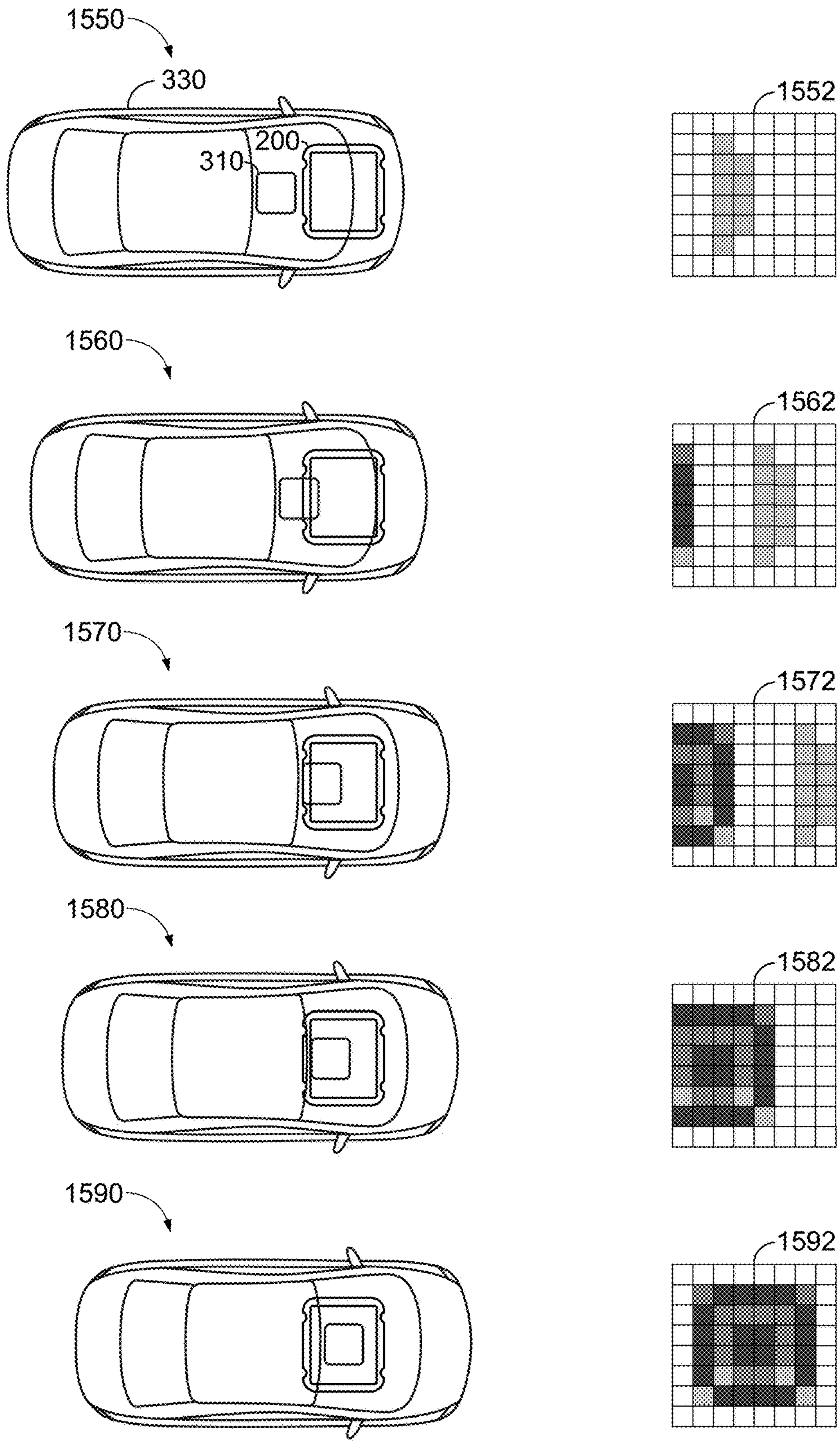

The sequence of images 1500 to 1580 of FIGS. 15A and 15B illustrate the electric vehicle 330 advancing towards the final parking position as described above with reference to FIG. 14C. On the right-hand side, FIGS. 15A and 15B display corresponding 8×8 pixel grayscale patterns 1502 to 1592. Each of the patterns 1502 to 1592 may refer to a pattern produced by mapping the plurality of detection output values of the multi-purpose detection circuit 100 using an 8×8 array 107 of inductive sense elements 107*a*, 107*b*, . . . , 107*n* onto respective elements of an 8×8 matrix at the respective vehicle position. More specifically, in some implementations, these detection outputs may refer to outputs of the measurement circuit 104 with reference to FIG. 4. In other implementations, detection outputs may be outputs of a function (not shown herein) that is part of the evaluation & control circuit 102. The pixel grayscale may be indicative of at least one of a magnitude and a phase of an impedance change (e.g., $\Delta Z$) in an inductive sense circuit (e.g., inductive sense circuit 106*a*) as caused by the presence of the vehicle 330. In some implementations, it may be indicative of another electrical characteristics as output by the multi-purpose detection circuit 100. "Dark gray" indicates zero change (e.g., $|\Delta Z|\approx 0$) or a change blow a detection threshold, while "white" refers to a change reaching or exceeding a certain saturation level.

Pattern 1502 (all pixels dark gray) refers to the absence of the vehicle 330 or to a vehicle 330 position as shown by image 1500 where the vehicle's 330 impact on the detection outputs of the multi-purpose detection circuit 100 is below the detection threshold.

Pattern 1512 refers to a vehicle 330 position as shown by image 1510 where the front (leading edge) of the vehicle 330 starts to cause a minority of detection outputs to exceed the detection threshold resulting in brighter gray pixels in the $1^{st}$ and $2^{nd}$ column of the pattern 1512.

Pattern 1522 refers to a vehicle 330 position as shown by image 1520 where the leading edge of the vehicle 330 causes more detection outputs to exceed the detection threshold or even the saturation level resulting in white pixels in the $1^{st}$ and $2^{nd}$ column and brighter gray pixels in the $3^{rd}$ and $4^{th}$ column of the pattern 1522.

Pattern 1532 refers to a vehicle 330 position as shown by image 1530 where the leading edge of the vehicle 330 is further advanced and substantially overlapping the surface of the wireless power transfer structure 200, thus causing a majority of detection outputs to exceed the detection threshold and a higher number thereof to exceed the saturation level resulting in white pixels in the first four columns and brighter gray pixels in the $5^{th}$ and $6^{th}$ column of the pattern 1532.

Pattern 1542 refers to a vehicle 330 position as shown by image 1540 where the leading edge of the vehicle 330 is almost fully overlapping the wireless power transfer structure 200, thus causing all detection outputs to exceed the detection threshold and a majority thereof to exceed the saturation level resulting in white pixels in the first 6 columns and brighter gray pixels in the $7^{th}$ and $8^{th}$ column of the pattern 1542. At this stage, the pattern 1542 also shows a gray area in the first two columns caused by an inhomogeneous structure of the vehicle's 330 underbody (e.g., by a different material or a cavity in the underbody).

Pattern 1552 refers to a vehicle 330 position as shown by image 1550 where the leading edge of the vehicle 330 entirely overlaps the wireless power transfer structure 200, thus causing detection outputs to exceed the detection threshold in all columns. The gray area caused by the inhomogeneous underbody and that has become visible in the pattern 1542 has now moved to the $4^{th}$ and $6^{th}$ column of the pattern 1552.

Pattern 1562 refers to a vehicle 330 position as shown by image 1560 where the vehicle-based wireless power transfer structure 310 has reached the edge of the ground-based wireless power transfer structure 200 that starts now to also impact the pattern 1562. Since the wireless power transfer structure 310 includes different materials (e.g., Litz wire made of copper, ferrite, aluminum, and other conductive and non-conductive materials, its impact on the individual inductive sense elements of the array 107 may be highly variable. While ferrite materials tend to produce a positive reactance change, highly conductive materials such as copper and aluminum tend to cause a negative reactance change. Depending on the actual relative position of the wireless power transfer structure 310, the impact of some portions of the wireless power transfer structure 310 on some inductive sense elements (e.g., inductive sense element 107*a*) may cancel out producing the dark gray area in column 1 of the pattern 1562.

Pattern 1572 refers to a vehicle 330 position as shown by image 1570 where the center of the vehicle-based wireless power transfer structure 310 has just surpassed the edge of the ground-based wireless power transfer structure 200 producing a unique pattern of different gray levels in the first three columns. The gray area caused by the underbody inhomogeneity has now proceeded to the last two columns of the pattern 1572.

Pattern 1582 refers to a vehicle 330 position as shown by image 1580 where the vehicle-based wireless power transfer structure 310 now fully overlaps with the top surface of the ground-based wireless power transfer structure 200. The grayscale pattern as produced by the vehicle-based wireless power transfer structure 310 is now almost entirely visible, while the underbody inhomogeneity has already left the sensitive area of the inductive sensing array 107 (not visible anymore in the pattern of image 1580).

Pattern 1592 refers to a vehicle 330 position as shown by image 1590 where the vehicle-based wireless power transfer structure 310 is now well aligned with the ground-based wireless power transfer structure 200 displaying the grayscale pattern centered in the 8×8 pattern 1592.

The patterns 1502 to 1592 as used in FIGS. 15A and 15B may be considered example and simplified for purposes of illustration. Other types of vehicles 330 and other types of vehicle-based wireless power transfer structures 310 may produce 8×8 patterns different from those shown in FIGS. 15A and 15B.

Patterns (e.g., 2×2 patterns) may also be produced from detection outputs of the multi-purpose detection circuit 100 associated to the plurality of capacitive sense elements 109*a*, 109*b*, . . . 109*n* as illustrated in FIGS. 2 and 3. More specifically, in some implementations, these detection outputs may refer to outputs of the measurement circuit 104 with reference to FIG. 4. In other implementations, detection outputs may be outputs of a function (not shown herein) that is part of the evaluation & control circuit 102. Analogously, gray levels in these patterns (not shown herein) may be indicative of impedance changes as measured in the plurality of capacitive sense circuits 108*a*, 108*b*, . . . 108*n*. Though with a lower image resolution, these patterns may also reflect structures of the vehicle's 330 underbody (e.g., the vehicle-based wireless power transfer structure 310).

Therefore, in some implementations, the patterns 1502 to 1592 may also refer to a pattern produced by mapping detection output values of the multi-purpose detection circuit 100 associated with at least one of the plurality of inductive sense elements 107*a*, 107*b*, . . . , 107*n* and the plurality of capacitive sense elements 109*a*, 109*b*, . . . , 109*c*.

In an aspect of the multi-purpose detection circuit 100, patterns as produced by detection outputs associated with at least one of the plurality of inductive sense circuits 106 and the plurality of capacitive sense circuits as previously described with reference to FIGS. 15A and 15B are used to discriminate the vehicle 330 from an object (e.g., object 110). More specifically, in some implementations, detection outputs associated with at least one inductive sense circuit (e.g., inductive sense circuit 106*a*) are used to discriminate between the impact of the vehicle 330 and the impact of an object (e.g., object 112) in detection outputs associated with at least one capacitive sense circuit (e.g., capacitive sense circuit 108*a*). Conversely, in some implementations, detection outputs associated with at least one capacitive sense circuit (e.g., capacitive sense circuit 108*a*) are used to discriminate between the impact of the vehicle 330 and the impact of an object (e.g., object 110) in detection outputs associated with at least one inductive sense circuit (e.g., inductive sense circuit 106*a*).

Stated more generally, detection outputs associated with at least one inductive sense circuit (e.g., inductive sense circuit 106*a*) are used to reduce a false positive detection probability of LOD. Conversely, detection outputs associated with at least one capacitive sense circuit (e.g., capacitive sense circuit 108*a*) are used to reduce a false positive detection probability of FOD.

In some implementations, detection outputs associated with at least one inductive sense circuit (e.g., inductive sense circuit 106*a*) and at least one capacitive sense circuit (e.g., capacitive sense circuit 108*a*) are used to dynamically adjust a detection threshold of the multi-purpose detection circuit 100 where the detection threshold refers to at least one of FOD and LOD. Dynamically adjusting a detection threshold is described in U.S. patent application Ser. No. 16/392,464, titled Extended Foreign Object Detection Signal Processing.

In another aspect of the multi-purpose detection circuit 100, patterns as produced by detection outputs associated with at least one of the plurality of inductive sense circuits 106 and the plurality of capacitive sense circuits as previously described with reference to FIGS. 15A and 15B are used to detect or identify a type of vehicle 330 or a type of vehicle-based wireless power transfer structures 310.

In a further aspect of the multi-purpose detection circuit 100, patterns as produced by detection outputs associated with at least one of the plurality of inductive sense circuits 106 and the plurality of capacitive sense circuits as previously described with reference to FIGS. 15A and 15B are used to determine a position of the vehicle 330 (or the vehicle-based wireless power transfer structures 310) relative to the ground-based wireless power transfer structure 200.

In some implementations of the multi-purpose detection circuit 100, the relative position is at least in part determined by using an image correlation technique (e.g., a similar technique as employed in the computer mouse using a laser sensor for surface structure detection).

In another implementation of the multi-purpose detection circuit 100, the relative position is determined by tracking a "front-wave" in successively obtained patterns as produced by detection outputs associated with at least one of the plurality of inductive sense circuits 106 and the plurality of capacitive sense circuits and as illustrated by the patterns 1512 to 1542 of FIG. 15A. This "front-wave" visible in patterns 1512 to 1542 as a transition of dark grey to white may be produced by the leading edge of the vehicle 330.

In another aspect of the multi-purpose detection circuit 100, patterns as produced by detection outputs associated with at least one of the plurality of inductive sense circuits 106 and the plurality of capacitive sense circuits as previously described with reference to FIGS. 15A and 15B are used to activate or prime another positioning system.

In a further aspect of the multi-purpose detection circuit 100, patterns as produced by detection outputs associated with at least one of the plurality of inductive sense circuits 106 and the plurality of capacitive sense circuits as previously described with reference to FIGS. 15A and 15B are used to extend the range of another positioning system.

In yet another aspect of the multi-purpose detection circuit 100, patterns as produced by detection outputs associated with at least one of the plurality of inductive sense circuits 106 and the plurality of capacitive sense circuits as previously described with reference to FIGS. 15A and 15B are used to enhance the accuracy or reliability of another positioning system.

In yet a further aspect of the multi-purpose detection circuit 100, patterns as produced by detection outputs associated with at least one of the plurality of inductive sense circuits 106 and the plurality of capacitive sense circuits as previously described with reference to FIGS. 15A and 15B are used to adjust or calibrate another positioning system.

Other positioning systems may include systems based on using at least one of an inductive and capacitive passive beacon transponder as previously discussed e.g., with reference to FIG. 3, sensing of at least one of a magnetic and electric field generated by an active beacon transmitter (e.g., active beacon as described in U.S. patent application Ser. No. 16/284,959 titled Extended-Range Positioning System Based on Foreign Object Detection, magnetic vectoring as described in U.S. patent application Ser. No. 15/003,521 titled Integration of Solenoid Positioning Antennas in Wireless Inductive Charging Power Applications, U.S. Pat. No. 10,340,752 titled System, Methods and Apparatuses for Guidance and Alignment in Electric Vehicles Wireless Inductive Charging Systems, and U.S. Pat. No. 10,566,839 titled Systems, Methods and Apparatus for Guidance and Alignment Between Electric Vehicles and Wireless Charging Systems, the entire contents of which are hereby incorporated by reference). They may also include positioning systems based on optical sensors (cameras), LIDAR technologies, ultrasound sensors, inertial sensors.

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general-purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The bus may also link various other circuits such as timing sources, peripherals, voltage regulators, power management circuits, and the like.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A detection circuit for detecting an object in a wireless power transfer system, the detection circuit comprising:
- a sense element;
- a reactance-compensating element in series with the sense element to form a series circuit configured to provide a series resonance substantially at a nominal sense frequency of the detection circuit;
- a parallel inductor in parallel with the series circuit and configured to attenuate a low frequency disturbance component in a voltage across the series circuit at a frequency substantially lower than the nominal sense frequency of the detection circuit; and
- a parallel capacitor in parallel with the series circuit and configured to:
  - provide parallel resonance together with the parallel inductor at the nominal sense frequency; and
  - attenuate a high frequency disturbance component in the voltage across the series circuit at a frequency substantially higher than the nominal sense frequency of the detection circuit, the high frequency disturbance component generated by a communication system that is coupled to the wireless power transfer system and that runs at a frequency substantially higher than the nominal sense frequency.

2. The detection circuit of claim 1, wherein the sense element is an inductive sense element comprising at least one sense coil, and wherein the reactance-compensating element is a capacitor.

3. The detection circuit of claim 1, wherein the sense element is a capacitive sense element comprising at least one sense electrode, and wherein the reactance-compensating element is an inductor.

4. The detection circuit of claim 1, wherein the parallel inductor and the parallel capacitor form a parallel circuit configured to provide a parallel resonance substantially at the nominal sense frequency of the detection circuit.

5. The detection circuit of claim 1, wherein the low frequency disturbance component in the voltage across the series circuit is generated by the wireless power transfer system when active.

6. The detection circuit of claim 1, wherein the detection circuit is operable to detect an object comprising a foreign metallic object located in a predetermined space of the wireless power transfer system.

7. The detection circuit of claim 1, wherein the detection circuit is operable to detect an object comprising a living object located in a predetermined space of the wireless power transfer system.

8. The detection circuit of claim 1, wherein the detection circuit is operable to detect a position of the object.

9. The detection circuit of claim 1, wherein the detection circuit is operable to detect a presence of the object.

10. The detection circuit of claim 1, wherein the sense element is integrated into a primary wireless power transfer structure of the wireless power transfer system, and wherein the nominal sense frequency of the detection circuit is a resonant frequency of a passive beacon transponder within a secondary wireless power transfer structure.

11. The detection circuit of claim 10, wherein the sense element is an inductive sense element configured to interact with the passive beacon transponder mainly inductively.

12. The detection circuit of claim 10, wherein the sense element is a capacitive sense element configured to interact with the passive beacon transponder mainly capacitively.

13. The detection circuit of claim 10, wherein the object is the passive beacon transponder.

14. A wireless power transmission system comprising:
- a primary wireless power transfer structure;
- a communication system running at a first frequency;
- a detection circuit for detecting an object, the detection circuit comprising:
  - a sense element;
  - a reactance-compensating element in series with the sense element to form a series circuit configured to provide a series resonance substantially at a nominal sense frequency of the detection circuit, the first frequency of the communication system being substantially higher than the nominal sense frequency of the detection circuit;
  - a parallel inductor in parallel with the series circuit and configured to attenuate a low frequency disturbance component in a voltage across the series circuit at a frequency substantially lower than the nominal sense frequency of the detection circuit; and
  - a parallel capacitor in parallel with the series circuit and configured to:
    - provide parallel resonance together with the parallel inductor at the nominal sense frequency; and
    - attenuate a high frequency disturbance component in the voltage across the series circuit at a frequency substantially higher than the nominal sense frequency of the detection circuit, the high frequency disturbance component generated by the communication system at the first frequency.

15. The wireless power transmission system of claim 14, wherein the sense element is an inductive sense element comprising at least one sense coil, and wherein the reactance-compensating element is a capacitor.

16. The wireless power transmission system of claim 14, wherein the sense element is a capacitive sense element comprising at least one sense electrode, and wherein the reactance-compensating element is an inductor.

17. The wireless power transmission system of claim 14, wherein the low frequency disturbance component in the voltage across the series circuit is generated by the wireless power transmission system when active.

18. The wireless power transmission system of claim 14, wherein:
- the sense element is integrated into the primary wireless power transfer structure; and the nominal sense frequency of the detection circuit is a resonant frequency of a passive beacon transponder within a secondary power transfer structure.

19. The wireless power transmission system of claim 18, wherein the sense element is an inductive sense element configured to interact with the passive beacon transponder mainly inductively.

20. The wireless power transmission system of claim 18, wherein the sense element is a capacitive sense element configured to interact with the passive beacon transponder mainly capacitively.

* * * * *